United States Patent
Tao et al.

(10) Patent No.: US 9,657,169 B2
(45) Date of Patent: May 23, 2017

(54) GRAFT COPOLYMER, THERMOPLASTIC RESIN COMPOSITION, AND MOLDED ARTICLE OF SAID RESIN COMPOSITION

(71) Applicants: UMG ABS, LTD., Chuo-ku (JP); MITSUBISHI RAYON CO., LTD., Chiyoda-ku (JP)

(72) Inventors: Kousaku Tao, Ube (JP); Risa Nii, Ube (JP); Yoshiaki Shinohara, Ube (JP); Nobutaka Hase, Ube (JP)

(73) Assignees: UMG ABS, LTD., Chuo-ku (JP); Mitsubishi Rayon Co., Ltd., Chiyoda-ku (JP)

( * ) Notice: Subject to any disclaimer, the term of this patent is extended or adjusted under 35 U.S.C. 154(b) by 0 days.

(21) Appl. No.: 14/765,667

(22) PCT Filed: Feb. 14, 2014

(86) PCT No.: PCT/JP2014/053518
§ 371 (c)(1),
(2) Date: Aug. 4, 2015

(87) PCT Pub. No.: WO2014/126215
PCT Pub. Date: Aug. 21, 2014

(65) Prior Publication Data
US 2015/0376395 A1    Dec. 31, 2015

(30) Foreign Application Priority Data

| Feb. 15, 2013 | (JP) | 2013-028130 |
| Feb. 15, 2013 | (JP) | 2013-028360 |
| Feb. 15, 2013 | (JP) | 2013-028361 |
| Feb. 15, 2013 | (JP) | 2013-028362 |
| Feb. 3, 2014 | (JP) | 2014-018864 |
| Feb. 3, 2014 | (JP) | 2014-018865 |

(51) Int. Cl.

| *C08L 51/00* | (2006.01) |
| *C08L 51/06* | (2006.01) |
| *C08F 255/02* | (2006.01) |
| *C08L 51/04* | (2006.01) |
| *C08F 2/22* | (2006.01) |
| *C08L 33/10* | (2006.01) |
| *C08F 210/02* | (2006.01) |
| *C08L 23/08* | (2006.01) |
| *C08L 25/04* | (2006.01) |

(52) U.S. Cl.
CPC .............. *C08L 51/06* (2013.01); *C08F 2/22* (2013.01); *C08F 210/02* (2013.01); *C08F 255/02* (2013.01); *C08L 23/0815* (2013.01); *C08L 25/04* (2013.01); *C08L 33/10* (2013.01); *C08L 51/00* (2013.01); *C08L 51/04* (2013.01); *C08L 2205/02* (2013.01); *C08L 2205/03* (2013.01); *C08L 2207/04* (2013.01)

(58) Field of Classification Search
CPC ........... C08L 51/00; C08L 51/04; C08L 51/06
See application file for complete search history.

(56) References Cited

U.S. PATENT DOCUMENTS 5,037,890 A    8/1991    Yokoyama et al.

FOREIGN PATENT DOCUMENTS

| CN | 1751074 | 3/2006 |
| JP | 1-118510 A | 5/1989 |
| JP | 5-022735 | 3/1993 |
| JP | 5-279434 A | 10/1993 |
| JP | 2688619 B2 | 12/1997 |
| JP | 11-1600 A | 1/1999 |
| JP | 2848584 | 1/1999 |
| JP | 2000-119477 A | 4/2000 |
| JP | 2000-351816 A | 12/2000 |
| JP | 2001-98135 A | 4/2001 |
| JP | 2002-256036 A | 9/2002 |
| JP | 2003-277570 A | 10/2003 |
| JP | 2004-346187 A | 12/2004 |
| JP | 2004-352842 A | 12/2004 |
| JP | 2005-132970 A | 5/2005 |
| JP | 2008-291158 A | 12/2008 |
| JP | 2011-168186 A | 9/2011 |
| JP | 2011-174029 A | 9/2011 |

OTHER PUBLICATIONS

English language translation (machine generated) JP 2000-351816, Dec. 2000.*
International Search Report issued Apr. 22, 2014 in PCT/JP2014/053518 (with English TranIslation).
Office Action Issued Aug. 1, 2016, in Chinese Patent Application No. 201480009002.5 (with English Translation).
Office Action mailed Jan. 4, 2017, in Japanese Patent Application No. 2013-028360 (with English Translation).

* cited by examiner

*Primary Examiner* — Margaret Moore
(74) *Attorney, Agent, or Firm* — Oblon, McClelland, Maier & Neustadt, L.L.P.

(57) ABSTRACT

This graft copolymer is obtainable by polymerization of a vinyl-based monomer mixture (m1) including an aromatic vinyl compound and a vinyl cyanide compound, in the presence of: an ethylene.α-olefin copolymer (A) which has a mass average molecular weight (Mw) of $17 \times 10^4$ to $35 \times 10^4$ and a distribution of molecular weight (Mw/Mn) of 1 to 3; or a cross-linked ethylene.α-olefin copolymer (C) obtainable by cross-linking treatment of the ethylene.α-olefin copolymer (A).

14 Claims, 1 Drawing Sheet

GRAFT COPOLYMER, THERMOPLASTIC RESIN COMPOSITION, AND MOLDED ARTICLE OF SAID RESIN COMPOSITION

TECHNICAL FIELD

The present invention relates to a thermoplastic resin composition, and a molded article thereof.

Priority is claimed on Japanese Patent Application No. 2013-028360, filed on Feb. 15, 2013, Japanese Patent Application No. 2013-028361, filed on Feb. 15, 2013, Japanese Patent Application No. 2013-028362, filed on Feb. 15, 2013, Japanese Patent Application No. 2013-028130, filed on Feb. 15, 2013, Japanese Patent Application No. 2014-018864, filed on Feb. 3, 2014, and Japanese Patent Application No. 2014-018865, filed on Feb. 3, 2014, the content of which is incorporated herein by reference.

BACKGROUND OF THE ART

The vehicle exterior parts, for example, door mirrors, pillars, bumpers, front grilles, cowls and the like, have a high impact resistance and good appearance. With respect to the material, a paint treatment is conducted to the molded article of a thermoplastic resin such as ABS resin, ASA resin, polymethyl methacrylate, polycarbonate, and the like, in order to obtain high quality appearance.

In recent years, the environmental burden is large, the processes are complicated, and failure rate is high, so a paint treatment of the molded article may be omitted by blending a coloring agent in advance in a thermoplastic resin.

When the paint treatment is omitted, because the high weather resistance on a thermoplastic resin is required, AES resin and ASA resin having a good weather resistance has been used, in which ethylene.propylene.non-conjugated diene copolymer, acrylic ester-based rubber, hydrogenated rubber such as hydrogenated butadiene-based rubber, or silicone-based rubber is used as the rubber having a good weather resistance.

However, while manufacturing the molded article, processing the molded article or using the molded article for long periods, in the case where the surface of the molded article is scratched, the design property is seriously deteriorated. And therefore, improvement of scratch resistance is desired in some applications.

In order to improve the scratch resistance of the molded article, a method in which the surface of the molded article is harden by reducing the amount of rubber (see Patent Document 1), a method in which lubricant property of the surface of the molded article is improved by adding a lubricant such as silicone oil, olefin wax and the like (see Patent Document 2), a method in which a layered clay mineral having an organic compound intercalated is added to the rubber-modified thermoplastic resin (see Patent Document 3), and a method in which a specific amount of methyl methacrylate-methyl acrylate-copolymer containing methyl acrylate in a specific range is added to ABS resin (see Patent Document 4) have been proposed.

However, in the method of reducing the amount of rubber as described in Patent Document 1, since the surface hardness of the molded product is increased, scratch resistance is improved against scratches, but impact strength is reduced. There is a limitation to achieve both properties, that is, impact resistance and scratch resistance. In a method of adding a lubricant such as silicone oil and olefin wax as described in Patent Document 2, lubricant properties of the surface of the molded article is improved, but improvement of scratch resistance is insufficient.

Further, breed-out of additives such as silicone oil from the surface of the molded article occurs, and as a result, glossiness and coloration are likely to be deteriorated.

In the method of adding special additives to a thermoplastic resin as described in Patent Document 3, the compatibility with the thermoplastic resin may become insufficient, and appearance such as glossiness and coloration may be deteriorated and, deterioration of impact resistance may occur.

In the method of blending a special resin in ABS resin as described in Patent Document 4, it is possible to obtain the improvement effect of scratch resistance against scratches caused when the surface of the molded article is scratched by a hard substance such as nails. However, scratch resistance against scratches caused when the surface of the molded article is rubbed by the soft substance such as gloves, gauze, and cloth is insufficient.

In addition, the thermoplastic resin is also required to have excellent fluidity during molding, the techniques described in Patent Documents are not insufficient.

By improving the impact resistance of the molded product, not only applications of the molded article applications can be expanded, but also industrial utilities can be expanded, for example, reduced thickness and increased size of the molded article can be realized. Therefore, for improving the impact resistance of the molded article, various methods have been proposed.

In these methods, a method of using a resin material which is a combination of a rubber polymer and a hard resin, so as to increase the impact resistance of the molded article while retaining the characteristics derived from a hard resin has already been employed in industrial production. As such a resin material, an acrylonitrile-butadiene-styrene (ABS) resin, acrylonitrile-styrene-acrylate ester (ASA) resin, an acrylonitrile-ethylene.propylene.non-conjugated diene copolymer-styrene (AES) resin, or thermoplastic resin composition in which a hard resin are further added to these resins, and the like can be mentioned.

Also, when high design properties is desired to the molded product, a coating treatment is conducted to the molded article obtained from these resin materials to obtain a high quality appearance. However, the coating treatment has problems in that the environmental burden is large, the process is complicated, the failure rate is high and the like. Therefore, by blending a colorant to the resin material in advance, the coating process of the molded article may be omitted. Since the high weather resistance in the molded article is required to omit the painting process, the resin material capable of providing a molded article having a good weather resistance, such as AES resin or ASA resin has been used, in which ethylene.propylene.non-conjugated diene, acrylic ester-based rubber, hydrogenated rubber (hydrogenated butadiene rubber), silicone rubber, or the like is used as a rubber polymer.

However, with respect to a molded article using a resin material capable of providing a molded article having a good weather resistance and omitting the coating process, in the case where the surface of the molded article is scratched during the manufacturing the molded article, processing the molded article or using the molded article for long periods, the design property is seriously deteriorated. Therefore, improvement of scratch resistance is desired depending on the molded article applications. Therefore, in order to improve the scratch resistance of the molded article, to use a thermoplastic resin composition described below has been proposed.

(1) a thermoplastic resin composition containing: a graft copolymer obtainable by polymerization of a vinyl-based monomer mixture containing an aromatic vinyl compound and vinyl cyanide compound in the presence of a rubber polymer; and a hard resin, in which the amount of rubber polymer is reduced; the thermoplastic resin composition is used to harden the surface of the molded article (see Patent Document 1).

(2) a thermoplastic resin composition containing: a graft copolymer obtainable by polymerization of a vinyl-based monomer mixture containing an aromatic vinyl compound and vinyl cyanide compound in the presence of a rubber polymer; and a lubricant (polyolefin-based wax, silicone oil); the thermoplastic resin is used to improve the lubricant property of the surface of the molded article (see Patent Document 2).

(3) a thermoplastic resin composition containing: a graft copolymer obtainable by polymerization of a vinyl-based monomer mixture containing an aromatic vinyl compound and vinyl cyanide compound in the presence of a rubber polymer; and a layered clay mineral in which an organic compound has been intercalated (see Patent Document 3).

(4) a thermoplastic resin composition containing: a graft copolymer obtainable by polymerization of a vinyl-based monomer mixture containing an aromatic vinyl compound and vinyl cyanide compound in the presence of a rubber polymer; a copolymer obtainable by polymerization of a vinyl-based monomer mixture containing an aromatic vinyl compound and a vinyl cyanide compound; and a copolymer obtainable by copolymerizing methyl methacrylate and methyl acrylate, in a specific ratio (see Patent Document 4).

When using the thermoplastic resin composition of (1) as above, although the scratch resistance is improved against scratches due to enhancing hardness of the surface of the molded article, impact resistance of the molded article is deteriorated due to the low amount of the rubber polymer. Therefore, there is a limitation in order to satisfy both of impact resistance and scratch resistance of the molded article.

When using a thermoplastic resin composition of (2) as above, although the lubricant property of the surface of the molded article is improved, the improvement of scratch resistance is insufficient. In addition, since the lubricant bleeds out on the surface of the molded article, glossiness and coloration are likely to be impaired.

In the thermoplastic resin composition of (3) as above, the compatibility between the graft copolymer and a layered clay mineral in which an organic compound has been intercalated is likely to be insufficient. Therefore, deterioration in impact resistance and deterioration in appearance (deterioration of glossiness and coloration) are likely to occur.

When using a thermoplastic resin composition of (4) as above, although scratch resistance of a molded article against scratches is improved, abrasion resistance of the molded article against abrasion is insufficient.

In addition, the thermoplastic resin composition is also required to have excellent fluidity during molding, the fluidity of the thermoplastic resin compositions of (1) to (4) is not satisfactory level.

As a thermoplastic resin composition capable of providing a molded article in which impact resistance is improved while retaining the properties derived from the hard resin, the following thermoplastic resin compositions are known.

(1) a thermoplastic resin obtainable by adding AES resin to a hard resin, and in the composition, the amount of the rubber polymer is reduced in order to harden the surface of the molded article (Patent Document 1).

(2) a thermoplastic resin obtainable by adding AES resin to methacrylic ester resin as a hard resin (Patent Document 5).

(3) a thermoplastic resin obtainable by adding AES resin to maleimide-based copolymer (Patent Document 6).

(4) a thermoplastic resin obtainable by adding AES resin and ASA resin to methacrylic ester resin as a hard resin (Patent Document 7).

When using the thermoplastic resin composition of (1) as above, although the scratch resistance is improved against scratches due to enhancing hardness of the surface of the molded article, impact resistance of the molded article is deteriorated due to the low amount of the rubber polymer. Therefore, there is a limitation in order to satisfy both of impact resistance and scratch resistance of the molded article.

In the thermoplastic resin composition of (2) or (3) as above, it is necessary to add a large amount of an AES resin in order to improve the impact resistance of the molded article. In the resulting molded article, surface hardness (scratch resistance) derived from the methacrylic ester resin and heat resistance derived from maleimide-based copolymer are seriously deteriorated.

Also, since it is necessary to add an AES resin having a large particle size in order to improve impact resistance of the molded article, in the resulting molded article, coloration derived from a hard resin is deteriorated.

In the thermoplastic resin composition of (4) as above, although AES resins and ASA resins are blended in order to suppress deterioration of coloration of the molded article, impact resistance of the molded article is deteriorated as compared to the molded article to which AES resin is blended alone.

A rubber-reinforced resin material typified by ABS resin as a resin material having excellent balance of impact resistance, mechanical properties of the molded article, and fluidity during molding, has been widely used in various fields such as OA equipments, automobiles, miscellaneous goods and the like.

However, since the ABS resin is a non-crystalline (amorphous) resin, the friction coefficient (dynamic friction coefficient, amplitude of the dynamic friction coefficient) of the molded article is large as compared to the polyethylene, polypropylene, or polyacetal as a crystalline resin.

Therefore, since the vibration of the device and the vibration at the start or during running of the automobile cause the stick-slip phenomenon at the switch portion of OA equipment or the connection part of car audio, there is a problem that squeak noise is generated.

As the rubber-reinforced resin material capable of providing a molded article having small the friction coefficient (dynamic friction coefficient, amplitude of the dynamic friction coefficient), the following thermoplastic resin composition have been proposed.

(5) a thermoplastic resin obtainable by adding a polyorganosiloxane as a lubricant to a rubber-reinforced styrene resin (Patent Document 8).

(6) a thermoplastic resin obtainable by adding a silicone resin having a specific viscosity as a lubricant to a rubber-reinforced acrylonitrile-styrene resin containing ABS resin and AES resin (Patent Document 9).

(7) a thermoplastic resin obtainable by adding polytetrafluoroethylene, a low molecular weight oxidized polyethylene or an ultra-high molecular weight polyethylene as a lubricant to a rubber-reinforced styrene resin, an olefin resin and styrene-butadiene-styrene block copolymer (Patent Document 10).

In the molded article obtainable by using the thermoplastic resin compositions of (5) to (7), the lubricant that is added to the thermoplastic resin composition bleeds out on the surface of the molded article, to increase the lubricant property of the molded article, and therefore, the friction coefficient can be reduced.

However, there is a problem in that the bleed-out of the lubricant deteriorates the surface appearance of the molded article, and lubricant property is deteriorated while the lubricant is gradually decreased over time due to bleed-out.

PRIOR ART DOCUMENTS

PATENT DOCUMENTS

[Patent Document 1] Japanese Unexamined Patent Application, First Publication No. Hei11-001600
[Patent Document 2] Japanese Unexamined Patent Application, First Publication No. 2000-119477
[Patent Document 3] Japanese Unexamined Patent Application, First Publication No. 2003-277570
[Patent Document 4] Japanese Unexamined Patent Application, First Publication No. 2008-291158
[Patent Document 5] Japanese Unexamined Patent Application, First Publication No. 2005-132970
[Patent Document 6] Japanese Unexamined Patent Application, First Publication No. 2004-352842
[Patent Document 7] Japanese Unexamined Patent Application, First Publication No. 2004-346187
[Patent Document 8] Japanese Patent Gazette No. 2688619
[Patent Document 9] Japanese Unexamined Patent Application, First Publication No. 2011-174029
[Patent Document 10] Japanese Unexamined Patent Application, First Publication No. 2011-168186

SUMMARY OF THE INVENTION

Problems to be Resolved by the Invention

A first aspect of the present invention has an object to provide a graft copolymer that is suitable for a raw material of a thermoplastic resin composition which has excellent fluidity and can form a molded article having excellent impact resistance, scratch resistance, glossiness and coloration.

A second aspect of the present invention has an object to provide a thermoplastic resin component which has excellent fluidity and can form a molded article having excellent impact resistance, scratch resistance, glossiness and coloration and to provide a molded article which has excellent impact resistance, scratch resistance, glossiness and coloration.

A third aspect of the present invention has an object to provide a thermoplastic resin component which has excellent fluidity and can form a molded article having excellent scratch resistance, glossiness, coloration and impact resistance, and to provide a molded article which has excellent scratch resistance, glossiness, coloration and impact strength.

A fourth aspect of the present invention has an object to provide a thermoplastic resin component which has excellent fluidity and can form a molded article having excellent scratch resistance, coloration and impact resistance, and to provide a molded article which has excellent scratch resistance, coloration and impact strength.

A fifth aspect of the present invention has an object to provide a thermoplastic resin component which has excellent fluidity and can form a molded article having excellent scratch resistance, coloration, impact resistance and lubrication properties, and to provide a molded article which has excellent scratch resistance, coloration, impact strength and lubrication properties.

MEANS OF SOLVING THE PROBLEMS

A first aspect of the present invention includes the following embodiments.

[1] A graft copolymer (D) obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $17 \times 10^4$ to $35 \times 10^4$ and a distribution of molecular weight (Mw/Mn) of 1 to 3, which is represented by the ratio of the mass average molecular weight (Mw) and the number-average molecular weight (Mn) or a cross-linked ethylene.α-olefin copolymer (C) obtainable by cross-linking treatment of the ethylene.α-olefin copolymer (A).

[2] The graft copolymer according to [1], wherein the gel content ratio of the cross-linked ethylene.α-olefin copolymer (C) with respect to the total amount of the cross-linked ethylene.α-olefin copolymer (C) is 35 to 75% by mass.

[3] The graft copolymer according to [1] or [2], wherein the ethylene.α-olefin copolymer (A) is an ethylene.propylene copolymer.

[4] The graft copolymer according to any one of [1] to [3], wherein the amount of an ethylene unit in the ethylene.α-olefin copolymer (A) with respect to the total amount of structural units constituting the ethylene.α-olefin copolymer (A) is 45 to 65% by mass.

[5] The graft copolymer according to any one of [1] to [4], wherein the polymerization is emulsion polymerization.

A thermoplastic resin composition as a second aspect of the present invention includes the following embodiments.

[6] A thermoplastic resin composition including a graft copolymer of any one of [1] to [5] and a hard component (J).

[7] The thermoplastic resin composition according to [6], wherein the hard component (J) is a styrene-based copolymer (H).

A thermoplastic resin composition as a third aspect of the present invention includes the following embodiments.

[8] A thermoplastic resin composition including a graft copolymer of any one of [1] to [5], and a methacrylic ester resin (G) obtainable by polymerization of a vinyl-based monomer mixture (m3) containing a methacrylic ester.

A thermoplastic resin composition as a fourth aspect of the present invention includes the following embodiments.

[9] A thermoplastic resin composition including: a graft copolymer (D) of any one of [1] to [5]; a graft copolymer (F) obtainable by polymerization of a vinyl-based monomer mixture (m2) containing an aromatic vinyl compound and a vinyl cyanide compound in the presence of a cross-linked acrylic ester-type rubber polymer (E); and a methacrylic ester resin (G) obtainable by polymerization of a vinyl-based monomer mixture (m3) containing a methacrylic ester, wherein the volume average particle diameter of an ethylene.α-olefin copolymer (A) or an cross-linked ethylene.α-olefin copolymer (C) contained in the graft copolymer (D) is 0.2 μm to 0.6 μm; the volume average particle diameter of the cross-linked acrylic ester-type rubber polymer (E) contained in the graft copolymer (F) is 0.05 μm to 0.18 μm; and the amount of the ethylene.α-olefin copolymer (A) or the cross-linked ethylene.α-olefin copolymer (C) is 15 to 85% by mass and the amount of the cross-linked acrylic ester-type rubber polymer (E) is 85 to 15% by mass, with respect to the sum of the ethylene.α-olefin copolymer (A), the cross-linked ethylene.α-olefin copolymer (C) and the cross-linked acrylic ester-type rubber polymer (E).

A thermoplastic resin composition as a fifth aspect of the present invention includes the following embodiments.

[10] A thermoplastic resin composition including: a graft copolymer (D) of any one of [1] to [5]; a graft copolymer (M) obtainable by polymerization of a vinyl-based monomer mixture (m5) in the presence of a composite rubber polymer (L) containing a polyorganosiloxane (La); and a methacrylic ester resin (G) obtainable by polymerization of a vinyl-based monomer mixture (m3) containing a methacrylic ester, wherein the volume average particle diameter of an ethylene.α-olefin copolymer (A) or an cross-linked ethylene.α-olefin copolymer (C) contained in the graft copolymer (D) in the thermoplastic resin composition is 0.2 μm to 0.6 μm; the volume average particle diameter of the composite rubber polymer (L) contained in the graft copolymer (M) in the thermoplastic resin composition is 0.05 μm to 0.18 μm; and the amount of the ethylene.α-olefin copolymer (A) or the cross-linked ethylene.α-olefin copolymer (C) is 15 to 85% by mass and the amount of the composite rubber polymer (L) is 85 to 15% by mass, with respect to 100 parts by mass of the sum of the ethylene.α-olefin copolymer (A), the cross-linked ethylene.α-olefin copolymer (C) and the composite rubber polymer (L).

[11] The thermoplastic resin composition according to [10], wherein the graft copolymer (M) is obtainable by polymerization of the vinyl-based monomer mixture (m5) containing an aromatic vinyl compound and a vinyl cyanide compound in the presence of a composite rubber polymer (L1) containing the polyorganosiloxane (La) and a poly(meth)acrylic ester (Lb) that contains a unit derived from a (meth)acrylic ester and contains either one or both of a unit derived from a cross-linking agent and a unit derived from a graft cross-linking agent.

A thermoplastic resin composition as a sixth aspect of the present invention includes the following embodiments.

[12] A molded article formed from the thermoplastic resin composition of any one of [6] to [11].

Effect of the invention

The graft copolymer according to the first aspect of the present invention is suitable for a raw material of a thermoplastic resin composition which has excellent fluidity and can form a molded article having excellent impact resistance, scratch resistance, glossiness and coloration.

The thermoplastic resin composition as a second aspect of the present invention exhibits excellent fluidity.

According to the thermoplastic resin composition of the second aspect of the present invention, a molded article having excellent impact resistance, scratch resistance, glossiness and coloration can be formed.

The molded article formed from the thermoplastic resin composition as a second aspect of the present invention exhibits excellent scratch resistance, glossiness, coloration and impact resistance.

The thermoplastic resin composition as a third aspect of the present invention exhibits excellent fluidity.

According to the thermoplastic resin composition of the third aspect of the present invention, a molded article having excellent scratch resistance, glossiness, coloration and impact resistance can be formed.

The molded article formed from the thermoplastic resin composition as a third aspect of the present invention exhibits excellent scratch resistance, glossiness, coloration and impact resistance.

The thermoplastic resin composition as a fourth aspect of the present invention exhibits excellent fluidity. According to the thermoplastic resin composition of the fourth aspect of the present invention, a molded article having excellent scratch resistance, coloration and impact resistance can be formed.

The molded article formed from the thermoplastic resin composition as a fourth aspect of the present invention exhibits excellent scratch resistance, coloration and impact resistance.

The thermoplastic resin composition as a fifth aspect of the present invention exhibits excellent fluidity.

According to the thermoplastic resin composition of the fifth aspect of the present invention, a molded article having excellent scratch resistance, coloration, impact resistance and lubrication properties can be formed.

The molded article formed from the thermoplastic resin composition as a fifth aspect of the present invention exhibits excellent scratch resistance, coloration, impact resistance and lubrication properties.

BEST MODE FOR CARRYING OUT THE INVENTION

Figure 1:
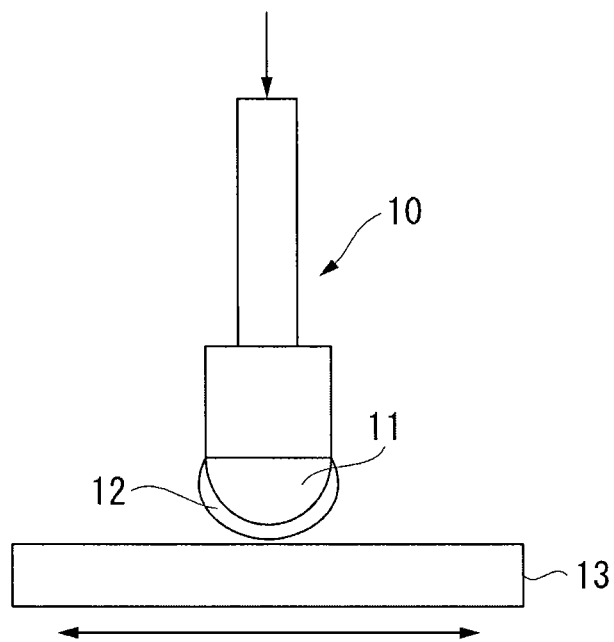
FIG. 1 is a schematic diagram showing an abrasion resistance test conducted by abrasion using gauze.

Following definitions of terms apply throughout the specification and claims.

The "unit" and "structural unit" refer to a monomer unit constituting a polymeric compound (resins, polymers, copolymers).

The term "(meth)acrylic acid refers to an acrylic acid or a methacrylic acid.

The term "molded articles" refers to an articles formed from a thermoplastic resin composition by molding.

The "scratch resistance" refers to resistance to scratch that occurs when the surface of the molded article is scratched by a hard and sharp substance such as hard nails and the like (scratch resistance), and resistance to abrasion that occurs when the surface of the molded article is rubbed by a soft substance such as gloves, gauze, cloth, and the like (abrasion resistance).

"Luminosity (L*)" is a luminosity value (L*) of color values in accordance with L*a*b* color system adopted in JIS Z 8729.

The "SCE method" means a method of measuring color using a spectrophotometer by removing the regular reflection light due to light trap in accordance with JIS Z 8722.

Below, the present invention will be described in detail.

[Graft Copolymer (D)]

A graft copolymer (D) according to the first aspect of the present invention is a copolymer obtainable by polymerization of a vinyl-based monomer mixture (m1) in the presence of either an ethylene.α-olefin copolymer (A) or a cross-linked ethylene.α-olefin copolymer (C) obtainable by cross-linking treatment of the ethylene.α-olefin copolymer (A).

In the present invention, the phrase "cross-linking treatment of an ethylene.α-olefin copolymer (A)" includes a cross-linking treatment of a mixture of an ethylene.α-olefin copolymer (A) and an acid-modified olefin polymer (K) described later and a cross-linking treatment after preparation of an olefin resin aqueous dispersion (B) containing an ethylene.α-olefin copolymer (A) or the mixture, as well as a cross-linking treatment of an ethylene.α-olefin copolymer (A) alone.

In the present specification, the term "cross-linking treatment" means that a polymer chain is linked in an intramolecular and/or intermolecular manner.

A cross-linked ethylene.α-olefin copolymer (C) may be a mixture containing an ethylene.α-olefin copolymer (A) which has been subjected to cross-linking treatment alone and containing an acid-modified olefin polymer (K) which has been subjected to cross-linking treatment alone.

Below, each of components constituting the graft copolymer (D) of the first aspect of the present invention will be explained.

Hereinafter, the "thermoplastic resin composition (I)" of the second aspect of the present invention contains a graft copolymer (D) of the first aspect of the present invention and contains a hard component (J) described later.

Here, the term "molded article" refers to an articles formed from a thermoplastic resin composition (I).

<Ethylene.α-Olefin Copolymer (A)>

In the present invention, it is important to use an ethylene.α-olefin copolymer (A) so that the molded article exhibits excellent impact resistance.

The ethylene.α-olefin copolymer (A) is a copolymer obtainable by copolymerization of ethylene and an α-olefin by a known polymerization method, contains an ethylene unit and an α-olefin unit, and does not include non-conjugated diene unit such as 5-ethylidiene-2-norbornene.

For example, when ethylene.propylene.non-conjugated diene copolymer is used instead of an ethylene.α-olefin copolymer (A), impact resistance of the molded article is deteriorated.

As α-olefin, the number of carbon atoms is preferably 3 or more, and specific examples thereof include propylene, 1-butene, 1-pentene, 1-hexene, 1-heptene, 1-octene, 1-decene, 1-undecene, 1-icosene, 1-docosene. Among these, α-olefin having 3 to 20 carbon atoms is preferable, and propylene is particularly preferred.

When ethylene.propylene copolymer in which propylene is used as an α-olefin is employed as an ethylene.α-olefin copolymer (A), impact resistance and coloration of the molded article are further improved.

When the total amount of the structural units constituting the ethylene.α-olefin copolymer (A) is regarded as 100% by mass, the amount of the ethylene unit in the ethylene.α-olefin copolymer (A) is preferably 45 to 65% by mass, and more preferably 50 to 60% by mass.

When the amount of the ethylene unit is within the above mentioned range, balance between scratch resistance and impact resistance of the molded article becomes excellent. When the amount of the ethylene unit is 50 to 60% by mass, scratch resistance and impact resistance of the molded article are further improved.

Here, the "amount of the ethylene unit" can be calculated from the weight of the monomer corresponding to the ethylene unit with respect to the total weight of the monomers used in the synthesis of an ethylene.α-olefin copolymer (A) (that is, the total mass of the monomers corresponding to the structural units constituting the ethylene.α-olefin copolymer (A)).

In the present invention, it is important to use an ethylene.α-olefin copolymer (A) having the mass average molecular weight (Mw) and having the distribution of molecular weight (Mw/Mn) represented by the ratio of the mass average molecular weight (Mw) and the number-average molecular weight (Mn), within the specific range, so that the fluidity of the thermoplastic resin composition (I) is improved and the molded article exhibits excellent scratch resistance, glossiness and impact resistance, in terms of controlling the cross-linking structure of the cross-linked ethylene.α-olefin copolymer (C).

The mass average molecular weight (Mw) of the ethylene.α-olefin copolymer (A) is $17 \times 10^4$ to $35 \times 10^4$, and preferably $26 \times 10^4$ to $32 \times 10^4$.

When the mass average molecular weight (Mw) is smaller than $17 \times 10^4$, scratch resistance and impact resistance are deteriorated. When the mass average molecular weight (Mw) is greater than $35 \times 10^4$, fluidity of the thermoplastic resin composition (I) and glossiness of the molded article are deteriorated. When the mass average molecular weight (Mw) is within the range of $26 \times 10^4$ to $32 \times 10^4$, fluidity of the thermoplastic resin composition (I) and scratch resistance, impact resistance and glossiness of the molded article become particularly excellent.

The distribution of molecular weight (Mw/Mn) represented by the ratio between the mass average molecular weight (Mw) and the number average molecular weight (Mn) of the ethylene.α-olefin copolymer (A) is preferably 1 to 3, and more preferably 1.9 to 2.5.

When the distribution of molecular weight (Mw/Mn) is greater than 3, scratch resistance and impact resistance of the molded article are deteriorated. When the distribution of molecular weight (Mw/Mn) is 1.9 to 2.5, fluidity of the thermoplastic resin component (I) and scratch resistance and impact resistance of the molded article become particularly excellent.

The mass average molecular weight (Mw) or the number average molecular weight (Mn) of the ethylene.α-olefin copolymer (A) is the value measured by gel permeation chromatography (GPC) and converted in terms of the standard polystyrene.

The production method of the ethylene.α-olefin copolymer (A) used in the present invention is not particularly limited. In general, the copolymer produced using a metallocene catalyst or a Ziegler-Natta catalyst can be used.

As metallocene catalysts, a catalyst containing a metallocene complex in which an organic compound having a cyclopentadienyl skeleton or a halogen atom is coordinated to a transition metal such as zirconium, titanium and hafnium, and containing an organic aluminum compound or an organic boron compound can be mentioned.

As Ziegler-Natta catalyst, a catalyst containing an organic aluminum compound or an organic boron compound and containing a halide of a transition metal such as titanium, vanadium, zirconium and hafnium can be mentioned.

As a polymerization method of polymerization to produce an ethylene.α-olefin copolymer (A), a method in which ethylene and an α-olefin are copolymerized in a solution in the presence of the aforementioned catalyst can be mentioned. In general case, a hydrocarbon solvent such as benzene, toluene, xylene, pentane, hexane, heptane, octane and the like can be used. As the hydrocarbon solvent, one type may be used alone, or two or more types may be used in combination. The α-olefin as a raw material may be used as a solvent.

The amount of the ethylene unit in an ethylene.α-olefin copolymer (A), the mass average molecular weight (Mw) and the distribution of molecular weight (Mw/Mn) can be adjusted by changing the amount of ethylene or α-olefin, the type or amount of the molecular weight modifier such as hydrogen, the type or amount of the catalyst, and the reaction condition such as a reaction temperature or a reaction pressure.

In the first aspect of the present invention, as the ethylene.α-olefin copolymer (A), the same copolymer as described later with respect to <ethylene.α-olefin copolymer (A)> in "thermoplastic resin composition (I)" can be used.

<Acid-Modified Olefin Polymer (K)>

As described above, the cross-linked ethylene.α-olefin copolymer (C) contains a copolymer in which an ethylene.α-olefin copolymer (A) has been subjected to cross-linking treatment, and may be a copolymer in which a mixture of an ethylene.α-olefin copolymer (A) and an acid-modified olefin polymer (K) has been subjected to cross-linking treatment, or a mixture containing a copolymer in which an ethylene.α-olefin copolymer (A) has been subjected to cross-linking treatment alone and containing a copolymer in which an acid-modified olefin polymer (K) has been subjected to cross-linking treatment alone.

As the acid-modified olefin polymer (K), a polymer in which an olefin polymer having a mass average molecular weight of 1,000 to 5,000 such as polyethylene or polypropylene is modified by a compound having a functional group such as an unsaturated carboxylic acid compound can be mentioned.

In the present specification, the term "modified" means that the compound having a functional group is bonded within the molecular chain or at the terminal of the molecule.

Examples of the unsaturated carboxylic acid compound include acrylic acid, maleic acid, itaconic acid, maleic anhydride, itaconic anhydride and maleic acid monoamide.

When the cross-linked ethylene.α-olefin copolymer (C) is obtained by cross-linking treatment of the mixture of the ethylene.α-olefin copolymer (A) and an acid-modified olefin copolymer (K), a vinyl-based monomer mixture described later can be stably polymerized. When the vinyl-based monomer mixture is subjected to polymerization in accordance with an emulsion polymerization method, emulsion stability can be enhanced.

When the cross-linked ethylene.α-olefin copolymer (C) contains an acid-modified olefin polymer (K), the amount of the acid-modified olefin polymer (K) relative to 100 parts by mass of ethylene.α-olefin copolymer (A) is preferably 1 to 40 parts by mass. When the amount of the acid-modified olefin polymer (K) is within the above mentioned range, balance between scratch resistance and impact resistance of a molded article becomes excellent.

The timing of adding an acid-modified olefin polymer (K) is not particularly limited, and cross-linking treatment may be conducted after mixing an ethylene.α-olefin copolymer (A) and an acid-modified olefin polymer (K), or mixing may be conducted after cross-linking treatment of an ethylene.α-olefin copolymer (A) alone and cross-linking treatment of an acid-modified olefin polymer (K) alone.

As the method of mixing the ethylene.α-olefin copolymer (A) and the acid-modified olefin copolymer (K) is not particularly limited, as long as it is possible to disperse them uniformly, and a melt-kneading method using a kneader, a Banbury mixer or a multi-screw extruder is preferably employed.

<Olefin Resin Aqueous Dispersion (B)>

An olefin resin aqueous dispersion (B) is dispersion in which the ethylene.α-olefin copolymer (A) is dispersed in aqueous medium.

As described above, a cross-linked ethylene.α-olefin copolymer (C) may be a copolymer obtainable by cross-linking treatment of an ethylene.α-olefin copolymer (A), or a copolymer obtainable by cross-linking treatment of an olefin resin aqueous dispersion (B) containing a mixture of an ethylene.α-olefin copolymer (A) and an acid-modified olefin polymer (K).

The method of preparing the olefin resin aqueous dispersion (B) is not limited. For example, it is preferable to employ a method in which using a known melt-kneading mean such as a kneader, a Banbury mixer and a multi-screw extruder, an ethylene.α-olefin copolymer (A) or a mixture of an ethylene.α-olefin copolymer (A) and an acid-modified olefin copolymer (K) is melted and kneaded, and then dispersed by applying mechanical shear force, and poured into an aqueous medium containing an emulsifier; or a method in which an ethylene.α-olefin copolymer (A) or the mixture is dissolved together with an emulsifier in a hydrocarbon solvent such as pentane, hexane, heptane, benzene, toluene and xylene, and added to an aqueous medium to form an emulsion, stirred sufficiently, and then the hydrocarbon solvent is distilled.

As emulsifiers used for preparation of the olefin resin aqueous dispersion (B), known emulsifiers can be used, and for example, long-chain alkyl carboxylates, sulfosuccinate alkylester salts, and alkyl benzene sulfonates can be mentioned.

When potassium oleate is used as an emulsifier, the amount of emulsifier with respect to 100 parts by mass of the ethylene.α-olefin copolymer (A) is preferably 1 to 8 parts by mass, in terms of suppressing thermal coloration of the thermoplastic resin component (I) and in terms of ease of adjusting the particle diameter of the olefin resin aqueous dispersion (B).

In terms of excellent balance of physical properties of the molded article, the volume average particle diameter of the olefin resin aqueous dispersion (B) is preferably 0.2 to 0.5 µm.

When the volume average particle diameter is within the above mentioned range, impact resistance of the molded article is further improved.

As a method of adjusting the volume average particle diameter of the olefin resin aqueous dispersion (B), a method of adjusting the type or amount of emulsifier, the shear force applied during kneading, the temperature condition during kneading, and the kind or amount of the acid-modified olefin polymer (K) in the case of using the acid-modified olefin polymer (K) can be mentioned.

In the present specification, the volume average particle diameter is a value measured in accordance with laser diffraction and scattering method.

<Cross-Linked Ethylene.α-Olefin Copolymer (C)>

A cross-linked ethylene.α-olefin copolymer (C) is obtainable by cross-linking treatment of ethylene.α-olefin copolymer (A). Specifically, a cross-linked ethylene.α-olefin copolymer (C) is obtainable by a method in which an ethylene.α-olefin copolymer (A) is subjected to cross-linking treatment alone; a method in which a mixture of an ethylene.α-olefin copolymer (A) and an acid-modified olefin copolymer (K) is subjected to cross-linking treatment; a method in which an ethylene.α-olefin copolymer (A) and an acid-modified olefin copolymer (K) are separately subjected to cross-linking treatment, and then mixed; or a method in which an olefin resin aqueous dispersion (B) is prepared from an ethylene.α-olefin copolymer (A) or a mixture of an ethylene.α-olefin copolymer (A) and an acid-modified olefin copolymer (K), then subjected to cross-linking treatment.

As a method of cross-linking treatment, a known cross-linking treatment method such as a cross-linking treatment using an organic peroxide, and a cross-linking treatment by ionizing radiation can be employed. Among these, from the viewpoint of uniformity of the cross-linking structure of the cross-linked ethylene.α-olefin copolymer (C), a cross-linking treatment using an organic peroxide is preferred, and a cross-linking treatment of an olefin resin aqueous dispersion (B) using an organic peroxide is particularly preferred.

In the cross-linking treatment using an organic peroxide, gel content ratio can be easily adjusted by adjusting the amount of organic peroxide, heating temperature, and heating time.

The volume average particle diameter of aqueous dispersion of cross-linked ethylene.α-olefin copolymer (C) obtainable by cross-linking treatment of an olefin resin aqueous dispersion (B) using an organic peroxide is not changed from the volume average particle diameter of the olefin resin aqueous dispersion (B).

Examples of organic peroxide used in a cross-linking treatment include organic peroxides such as peroxy ester compounds, peroxy ketal compounds and dialkyl peroxide compounds.

Specific examples of peroxy ester compounds include α,α'-bis(neodecanoylperoxy)diisopropylbenzene, cumyl peroxy neodecanoate, 1,1,3,3-tetramethylbutyl peroxyneodecanoate, 1-cyclohexyl-1-methyl ethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoylperoxy)hexane, 1-cyclohexyl-1-methylethyl peroxy-2-ethyl hexanoate, t-hexyl peroxy-2-hexyl hexanoate, t-butyl peroxy-2-hexyl hexanoate, t-butyl peroxy isobutyrate, t-hexyl peroxy isopropyl monocarbonate, t-butyl peroxy maleic acid, t-butyl peroxy-3,5,5-trimethyl hexanoate, t-butyl peroxy laurate, 2,5-dimethyl-2,5-bis(m-toluoyl peroxy) hexane, t-butyl peroxy isopropyl mono-carbonate, t-butyl peroxy 2-ethylhexyl monocarbonate, t-hexyl peroxybenzoate, 2,5-dimethyl-2,5-bis (benzoyl peroxy) hexane, t-butyl peroxy acetate, t-butyl peroxy-m-toluoyl benzoate, t-butyl peroxy benzoate, his (t-butyl peroxy) isophthalate and the like.

Specific examples of peroxy ketal compounds include 1,1-bis(t-hexylperoxy)-3,3,5-trimethylcyclohexane, 1,1-bis (t-hexylperoxy)cyclohexane, 1,1-bis (t-butylperoxy)-3,3,5-trimethyl cyclohexane, 1,1-bis(t-butylperoxy)cyclohexane, 1,1-bis(t-butylperoxy)cyclododecane, 2,2-bis(t-butylperoxy)butane, n-butyl-4,4-bis(t-butylperoxy)valerate, 2,2-bis (4,4-di-(t-butylperoxy)cyclohexyl) propane and the like.

Specific examples of the dialkyl peroxide compounds include α,α'-bis (t-butyl peroxy) diisopropyl benzene, dicumyl peroxide, 2,5-dimethyl-2,5-bis (t-butyl peroxy) hexane, t-butyl cumyl peroxide, di-t-butyl peroxide, 2,5-dimethyl-2,5-bis (t-butyl peroxy) hexyne-3, and the like.

As the organic peroxide, one type may be used alone, or two or more types may be used in combination.

Among organic peroxides, from the viewpoint of uniformity of cross-linking structure, dialkyl peroxide compounds such as dicumyl peroxide, t-butyl cumyl peroxide and di-t-butyl peroxide are particularly preferred. The usage of t-butyl cumyl peroxide with respect to 100 parts by mass of the ethylene.α-olefin copolymer (A) or 100 parts by mass of the sum of the ethylene.α-olefin copolymer (A) and the acid-modified olefin polymer (K) is generally within the range of 0.1 to 10 parts by mass.

Further, when the cross-linking treatment is conducted, in order to adjust the gel content of the cross-linked ethylene.α-olefin copolymer (C), a polyfunctional compound may be added.

Examples of polyfunctional compound include divinyl benzene, allyl methacrylate, ethylene glycol dimethacrylate, 1,3-butylene dimethacrylate, tetraethylene glycol diacrylate, triallyl cyanurate, triallyl isocyanurate, pentaerythritol tetraacrylate and the like.

As the polyfunctional compound, one type may be used alone, or two or more types may be used in combination.

Among polyfunctional compounds, divinylbenzene is preferred. The usage of divinylbenzene with respect to 100 parts by mass of the ethylene.α-olefin copolymer (A) or 100 parts by mass of the sum of the ethylene.α-olefin copolymer (A) and the acid-modified olefin polymer (K) is generally within the range of 0 to 10 parts by mass.

The time for cross-linking treatment is preferably 1 to 12 hours, and more preferably 2 to 8 hours.

The temperature of cross-linking treatment is preferably 60 to 150° C., and more preferably 100 to 140° C.

In the present invention, it is important that the gel content ratio of the cross-linked ethylene.α-olefin copolymer (C) is within the specific range so that the molded article exhibits excellent scratch resistance, impact resistance, and coloration.

From the viewpoint of the balance between scratch resistance and impact resistance of the molded article, the gel content ratio of the cross-linked ethylene.α-olefin copolymer (C) with respect to the total amount of the cross-linked ethylene.α-olefin copolymer (C) is 35 to 75% by mass, preferably 40 to 70% by mass, and more preferably 45 to 65% by mass. When the gel content ratio of cross-linked ethylene.α-olefin copolymer (C) is 35% by mass or more, coloration of the molded article is improved.

The gel content ratio of the cross-linked ethylene.α-olefin copolymer (C) is measured in accordance with the following manner.

Firstly, 0.5 g of the cross-linked ethylene.α-olefin copolymer (C) is weighed, and taken as a coagulated powdery sample [D1].

A coagulated powdery sample [D1] is immersed in 200 mL of toluene at 110° C. for 5 hours, then the sample is filtrated using a metal gauze having 200 mesh, the obtained residue is dried, the weight of the dried sample [D2] is measured, and the gel content ratio is calculated in accordance with the following equation (1). When the cross-linked ethylene.α-olefin copolymer (C) can be obtained as an aqueous dispersion or a solvent dispersion, an aqueous dispersion or a solvent dispersion of the cross-linked ethylene.α-olefin copolymer (C) is coagulated using dilute sulfuric acid and then washed with water and dried, 0.5 g of the dried sample is weighed, and taken as a coagulated powdery sample [D1].

Gel content ratio (% by mass)=mass of dried sample $[D2](g)$/mass of coagulated powdery sample of $[D1](g) \times 100$     (1)

In the first aspect of the present invention, as the cross-linked ethylene.α-olefin copolymer (C), the same copolymer as described later with respect to <cross-linked ethylene.α-olefin copolymer (C)> in "thermoplastic resin composition (I)" can be used.

<Vinyl-Based Monomer Mixture (m1)>

In the first aspect and second aspect of the present invention, a vinyl-based monomer mixture (m1) contains an aromatic vinyl compound (hereinafter, sometimes referred to as "aromatic vinyl-based monomer") and a vinyl cyanide compound (hereinafter, sometimes referred to as "vinyl cyanide-based monomer") as essential components, and further contains the other vinyl-based monomer polymerizable with these monomers, as an optional component.

Examples of aromatic vinyl-based monomer include styrene, α-methyl styrene, vinyltoluene, o-ethylstyrene and o-, p-dichlorostyrene.

As the aromatic vinyl-based monomer, one type may be used alone, or two or more types may be used in combination.

Among the aforementioned aromatic vinyl-based monomers, styrene and α-methylstyrene are preferred.

Examples of vinyl cyanide-based monomer include acrylonitrile, methacrylonitrile and the like.

As the vinyl cyanide-based monomer, one type may be used alone, or two or more types may be used in combination.

Among the aforementioned vinyl cyanide-based monomers, acrylonitrile is preferred.

Examples of the other vinyl-based monomer include acrylic-based monomers and maleimide-based monomers.

Examples of acrylic-based monomers include acrylic acid alkyl esters such as methyl acrylate, ethyl acrylate, propyl acrylate, butyl acrylate and the like; and methacrylic acid alkyl esters such as methyl methacrylate, ethyl methacrylate, propyl methacrylate, butyl methacrylate and the like. Among these, butyl acrylate and methyl methacrylate are preferably used.

Examples of maleimide-based monomers include maleimide, N-methylmaleimide, N-butylmaleimide, N-phenylmaleimide, N-(2-methylphenyl)maleimide, N-(4-hydroxyphenyl)maleimide and N-cyclohexylmaleimide. Among these, N-phenylmaleimide and N-cyclohexylmaleimide are preferred.

In the first aspect and second aspect of the present invention, in the composition of a vinyl-based monomer mixture (m1), in terms of fluidity of the thermoplastic resin composition (I) and excellent balance of physical properties such as impact resistance and heat resistance of the molded article, it is preferable that the amount of aromatic vinyl-based monomer is 60 to 82% by mass, the amount of vinyl cyanide-based monomer is 18 to 40% by mass, and the amount of the other vinyl-based monomer is 0 to 22% by mass, with respect to the total amount of the vinyl-based monomer mixture (m1) (provided that, the total amount of the aromatic vinyl-based monomer, vinyl cyanide-based monomer and the other vinyl-based monomer is 100% by mass).

In the first aspect and second aspect of the present invention, as the vinyl-based monomer mixture (m1), the same monomer mixture as described above with respect to <vinyl-based monomer mixture (m1)> in "thermoplastic resin composition (I)" can be also used.

<Graft Copolymer (D)>

In the first aspect and second aspect of the present invention, the graft copolymer (D) can be obtained by polymerization of a vinyl-based monomer mixture (m1) in the presence of either an ethylene.α-olefin copolymer (A) or a cross-linked ethylene.α-olefin copolymer (C).

As a polymerization method, known polymerization methods such as emulsion polymerization, solution polymerization, suspension polymerization, bulk polymerization and the like can be employed, and the emulsion polymerization is particularly preferred. When the graft copolymer (D) is produced by emulsion polymerization, scratch resistance and glossiness of the molded article become excellent.

In the first aspect and second aspect of the present invention, the graft copolymer (D) is preferably a copolymer obtainable by polymerization of 25 to 45% by mass of a vinyl-based monomer mixture (m1) in the presence of 55 to 75% by mass of an ethylene.α-olefin copolymer (A) or cross-linked ethylene.α-olefin copolymer (C) (provided that, the sum of the vinyl-based monomer mixture (m1) and the ethylene.α-olefin copolymer (A) or cross-linked ethylene.α-olefin copolymer (C) is 100% by mass). When the amount of the ethylene.α-olefin copolymer (A) or cross-linked ethylene.α-olefin copolymer (C) is 55 to 75% by mass, the fluidity of the thermoplastic resin composition (I) and balance of physical properties such as sliding property, impact resistance and glossiness of the molded article can be improved.

In the first aspect and second aspect of the present invention, the graft ratio of the graft copolymer (D) is preferably 25 to 60% by mass, from the viewpoint of fluidity of the thermoplastic resin composition (I) and improvement in the balance of impact resistance, coloration and glossiness of the molded article.

In the present specification, the graft ratio of the graft copolymer (D) is measured in accordance with the following procedure.

1 g of a graft copolymer (D) is added to 80 mL of acetone and heated under reflux for 3 hours at a temperature within the range of 65 to 70° C., the obtained suspended acetone solution is centrifuged using a centrifugal machine under 14,000 rpm for 30 minutes, thereby fractionating a precipitated component (acetone-insoluble component) and an acetone solution (acetone-soluble component). Thereafter, the precipitated component (acetone-insoluble component) is dried and the weight (Y(g)) is measured, and then the graft ratio is calculated in accordance with the following equation (2). In the formula (2), Y represents the weight of the acetone-insoluble component of the graft copolymer (D) (g); X represents the total weight of the graft copolymer (D) measured to calculate Y (g); and rubber ratio represents the amount of the ethylene.α-olefin copolymer (A) or the cross-linked ethylene.α-olefin copolymer (C) in terms of a solid content.

$$\text{Graft ratio (\% by mass)} = \{(Y - X \times \text{rubber ratio})/X \times \text{rubber ratio}\} \times 100 \qquad (2)$$

As a method of producing a graft copolymer (D) by emulsion polymerization, a method in which a vinyl-based monomer mixture (m1) is mixed with an organic peroxide, and then continuously added to an aqueous dispersion of an ethylene.α-olefin copolymer (A) (that is, olefin resin aqueous dispersion (B)) or an aqueous dispersion of a cross-linked ethylene.α-olefin copolymer (C) can be mentioned.

In an aqueous dispersion of ethylene.α-olefin copolymer (A) or an aqueous dispersion of cross-linked ethylene.α-olefin copolymer (C), the amount of the ethylene. α-olefin copolymer (A) or the cross-linked ethylene.α-olefin copolymer (C) is preferably 15 to 65% by mass, and more preferably 25 to 55% by mass.

The reaction time is preferably 2 to 5 hours, and more preferably 2.5 to 4.5 hours.

The reaction temperature is preferably 50° C. to 120° C., and more preferably 60° C. to 95° C.

The organic peroxide is preferably used in a state of a redox initiator in which an organic peroxide, a transition metal and a reducing agent are combined.

In the polymerization, a chain transfer agent, an emulsifier and the like may be used depending on the situation.

If necessary, an antioxidant may be added to the graft copolymer (D).

As a redox initiator, an redox initiator in which an organic peroxide, ferrous sulfate, a chelating agent and a reducing agent are combined is preferred.

As the organic peroxide, cumene hydroperoxide, diisopropyl benzene hydroperoxide, t-butyl hydroperoxide and the like can be mentioned.

A redox initiator composed of cumene hydroperoxide, ferrous sulfate, sodium pyrophosphate and dextrose is more preferred.

As chain transfer agents, mercaptans (e.g., octyl mercaptan, n- or t-dodecyl mercaptan, n-hexadecyl mercaptan, n- or t-tetradecyl mercaptan), allyl compounds such as allyl sulfonic acid, methallyl sulfonic acid and sodium salts thereof, α-methyl styrene dimer can be mentioned. Among these, mercaptans are preferred. As the chain transfer agent, one type may be used alone, or two or more types may be used in combination.

As the method of adding the chain transfer agent, one-batch addition, two or more-batches addition and continuous addition can be employed.

The amount of chain transfer agent with respect to 100 parts by mass of vinyl-based monomer mixture (m1) is preferably 2.0 parts by mass or less.

As an emulsifier, an anionic surfactant, a non-ionic surfactant, an ampholytic surfactant and the like can be mentioned.

As the anionic surfactant, sulfuric esters of higher alcohols, alkyl benzene sulfonates, fatty acid sulfonates, phosphoric acid salts, fatty acid salts, salts of amino acid derivatives and the like can be mentioned.

As the nonionic surfactant, typically polyethylene glycol alkyl ester-type surfactants, alkyl ether-type surfactants, alkyl phenyl ether-type surfactants and the like can be mentioned.

As the amphoteric surfactant, surfactants having carboxylates, sulfates, sulfonates, phosphates or ester salts as an anion part, and having amine salts or quaternary ammonium salts as a cation part can be mentioned.

The amount of emulsifier with respect to 100 parts by mass of vinyl-based monomer mixture (m1) is preferably 10 parts by mass or less.

The graft copolymers (D) obtained by the aforementioned method is dispersed in water. As a method of isolating the graft copolymer (D) from an aqueous dispersion containing the graft copolymer (D), a precipitation method can be mentioned, in which a precipitation agent is added to the aqueous dispersion, the mixture is heated and stirred, and then the precipitation agent is removed, and the residue is washed, dehydrated and dried.

As the precipitating agent in the precipitation method, aqueous solutions of sulfuric acid, acetic acid, calcium chloride, and magnesium sulfate can be mentioned. As the precipitating agent, one type may be used alone, or two or more types may be used in combination.

In the first aspect of the present invention, as the graft copolymer (D), the same copolymer as described above with respect to <graft copolymer (D)> in "thermoplastic resin composition (I)" can be used.

The graft copolymer (D) of the first aspect of the present invention is obtainable by polymerization of a specific vinyl-based monomer mixture (m1) in the presence of a cross-linked ethylene.α-olefin copolymer (C) having a specific cross-linking structure. Therefore, the graft copolymer (D) is suitable for a raw material of a thermoplastic resin component (I) which has excellent fluidity and can form a molded article having excellent scratch resistance, impact resistance, glossiness and coloration.

[Thermoplastic Resin Composition (I)]

The "thermoplastic resin composition (I) of the second aspect of the present invention contains the graft copolymer (D) of the first aspect of the present invention and a hard component (J).

The hard component (J) is not particularly limited, and examples thereof include a styrene-based copolymer (H), polycarbonate, a methacrylic ester resin (G) (for example, polymethyl methacrylate), polybutylene terephthalate, polyethylene terephthalate, polyvinyl chloride, methyl methacrylate.styrene copolymer, methyl methacrylate styrene.N-phenylmaleimide copolymer, modified polyphenylene ether, polyamide and the like. Among these, styrene-based copolymer and polycarbonate are preferred.

As the hard component (J), one type may be used alone, or two or more types may be used in combination.

The thermoplastic resin composition (I) of the second aspect may contain each of the components contained in the thermoplastic resin composition of the third aspect or fourth aspect.

The styrene-based copolymer (H) is a copolymer derived from a mixture containing an aromatic vinyl-based monomer as an essential component, a vinyl cyanide-based monomer and other vinyl-based monomer polymerizable with these monomers as an optional component.

As specific examples of the aromatic vinyl-based monomer, vinyl cyanide-based monomer, and other vinyl-based monomer, the same aromatic vinyl-based monomer, vinyl cyanide-based monomer, and other vinyl-based monomer as those exemplified in the explanation of the vinyl-based monomer mixture (m1) can be mentioned.

Alternately, a monomer mixture containing an aromatic vinyl compound or a vinyl cyanide compound as exemplified later in the vinyl-based monomer mixture (m4) can be mentioned.

The composition of the styrene-based copolymer (H) is not particularly limited, and a copolymer obtainable by polymerization of 25 to 100% by mass of an aromatic vinyl-based monomer, 0 to 40% by mass of a vinyl cyanide-based monomer, and 0 to 65% by mass of other vinyl-based monomer polymerizable with these monomers (provided that, the total amount of the aromatic vinyl-based monomer, vinyl cyanide-based monomer, and other vinyl-based monomer is 100% by mass) can be mentioned.

A polymerization method such as emulsion polymerization and suspension polymerization can be employed to produce the styrene-based copolymer (H).

When the styrene-based copolymer (H) is produced by emulsion polymerization, monomers, an emulsifier, a polymerization initiator and a chain transfer agent are fed into a reactor in the presence of water, polymerization is conducted by heating. Then, a styrene-based copolymer (H) is collected by a precipitation method from an aqueous dispersion containing a styrene-based copolymer (H) obtained after polymerization.

As an emulsifier, a common emulsifier for emulsion polymerization, such as potassium rosinate and sodium alkyl benzene sulfonate can be used. As a polymerization initiator, an organic- or inorganic-peroxide initiator can be used. As a chain transfer agent, mercaptans, α-methyl styrene dimers, terpenes and the like can be used.

As the precipitation method, the similar method by which a graft copolymer (D) is collected from an aqueous dispersion obtained after graft polymerization can be employed.

When the styrene-based copolymer (H) is produced by suspension polymerization, monomers, a suspension agent, a suspension aid, a polymerization initiator and a chain transfer agent are fed into a reactor, and polymerization is conducted by heating, obtained slurry is dehydrated and dried, thereby obtaining a styrene-based copolymer.

As a suspension agent, tricalcium phosphite and polyvinyl alcohol can be used. As a suspension aid, sodium alkylbenzene sulfonate can be used. As a polymerization initiator, organic peroxides can be used. As a chain transfer agent, mercaptans, α-methyl styrene dimers, terpenes and the like can be used.

As a polycarbonate, a compound obtainable by reaction of one or more type of bisphenols, and phosgene or carbonic acid diester can be mentioned.

As bisphenols, hydroquinone, 4,4-dihydroxyphenyl, bis-(4-hydroxyphenyl)-alkanes, bis-(4-hydroxyphenyl)-cycloalkanes, bis-(4-hydroxyphenyl)-sulfide, bis-(4-hydroxyphenyl)-ether, bis-(4-hydroxyphenyl)-ketone, bis-(4-hydroxyphenyl)-sulfone, and alkyl-substituted derivatives, aryl-substituted derivatives and halogen-substituted derivatives thereof can be mentioned. Among these, 2,2-bis-(4-hydroxyphenyl)propane is preferred, since a bisphenol A-based polycarbonate obtainable from bisphenol A as a raw material is easily available. As the polycarbonate, one type may be used alone, or two or more types may be used in combination.

The thermoplastic resin composition (I) of a third aspect of the present invention includes: a graft copolymer (D); and a methacrylic ester resin (G).

The thermoplastic resin composition (I) of a fourth aspect of the present invention includes: a graft copolymer (D); a graft copolymer (F); and a methacrylic ester resin (G).

The thermoplastic resin composition (I) of a fifth aspect of the present invention includes: a graft copolymer (D); a graft copolymer (M); and a methacrylic ester resin (G).

The thermoplastic resin composition (I) of the third aspect, fourth aspect and fifth aspect of the present invention may contain, if necessary, a styrene-based copolymer (H), other thermoplastic resin, and various additives within a range that does not impair the effect of the present invention.

The graft copolymer (D) of the third, fourth and fifth aspects is a copolymer (α) or (β) as follows.

Copolymer (α): a copolymer obtainable by polymerization of a vinyl-based monomer mixture (m1) in the presence of an ethylene.α-olefin copolymer (A)

Copolymer (β): a copolymer obtainable by polymerization of a vinyl-based monomer mixture (m1) in the presence of a cross-linked ethylene.α-olefin copolymer (C)

As the copolymer (α), specific examples can be mentioned as follows:

Copolymer (α1): a copolymer obtainable by polymerization of a vinyl-based monomer mixture (m1) in the solution containing an ethylene.α-olefin copolymer (A)

Copolymer (α2): a copolymer obtainable by polymerization of a vinyl-based monomer mixture (m1) in the olefin resin aqueous dispersion (B) containing an ethylene.α-olefin copolymer (A)

As the copolymer (β), specific examples can be mentioned as follows:

Copolymer (β1): a copolymer obtainable by polymerization of a vinyl-based monomer mixture (m1) in the solution containing a cross-linked ethylene.α-olefin copolymer (C)

Copolymer (β2): a copolymer obtainable by polymerization of a vinyl-based monomer mixture (m1) in the aqueous dispersion containing a cross-linked ethylene.α-olefin copolymer (C)

The graft copolymer (F) is the following copolymer (γ):

Copolymer (γ): a copolymer obtainable by polymerization of a vinyl-based monomer mixture (m2) in the presence of a cross-linked acrylic ester-type rubber polymer (E).

The methacrylic ester resin (G) is the following resin (δ):

Resin (δ): a resin obtainable by polymerization of a vinyl-based monomer mixture (m3)

The styrene-based copolymer (H) is the following copolymer (ε):

Copolymer (ε): a copolymer obtainable by polymerization of a vinyl-based monomer mixture (m4)

The graft copolymer (M) is the following copolymer (ζ):

Copolymer (ζ): a copolymer obtainable by polymerization of a vinyl-based monomer mixture (m5) in the presence of a composite rubber polymer (L) containing a polyorganosiloxane (La) (preferably, in the presence of a composite rubber polymer (L1) including a polyorganosiloxane (La) and a poly(meth)acrylic ester (Lb))

Below, each of components (components (A) to (H), (K), (L), (L1), (La), (Lb), (M), (m1) to (m5) and the like) will be explained.

<Ethylene.α-Olefin Copolymer (A)>

In the present invention, it is important to use an ethylene.α-olefin copolymer (A) so that the molded article exhibits excellent impact resistance.

The ethylene.α-olefin copolymer (A) is a copolymer obtainable by copolymerization of ethylene and an α-olefin having 3 or more carbon atoms by a known polymerization method and is a copolymer containing an ethylene unit and an α-olefin unit.

As the α-olefin, propylene, 1-butene, 1-pentene, 1-hexene, 1-heptene, 1-octene, 1-decene, 1-undecene, 1-icosene and 1-docosene can be mentioned, and in terms of impact resistance of the molded article, an α-olefin having 3 to 20 carbon atoms is preferable, and propylene is particularly preferable.

When the total amount of the structural units constituting the ethylene.α-olefin copolymer (A) is regarded as 100% by mass, the amount of the ethylene unit in the ethylene.α-olefin copolymer (A) is preferably 45 to 65% by mass, and 50 to 60% by mass. When the amount of the ethylene unit is within the above mentioned range, balance between scratch resistance and impact resistance of the molded article are further improved. When the amount of the ethylene unit is 50 to 60% by mass, abrasion resistance and impact resistance of a molded article are further improved.

Here, the "amount of an ethylene unit" can be calculated from the mass of the monomer corresponding to the ethylene unit with respect to the total mass of the monomers used in the synthesis of an ethylene.α-olefin copolymer (A) (that is, the total mass of the monomers corresponding to the structural units constituting the ethylene.α-olefin copolymer (A)).

In the present invention, it is important to use an ethylene.α-olefin copolymer (A) having the mass average molecular weight (Mw) and the distribution of molecular weight (Mw/Mn) represented by the ratio of the mass average molecular weight (Mw) to the number-average molecular weight (Mn), within the specific range, so that the fluidity of the thermoplastic resin composition (I) is improved and the molded article exhibits excellent abrasion resistance, glossiness, coloration, impact resistance and lubricant property.

The mass average molecular weight (Mw) of the ethylene.α-olefin (A) is $17×10^4$ to $35×10^4$, and preferably $26×10^4$ to $32×10^4$. When the mass average molecular weight (Mw) is smaller than $17×10^4$, abrasion resistance, impact resistance and lubrication properties are deteriorated. When the mass average molecular weight (Mw) is greater than $35×10^4$, fluidity of the thermoplastic resin composition (I) and glossiness, coloration and lubrication properties of the molded article are deteriorated. When the mass average molecular weight (Mw) is $26×10^4$ to $32×10^4$, fluidity of the thermoplastic resin composition (I) and abrasion resistance, impact resistance, glossiness and lubrication properties of the molded article are further improved.

The distribution of molecular weight (Mw/Mn) of ethylene.α-olefin copolymer (A) is 1 to 3, and preferably 1.9 to 2.5. When the distribution of molecular weight (Mw/Mn) is greater than 3, abrasion resistance, impact resistance and lubrication properties are deteriorated. When a distribution of molecular weight (Mw/Mn) is 1.9 to 2.5, fluidity of the thermoplastic resin composition (I) and abrasion resistance and impact resistance of the molded article are further improved.

The mass average molecular weight (Mw) and the number average molecular weight (Mn) of ethylene.α-olefin copolymer (A) are measured by gel permeation chromatography (GPC) and converted in terms of the standard polystyrene.

The production method of the ethylene.α-olefin copolymer (A) is not particularly limited. In general, an ethylene.α-olefin copolymer (A) is produced by polymerization of ethylene and an α-olefin using a metallocene catalyst or a Ziegler-Natta catalyst.

As metallocene catalysts, a catalyst containing a metallocene complex in which an organic compound having a cyclopentadienyl skeleton or a halogen atom coordinated to a transition metal (zirconium, titanium, hafnium), and containing an organic aluminum compound or an organic boron compound can be mentioned.

As Ziegler-Natta catalyst, a catalyst containing an organic aluminum compound or an organic boron compound as well as a halide of a transition metal (e.g., titanium, vanadium, zirconium and hafnium) can be mentioned.

As a polymerization method, a method in which ethylene and α-olefin are copolymerized in a solvent in the presence of the catalyst can be mentioned. As a solvent, hydrocarbon solvent (e.g., benzene, toluene, xylene, pentane, heptane, octane and the like) can be mentioned. As the hydrocarbon solvent, one type may be used alone, or two or more types may be used in combination. The α-olefin as a raw material may be used as a solvent.

The amount of the ethylene unit in an ethylene.α-olefin copolymer (A), the mass average molecular weight (Mw) and the distribution of molecular weight (Mw/Mn) can be adjusted by changing the amount of ethylene and α-olefin, the type or amount of the molecular weight modifier such as hydrogen, the type or amount of the catalyst, and the reaction condition such as reaction temperature or reaction pressure.

<Olefin Resin Aqueous Dispersion (B)>

An olefin resin aqueous dispersion (B) is a dispersion in which the ethylene.α-olefin copolymer (A) is dispersed in aqueous medium.

The production method of the olefin resin aqueous dispersion (B) is not particularly limited. As the preparation method, a method in which using a known melt-kneading mean (e.g., a kneader, a Banbury mixer and a multi-screw extruder), an ethylene.α-olefin copolymer (A) is melted and kneaded, and then dispersed by applying mechanical shear force, and added to an aqueous medium containing an emulsifier; and a method in which an ethylene.α-olefin copolymer (A) is dissolved in a hydrocarbon solvent (e.g., pentane, hexane, heptane, benzene, toluene and xylene) in addition to an emulsifier, and added to an aqueous medium to form an emulsion, stirred sufficiently, and then the hydrocarbon solvent is distilled, can be mentioned. When producing an olefin resin aqueous dispersion (B), an emulsifier and an acid-modified olefin polymer (K) may be added as the other component.

As emulsifiers, known emulsifiers can be used, and for example, long-chain alkyl carboxylates, sulfosuccinate alkylester salts, and alkyl benzene sulfonates can be mentioned.

With respect to the amount of emulsifier, when potassium oleate is used as an emulsifier, the amount with respect to 100 parts by mass of the ethylene.α-olefin copolymer (A) is preferably 1 to 8 parts by mass, in terms of suppressing thermal coloration of the thermoplastic resin component (I) and in terms of ease of adjusting the particle diameter of the olefin resin aqueous dispersion (B).

As the acid-modified olefin polymer (K), a polymer in which an olefin polymer having a mass average molecular weight of 1,000 to 5,000 (e.g., polyethylene or polypropylene) is modified by a compound having a functional group (e.g., unsaturated carboxylic acid compound) can be mentioned. Examples of the unsaturated carboxylic compound include acrylic acid, maleic acid, itaconic acid, maleic anhydride, itaconic anhydride and maleic acid monoamide.

The amount of the acid-modified olefin polymer (K) with respect to 100 parts by mass of the ethylene.α-olefin copolymer (A) is preferably 1 to 40 parts by mass. When the amount of the acid-modified olefin polymer (K) is within the above mentioned range, the balance between scratch resistance and impact resistance becomes excellent.

The method of adding the acid-modified olefin polymer (K) is not particularly limited. A cross-linking treatment may be conducted after mixing an ethylene.α-olefin copolymer (A) and an acid-modified olefin polymer (K), or mixing may be conducted after cross-linking treatment of an ethylene.α-olefin copolymer (A) alone and cross-linking treatment of an acid-modified olefin polymer (K) alone.

The method of mixing the ethylene.α-olefin copolymer (A) and the acid-modified olefin polymer (K) is not particularly limited. As a mixing method, a melt-kneading method using a kneader, a Banbury mixer, or a multi-screw extruder can be mentioned.

In terms of excellent balance of physical properties of the molded article, the volume average particle diameter of the ethylene.α-olefin copolymer (A) contained in the olefin resin aqueous dispersion (B) is preferably 0.2 to 0.6 μm, and more preferably 0.3 to 0.5 μm. When the volume average particle diameter is within the above mentioned range, impact resistance, coloration and lubricant property of the molded article are further improved.

As a method of adjusting the volume average particle diameter of the ethylene.α-olefin copolymer (A) in the olefin resin aqueous dispersion (B), a method of adjusting the type or amount of emulsifier, the shear force applied during kneading, the temperature condition during kneading, and the kind or amount of the acid-modified olefin polymer (K) can be mentioned.

By image processing of electron micrographs, it is confirmed that the volume average particle diameter of ethylene.α-olefin copolymer (A) and the volume average particle diameter of cross-linked ethylene.α-olefin copolymer (C) dispersed in an aqueous dispersion respectively correspond to the volume average particle diameter of the ethylene.α-olefin copolymer (A) and the cross-linked ethylene.α-olefin copolymer (C) in the thermoplastic resin composition (I) without change.

<Cross-Linked Ethylene.α-Olefin Copolymer (C)>

In the third, fourth and fifth aspects of the present invention, a cross-linked ethylene.α-olefin copolymer (C) is preferably a copolymer obtainable by cross-linking treatment of ethylene.α-olefin copolymer (A).

In the third, fourth and fifth aspects of the present invention, it is preferable that the gel content ratio of the cross-linked ethylene.α-olefin copolymer (C) is within the specific range, so that the molded article exhibits excellent abrasion resistance, impact resistance, and coloration.

In the third, fourth and fifth aspects of the present invention, from the viewpoint of the balance of abrasion resistance, impact resistance and coloration of the molded article, the gel content ratio of the cross-linked ethylene.α-olefin copolymer (C) with respect to the total amount of the cross-linked ethylene.α-olefin copolymer (C) is preferably 35 to 75% by mass, more preferably 40 to 70% by mass, and particularly preferably 45 to 65% by mass.

The cross-linking treatment of the ethylene.α-olefin copolymer (A) may be conducted by a conventional method. As the method of cross-linking treatment, a method (a) in which an organic peroxide and, if necessary, a polyfunctional compound are added to an ethylene.α-olefin copolymer (A), and then cross-linking treatment is conducted; and a method (b) in which cross-linking treatment is conducted by ionizing radiation can be mentioned. In terms of impact resistance and coloration of the molded article, the method (a) is preferred.

Specifically, as the method (a), a method can be mentioned, in which an organic peroxide, if necessary, a polyfunctional compound are added to an ethylene.α-olefin copolymer (A), followed by heating.

The gel content ratio of the cross-linked ethylene.α-olefin copolymer (C) can be adjusted by controlling the amount of the organic peroxide or a polyfunctional compound, heating temperature or heating time.

The heating temperature is varied depending on the type of organic peroxide. The heating temperature is preferably −5° C. to +30° C. of ten-hour half-life temperature of organic peroxide.

The heating time is preferably 3 to 15 hours.

The organic peroxide is a component to form a cross-linking structure in the ethylene.α-olefin copolymer (A). Examples of organic peroxide include peroxy ester compounds, peroxy ketal compounds and dialkyl peroxide compounds. As the organic peroxide, one type may be used alone, or two or more types may be used in combination.

Specific examples of peroxy ester compounds include α,α'-bis(neodecanoylperoxy)diisopropylbenzene, cumylperoxy neodecanoate, 1,1,3,3-tetramethylbutyl peroxyneodecanoate, 1-cyclohexyl-1-methyl ethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoylperoxy)hexane, 1-cyclohexyl-1-methyl-ethyl peroxy-2-ethyl hexanoate, t-hexyl peroxy-2-hexyl hexanoate, t-butyl peroxy-2-hexyl hexanoate, t-butyl peroxy isobutyrate, t-hexyl peroxy isopropyl monocarbonate, t-butyl peroxy maleic acid, t-butyl peroxy-3,5,5-trimethyl hexanoate, t-butyl peroxy laurate, 2,5-dimethyl-2,5-bis (m-toluoyl peroxy) hexane, t-butyl peroxy isopropyl monocarbonate, t-butyl peroxy 2-ethylhexyl monocarbonate, t-hexyl peroxybenzoate, 2,5-dimethyl-2,5-bis (benzoyl peroxy) hexane, t-butyl peroxy acetate, t-butyl peroxy-m-toluoyl benzoate, t-butyl peroxy benzoate, bis (t-butyl peroxy) isophthalate and the like.

Specific examples of peroxy ketal compounds include 1,1-bis(t-hexylperoxy)-3,3,5-trimethylcyclohexane, 1,1-bis (t-hexylperoxy)cyclohexane, 1,1-bis (t-butylperoxy)-3,3,5-trimethylcyclohexane, 1,1-bis(t-butylperoxy)cyclohexane, 1,1-bis(t-butylperoxy)cyclododecane, 2,2-bis(t-butylperoxy)butane, n-butyl-4,4-bis(t-butylperoxy)valerate, 2,2-bis (4,4-di-(t-butylperoxy)cyclohexyl) propane and the like.

Specific examples of the dialkyl peroxide compounds include α,α'-bis (t-butyl peroxy)diisopropyl benzene, dicumyl peroxide, 2,5-dimethyl-2,5-bis (t-butyl peroxy) hexane, t-butyl cumyl peroxide, di-t-butyl peroxide, 2,5-dimethyl-2,5-bis (t-butyl peroxy) hexyne-3, and the like.

As an organic peroxide, in terms of adjusting the gel content ratio of a cross-linked ethylene.α-olefin copolymer (C), dialkyl peroxide compounds such as dicumyl peroxide, t-butyl cumyl peroxide and di-t-butyl peroxide are particularly preferred.

The amount of an organic peroxide with respect to 100 parts by mass of the ethylene.α-olefin copolymer (A) is preferably 0.1 to 5 parts by mass, in terms of ease of adjusting the gel content ratio of the cross-linked ethylene.α-olefin copolymer (C) within the range of 35 to 75% by mass.

A polyfunctional compound is a compound used, if necessary, in combination with an organic peroxide in order to adjust the gel content ratio of the cross-linked ethylene.α-olefin copolymer (C). Examples of polyfunctional compound include divinyl benzene, allyl methacrylate, ethylene glycol dimethacrylate, 1,3-butylene dimethacrylate, tetraethylene glycol diacrylate, triallyl cyanurate, triallyl isocyanurate, pentaerythritol tetraacrylate and the like. In terms of adjusting the gel content ratio easily, divinyl benzene is preferred. As the polyfunctional compound, one type may be used alone, or two or more types may be used in combination.

The amount of a polyfunctional compound with respect to 100 parts by mass of the ethylene.α-olefin copolymer (A) is preferably 10 parts by mass or less, in terms of ease of adjusting the gel content ratio of the cross-linked ethylene.α-olefin copolymer (C) within the range of 35 to 75% by mass.

In terms of excellent physical properties, the volume average particle diameter of the cross-linked ethylene.α-olefin copolymer (C) contained in the aqueous dispersion is 0.2 to 0.6 μm, and preferably 0.3 to 0.5 μm.

When the volume average particle diameter is within the above mentioned range, impact resistance, coloration and lubricant property of the molded article are improved.

The volume average particle diameter of cross-linked ethylene.α-olefin copolymer (C) in aqueous dispersion of cross-linked ethylene.α-olefin copolymer (C) obtained by conducting cross-linking treatment of an olefin resin aqueous dispersion (B) using an organic peroxide is not changed from the volume average particle diameter of the ethylene.α-olefin copolymer (A) in the olefin resin aqueous dispersion (B).

<Vinyl-Based Monomer Mixture (m1)>

In the third aspect, fourth aspect and fifth aspect of the present invention, a vinyl-based monomer mixture (m1) is a monomer mixture containing at least an aromatic vinyl compound and a vinyl cyanide compound.

Examples of aromatic vinyl compounds include styrene, α-methylstyrene, o-methylstyrene, m-methylstyrene, p-methylstyrene, vinylxylene, p-t-butylstyrene, ethylstyrene and the like. In terms of fluidity of the thermoplastic resin component (I) and coloration and impact resistance of the molded article, styrene and α-methylstyrene are preferred. As the aromatic vinyl compound, one type may be used alone, or two or more types may be used in combination.

The amount of aromatic vinyl compound with respect to 100% by mass of a vinyl-based monomer mixture (m1) is preferably 65 to 82% by mass, more preferably 73 to 80% by mass, and still more preferably 75 to 80% by mass. When the amount of the aromatic vinyl compound is within the above mentioned range, coloration and impact resistance of the molded article are further improved.

Examples of vinyl cyanide compound include acrylonitrile, methacrylonitrile and the like. As the vinyl cyanide compound, one type may be used alone, or two or more types may be used in combination.

In the third, fourth and fifth aspects of the present invention, the amount of vinyl cyanide compound with respect to 100% by mass of a vinyl-based monomer mixture (m1) is preferably 18 to 35% by mass, more preferably 20 to 27% by mass, and still more preferably 20 to 25% by mass. When the amount of the vinyl cyanide compound is within the above mentioned range, coloration and impact resistance of the molded article are further improved.

A vinyl-based monomer mixture (m1) may contain other monomers which are polymerizable with an aromatic vinyl compound or a vinyl cyanide compound, in addition to the aromatic vinyl compound or a vinyl cyanide compound, within the range not to impair the effects of the present invention.

As the other monomers, acrylic acid esters (e.g., methyl acrylate, ethyl acrylate, propyl acrylate, butyl acrylate), methacrylic esters (e.g., methyl methacrylate, ethyl methacrylate, propyl methacrylate, butyl methacrylate), maleimide-based compounds (e.g., N-cyclohexylmaleimide, N-phenyl maleimide) can be mentioned.

As the other monomer, one type may be used alone, or two or more types may be used in combination.

<Graft Copolymer (D)>

In the third aspect, fourth aspect and fifth aspect, the graft copolymer (D) can be obtained by polymerization of a vinyl-based monomer mixture (m1) in the presence of either an ethylene.α-olefin copolymer (A) or a cross-linked ethylene.α-olefin copolymer (C).

Since the graft copolymer (D) can reliably ensure the molecular chain (i.e., graft component) that contributes to control elastic deformation, deformation of the particles of an ethylene.α-olefin copolymer (A) or an cross-linked ethylene.α-olefin copolymer (C) in the graft polymer, caused by applying shear force can be suppressed. Therefore, by blending the graft copolymer (D), the obtained molded article exhibits excellent impact resistance and scratch resistance.

In the third aspect, fourth aspect and fifth aspect of the present invention, the graft copolymer (D) is preferably a copolymer obtainable by polymerization of 20 to 50% by mass of a vinyl-based monomer mixture (m1) in the presence of 50 to 80% by mass of an ethylene.α-olefin copolymer (A) or cross-linked ethylene.α-olefin copolymer (C) (provided that, the sum of the vinyl-based monomer mixture (m1) and the ethylene.α-olefin copolymer (A) or cross-linked ethylene.α-olefin copolymer (C) is 100% by mass). When the amount of the ethylene.α-olefin copolymer (A) or cross-linked ethylene.α-olefin copolymer (C) is 50 to 80% by mass, the fluidity of the thermoplastic resin composition (I) and balance of physical properties such impact resistance, glossiness and coloration of the molded article can be improved. The graft copolymer (D) is more preferably a copolymer obtainable by polymerization of 25 to 45% by mass of a vinyl-based monomer mixture (m1) in the presence of 55 to 75% by mass of an ethylene.α-olefin copolymer (A) or cross-linked ethylene.α-olefin copolymer (C) (provided that, the sum of the vinyl-based monomer mixture (m1) and the ethylene.α-olefin copolymer (A) or cross-linked ethylene.α-olefin copolymer (C) is 100% by mass).

In the third aspect, fourth aspect and fifth aspect of the present invention, the graft ratio of the graft copolymer (D) is preferably 20 to 100% by mass, from the viewpoint of fluidity of the thermoplastic resin composition (I) and balance of impact resistance, coloration and glossiness of the molded article.

As the polymerization method, a known polymerization method (e.g., emulsion polymerization method, suspension polymerization method, bulk polymerization method, solution polymerization method, and the like) can be employed. In terms of excellent abrasion resistance and glossiness of the molded article, emulsion polymerization method is particularly preferred.

As a method of producing a graft copolymer (D) by emulsion polymerization, a method in which a vinyl-based monomer mixture (m1) is mixed with an organic peroxide, and then continuously added to an olefin resin aqueous dispersion (B) or an aqueous dispersion of a cross-linked ethylene.α-olefin copolymer (C) can be mentioned.

In an olefin resin aqueous dispersion (B) or an aqueous dispersion of cross-linked ethylene.α-olefin copolymer (C), the amount of the ethylene.α-olefin copolymer (A) or the cross-linked ethylene.α-olefin copolymer (C) is preferably 15 to 65% by mass, and more preferably 25 to 55% by mass.

The reaction time is preferably 2 to 5 hours, and more preferably 2.5 to 4.5 hours.

The reaction temperature is preferably 50° C. to 100° C., and more preferably 60° C. to 90° C.

An organic peroxide is preferably used as a redox initiator in which an organic peroxide, a transition metal and a reducing agent is combined. In the polymerization, a chain transfer agent, an emulsifier and the like may be used depending on the situation.

As a redox initiator, a combination of an organic peroxide and a ferrous sulfate-chelating agent-reducing agent is preferably used, from the viewpoint that the polymerization reaction condition does not require high temperature; deterioration of an ethylene.α-olefin copolymer (A) or a cross-linked ethylene.α-olefin copolymer (C) can be suppressed; and deterioration of impact resistance of the molded article can be prevented.

As the organic peroxide, cumene hydroperoxide, diisopropyl benzene hydroperoxide, t-butyl hydroperoxide and the like can be mentioned.

A redox initiator composed of cumene hydroperoxide, ferrous sulfate, sodium pyrophosphate and dextrose is more preferred.

As chain transfer agents, mercaptans (e.g., octyl mercaptan, n- or t-dodecyl mercaptan, n-hexadecyl mercaptan, n- or t-tetradecyl mercaptan), allyl compounds (e.g., allyl sulfonic acid, methallyl sulfonic acid, and sodium salts thereof), α-methyl styrene dimer can be mentioned. In terms of ease of adjusting the molecular weight, mercaptans are preferred. As the chain transfer agent, one type may be used alone, or two or more types may be used in combination.

As the method of adding the chain transfer agent, one-batch addition, two or more-batches addition, and continuous addition can be employed.

The amount of chain transfer agent with respect to 100 parts by mass of vinyl-based monomer mixture (m1) is preferably 2.0 parts by mass or less.

As an emulsifier, an anionic surfactant, a non-ionic surfactant, an ampholytic surfactant and the like can be mentioned.

As the anionic surfactant, sulfuric esters of higher alcohols, alkyl benzene sulfonates, fatty acid sulfonates, salts of phosphoric acid, salts of fatty acid, salts of amino acid derivatives and the like can be mentioned.

As the nonionic surfactant, typical polyethylene glycol alkyl ester-type surfactants, alkyl ether-type surfactants, alkyl phenyl ether-type surfactants and the like can be mentioned.

As the amphoteric surfactant, surfactants having carboxylates, sulfates, sulfonates, phosphates or ester salts as an anion part, and amine salts or quaternary ammonium salts as a cation part can be mentioned.

The amount of emulsifier with respect to 100 parts by mass of vinyl-based monomer mixture (m1) is preferably 10 parts by mass or less.

The graft copolymers (D) obtained by emulsion polymerization method is dispersed in water.

As a method of isolating the graft copolymer (D) from an aqueous dispersion containing the graft copolymer (D), a precipitation method can be mentioned, in which a precipitation agent is added to the aqueous dispersion, the mixture is heated and stirred, and then the precipitation agent was separated, the precipitated graft copolymer (D) is washed, dehydrated and dried.

As the precipitating agent, aqueous solutions of sulfuric acid, acetic acid, calcium chloride, and magnesium sulfate can be mentioned. As the precipitating agent, one type may be used alone, or two or more types may be used in combination.

If necessary, an antioxidant may be added to the aqueous dispersion containing a graft copolymer (D).

<Cross-Linked Acrylic Ester-Type Rubber Polymer (E)>

A cross-linked acrylic ester-type rubber polymer (E) is a copolymer having a unit derived from a (meth)acrylic ester and having a unit derived from a cross-linking agent and/or a unit derived from a graft cross-linking agent.

An aqueous dispersion of the cross-linked acrylic ester-type rubber polymer (E) may contain an aqueous dispersion of other rubber component such as polybutadiene.

As (meth)acrylic esters, a (meth)acrylic alkylester having an alkyl group of 1 to 12 carbon atoms and an acrylic ester having an aromatic hydrocarbon group (e.g., a phenyl group or a benzyl group) can be mentioned. In terms of impact resistance of the molded article, n-butyl acrylate, 2-ethylhexyl acrylate, ethyl acrylate are preferred.

As the (meth)acrylic ester, one type may be used alone, or two or more types may be used in combination.

A cross-linking agent and a graft cross-linking agent can improve coloration of the molded article.

As a cross-linking agent, dimethacrylate-based compounds such as ethylene glycol dimethacrylate, propylene glycol dimethacrylate, 1,3-butylene glycol dimethacrylate and 1,4-butylene glycol dimethacrylate can be mentioned.

As a graft cross-linking agent, allyl compounds such as allyl methacrylate, triallyl cyanurate, triallyl isocyanurate and the like can be mentioned.

The total amount of the unit derived from cross-linking agent and graft cross-linking agent is preferably 0.1 to 5% by mass, more preferably 0.2 to 3% by mass, and still more preferably 0.5 to 2% by mass, with respect to the total amounts of units constituting the cross-linked acrylic ester-type rubber polymer (E) (100% by mass), from the viewpoint that coloration of the molded article becomes excellent and the amount of coagulum generated during producing the graft copolymer (F) can be reduced.

The "total amount of the unit derived from cross-linking agent and graft cross-linking agent" can be calculated from the mass of the cross-linking agent and graft cross-linking agent relative to the total mass of the monomers used in the synthesis of the cross-linked acrylic ester-type rubber polymer (E) (i.e., the total mass of the monomers corresponding to structural units constituting the cross-linked acrylic ester-type rubber polymer (E)).

The production method of cross-linked acrylic ester-type rubber polymer (E) is not particularly limited.

As a production method of cross-linked acrylic ester-type rubber polymer (E), a method in which a monomer mixture containing a (meth)acrylic ester and either one or both of cross-linking agent and graft cross-linking agent is subjected to emulsion polymerization to obtain an aqueous dispersion of the cross-linked acrylic ester-type rubber polymer (E); a method in which an aqueous dispersion of the cross-linked acrylic ester-type rubber polymer (E) and an aqueous dispersion of the other rubber component are subjected to hetero aggregation or co-enlarged; and a method in which in the presence of an aqueous dispersion of the cross-linked acrylic ester-type rubber polymer (E) or an aqueous dispersion of the other rubber component, a monomer mixture for constituting the other aqueous dispersion is polymerized to form a composite.

Specific examples of emulsifier used in emulsion polymerization include sodium salts or potassium salts of fatty acid (e.g., oleic acid, stearic acid, myristic acid, stearic acid, palmitic acid), sodium lauryl sulfate, sodium N-lauroyl sarcosinate, dipotassium alkenyl succinate and sodium alkyl diphenyl ether disulfonate can be mentioned. From the viewpoint that generation of gas during molding the thermoplastic resin composition (I) can be suppressed, an acid-type emulsifier containing two functional groups in one molecule or salts thereof are preferred.

As the acid-type emulsifier containing two functional groups in one molecule or salts thereof, dipotassium alkenyl succinate and sodium alkyl diphenyl ether disulfonate are preferred, and in terms of ease of coagulation and collection of the cross-linked acrylic ester-type rubber polymer (E) from the aqueous dispersion by using sulfuric acid, dipotassium alkenyl succinate is more preferred.

Specific examples of dipotassium alkenylsuccinate, dipotassium octadecenylsuccinate, dipotassium heptadecenylsuccinate, and dipotassium hexadecenylsuccinate can be mentioned.

As the emulsifier, one type may be used alone, or two or more types may be used in combination.

The volume average particle diameter of a cross-linked acrylic ester-type rubber polymer (E) in an aqueous dispersion is 0.05 to 0.18 µm, and preferably 0.07 to 0.15 µm, in terms of excellent physical properties of the molded article.

When the volume average particle diameter is smaller than 0.05 µm, impact strength of the molded article is deteriorated.

When the volume average particle diameter is greater than 0.18 µm, impact resistance, impact strength and coloration are deteriorated.

As a method of adjusting the volume average particle diameter of a cross-linked acrylic ester-type rubber polymer (E) in an aqueous dispersion, a method of adjusting the type or amount of emulsifier can be mentioned.

<Vinyl-Based Monomer Mixture (m2)>

A vinyl-based monomer mixture (m2) is a monomer mixture containing at least an aromatic vinyl compound and a vinyl cyanide compound.

Examples of aromatic vinyl compounds include styrene, α-methylstyrene, o-methylstyrene, m-methylstyrene, p-methylstyrene, vinylxylene, p-t-butylstyrene, ethylstyrene and the like. In terms of fluidity of the thermoplastic resin component (I) and coloration and impact resistance of the molded article, styrene and α-methylstyrene are preferred.

As the aromatic vinyl compound, one type may be used alone, or two or more types may be used in combination.

The amount of aromatic vinyl compound with respect to 100% by mass of a vinyl-based monomer mixture (m2) is preferably 65 to 82% by mass, more preferably 73 to 80% by mass, and still more preferably 75 to 80% by mass.

When the amount of the aromatic vinyl compound is within the above mentioned range, coloration and impact resistance of the molded article are further improved.

Examples of vinyl cyanide compound include acrylonitrile, methacrylonitrile and the like.

As the vinyl cyanide compound, one type may be used alone, or two or more types may be used in combination.

The amount of vinyl cyanide with respect to 100% by mass of a vinyl-based monomer mixture (m2) is preferably 18 to 35% by mass, more preferably 20 to 27% by mass, and still more preferably 20 to 25% by mass.

When the amount of the vinyl cyanide is within the above mentioned range, coloration and impact resistance of the molded article is further improved.

A vinyl-based monomer mixture (m2) may contain other monomers which are polymerizable with an aromatic vinyl compound or a vinyl cyanide compound, in addition to the aromatic vinyl compound or a vinyl cyanide compound, within the range not to impair the effects of the present invention.

Examples of other monomers include methacrylic esters (e.g., methyl methacrylate, ethyl methacrylate, n-propyl methacrylate, i-propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate, phenyl methacrylate), maleimide-based compounds (e.g., N-methyl maleimide, N-ethyl maleimide, N-n-propyl maleimide, N-i-propyl maleimide, N-n-butyl maleimide, N-i-butyl maleimide, N-tert-butyl maleimide, N-cycloalkyl maleimide (N-cyclohexylmaleimide)), N-aryl maleimides (e.g., N-phenyl maleimide, N-alkyl-substituted phenyl maleimide, N-chlorophenyl maleimide), N-aralkyl maleimides, and acrylic esters (e.g., methyl acrylate, ethyl acrylate, propyl acrylate, butyl acrylate).

As the other monomer, one type may be used alone, or two or more types may be used in combination.

<Graft Copolymer (F)>

A graft copolymer (F) is obtainable by polymerization of a vinyl-based monomer mixture (m2) in the presence of a cross-linked acrylic ester-type rubber polymer (E).

A graft copolymer (F) is preferably a copolymer obtainable by polymerization of 20 to 80% by mass of a vinyl-based monomer mixture (m2) in the presence of 20 to 80% by mass of a cross-linked acrylic ester-type rubber polymer (E), more preferably a copolymer obtainable by polymerization of 25 to 75% by mass of a vinyl-based monomer mixture (m2) in the presence of 25 to 75% by mass of a cross-linked acrylic ester-type rubber polymer (E), and still more preferably a copolymer obtainable by polymerization of 30 to 70% by mass of a vinyl-based monomer mixture (m2) in the presence of 30 to 70% by mass of a cross-linked acrylic ester-type rubber polymer (E) (provided that, the total amount of the cross-linked acrylic ester-type rubber polymer (E) and the vinyl-based monomer mixture (m2) is 100% by mass).

When the amount of the cross-linked acrylic ester-type rubber polymer (E) is within the above mentioned range, productivity of the graft copolymer (F) is improved, and coloration and impact resistance of the molded article are further improved.

The graft copolymer (F) can be produced, for example, by emulsion polymerization.

That is, the vinyl-based monomer mixture (m2) is added to aqueous dispersion of the cross-linked acrylic ester-type rubber polymer (E), and the vinyl-based monomer mixture (m2) is subjected to radical polymerization in the presence of an emulsifier to obtain a graft polymer (F).

In order to adjust the graft ratio and the molecular weight of the graft component, various known chain transfer agents may be incorporated.

As radical polymerization initiators, peroxides, azo-type initiators, and redox-type initiators in which an oxidizing agent and a reducing agent are combined can be mentioned. In terms of ease of controlling a graft polymerization reaction, a redox-type initiator is preferred, and a sulfoxylate-based initiator in which ferrous sulfate, ethylenediaminetetraacetic acid disodium salt, Rongalit, and hydroperoxide have been combined is particularly preferred.

As emulsifier, the same emulsifier used in the production of cross-linked acrylic ester-type rubber polymer (E) can be mentioned.

An emulsifier contained in an aqueous dispersion of a cross-linked acrylic ester-type rubber polymer (E) in advance is used in graft polymerization and additional emulsifier may not be added during graft polymerization, or an additional emulsifier may be added during graft polymerization if necessary.

As a method of collecting a graft copolymer (F) from an aqueous dispersion of the graft copolymer (F), a method in which the aqueous dispersion is poured into a hot water dissolving a coagulant, and coagulated in a slurry state, and then, the graft copolymer is collected (wet process); and a method in which the aqueous dispersion of the graft copolymer (F) is sprayed under heating atmosphere and the graft copolymer (F) is collected in a semi-directly manner (spray-dry process), can be mentioned.

As a coagulant, inorganic acids (sulfuric acid, hydrochloric acid, phosphoric acid, nitric acid and the like), metal salt (calcium chloride, calcium acetate, aluminum sulfate and the like) and the like can be mentioned.

The coagulant is selected depending on the emulsifier used in the polymerization.

That is, when a sodium or potassium salt of carboxylic acid such as a sodium or potassium salt of fatty acid and a sodium or potassium salt of rosin acid is used alone, any coagulant may be used.

When an emulsifier that exhibits stable emulsifying capacity in the acidic region (e.g., sodium dodecylbenzenesulfonate) is included, it is necessary to use a metallic salt.

As a method for obtaining a dried graft copolymer (F) from a slurry of the graft copolymer (F), after the emulsifier residue in slurry is dissolved in water by washing, a method (i) in which the slurry is dehydrated using a centrifugal dehydrator or a press dehydrator, then dried using a flash dryer, or a method (ii) in which the slurry is simultaneously dehydrated and dried using a squeezing type dehydrator or an extruder can be mentioned.

After drying, a graft copolymer (F) can be obtained in a powder or particle state.

The graft copolymer (F) discharged from a squeezing type dehydrator or an extruder may be transfer directly to an extruder or molding machine for preparing a thermoplastic resin composition (I).

(Polyorganosiloxane (La))

As a polyorganosiloxane (La), in terms of impact resistance of the molded article, a polyorganosiloxane (La) having a vinyl polymerizable functional group is preferred. It is more preferable that a polyorganosiloxane contains 0.3 to 3 mol % of the unit derived from a siloxane having a vinyl polymerizable functional group and 97 to 99.7 mol % of the unit derived from a dimethylsiloxane, with respect to the total amount of units constituting the polyorganosiloxane (La), and the amount of the silicon atom having a three or more siloxane bonds is 1 mol % or less, with respect to the total silicon atoms in the polyorganosiloxane (La).

As polydimethylsiloxane, 3 or more-membered dimethylsiloxane-based cyclic compound can be mentioned, and 3- to 7-membered cyclic compound is preferred.

Specifically, hexamethylcyclotrisiloxane, octamethylcyclotetrasiloxane, decamethylcyclopentasiloxane, and dodecamethylcyclohexasiloxane can be mentioned.

As the dimethylsiloxane, one type may be used alone, or two or more types may be used in combination.

A siloxane having a vinyl polymerizable functional group has a vinyl polymerizable functional group and can form a bond with dimethylsiloxane via a siloxane bond.

As a siloxane having a vinyl polymerizable functional group, an alkoxysilane compound having a vinyl polymerizable functional group is preferred, in terms of reactivity with dimethylsiloxane.

Specifically, methacryloyloxy siloxanes (e.g., β-methacryloyloxyethyl dimethoxymethylsilane, γ-methacryloyloxypropyl dimethoxymethylsilane, γ-methacryloyloxypropyl methoxy dimethyl silane, γ-methacryloyloxypropyl trimethoxysilane, γ-methacryloyloxypropyl ethoxy diethyl silane, γ-methacryloyloxypropyl diethoxymethylsilane, δ-methacryloyloxybutyl diethoxymethylsilane), vinyl siloxanes (e.g., tetramethyltetravinylcyclotetrasiloxane), p-vinyl phenylalanine dimethoxymethylsilane, and mercapto siloxanes (e.g., γ-mercaptopropyl dimethoxymethylsilane, γ-mercaptopropyl trimethoxysilane) can be mentioned.

As the siloxane having a vinyl polymerizable functional group, one type may be used alone, or two or more types may be used in combination.

If necessary, a polyorganosiloxane (La) may contain a unit derived from a siloxane-based cross-linking agent.

As a siloxane-based cross-linking agent, 3- or 4-functionalized silane-based cross-linking agent, for example, trimethoxymethylsilane, triethoxyphenylsilane, tetramethoxysilane, tetraethoxysilane, and tetrabutoxysilane can be mentioned.

The polyorganosiloxane (La) can be produced as follows.

To a siloxane mixture containing dimethylsiloxane and a siloxane having a vinyl polymerizable functional group, a siloxane-based cross-linking agent is added, if necessary. Then, the mixture is emulsified using an emulsifier and water, thereby obtaining an aqueous dispersion of siloxane mixture.

The aqueous dispersion of siloxane mixture is subjected to microparticulation using a homomixer capable of microparticulation by shear force due to the high-speed rotation or a homogenizer capable of microparticulation by ejection force due to the high-pressure generator.

When using a high pressure emulsification device such as a homogenizer, it is preferable that the particle diameter distribution of polyorganosiloxane (La) becomes small.

The microparticulated aqueous dispersion of siloxane mixture is added to an acid solution containing an acid catalyst to polymerize at a high temperature. The reaction solution is cooled, and the polymerization reaction is stopped by neutralization using an alkaline substance (e.g., sodium hydroxide, potassium hydroxide and sodium carbonate), thereby obtaining an aqueous dispersion of a polyorganosilozane (La).

As an emulsifier, anion-type emulsifier is preferred.

As an anion-type emulsifier, sodium alkylbenzene sulfonate, sodium lauryl sulfonate, sodium salt of polyoxyethylene nonyl phenyl ether sulfate ester can be mentioned. In terms of ease of adjusting the volume average particle diameter of the polyorganosiloxane (La), sulfonic acid-based emulsifier (e.g., sodium alkylbenzene sulfonate, sodium lauryl sulfonate) is preferred.

The amount of emulsifier is about 0.05 to 20 parts by mass with respect to 100 parts of siloxane mixture (as a solid content).

As acid catalysts, sulfonic acids (e.g., aliphatic sulfonic acids, aliphatic group-substituted benzenesulfonic acid, aliphatic group-substituted naphthalenesulfonic acids), and mineral acids (e.g., sulfuric acid, hydrochloric acid, nitric acid) can be mentioned.

From the viewpoint that stabilization property of an aqueous dispersion of the polyorganosiloxane (La) becomes excellent, aliphatic group-substituted benzene sulfonic acid is preferred, and n-dodecylbenzenesulfonic acid is particularly preferred.

When n-dodecyl benzene sulfonic acid and a mineral acid (e.g., sulfuric acid) are used in combination, the effect of emulsifier used in an aqueous dispersion of polyorganosiloxane (La) on coloration of the molded article can be suppressed as much as possible.

As the acidic catalyst, one type may be used alone, or two or more types may be used in combination.

The volume average particle diameter of the polyorganosiloxane (La) in the aqueous dispersion is preferably 0.01 to 0.09 µm, and more preferably 0.02 to 0.08 µm, from the viewpoint that the coloration of the molded article becomes excellent, and the increase in viscosity and the generation of coagulum during producing the polyorganosiloxane (La) can be suppressed.

As a method of adjusting the volume average particle diameter of a polyorganosiloxane (La) in an aqueous dispersion, a method disclosed in Japanese Unexamined Patent Application, First Publication No. Hei5-279434 can be employed.

<Poly(Meth)Acrylic Ester (Lb)>

A poly(meth)acrylic ester (Lb) is a copolymer having a unit derived from (meth)acrylic ester and having a unit derived from a cross-linking agent and/or a unit derived from a graft cross-linking agent.

As (meth)acrylic esters, a (meth)acrylic alkylester having an alkyl group of 1 to 12 carbon atoms and an acrylic ester having an aromatic hydrocarbon group (e.g., a phenyl group or a benzyl group) can be mentioned. In terms of impact resistance of the molded article, n-butyl acrylate, 2-ethylhexyl acrylate, and ethyl acrylate are preferred.

As the (meth)acrylic ester, one type may be used alone, or two or more types may be used in combination.

A cross-linking agent and a graft cross-linking agent can improve coloration of the molded article.

As a cross-linking agent, dimethacrylate-based compounds such as ethylene glycol dimethacrylate, propylene glycol dimethacrylate, 1,3-butylene glycol dimethacrylate and 1,4-butylene glycol dimethacrylate can be mentioned.

As a graft cross-linking agent, allyl compounds such as allyl methacrylate, triallyl cyanurate, triallyl isocyanurate and the like can be mentioned The total amount of the units derived from cross-linking agent and graft cross-linking agent is preferably 0.1 to 5% by mass, more preferably 0.2 to 3% by mass, and still more preferably 0.5 to 2% by mass, with respect to the total amounts of units constituting the a poly(meth)acrylic ester (Lb) (100% by mass), from the viewpoint that coloration of the molded article becomes excellent, and the amount of coagulum generated during producing the graft copolymer (M) can be reduced.

The "total amount of the units derived from cross-linking agent and graft cross-linking agent" can be calculated from the mass of the cross-linking agent and graft cross-linking agent relative to the total mass of the monomers used in the synthesis of a poly(meth)acrylic ester (Lb) (i.e., the total mass of the monomers corresponding to structural units constituting the poly(meth)acrylic ester (Lb)).

A poly(meth)acrylic ester (Lb) can be produced in the following manner.

The production method of poly(meth)acrylic ester (Lb) is not particularly limited, and a method in which a monomer mixture containing a (meth)acrylic ester and either one or both of cross-linking agent and graft cross-linking agent is subjected to emulsion polymerization to obtain an aqueous dispersion of the poly(meth)acrylic ester (Lb) can be mentioned.

Specific examples of emulsifier used in emulsion polymerization include sodium salts or potassium salts of fatty acid (e.g., oleic acid, stearic acid, myristic acid, stearic acid, palmitic acid), sodium lauryl sulfate, sodium N-lauroyl sarcosinate, dipotassium alkenyl succinate and sodium alkyl diphenyl ether disulfonate can be mentioned. From the viewpoint that generation of gas during molding the thermoplastic resin composition (I) can be suppressed, an acid-type emulsifier containing two functional groups in one molecule or salts thereof are preferred.

As the acid-type emulsifier containing two functional groups in one molecule or salts thereof, dipotassium alkenyl succinate and sodium alkyl diphenyl ether disulfonate are preferred, and in terms of ease of coagulation and collection of the composite rubber polymer (L1) from the aqueous dispersion by using sulfuric acid, dipotassium alkenyl succinate is more preferred.

Specific examples of dipotassium alkenylsuccinate, dipotassium octadecenylsuccinate, dipotassium heptadecenylsuccinate, and dipotassium hexadecenylsuccinate can be mentioned.

As the emulsifier, one type may be used alone, or two or more types may be used in combination.

<Composite Rubber Polymer (L)>

A composite rubber polymer (L) is a polymer containing a polyorganosiloxane (La).

As a composite rubber polymer (L), a composite rubber polymer containing a polyorganosiloxane (La), and a composite rubber polymer containing a polyorgansiloxane (La) and the other polymer can be mentioned.

The composite rubber polymer (L) is preferably a composite rubber polymer (L1) containing a polyorganosiloxane (La) and a poly(meth)acrylic ester (Lb), in terms of obtaining the effect of the present invention satisfactorily.

The amount of the polyorganosiloxane (La) contained in the rubber polymer (L) with respect to the total amount of the rubber polymer (L) is preferably 1 to 99% by mass, more preferably 2 to 80% by mass, and still more preferably 3 to 50% by mass.

When the amount of polyorganosiloxane (La) is within the above mentioned range, impact resistance and coloration of the molded article are further improved.

The amount of the polyorganosiloxane (La) contained in the composite rubber polymer (L1) with respect to the total amount of the composite rubber polymer (L1) is preferably 1 to 99% by mass, more preferably 2 to 80% by mass, and still more preferably 3 to 50% by mass.

When the amount of polyorganosiloxane (La) is within the above mentioned rage, impact resistance and coloration of the molded article are further improved.

The production method of composite rubber polymer (L1) is not particularly limited.

As a method of producing a composite rubber polymer (L1), for example, a method in which an aqueous dispersion of polyorganosiloxane (La) and an aqueous dispersion of poly(meth)acrylic ester (Lb), which are separately prepared, are subjected to hetero aggregation or co-enlarged; and a method in which in an aqueous dispersion of polyorganosiloxane (La) or an aqueous dispersion of poly(meth)acrylic ester (Lb), the remaining polymer is produced to form a composite can be mentioned. In terms of excellent impact resistance and coloration of the molded article, a method in which a monomer mixture containing a (meth)acrylic ester and either one or both of a cross-linking agent and a graft cross-linking agent is subjected to emulsion polymerization in the presence of an aqueous dispersion of a polyorganosiloxane (La) is preferable.

Specific examples of emulsifier used in emulsion polymerization include sodium salts or potassium salts of fatty acid (e.g., oleic acid, stearic acid, myristic acid, stearic acid, palmitic acid), sodium lauryl sulfate, sodium N-lauroyl sarcosinate, dipotassium alkenyl succinate and sodium alkyl diphenyl ether disulfonate can be mentioned. From the viewpoint that generation of gas during molding the thermoplastic resin composition (I) can be suppressed, an acid-type emulsifier containing two functional groups in one molecule or salts thereof are preferred.

As the acid-type emulsifier containing two functional groups in one molecule or salts thereof, dipotassium alkenyl succinate and sodium alkyl diphenyl ether disulfonate are preferred, and in terms of ease of coagulation and collection of the composite rubber polymer (L1) from the aqueous dispersion by using sulfuric acid, dipotassium alkenyl succinate is more preferred.

Specific examples of dipotassium alkenylsuccinate, dipotassium octadecenylsuccinate, dipotassium heptadecenylsuccinate, and dipotassium hexadecenylsuccinate can be mentioned.

As the emulsifier, one type may be used alone, or two or more types may be used in combination.

The volume average particle diameter of a composite rubber polymer (L) and a composite rubber polymer (L1) in an aqueous dispersion is 0.05 to 0.18 µm, and preferably 0.07 to 0.15 µm, in terms of excellent physical properties of the molded article.

When the volume average particle diameter is smaller than 0.05 µm, impact resistance and lubrication properties are deteriorated.

When the volume average particle diameter is greater than 0.18 μm, impact resistance, coloration and lubrication properties are deteriorated.

As a method of adjusting the volume average particle diameter of a composite rubber polymer (L) and composite rubber polymer (L1) in an aqueous dispersion, a method of adjusting the type or amount of emulsifier can be mentioned.

<Vinyl-Based Monomer Mixture (m5)>

A vinyl-based monomer mixture (m5) is a monomer component containing an arbitrary vinyl-based monomer. Examples of vinyl-based monomer include aromatic vinyl compounds, vinyl cyanide compounds and the other monomers polymerizable with these compounds.

In terms of achieving the effect of the present invention satisfactorily, the vinyl-based monomer mixture (m5) is preferably a monomer mixture containing at least an aromatic vinyl compound and a vinyl cyanide compound is preferably used.

Examples of aromatic vinyl compounds include styrene, α-methylstyrene, o-methylstyrene, m-methylstyrene, p-methylstyrene, vinylxylene, p-t-butylstyrene, ethylstyrene and the like. In terms of fluidity of the thermoplastic resin component (I) and coloration and impact resistance of the molded article, styrene and α-methylstyrene are preferred.

As the aromatic vinyl compound, one type may be used alone, or two or more types may be used in combination.

The amount of aromatic vinyl compound with respect to 100% by mass of a vinyl-based monomer mixture (m5) is preferably 65 to 82% by mass, more preferably 73 to 80% by mass, and still more preferably 75 to 80% by mass.

When the amount of the aromatic vinyl compound is within the above mentioned range, coloration and impact resistance of the molded article is further improved.

Examples of vinyl cyanide compound include acrylonitrile, methacrylonitrile and the like.

As the vinyl cyanide compound, one type may be used alone, or two or more types may be used in combination.

The amount of vinyl cyanide with respect to 100% by mass of a vinyl-based monomer mixture (m5) is preferably 18 to 35% by mass, more preferably 20 to 27% by mass, and still more preferably 20 to 25% by mass.

When the amount of the vinyl cyanide is within the above mentioned range, coloration and impact resistance of the molded article is further improved.

A vinyl-based monomer mixture (m5) containing an aromatic vinyl compound and a vinyl cyanide compound may contain the other monomers which are polymerizable with the aromatic vinyl compound or the vinyl cyanide compound, in addition to the aromatic vinyl compound or a vinyl cyanide compound, within the range not to impair the effects of the present invention.

Examples of other monomers include methacrylic esters (e.g., methyl methacrylate, ethyl methacrylate, n-propyl methacrylate, i-propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate, phenyl methacrylate), maleimide-based compounds (e.g., N-methyl maleimide, N-ethyl maleimide, N-n-propyl maleimide, N-i-propyl maleimide, N-n-butyl maleimide, N-i-butyl maleimide, N-tert-butyl maleimide, N-cycloalkyl maleimide (N-cyclohexylmaleimide)), N-aryl maleimides (e.g., N-phenyl maleimide, N-alkyl-substituted phenyl maleimide, N-chlorophenyl maleimide), N-aralkyl maleimides, and acrylic esters (e.g., methyl acrylate, ethyl acrylate, propyl acrylate, butyl acrylate).

As the other monomer, one type may be used alone, or two or more types may be used in combination.

<Graft Copolymer (M)>

A graft copolymer (M) is obtainable by polymerization of a vinyl-based monomer mixture (m5) in the presence of the composite rubber polymer (L).

A graft copolymer (M) is preferably a copolymer obtainable by polymerization of 20 to 80% by mass of a vinyl-based monomer mixture (m5) in the presence of 20 to 80% by mass of a composite rubber polymer (L), more preferably a copolymer obtainable by polymerization of 25 to 75% by mass of a vinyl-based monomer mixture (m5) in the presence of 25 to 75% by mass of a composite rubber polymer (L), and still more preferably a copolymer obtainable by polymerization of 30 to 70% by mass of a vinyl-based monomer mixture (m5) in the presence of 30 to 70% by mass of a composite rubber polymer (L) (provided that, the total amount of the composite rubber polymer (L) and the vinyl-based monomer mixture (m5) is 100% by mass).

When the amount of the composite rubber polymer (L) is within the above mentioned range, productivity of the graft copolymer (M) is improved, and coloration and impact resistance of the molded article are further improved.

The graft copolymer (M) can be produced, for example, by radical polymerization and emulsion polymerization.

That is, the vinyl-based monomer mixture (m5) is added to aqueous dispersion of the composite rubber polymer (L), and the vinyl-based monomer mixture (m5) is subjected to radical polymerization in the presence of an emulsifier to obtain a graft polymer.

In order to adjust the graft ratio and the molecular weight of the graft component, various known chain transfer agents may be incorporated.

As radical polymerization initiators, peroxides, azo-type initiators, and redox-type initiators in which an oxidizing agent and a reducing agent are combined can be mentioned. In terms of ease of controlling a graft polymerization reaction, a redox-type initiator is preferred, and a sulfoxylate-based initiator in which ferrous sulfate, ethylenediaminetetraacetic acid disodium salt, Rongalit, and hydroperoxide have been combined is particularly preferred.

As emulsifier, the same emulsifier used in the production of composite rubber polymer (L) can be mentioned.

An emulsifier contained in an aqueous dispersion of a composite rubber polymer (L) in advance is used in graft polymerization and additional emulsifier may not be added during graft polymerization, or an additional emulsifier may be added during graft polymerization if necessary.

As a method of collecting a graft copolymer (M) from an aqueous dispersion of the graft copolymer (M), a method in which the aqueous dispersion is poured into a hot water dissolving a coagulant, and coagulated to be a slurry state, and then, the graft copolymer (M) is collected (wet process); and a method in which the aqueous dispersion of the graft copolymer (M) is sprayed under heating atmosphere and the graft copolymer (M) is collected in a semi-directly manner, can be mentioned (spray-dry process).

As a coagulant, inorganic acids (sulfuric acid, hydrochloric acid, phosphoric acid, nitric acid and the like), metal salts (calcium chloride, calcium acetate, aluminum sulfate and the like) and the like can be mentioned.

The coagulant is selected depending on the emulsifier used in the polymerization.

That is, when a sodium or potassium salt of carboxylic acid such as a sodium or potassium salt of fatty acid and a sodium or potassium salt of rosin acid is used alone, any coagulant may be used.

When an emulsifier that exhibits stable emulsifying capacity in the acidic region (e.g., sodium dodecylbenzenesulfonate) is included, it is necessary to use a metallic salt.

As a method for obtaining a dried graft copolymer (M) from a slurry of the graft copolymer (M), after the emulsifier residue in slurry is dissolved in water by washing, a method (i) in which the slurry is dehydrated using a centrifugal dehydrator or a press dehydrator, then dried using a flash dryer, or a method (ii) in which the slurry is simultaneously dehydrated and dried using a squeezing dehydrator or an extruder can be mentioned.

After drying, a graft copolymer (M) can be obtained in a powder or particle state.

The graft copolymer (M) discharged from a squeeze dehydrator or an extruder may be transfer directly to an extruder or molding machine for preparing a thermoplastic resin composition (1).

<Vinyl-Based Monomer Mixture (m3)>

The vinyl-base monomer mixture (m3) contains at least a methacrylic ester as an essential component, and contains a maleimide-based compound, an aromatic vinyl compound, an acrylic ester, and the other vinyl-based monomer polymerizable with the methacrylic ester as an optional component.

The amount of methacrylic ester with respect to 100% by mass of a vinyl-based monomer mixture (m3) is preferably 50 to 100% by mass, in terms of scratch resistance and coloration of the molded article.

When the amount of methacrylic ester is 50 to 94% by mass, the amount of maleimide-based compound is 5 to 49% by mass and the amount of aromatic vinyl compound is 1 to 45% by mass, scratch resistance, coloration, impact resistance and heat resistance become excellent.

Examples of methacrylic esters include methyl methacrylate, ethyl methacrylate, n-propyl methacrylate, i-propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate, phenyl methacrylate. In terms of excellent heat resistance and impact resistance, at least one selected from methyl methacrylate and ethyl methacrylate is preferred. As the methacrylic ester, one type may be used alone, or two or more types may be used in combination.

Examples of maleimide-type compound include N-alkyl maleimide (N-methyl maleimide, N-ethyl maleimide, N-n-propyl maleimide, N-i-propyl maleimide, N-n-butyl maleimide, N-i-butyl maleimide, N-t-butyl maleimide, and the like), N-cycloalkyl maleimide (N-cyclohexyl maleimide, and the like), N-aryl maleimide (N-phenyl maleimide, N-alkyl-substituted phenyl maleimide, N-chlorophenyl maleimide and the like) and the like. In terms of excellent heat resistance and impact resistance of the molded article, N-aryl maleimide is preferable, and N-phenyl maleimide is particularly preferred.

As the maleimide-based compound, one type may be used alone, or two or more types may be used in combination.

Examples of aromatic vinyl compounds include styrene, α-methylstyrene, o-methylstyrene, m-methylstyrene, p-methylstyrene, vinylxylene, p-t-butyl styrene, ethylstyrene and the like. In terms of excellent heat resistance and impact resistance of the molded article, styrene and α-methylstyrene are preferred. As the aromatic vinyl compound, one type may be used alone, or two or more types may be used in combination.

Examples of acrylic ester include methyl acrylate, ethyl acrylate, propyl acrylate, butyl acrylate and the like. In terms of superior heat resistance and impact resistance, methyl acrylate is preferred. As the acrylic ester, one type may be used alone, or two or more types may be used in combination.

Examples of other vinyl-based monomer include vinyl cyanide compounds (acrylonitrile, methacrylonitrile and the like). As the other vinyl-based compound, one type may be used alone, or two or more types may be used in combination.

<Methacrylic Ester Resin (G)>

The methacrylic ester resin (G) is obtained by polymerization of a vinyl-based monomer mixture (m3).

The polymerization method is not particularly limited. As the polymerization method, a known polymerization method (e.g., emulsion polymerization method, suspension polymerization method, solution polymerization method, and the like) can be employed.

As a method of producing a methacrylic ester resin (G) by a emulsion polymerization method, for example, a method can be mentioned, in which a vinyl-based monomer mixture (m3), an emulsifier, a polymerization initiator and a chain transfer agent are fed into a reaction vessel in the presence of water, the mixture is heated and polymerized, and a methacrylic ester resin (G) is collected from the obtained aqueous dispersion of methacrylic ester resin (G) by a precipitation method.

As an emulsifier, normal emulsifiers for emulsion polymerization (potassium rosin acid, sodium alkylbenzene sulfonate) can be mentioned.

As a polymerization initiator, an organic or inorganic peroxide-type initiator can be mentioned.

As a chain transfer agent, mercaptans, α-methylstyrene dimer and terpenes can be mentioned.

As the precipitation method, the similar method by which a graft copolymer (D) is isolated from an aqueous dispersion can be employed.

As a method of producing a methacrylic ester resin (G) by a suspension polymerization method, for example, a method can be mentioned, in which a vinyl-based monomer mixture (m3), a suspension agent, a suspension aid, a polymerization initiator and a chain transfer agent are fed into a reaction vessel, and heated and polymerized, and the obtained slurry is dehydrated and dried, and then a methacrylic ester resin (G) is collected.

As a suspension agent, tricalcium phosphite and polyvinyl alcohol can be mentioned.

As a suspension aid, sodium alkylbenzene sulfonate can be mentioned.

As a polymerization initiator, organic peroxides can be mentioned.

As a chain transfer agent, mercaptans, α-methylstyrene dimer and terpenes can be mentioned.

As the methacrylic ester resin (G), one type may be used alone, or two or more types may be used in combination.

<Vinyl-Based Monomer Mixture (m4)>

A vinyl-based monomer mixture (m4) is a monomer mixture containing at least an aromatic vinyl compound and a vinyl cyanide compound.

Examples of aromatic vinyl compounds include styrene, α-methylstyrene, o-methylstyrene, m-methylstyrene, p-methyl styrene, vinylxylene, p-t-butylstyrene, ethylstyrene and the like. In terms of fluidity of the thermoplastic resin component (I) and coloration and impact resistance of the molded article, styrene and α-methylstyrene are preferred. As the aromatic vinyl compound, one type may be used alone, or two or more types may be used in combination.

The amount of aromatic vinyl compound with respect to 100% by mass of a vinyl-based monomer mixture (m4) is preferably 15 to 95% by mass. When the amount of the aromatic vinyl compound is within the above mentioned range, impact resistance of the molded article is further improved.

Examples of vinyl cyanide compound include acrylonitrile, methacrylonitrile and the like. As the vinyl cyanide compound, one type may be used alone, or two or more types may be used in combination.

The amount of vinyl cyanide compound with respect to 100% by mass of a vinyl-based monomer mixture (m4) is preferably 5 to 85% by mass. When the amount of the vinyl cyanide compound is within the above mentioned range, impact resistance of the molded article is further improved.

If necessary, the vinyl-based monomer mixture (m4) may contain a methacrylic ester and a maleimide-based compound.

As the methacrylic ester and a maleimide-based compound, the same compounds as those exemplified in the explanation of the vinyl-based monomer mixture (m3) can be mentioned.

<Styrene-Based Copolymer (H)>

A styrene-based copolymer (H) is a copolymer obtainable by polymerization of a vinyl-based monomer mixture (m4) containing an aromatic vinyl compound and a vinyl cyanide compound.

The polymerization method is not particularly limited. As the polymerization method, a known polymerization method (e.g., emulsion polymerization method, suspension polymerization method, bulk polymerization method, solution polymerization method, and the like) can be employed. In terms of heat resistance of the molded article, suspension polymerization method and bulk polymerization method are preferred.

<Other Thermoplastic Resin>

Examples of the other thermoplastic resin include polycarbonate, polybutylene terephthalate (PBT), polyethylene terephthalate (PET), polyvinyl chloride, polystyrene, polyacetal, modified polyphenylene ether (modified PPE), ethylene-vinyl acetate copolymer, polyarylate, liquid crystal polyester, polyethylene, polypropylene, fluorine resin, polyamide (nylon) and the like.

<Various Additives>

As various additives, antioxidants, lubricants, processing aids, pigments, fillers, silicone oils, paraffin oils and the like can be mentioned.

<Content of Each Component>

In the thermoplastic resin composition (I) of the third aspect of the present invention, the amount of graft copolymer (D) relative to 100% by mass of the total amount of the graft copolymer (D), methacrylic ester resin (G) and styrene-based copolymer (H) is preferably 10 to 30% by mass, and more preferably 15 to 25% by mass. When the amount of graft copolymer (D) is within the above mentioned range, balance of physical properties such as fluidity of the thermoplastic resin component (I) and scratch resistance, impact resistance, coloration and heat resistance of the molded article becomes excellent.

In the thermoplastic resin composition (I) of the third aspect of the present invention, the amount of methacrylic ester resin (G) relative to 100% by mass of the total amount of the graft copolymer (D), methacrylic ester resin (G) and styrene-based copolymer (H) is preferably 30 to 90% by mass, and more preferably 35 to 85% by mass. When the amount of methacrylic ester resin (G) is within the above mentioned range, balance of physical properties such as fluidity of the thermoplastic resin component (I), scratch resistance, impact resistance, coloration and heat resistance of the molded article becomes excellent.

In the thermoplastic resin composition (I) of the third aspect of the present invention, the amount of styrene-based copolymer (H) relative to 100% by mass of the total amount of the graft copolymer (D), methacrylic ester resin (G) and styrene-based copolymer (H) is preferably 0 to 40% by mass, and more preferably 1 to 40% by mass in terms of fluidity of the thermoplastic resin composition (I) and impact resistance and heat resistance of the molded article.

<Content of Each Component>

In the thermoplastic resin composition (I) according to the fourth aspect of the present invention, the amount of ethylene.α-olefin copolymer (A) or cross-linked ethylene.α-olefin copolymer (C) is 15 to 85% by mass and preferably 30 to 70% by mass, with respect to the total amount of the ethylene.α-olefin copolymer (A), cross-linked ethylene.α-olefin copolymer (C) and cross-linked acrylic ester-type rubber polymer (E) (100% by mass).

In the thermoplastic resin composition (I) according to the fourth aspect of the present invention, the amount of cross-linked acrylic ester-type rubber polymer (E) is 85 to 15% by mass and preferably 70 to 30% by mass, with respect to the total amount of the ethylene.α-olefin copolymer (A), cross-linked ethylene.α-olefin copolymer (C) and cross-linked acrylic ester-type rubber polymer (E) (100% by mass).

In the thermoplastic resin composition (I) according to the fourth aspect of the present invention, when the amount of ethylene.α-olefin copolymer (A) or cross-linked ethylene.α-olefin copolymer (C) and the amount of cross-linked acrylic ester-type rubber polymer (E) are within above-mentioned range, impact resistance can be exerted even when rubber content is low, and scratch resistance and coloration become excellent.

In the thermoplastic resin composition (I) according to the fourth aspect of the present invention, the total amount of ethylene.α-olefin copolymer (A), cross-linked ethylene.α-olefin copolymer (C) and cross-linked acrylic ester-type rubber polymer (E) (i.e., rubber content) is preferably 5 to 30% by mass, and more preferably 10 to 25% by mass, with respect to 100% by mass of the thermoplastic resin composition (I).

When the amount of rubber is within the above mentioned range, fluidity of the thermoplastic resin composition (I), and impact resistance, scratch resistance and coloration of the molded article are further improved.

In the thermoplastic resin composition (I) of the fourth aspect of the present invention, the total amount of graft copolymer (D) and graft copolymer (F) relative to 100% by mass of the total amount of the graft copolymer (D), graft copolymer (F), methacrylic ester resin (G) and styrene-based copolymer (H) is preferably 5 to 40% by mass, and more preferably 10 to 30% by mass.

When the total amount of graft copolymer (D) and graft copolymer (F) is within the above mentioned range, balance of physical properties such as fluidity of the thermoplastic resin component (I), and scratch resistance, impact resistance, coloration and heat resistance of the molded article becomes excellent.

In the thermoplastic resin composition (I) of the fourth aspect of the present invention, the amount of methacrylic ester resin (G) relative to 100% by mass of the total amount of the graft copolymer (D), graft copolymer (F), methacrylic ester resin (G) and styrene-based copolymer (H) is preferably 95 to 60% by mass, and more preferably 90 to 70% by mass.

When the amount of methacrylic ester resin (G) is within the above mentioned range, balance of physical properties such as fluidity of the thermoplastic resin component (I), and scratch resistance, impact resistance, coloration and heat resistance of the molded article becomes excellent.

In the thermoplastic resin composition (I) of the fourth aspect of the present invention, the amount of styrene-based copolymer (H) relative to 100% by mass of the total amount of the graft copolymer (D), graft copolymer (F), methacrylic ester resin (G) and styrene-based copolymer (H) is preferably 0 to 40% by mass, and more preferably 1 to 40% by mass in terms of fluidity of the thermoplastic resin composition (I), and impact resistance and heat resistance of the molded article.

<Volume Average Particle Diameter>

In the thermoplastic resin composition (I) of the fourth aspect of the present invention, the volume average particle diameter of the ethylene.α-olefin copolymer (A) or the cross-linked ethylene.α-olefin copolymer (C) contained in the graft copolymer (D) in the thermoplastic resin composition (I) is 0.2 to 0.6 μm, and more preferably 0.3 to 0.5 μm.

When the volume average particle diameter is smaller than 0.2 μm, impact resistance of the molded article are deteriorated.

When the volume average particle diameter is greater than 0.6 μm, impact resistance and coloration are deteriorated.

When the volume average particle diameter of the ethylene.α-olefin copolymer (A) or cross-linked ethylene.α-olefin copolymer (C) is 0.3 μm to 0.5 μm, impact resistance and coloration of the molded article are further improved.

By image processing of electron micrographs, it is confirmed that the volume average particle diameter of ethylene.α-olefin copolymer (A) and the volume average particle diameter of cross-linked ethylene.α-olefin copolymer (C) dispersed in an aqueous dispersion respectively correspond to the volume average particle diameter of the ethylene.α-olefin copolymer (A) and the cross-linked ethylene.α-olefin copolymer (C) in the thermoplastic resin composition (1).

In the thermoplastic resin composition (I) of the fourth aspect of the present invention, the volume average particle diameter of the cross-linked acrylic ester-type rubber polymer (E) contained in the graft copolymer (F) in the thermoplastic resin composition (I) is 0.05 to 0.18 μm, and more preferably 0.07 to 0.15 μm.

When the volume average particle diameter is smaller than 0.05 μm, impact strength of the molded article is deteriorated.

When the volume average particle diameter is greater than 0.18 μm, impact resistance and coloration are deteriorated.

By image processing of electron micrographs, it is confirmed that that the volume average particle diameter of the cross-linked acrylic ester-type rubber polymer (E) dispersed in an aqueous dispersion corresponds to the volume average particle diameter of the cross-linked acrylic ester-type rubber polymer (E) in the thermoplastic resin composition (I).

<Content of Each Component>

In the thermoplastic resin composition (I) according to the fifth aspect of the present invention, the amount of ethylene.α-olefin copolymer (A) or cross-linked ethylene.α-olefin copolymer (C) is 15 to 85% by mass and preferably 30 to 70% by mass, with respect to the total amount of the ethylene.α-olefin copolymer (A), cross-linked ethylene.α-olefin copolymer (C) and composite rubber polymer (L) (100% by mass).

In the thermoplastic resin composition (I) according to the fifth aspect of the present invention, the amount of composite rubber polymer (L) is 85 to 15% by mass and preferably 70 to 30% by mass, with respect to the total amount of the ethylene.α-olefin copolymer (A), cross-linked ethylene.α-olefin copolymer (C) and composite rubber polymer (L) (100% by mass).

In the thermoplastic resin composition (I) according to the fifth aspect of the present invention, when the amount of ethylene.α-olefin copolymer (A) or cross-linked ethylene.α-olefin copolymer (C) and the amount of composite rubber polymer (L) are within above-mentioned range, impact resistance can be exerted even when rubber content is low, and scratch resistance and coloration become excellent.

In the thermoplastic resin composition (I) according to the fifth aspect of the present invention, the total amount of ethylene.α-olefin copolymer (A), cross-linked ethylene.α-olefin copolymer (C) and composite rubber polymer (L) (i.e., rubber content) is preferably 5 to 30% by mass, and more preferably 10 to 25% by mass, with respect to 100% by mass of the thermoplastic resin composition.

When the amount of rubber is within the above mentioned range, fluidity of the thermoplastic resin composition (I), and impact resistance, lubricant properties, scratch resistance and coloration of the molded article are further improved.

In the thermoplastic resin composition (1) of the fifth aspect of the present invention, the total amount of graft copolymer (D) and graft copolymer (M) relative to 100% by mass of the total amount of the graft copolymer (D), graft copolymer (M), methacrylic ester resin (G) and styrene-based copolymer (H) is preferably 5 to 40% by mass, and more preferably 10 to 30% by mass.

When the total amount of graft copolymer (D) and graft copolymer (M) is within the above mentioned range, balance of physical properties such as fluidity of the thermoplastic resin component (I), scratch resistance, impact resistance, coloration, lubricant properties and heat resistance of the molded article becomes excellent.

In the thermoplastic resin composition (I) of the fifth aspect of the present invention, the amount of methacrylic ester resin (G) relative to 100% by mass of the total amount of the graft copolymer (D), graft copolymer (M), methacrylic ester resin (G) and styrene-based copolymer (H) is preferably 95 to 60% by mass, and more preferably 90 to 70% by mass.

When the amount of methacrylic ester resin (G) is within the above mentioned range, balance of physical properties such as fluidity of the thermoplastic resin component (I), scratch resistance, impact resistance, coloration, lubricant properties and heat resistance of the molded article becomes excellent.

In the thermoplastic resin composition (I) of the fifth aspect of the present invention, the amount of styrene-based copolymer (H) relative to 100% by mass of the total amount of the graft copolymer (D), graft copolymer (M), methacrylic ester resin (G) and styrene-based copolymer (H) is preferably 0 to 40% by mass, and more preferably 1 to 40% by mass in terms of fluidity of the thermoplastic resin composition (I) and impact resistance and heat resistance of the molded article.

<Volume Average Particle Diameter>

In the thermoplastic resin composition (I) of the fifth aspect of the present invention, the volume average particle diameter of the ethylene.α-olefin copolymer (A) or the cross-linked ethylene.α-olefin copolymer (C) contained in the graft copolymer (D) in the thermoplastic resin composition (I) is 0.2 to 0.6 μm, and more preferably 0.3 to 0.5 μm.

When the volume average particle diameter is smaller than 0.2 µm, impact resistance and lubrication properties of the molded article are deteriorated.

When the volume average particle diameter is greater than 0.6 µm, impact resistance, coloration and lubrication properties of the molded article are deteriorated.

When the volume average particle diameter of the ethylene.α-olefin copolymer (A) or cross-linked ethylene.α-olefin copolymer (C) is 0.3 µm to 0.5 µm, impact resistance and coloration of the molded article are further improved. By image processing of electron micrographs, it is confirmed that the volume average particle diameter of ethylene.α-olefin copolymer (A) and the volume average particle diameter of cross-linked ethylene.α-olefin copolymer (C) dispersed in an aqueous dispersion respectively correspond to the volume average particle diameter of the ethylene.α-olefin copolymer (A) and the cross-linked ethylene.α-olefin copolymer (C) in the thermoplastic resin composition (I).

In the thermoplastic resin composition (I) of the fifth aspect of the present invention, the volume average particle diameter of the composite rubber polymer (L) contained in the graft copolymer (M) in the thermoplastic resin composition (I) is 0.05 to 0.18 µm, and more preferably 0.07 to 0.15 µm.

When the volume average particle diameter is smaller than 0.05 µm, impact resistance and lubrication properties are deteriorated.

When the volume average particle diameter is greater than 0.18 µm, impact resistance, coloration and lubrication properties are deteriorated.

By image processing of electron micrographs, it is confirmed that the volume average particle diameter of the composite rubber polymer (L) dispersed in an aqueous dispersion corresponds to the volume average particle diameter of the composite rubber polymer (L) in the thermoplastic resin composition (I) without change.

<Production Method of Thermoplastic Resin Composition (I)>

The thermoplastic resin component (I) of the second aspect of the present invention is obtainable by mixing the graft copolymer (D) of the first aspect of the present invention and the aforementioned hard component (J).

Specifically, it can be easily produced by mixing a graft copolymer (D) and a hard component (J) and various additives if necessary.

If necessary, it may be pelletized by an extruder, a Banbury mixer, a kneading roll or the like.

The amount of the graft copolymer (D) contained in the thermoplastic resin composition (I) is not particularly limited, and it is preferable to adjust the amount of the graft copolymer (D) within the range of 0.1 to 99% by mass with respective to the sum of the graft copolymer (D) and the hard component (J).

The thermoplastic resin composition (1) of the third aspect of the present invention is obtainable by mixing the graft copolymer (D), methacrylic ester resin (G), and if necessary, the styrene-based copolymer (H), other thermoplastic resin and various additives. It may be pelletized by an extruder, a Banbury mixer, a kneading roll or the like.

The thermoplastic resin composition (I) of the fourth aspect of the present invention is obtainable by mixing the graft copolymer (D), the graft copolymer (F), methacrylic ester resin (G) and the styrene-based copolymer (H).

The thermoplastic resin composition (I) of the fifth aspect of the present invention is obtainable by mixing the graft copolymer (D), the graft copolymer (M), methacrylic ester resin (G) and the styrene-based copolymer (H).

<Function and Effect>

As described above, since the thermoplastic resin composition (I) of the second aspect of the present invention contains the graft copolymer (D) of the first aspect of the present invention, the composition exhibits excellent fluidity, and can provide a molded article having excellent scratch resistance, impact resistance, glossiness and coloration.

As described above, since the thermoplastic resin composition (I) of the third aspect of the present invention contains a methacrylic ester resin (G) and a graft copolymer (D) obtainable by polymerization of a vinyl-based monomer mixture (m1) in the presence of either an ethylene.α-olefin copolymer (A) which has a mass average molecular weight (Mw) and a distribution of molecular weight (Mw/Mn) within a specific range or a cross-linked ethylene.α-olefin copolymer (C) obtainable by cross-linking treatment of the ethylene.α-olefin copolymer (A), fluidity is excellent and a molded article having scratch resistance, glossiness, coloration, and impact resistance can be obtained. Even when heat resistance is imparted to the molded article, impact resistance is not deteriorated.

As described above, since the thermoplastic resin composition (I) of the fourth aspect of the present invention contains a methacrylic ester resin (G); a graft copolymer (F) obtainable by polymerization of a vinyl-based monomer mixture (m2) in the presence of a cross-linked acrylic ester-type rubber polymer (E); and a graft copolymer (D) obtainable by polymerization of a vinyl-based monomer mixture (m1) in the presence of either an ethylene.α-olefin copolymer (A) which has a mass average molecular weight (Mw) and a distribution of molecular weight (Mw/Mn) within a specific range or a cross-linked ethylene.α-olefin copolymer (C) obtainable by cross-linking treatment of the ethylene.α-olefin copolymer (A), the volume average particle diameter of ethylene.α-olefin copolymer (A) or a cross-linked ethylene.α-olefin copolymer (C) and cross-linked acrylic ester-type rubber polymer (E) in the thermoplastic resin composition (I) is within a specific range, and the amount of the ethylene.α-olefin copolymer (A) or a cross-linked ethylene.α-olefin copolymer (C) and cross-linked acrylic ester-type rubber polymer (E) in the thermoplastic resin composition (I) is within a specific range, fluidity is excellent and a molded article having scratch resistance, coloration, and impact resistance can be obtained.

Even when heat resistance is imparted to the molded article, impact resistance is not deteriorated.

As described above, since the thermoplastic resin composition (I) of the fifth aspect of the present invention contains a methacrylic ester resin (G); a graft copolymer (M) obtainable by polymerization of a vinyl-based monomer mixture (m5) in the presence of a composite rubber polymer (L) containing a polyorganosiloxane (La); and a graft copolymer (D) obtainable by polymerization of a vinyl-based monomer mixture (m1) in the presence of either an ethylene.α-olefin copolymer (A) which has a mass average molecular weight (Mw) and a distribution of molecular weight (Mw/Mn) within a specific range or a cross-linked ethylene.α-olefin copolymer (C) obtainable by cross-linking treatment of the ethylene.α-olefin copolymer (A), the volume average particle diameter of ethylene.α-olefin copolymer (A) or a cross-linked ethylene.α-olefin copolymer (C) and composite rubber polymer (L) in the thermoplastic resin composition (I) is within a specific range, and the amount of the ethylene.α-olefin copolymer (A) or a cross-linked ethylene.α-olefin copolymer (C) and composite rubber polymer (L) in the thermoplastic resin composition (I) is within a specific range, fluidity is excellent and a molded article having scratch resistance, coloration, impact resistance and lubricant property can be obtained.

Even when heat resistance is imparted to the molded article, impact resistance is not deteriorated.

[Molded Article]

A molded article of the present invention can be obtained by molding the thermoplastic resin composition (I) of the second aspect, third aspect, fourth aspect or fifth aspect of the present invention in accordance with a known molding method.

As a molding method, for example, an injection molding method, a press molding method, an extrusion molding method, a vacuum molding method and a blow molding method can be mentioned.

As applications of the molded article, vehicle interior parts, vehicle exterior parts, office equipments, consumer electronics, building materials and the like can be mentioned.

Since the molded article of the sixth aspect of the invention as described above is formed from a thermoplastic resin composition (I) of the present invention, the molded article exhibits excellent scratch resistance, glossiness, coloration and impact resistance and lubricant property. In the third aspect of the present invention, when a resin having a specific copolymer composition is used as a methacrylic ester resin (G) or when a styrene-based copolymer (H) is used, heat resistance can be improved. In the fourth aspect of the present invention, when a resin having a specific copolymer composition is used as a methacrylic ester resin (G) or when a styrene-based copolymer (H) is used, heat resistance can be improved. In the fifth aspect of the present invention, when a resin having a specific copolymer composition is used as a methacrylic ester resin (G) or when a styrene-based copolymer (H) is used, heat resistance can be improved.

These molded articles are used for vehicle interior parts, vehicle exterior parts, office equipments, consumer electronics, building materials and the like.

The graft copolymer (D) of the first aspect of the present invention is preferably a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26 \times 10^4$ to $32 \times 10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A).

The graft copolymer (D) of the first aspect of the present invention is preferably a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26 \times 10^4$ to $32 \times 10^4$ and a distribution of molecular weight (Mw/Mn) of 1.9 to 2.5, wherein the gel content ratio of the cross-linked ethylene.α-olefin copolymer (C) with respect to the total mass of the cross-linked ethylene.α-olefin copolymer (C) is 45 to 65% by mass.

The graft copolymer (D) of the first aspect of the present invention is preferably a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26 \times 10^4$ to $32 \times 10^4$ and a distribution of molecular weight (Mw/Mn) of 1.9 to 2.5, wherein the gel content ratio of the cross-linked ethylene.α-olefin copolymer (C) with respect to the total mass of the cross-linked ethylene.α-olefin copolymer (C) is 45 to 65% by mass, and the ethylene.α-olefin copolymer (A) is an ethylene.propylene copolymer.

The graft copolymer (D) of the first aspect of the present invention is preferably a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26 \times 10^4$ to $32 \times 10^4$ and a distribution of molecular weight (Mw/Mn) of 1.9 to 2.5, wherein the gel content ratio of the cross-linked ethylene.α-olefin copolymer (C) with respect to the total mass of the cross-linked ethylene.α-olefin copolymer (C) is 45 to 65% by mass, the ethylene.α-olefin copolymer (A) is an ethylene.propylene copolymer, and the amount of ethylene unit in the ethylene.α-olefin copolymer (A) relative to the total mass of the structural units constituting the ethylene.α-olefin copolymer (A) is 45 to 65% by mass.

The graft copolymer (D) of the first aspect of the present invention is preferably a graft copolymer obtainable by emulsion polymerization of a vinyl-based monomer mixture (m1) including an aromatic vinyl compound and a vinyl cyanide compound, in the presence of a cross-linked ethylene.α-olefin copolymer (C) obtainable by cross-linking treatment of the ethylene.α-olefin copolymer (A) which has a mass average molecular weight (Mw) of $26 \times 10^4$ to $32 \times 10^4$ and a distribution of molecular weight (Mw/Mn) of 1.9 to 2.5, wherein the gel content ratio of the cross-linked ethylene.α-olefin copolymer (C) with respect to the total mass of the cross-linked ethylene.α-olefin copolymer (C) is 45 to 65% by mass, the ethylene.α-olefin copolymer (A) is an ethylene.propylene copolymer, and the amount of ethylene unit in the ethylene.α-olefin copolymer (A) relative to the total mass of the structural units constituting the ethylene.α-olefin copolymer (A) is 45 to 65% by mass.

The thermoplastic resin composition (I) of the second aspect of the present invention preferably contains a graft copolymer (D) and a styrene-based copolymer (H), wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26 \times 10^4$ to $32 \times 10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A).

The thermoplastic resin composition (I) of the second aspect of the present invention preferably contains a graft copolymer (D) and a styrene-based copolymer (H), wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of the ethylene.α-olefin copolymer (A) which has a mass average molecular weight (Mw) of $26\times10^4$ to $32\times10^4$ and a distribution of molecular weight (Mw/Mn) of 1.9 to 2.5, the gel content ratio of the cross-linked ethylene.α-olefin copolymer (C) with respect to the total mass of the cross-linked ethylene.α-olefin copolymer (C) is 45 to 65% by mass.

The thermoplastic resin composition (I) of the second aspect of the present invention preferably contains a graft copolymer (D) and a styrene-based copolymer (H), wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of the ethylene.α-olefin copolymer (A) which has a mass average molecular weight (Mw) of $26\times10^4$ to $32\times10^4$ and a distribution of molecular weight (Mw/Mn) of 1.9 to 2.5, the gel content ratio of the cross-linked ethylene.α-olefin copolymer (C) with respect to the total mass of the cross-linked ethylene.α-olefin copolymer (C) is 45 to 65% by mass, and the ethylene.α-olefin copolymer (A) is an ethylene.propylene copolymer.

The thermoplastic resin composition (I) of the second aspect of the present invention preferably contains a graft copolymer (D) and a styrene-based copolymer (H), wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of the ethylene.α-olefin copolymer (A) which has a mass average molecular weight (Mw) of $26\times10^4$ to $32\times10^4$ and a distribution of molecular weight (Mw/Mn) of 1.9 to 2.5, the gel content ratio of the cross-linked ethylene.α-olefin copolymer (C) with respect to the total mass of the cross-linked ethylene.α-olefin copolymer (C) is 45 to 65% by mass, the ethylene.α-olefin copolymer (A) is an ethylene.propylene copolymer, and the amount of ethylene unit in the ethylene.α-olefin copolymer (A) relative to the total mass of the structural units constituting the ethylene.α-olefin copolymer (A) is 45 to 65% by mass.

The thermoplastic resin composition (I) of the second aspect of the present invention preferably contains a graft copolymer (D) and a styrene-based copolymer (H), wherein the graft copolymer (D) is a graft copolymer obtainable by emulsion polymerization of a vinyl-based monomer mixture (m1) including an aromatic vinyl compound and a vinyl cyanide compound, in the presence of a cross-linked ethylene.α-olefin copolymer (C) obtainable by cross-linking treatment of the ethylene.α-olefin copolymer (A) which has a mass average molecular weight (Mw) of $26\times10^4$ to $32\times10^4$ and a distribution of molecular weight (Mw/Mn) of 1.9 to 2.5, the gel content ratio of the cross-linked ethylene.α-olefin copolymer (C) with respect to the total mass of the cross-linked ethylene.α-olefin copolymer (C) is 45 to 65% by mass, the ethylene.α-olefin copolymer (A) is an ethylene.propylene copolymer, and the amount of ethylene unit in the ethylene.α-olefin copolymer (A) relative to the total mass of the structural units constituting the ethylene.α-olefin copolymer (A) is 45 to 65% by mass.

The thermoplastic resin composition (I) of the third aspect of the present invention preferably contains a graft copolymer (D) and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26\times10^4$ to $32\times10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A).

The thermoplastic resin composition (I) of the third aspect of the present invention preferably contains a graft copolymer (D) and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26\times10^4$ to $32\times10^4$ and a distribution of molecular weight (Mw/Mn) of 1.9 to 2.5, the gel content ratio of the cross-linked ethylene.α-olefin copolymer (C) with respect to the total mass of the cross-linked ethylene.α-olefin copolymer (C) is 45 to 65% by mass.

The thermoplastic resin composition (I) of the third aspect of the present invention preferably contains a graft copolymer (D) and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26\times10^4$ to $32\times10^4$ and a distribution of molecular weight (Mw/Mn) of 1.9 to 2.5, the gel content ratio of the cross-linked ethylene.α-olefin copolymer (C) with respect to the total mass of the cross-linked ethylene.α-olefin copolymer (C) is 45 to 65% by mass, and the ethylene.α-olefin copolymer (A) is an ethylene.propylene copolymer.

The thermoplastic resin composition (I) of the third aspect of the present invention preferably contains a graft copolymer (D) and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26\times10^4$ to $32\times10^4$ and a distribution of molecular weight (Mw/Mn) of 1.9 to 2.5, the gel content ratio of the cross-linked ethylene.α-olefin copolymer (C) with respect to the total mass of the cross-linked ethylene.α-olefin copolymer (C) is 45 to 65% by mass, the ethylene.α-olefin copolymer (A) is an ethylene.propylene copolymer, and the amount of ethylene unit in the ethylene.α-olefin copolymer (A) relative to the total mass of the structural units constituting the ethylene.α-olefin copolymer (A) is 45 to 65% by mass.

The thermoplastic resin composition (I) of the third aspect of the present invention preferably contains a graft copolymer (D) and a methacrylic ester resin (G) obtainable by polymerization of a vinyl-based monomer mixture (m3) containing a methacrylic ester, wherein the graft copolymer (D) is a graft copolymer obtainable by emulsion polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26\times10^4$ to $32\times10^4$ and a distribution of molecular weight (Mw/Mn) of 1.9 to 2.5, the gel content ratio of the cross-linked ethylene.α-olefin copolymer (C) with respect to the total mass of the cross-linked ethylene.α-olefin copolymer (C) is 45 to 65% by mass, the ethylene.α-olefin copolymer (A) is an ethylene-propylene copolymer, and the amount of ethylene unit in the ethylene.α-olefin copolymer (A) relative to the total mass of the structural units constituting the ethylene.α-olefin copolymer (A) is 45 to 65% by mass.

The thermoplastic resin composition (I) of the third aspect of the present invention preferably contains a graft copolymer (D) and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26\times10^4$ to $32\times10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A), the amount of the methacrylic ester is 50 to 94% by mass, the amount of a maleimide-based compound is 5 to 49% by mass and the amount of an aromatic vinyl compound is 1 to 45% by mass, relative to 100% by mass of the vinyl-based monomer mixture (m3).

The thermoplastic resin composition (I) of the third aspect of the present invention preferably contains a graft copolymer (D), a methacrylic ester resin (G) obtainable by polymerization of a vinyl-based monomer mixture (m3) containing a methacrylic ester, and a styrene-based copolymer (H) obtainable by polymerization of a vinyl-based monomer mixture (m4) containing an aromatic vinyl compound and a vinyl cyanide compound, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26\times10^4$ to $32\times10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A), the amount of the methacrylic ester is 50 to 94% by mass, the amount of a maleimide-based compound is 5 to 49% by mass and the amount of an aromatic vinyl compound is 1 to 45% by mass, relative to 100% by mass of the vinyl-based monomer mixture (m3), and the amount of the aromatic vinyl compound is 15 to 95% by mass and the amount of the vinyl cyanide compound is 5 to 85% by mass, relative to the total mass of the vinyl-based monomer mixture (m4).

The thermoplastic resin composition (I) of the fourth aspect of the present invention preferably contains a graft copolymer (D), a graft copolymer (F) obtainable by polymerization of a vinyl-based monomer mixture (m2) containing an aromatic vinyl compound and a vinyl cyanide compound in the presence of a cross-linked acrylic ester-type rubber polymer (E), and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26\times10^4$ to $32\times10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A).

The thermoplastic resin composition (I) of the fourth aspect of the present invention preferably contains a graft copolymer (D), a graft copolymer (F) obtainable by polymerization of a vinyl-based monomer mixture (m2) containing an aromatic vinyl compound and a vinyl cyanide compound in the presence of a cross-linked acrylic ester-type rubber polymer (E), and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26\times10^4$ to $32\times10^4$ and a distribution of molecular weight (Mw/Mn) of 1.9 to 2.5, and the gel content ratio of the cross-linked ethylene.α-olefin copolymer (C) with respect to the total mass of the cross-linked ethylene.α-olefin copolymer (C) is 45 to 65% by mass.

The thermoplastic resin composition (I) of the fourth aspect of the present invention preferably contains a graft copolymer (D), a graft copolymer (F) obtainable by polymerization of a vinyl-based monomer mixture (m2) containing an aromatic vinyl compound and a vinyl cyanide compound in the presence of a cross-linked acrylic ester-type rubber polymer (E), and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26\times10^4$ to $32\times10^4$ and a distribution of molecular weight (Mw/Mn) of 1.9 to 2.5, and the gel content ratio of the cross-linked ethylene.α-olefin copolymer (C) with respect to the total mass of the cross-linked ethylene.α-olefin copolymer (C) is 45 to 65% by mass, and the ethylene.α-olefin copolymer (A) is an ethylene.propylene copolymer.

The thermoplastic resin composition (I) of the fourth aspect of the present invention preferably contains a graft copolymer (D), a graft copolymer (F) obtainable by polymerization of a vinyl-based monomer mixture (m2) containing an aromatic vinyl compound and a vinyl cyanide compound in the presence of a cross-linked acrylic ester-type rubber polymer (E), and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26\times10^4$ to $32\times10^4$ and a distribution of molecular weight (Mw/Mn) of 1.9 to 2.5, and the gel content ratio of the cross-linked ethylene.α-olefin copolymer (C) with respect to the total mass of the cross-linked ethylene.α-olefin copolymer (C) is 45 to 65% by mass, the ethylene.α-olefin copolymer (A) is an ethylene.propylene copolymer, and the amount of ethylene unit in the ethylene.α-olefin copolymer (A) relative to the total mass of the structural units constituting the ethylene.α-olefin copolymer (A) is 45 to 65% by mass.

The thermoplastic resin composition (I) of the fourth aspect of the present invention preferably contains a graft copolymer (D), a graft copolymer (F) obtainable by polymerization of a vinyl-based monomer mixture (m2) containing an aromatic vinyl compound and a vinyl cyanide compound in the presence of a cross-linked acrylic ester-type rubber polymer (E), and a methacrylic ester resin (G) obtainable by polymerization of a vinyl-based monomer mixture (m3) containing a methacrylic ester, wherein the graft copolymer (D) is a graft copolymer obtainable by emulsion polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26 \times 10^4$ to $32 \times 10^4$ and a distribution of molecular weight (Mw/Mn) of 1.9 to 2.5, and the gel content ratio of the cross-linked ethylene.α-olefin copolymer (C) with respect to the total mass of the cross-linked ethylene.α-olefin copolymer (C) is 45 to 65% by mass, the ethylene.α-olefin copolymer (A) is an ethylene.propylene copolymer, and the amount of ethylene unit in the ethylene.α-olefin copolymer (A) relative to the total mass of the structural units constituting the ethylene.α-olefin copolymer (A) is 45 to 65% by mass.

The thermoplastic resin composition (I) of the fourth aspect of the present invention preferably contains a graft copolymer (D), a graft copolymer (F) obtainable by polymerization of a vinyl-based monomer mixture (m2) containing an aromatic vinyl compound and a vinyl cyanide compound in the presence of a cross-linked acrylic ester-type rubber polymer (E), and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26 \times 10^4$ to $32 \times 10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A), and the amount of the aromatic vinyl compound is 65 to 82% by mass, and the amount of the vinyl cyanide compound is 18 to 35% by mass, relative to 100% by mass of the vinyl-based monomer mixture (m2).

The thermoplastic resin composition (I) of the fourth aspect of the present invention preferably contains a graft copolymer (D), a graft copolymer (F) obtainable by polymerization of a vinyl-based monomer mixture (m2) containing an aromatic vinyl compound and a vinyl cyanide compound in the presence of a cross-linked acrylic ester-type rubber polymer (E), and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26 \times 10^4$ to $32 \times 10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A), and the amount of the aromatic vinyl compound is 65 to 82% by mass, and the amount of the vinyl cyanide compound is 18 to 35% by mass, relative to 100% by mass of the vinyl-based monomer mixture (m2); and the amount of the methacrylic ester is 50 to 94% by mass, and the amount of the maleimide-based compound is 5 to 49% by mass, and the amount of the aromatic vinyl compound is 1 to 45% by mass, relative to 100% by mass of the vinyl-based monomer mixture (m3).

The thermoplastic resin composition (1) of the fourth aspect of the present invention preferably contains a graft copolymer (D), a graft copolymer (F) obtainable by polymerization of a vinyl-based monomer mixture (m2) containing an aromatic vinyl compound and a vinyl cyanide compound in the presence of a cross-linked acrylic ester-type rubber polymer (E), a methacrylic ester resin (G) obtainable by polymerization of a vinyl-based monomer mixture (m3) containing a methacrylic ester, and a styrene-based copolymer (H) obtainable by polymerization of a vinyl-based monomer mixture (m4) containing an aromatic vinyl compound and a vinyl cyanide compound, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26 \times 10^4$ to $32 \times 10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A), and the amount of the aromatic vinyl compound is 65 to 82% by mass, and the amount of the vinyl cyanide compound is 18 to 35% by mass, relative to 100% by mass of the vinyl-based monomer mixture (m2); the amount of the methacrylic ester is 50 to 94% by mass, and the amount of the maleimide-based compound is 5 to 49% by mass, and the amount of the aromatic vinyl compound is 1 to 45% by mass, relative to 100% by mass of the vinyl-based monomer mixture (m3); and the amount of the aromatic vinyl compound is 15 to 95% by mass and the amount of the vinyl cyanide compound is 5 to 85% by mass, with respect to 100% by mass of the vinyl-based monomer mixture (m4).

The thermoplastic resin composition (1) of the fifth aspect of the present invention preferably contains: a graft copolymer (D); a graft copolymer (M) obtainable by polymerization of a vinyl-based monomer mixture (m5) containing an aromatic vinyl compound and a vinyl cyanide compound in the presence of a composite rubber polymer (L1) containing a polyorganosiloxane (La) and a poly(meth)acrylic ester (Lb) that contains a unit derived from a (meth)acrylic ester and contains a unit derived from a cross-linking agent and/or a unit derived from a graft cross-linking agent; and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26 \times 10^4$ to $32 \times 10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A).

The thermoplastic resin composition (I) of the fifth aspect of the present invention preferably contains: a graft copolymer (D); a graft copolymer (M) obtainable by polymerization of a vinyl-based monomer mixture (m5) containing an aromatic vinyl compound and a vinyl cyanide compound in the presence of a composite rubber polymer (L1) containing a polyorganosiloxane (La) and a poly(meth)acrylic ester (Lb) that contains a unit derived from a (meth)acrylic ester and contains a unit derived from a cross-linking agent and/or a unit derived from a graft cross-linking agent; and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26 \times 10^4$ to $32 \times 10^4$ and a distribution of molecular weight (Mw/Mn) of 1.9 to 2.5, and the gel content ratio of the cross-linked ethylene.α-olefin copolymer (C) with respect to the total mass of the cross-linked ethylene.α-olefin copolymer (C) is 45 to 65% by mass.

The thermoplastic resin composition (I) of the fifth aspect of the present invention preferably contains: a graft copolymer (D); a graft copolymer (M) obtainable by polymerization of a vinyl-based monomer mixture (m5) containing an aromatic vinyl compound and a vinyl cyanide compound in the presence of a composite rubber polymer (L1) containing a polyorganosiloxane (La) and a poly(meth)acrylic ester (Lb) that contains a unit derived from a (meth)acrylic ester and contains a unit derived from a cross-linking agent and/or a unit derived from a graft cross-linking agent; and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26 \times 10^4$ to $32 \times 10^4$ and a distribution of molecular weight (Mw/Mn) of 1.9 to 2.5, and the gel content ratio of the cross-linked ethylene.α-olefin copolymer (C) with respect to the total mass of the cross-linked ethylene.α-olefin copolymer (C) is 45 to 65% by mass, and the ethylene.α-olefin copolymer (A) is an ethylene.propylene copolymer.

The thermoplastic resin composition (I) of the fifth aspect of the present invention preferably contains: a graft copolymer (D); a graft copolymer (M) obtainable by polymerization of a vinyl-based monomer mixture (m5) containing an aromatic vinyl compound and a vinyl cyanide compound in the presence of a composite rubber polymer (L1) containing a polyorganosiloxane (La) and a poly(meth)acrylic ester (Lb) that contains a unit derived from a (meth)acrylic ester and contains a unit derived from a cross-linking agent and/or a unit derived from a graft cross-linking agent; and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26 \times 10^4$ to $32 \times 10^4$ and a distribution of molecular weight (Mw/Mn) of 1.9 to 2.5, and the gel content ratio of the cross-linked ethylene.α-olefin copolymer (C) with respect to the total mass of the cross-linked ethylene.α-olefin copolymer (C) is 45 to 65% by mass, and the ethylene.α-olefin copolymer (A) is an ethylene.propylene copolymer, and the amount of ethylene unit in the ethylene.α-olefin copolymer (A) relative to the total mass of the structural units constituting the ethylene.α-olefin copolymer (A) is 45 to 65% by mass.

The thermoplastic resin composition (I) of the fifth aspect of the present invention preferably contains: a graft copolymer (D); a graft copolymer (M) obtainable by polymerization of a vinyl-based monomer mixture (m5) containing an aromatic vinyl compound and a vinyl cyanide compound in the presence of a composite rubber polymer (L1) containing a polyorganosiloxane (La) and a poly(meth)acrylic ester (Lb) that contains a unit derived from a (meth)acrylic ester and contains a unit derived from a cross-linking agent and/or a unit derived from a graft cross-linking agent; and a methacrylic ester resin (G) obtainable by polymerization of a vinyl-based monomer mixture (m3) containing a methacrylic ester, wherein the graft copolymer (D) is a graft copolymer obtainable by emulsion polymerization of a vinyl-based monomer mixture (m1) including an aromatic vinyl compound and a vinyl cyanide compound, in the presence of a cross-linked ethylene.α-olefin copolymer (C) obtainable by cross-linking treatment of an ethylene.α-olefin copolymer (A) which has a mass average molecular weight (Mw) of $26 \times 10^4$ to $32 \times 10^4$ and a distribution of molecular weight (Mw/Mn) of 1.9 to 2.5; or a cross-linked ethylene.α-olefin copolymer (C) obtainable by cross-linking treatment of the ethylene.α-olefin copolymer (A), and the gel content ratio of the cross-linked ethylene.α-olefin copolymer (C) with respect to the total mass of the cross-linked ethylene.α-olefin copolymer (C) is 45 to 65% by mass, and the ethylene.α-olefin copolymer (A) is an ethylene.propylene copolymer, and the amount of ethylene unit in the ethylene.α-olefin copolymer (A) relative to the total mass of the structural units constituting the ethylene.α-olefin copolymer (A) is 45 to 65% by mass.

The thermoplastic resin composition (I) of the fifth aspect of the present invention preferably contains: a graft copolymer (D); a graft copolymer (M) obtainable by polymerization of a vinyl-based monomer mixture (m5) containing an aromatic vinyl compound and a vinyl cyanide compound in the presence of a composite rubber polymer (L1) containing a polyorganosiloxane (La) and a poly(meth)acrylic ester (Lb) that contains a unit derived from a (meth)acrylic ester and contains a unit derived from a cross-linking agent and/or a unit derived from a graft cross-linking agent; and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26 \times 10^4$ to $32 \times 10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A), and the volume average particle diameter of the composite rubber polymer (L1) is 0.05 to 0.18 µm.

The thermoplastic resin composition (I) of the fifth aspect of the present invention preferably contains: a graft copolymer (D); a graft copolymer (M) obtainable by polymerization of a vinyl-based monomer mixture (m5) containing an aromatic vinyl compound and a vinyl cyanide compound in the presence of a composite rubber polymer (L1) containing a polyorganosiloxane (La) and a poly(meth)acrylic ester (Lb) that contains a unit derived from a (meth)acrylic ester and contains a unit derived from a cross-linking agent and/or a unit derived from a graft cross-linking agent; and a methacrylic ester resin (G) obtainable by polymerization of a vinyl-based monomer mixture (m3) containing a methacrylic ester, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26 \times 10^4$ to $32 \times 10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A), and the volume average particle diameter of the composite rubber polymer (L1) is 0.05 to 0.18 and the amount of the methacrylic ester is 50 to 94% by mass, the amount of a maleimide-based compound is 5 to 49% by mass, and the amount of the aromatic vinyl compound is 1 to 45% by mass, with respect to 100% by mass of the vinyl-based monomer mixture (m3).

The thermoplastic resin composition (I) of the fifth aspect of the present invention preferably contains: a graft copolymer (D); a graft copolymer (M) obtainable by polymerization of a vinyl-based monomer mixture (m5) containing an aromatic vinyl compound and a vinyl cyanide compound in the presence of a composite rubber polymer (L1) containing a polyorganosiloxane (La) and a poly(meth)acrylic ester (Lb) that contains a unit derived from a (meth)acrylic ester and contains a unit derived from a cross-linking agent and/or a unit derived from a graft cross-linking agent; a methacrylic ester resin (G) obtainable by polymerization of a vinyl-based monomer mixture (m3) containing a methacrylic ester; and a styrene-based copolymer (H) obtainable by polymerization of a vinyl-based monomer mixture (m4) containing an aromatic vinyl compound and a vinyl cyanide compound, wherein the graft copolymer (D) is a graft copolymer obtainable by polymerization of a vinyl-based monomer mixture (m1) including an aromatic vinyl compound and a vinyl cyanide compound, in the presence of either an ethylene.α-olefin copolymer (A) which has a mass average molecular weight (Mw) of $26 \times 10^4$ to $32 \times 10^4$ and a distribution of molecular weight (Mw/Mn) of 1.9 to 2.5 or a cross-linked ethylene.α-olefin copolymer (C) obtainable by cross-linking treatment of the ethylene.α-olefin copolymer (A), and the volume average particle diameter of the composite rubber polymer (L1) is 0.05 to 0.18 µm, and the amount of the methacrylic ester is 50 to 94% by mass, the amount of a maleimide-based compound is 5 to 49% by mass, and the amount of the aromatic vinyl compound is 1 to 45% by mass, with respect to 100% by mass of the vinyl-based monomer mixture (m3), and the amount of the aromatic vinyl compound is 15 to 95% by mass and the amount of the vinyl cyanide is 5 to 85% by mass, with respect to 100% by mass of the vinyl-based monomer mixture (m4).

EXAMPLES

As follows is a description of examples of the present invention. Although the scope of the present invention is by no way limited by these examples.

Hereafter, "%" refers to "% by mass" and "parts" refers to "parts by mass".

Measurement methods and evaluation methods in Examples or Comparative Examples will be explained as follows.

[Measurement Method]

<Measurement Method of Mass Average Molecular Weight (Mw) and Molecular Weight Distribution (Mw/Mn)>

With respect to ethylene.α-olefin copolymer, using GPC (GPC: "GPC/V2000" manufactured by Waters Corporation, Column: "Shodex AT-G+AT-806MS" manufactured by Showa Denko K.K.), o-dichlorobenzene (145° C.) was used as solvent, the mass average molecular weight (Mw) and the number-average molecular weight (Mn) in terms of polystyrene were measured, and then, the distribution of molecular weight (Mw/Mn) was calculated.

<Measurement Method of Acid Value>

An acid value was measured in accordance with JIS K2501.

<Measurement Method of Volume Average Particle Diameter 1>

The volume average particle diameter (MV) of an olefin resin aqueous dispersion (B) was measured using microtrac (product name: nanotrac 150, manufactured by Nikkiso Co., Ltd.) and pure water as a solvent which was used in measurement.

<Measurement Method of Gel Content Ratio>

An aqueous dispersion or solvent dispersion of a cross-linked ethylene.α-olefin copolymer (C) was coagulated using dilute sulfuric acid, and the resulting substance was washed and dried, thereby obtaining a coagulated powdery sample [D1]. 0.5 g of the coagulated powdery sample [D1] was immersed in 200 mL of toluene at 110° C. for 5 hours, then the sample [D1] was filtrated using a metal gauze having 200 mesh, the obtained residue was dried, the weight of the dried substance [D2] was measured, and the gel content ratio of the ethylene.α-olefin copolymer (C) was calculated in accordance with the following equation (1).

Gel content ratio (% by mass)=weight of dried substance [$D2$](g)/weight of coagulated powdery sample [$D1$](g)×100   (1)

<Measurement Method of Graft Ratio>

1 g of a graft copolymer (D) was added to 80 mL of acetone and heated under reflux for 3 hours at a temperature of 65 to 70° C., the obtained suspended acetone solution was centrifuged using a centrifugal machine (manufactured by Hitachi Koki Co., Ltd. "CR21E") under 14,000 rpm and for 30 minutes, thereby fractionating a precipitated component (acetone-insoluble component) and an acetone solution (acetone-soluble component). Thereafter, the precipitated component (acetone-insoluble component) was dried and the weight (Y(g)) was measured, and then the graft ratio was calculated in accordance with the following equation (2). In the equation (2), Y represents the weight of the acetone-insoluble component of the graft copolymer (D) (g); X represents the total weight of the graft copolymer (D) measured to calculate Y (g); and rubber ratio represents the amount of either the ethylene.α-olefin copolymer (A) or the cross-linked ethylene.α-olefin copolymer (C) in terms of a solid content in the graft copolymer (D).

Graft ratio (% by mass)={(*Y*–*X*×rubber ratio)/*X*×rubber ratio}×100 (2)

[Evaluation Method]

<Melt-Kneading 1>

0.5 parts of carbon black was added to 100 parts of the total amount of a graft copolymer (D) and a hard component (J) and mixed, and the mixture was subjected to melt-kneading using a twin-screw extruder equipped with a vacuum vent of 30 mmφ (manufactured by Ikegai Inc., product name: PCM30) at a temperature of 200 to 260° C. under a vacuum condition of 93.325 kPa, thereby producing a thermoplastic resin composition (1). After melting and kneading, if necessary, the thermoplastic resin was pelletized using a pelletizer ("SH-type pelletizer", manufactured by So-ken-sha).

<Melt-Kneading 2>

0.8 parts of carbon black was added to 100 parts of the total amount of a graft copolymer (D) and a hard component (J) and mixed, and the mixture was subjected to melt-kneading using a twin-screw extruder equipped with a vacuum vent of 30 mmφ (manufactured by Ikegai Inc., product name: PCM30) at a cylinder temperature of 200 to 260° C. under a vacuum condition of 93.325 kPa, thereby producing a thermoplastic resin composition (2). The thermoplastic resin was composition (2) pelletized using a pelletizer ("SH-type pelletizer, manufactured by So-ken-sha).

(Measurement of Melt Volume Rate (MVR))

With respect to the thermoplastic resin component (1) obtained by melt-kneading, MVR was measured in accordance with ISO 1133 standard. MVR is an indication of fluidity of the thermoplastic resin composition.

<Injection Molding 1>

From the pellet obtained by melt-kneading of the thermoplastic resin composition (1) using an injection molding machine (manufactured by Toshiba Machine Co., Ltd., "IS55FP-1.5A") under the condition where the cylinder temperature was 200 to 260° C. and the mold temperature was 60° C., a molded article having a depth of 80 mm, a width of 10 cm and a thickness of 4 mm (molded article (Ma1)) was molded. The molded article (Ma1) was used as a molded article for evaluation of flexural modulus and a molded article for evaluation of Charpy impact strength.

<Injection Molding 2>

From the pellet obtained by melt-kneading of the thermoplastic resin composition (2), using an injection molding machine (manufactured by Toshiba Machine Co., Ltd., "IS55FP-1.5A") under the condition where the cylinder temperature was 200 to 260° C. and the mold temperature was 60° C., a black plane plate having a depth of 10 cm, a width of 10 cm and a thickness of 2 mm (molded article (Ma2)) was molded. The molded article (Ma2) is used as a molded article for evaluation of glossiness, a molded article for evaluation of coloration and a molded article for evaluation of scratch resistance.

(Measurement of Flexural Modulus)

With respect to the molded article (Ma1)(test piece), flexural modulus was measured in accordance with ISO 178 standard.

(Evaluation of Impact Resistance: Charpy Impact Test)

With respect to the molded article (Ma1), in accordance with ISO 179 standard, Charpy impact test in the presence of notch was conducted at 23° C. to measure Charpy impact strength.

(Evaluation of Glossiness 1)

With respect to the molded article (Ma2), the reflectance was measured under the conditions of the incident angle of 60° and the reflection angle of 60° using a digital variable angle gloss meter (manufactured by Suga Test Instruments Co., product name: UGV-5D). As the reflection ratio becomes higher, glossiness becomes more excellent.

(Evaluation of Coloration 1)

With respect to the molded article (Ma2), using a pectro-photometer (manufactured by Konica Minolta Optics, Inc., "CM-3500d"), Luminosity L* was measured in accordance with SCE (regular reflection light-removed) method, under an optical system of d/8 (diffuse illumination/8° photoreceiving system). The L* measured in accordance with the aforementioned manner indicates as "L*(ma)". As the value of L* becomes smaller, coloration becomes more excellent.

(Evaluation of Scratch Resistance 1)

As shown in FIG. 1, a jig 10 having a rod shape and having a tip portion 11 formed in a substantially hemispherical shape was set, and the tip portion was covered with a laminated sheet 12 having 8 sheets of gauze piled. The tip portion 11 covered with a laminated sheet 12 was brought into contact with the surface of the molded article (Ma2) 13, such that the angle between the surface of the molded article (Ma2) 13 and the jig 10 having a rod shape became right angle. Then, the tip portion 11 was slid to a horizontal direction on the surface of the molded article (Ma2) 13 (direction of the double-headed arrow in FIG. 1), and reciprocated 100 times to scratch the surface of the molded article (Ma2) 13. The load was 1 kg. The molded article (Ma2) 13 having the surface thereof scratched is regarded as "molded article (Mc2)".

Luminosity L* of the molded article (Mc2) was measured in accordance with SCE method using a spectrophotometer. The L* measured in accordance with the aforementioned manner indicates as "L*(mc)".

Evaluation results of scratch resistance 1: The evaluation index ΔL* of the easily noticeable scratches of the molded article (Mc2) was calculated in accordance with the following equation (3).

The larger absolute value of ΔL* means that the scratch is easily noticeable.

$$\Delta L^* = L^*(mc) - L^*(ma) \quad (3)$$

When the absolute value of ΔL* is 3.0 or less, the scratch is not noticeable and the appearance of the molded article is not impaired.

When the absolute value of ΔL* is greater than 3.0 and not more than 7.0, the scratch is little noticeable and the appearance of the molded article is not impaired.

When the absolute value of ΔL* is greater than 7.0, the scratch is noticeable and the appearance of the molded article is impaired.

Evaluation Results of Scratch Resistance 2:

As evaluation index of ease in scratching the molded article (Ma2), using a shape measurement laser microscope (manufactured by Keyence Corp., "VK-9700"), 10-point average roughness (Rz jis) of the molded article (Ma2) was measured. The larger value of Rz jis means that the molded article is easily scratched.

[Each Components]

In the following examples, a component (A), olefin resin aqueous dispersion (B), cross-linked ethylene.α-olefin copolymer (C), graft copolymer (D) and a hard component (J) were used as follows.

<Component (A): Ethylene.α-Olefin Copolymer or Replacement Copolymer Thereof> (Preparation of Ethylene.Propylene Copolymer (A-1A))

After the inner gas of a 20 L stainless-steel polymerization vessel equipped with a stirrer was purged with nitrogen, 10 L of dehydrated and purified hexane was fed into the vessel, 8.0 mmol/L hexane solution of ethyl aluminum sesquichloride $(Al(C_2H_5)_{1.5}.Cl_{1.5})$ was continuously supplied at 5 L/h over 1 hour, and then, 0.8 mmol/L hexane solution of $VO(OC_2H_5)Cl_2$ as a catalyst and hexane were continuously supplied at 5 L/h and 5 L/h respectively, respectively. From the top of the polymerization vessel, the polymerization solution was continuously taken out from the vessel, so that the amount of the polymerization solution was maintained to be 10 L. Using a bubbling tube, ethylene, propylene and hydrogen are supplied at 2000 L/h, 1000 L/h and 8 L/h, respectively, and polymerization reaction was conducted at 35° C.

A polymerization reaction was conducted in the aforementioned manner, and polymerization solution containing an ethylene.propylene copolymer (A-1A) was obtained. The obtained polymerization solution was subjected to decalcification using hydrochloric acid, and poured into methanol to precipitate the product, and then the precipitate was dried, thereby obtaining ethylene.propylene copolymer (A-1A). The polymer profiles of the ethylene.propylene copolymer (A-1A) are shown in Table 1A.

(Preparation of Ethylene.Propylene Copolymers (A-2A) to (A-8A))

Ethylene.propylene copolymers (A-2A) to (A-8A) were obtained in the same manner as in the preparation of the ethylene.propylene copolymer (A-1A), except that the supply amount of hydrogen was changed as indicated in Table 1A. The polymer profiles of ethylene.propylene copolymers (A-2A) to (A-8A) are shown in Table 1A.

(Preparation of Ethylene.Propylene Copolymer (A-9A))

After the inner gas of a 20 L stainless-steel polymerization vessel equipped with a stirrer were purged with nitrogen, 10 L of hexane was fed to the vessel, 110 NL of propylene and 800 mL of hydrogen gas were added thereto. After heating to 40° C., pressure was applied by supplying ethylene, so that total pressure became 0.6 MPa[gage]. When the inner pressure of the autoclave reached to 0.6 MPa[gage], 10 mL of 1.0 mM/mL hexane solution of triisobutylaluminum (TIBA) was injected into the autoclave by nitrogen gas. 30 mL of toluene solution containing 0.16 mM of triphenylcarbenium (tetrakispentafluorophenyl) borate in terms of boron and 0.0004 mM of [dimethyl(t-butylamido) (tetramethyl cyclopentadienyl) silane] titanium chloride, which were prepared in advance, was injected with nitrogen to start polymerization. Then, the temperature was adjusted to 40° C. over 5 minutes, and ethylene was supplied so that the pressure became 0.6 MPa[gage]. After 5 minutes from starting the polymerization, 50 mL of methanol was added in order to stop the polymerization, and depressurization was conducted so as to be atmospheric pressure, thereby obtaining polymerization solution of an ethylene.propylene copolymer (A-9A). The obtained polymerization solution was subjected to decalcification using hydrochloric acid, and poured into methanol to precipitate the product, and then the precipitate was dried, thereby obtaining the ethylene.propylene copolymer (A-9A). The polymer profiles of the ethylene.propylene copolymer (A-9A) are shown in Table 3A.

(Preparation of Ethylene.Propylene Copolymer (A-10A))

20 parts of the ethylene.propylene copolymer (A-1A) and 80 parts of the ethylene.propylene copolymer (A-9A) were mixed and subjected to melt-kneading using a twin-screw extruder equipped with a vacuum vent of 30 mmϕ (manufactured by Ikegai Inc., product name: PCM30) at 200° C. under a vacuum condition of 93.325 kPa, thereby producing an ethylene propylene copolymer (A-10A). The polymer profiles of the ethylene.propylene copolymer (A-10A) are shown in Table 3A.

(Preparation of Ethylene.Propylene Copolymer (A-11A))

An ethylene.propylene copolymer (A-11A) was obtained in the same manner as in the preparation of the ethylene propylene copolymer (A-1A), except that $VCl_4$ was used as a catalyst instead of $VO(OC_2H_5)Cl_2$. The polymer profiles of the ethylene.propylene copolymer (A-11A) are shown in Table 1A.

(Preparation of Ethylene.Propylene Copolymer (A-12A))

75 parts of the ethylene.propylene copolymer (A-1A) and 25 parts of the ethylene.propylene copolymer (A-11A) were mixed and subjected to melt-kneading using a twin-screw extruder equipped with a vacuum vent of 30 mmϕ (manufactured by Ikegai Inc., product name: PCM30) at 200° C. under a vacuum condition of 93.325 kPa, thereby producing an ethylene propylene copolymer (A-12A). The polymer profiles of the ethylene.propylene copolymer (A-12A) are shown in Table 3A.

(Preparation of Ethylene.Propylene Copolymer (A-13A))

50 parts of the ethylene.propylene copolymer (A-1A) and 50 parts of the ethylene.propylene copolymer (A-11A) were mixed and subjected to melt-kneading using a twin-screw extruder equipped with a vacuum vent of 30 mmϕ (manufactured by Ikegai Inc., product name: PCM30) at 200° C. under a vacuum condition of 93.325 kPa, thereby producing an ethylene.propylene copolymer (A-13A). The polymer profiles of the ethylene.propylene copolymer (A-13A) are shown in Table 3A.

(Preparation of Ethylene.Propylene Copolymer (A-14A))

20 parts of the ethylene propylene copolymer (A-1A) and 80 parts of the ethylene.propylene copolymer (A-11A) were mixed and subjected to melt-kneading using a twin-screw extruder equipped with a vacuum vent of 30 mmϕ (manufactured by Ikegai Inc., product name: PCM30) at 200° C. under a vacuum condition of 93.325 kPa, thereby producing an ethylene.propylene copolymer (A-14A). The polymer profiles of the ethylene propylene copolymer (A-14A) are shown in Table 3A.

(Preparation of ethylene.propylene.non-conjugated diene copolymer (A-15A) and ethylene.1-buten copolymer (A-16A))

An ethylene.propylene non-conjugated diene copolymer (A-15A) and an ethylene.1-butene copolymer (A-16A) was obtained in the same manner as in the preparation of the ethylene.propylene copolymer (A-1A) except that the supply amounts of ethylene, propylene, 1-butene and hydrogen were changed as indicated in Table 2A. The profiles of the obtained polymers are shown in Table 2A.

(Preparation of Ethylene.1-Octene Copolymer (A-17A))

0.5 mg of bis (1,3-dimethyl-cyclopentadienyl) zirconium dichloride was fed into a glass flask purged with nitrogen sufficiently, and 1.57 mL of a toluene solution of methylaluminoxane (Al; 1.1 mol/L) and 2.76 mL of toluene were added thereto, thereby obtaining a catalyst solution.

Into a 20 L autoclave equipped with a stirrer and purged with nitrogen gas, 6,000 mL of hexane and 4,000 mL of 1-octene were fed, and the inner temperature of the autoclave was raised to 70° C. Thereafter, 1 mmol of triisobutylaluminum and 5 mL of the catalyst solution prepared as above were injected using ethylene, and polymerization was launched. Then, ethylene was continuously supplied alone, such that the total pressure maintained at 0.39 MPa[gage], and polymerization was conducted at 80° C. for 1 hour.

A polymerization reaction was conducted in the aforementioned manner, and polymerization solution of ethylene.1-octene copolymer was obtained.

The obtained polymerization solution was subjected to decalcification using hydrochloric acid, and poured into methanol to precipitate the product, and then the precipitate was dried, thereby obtaining an ethylene.1-octene copolymer (A-17A). The profiles of obtained polymer are shown in Table 3A.

(Preparation of Ethylene.Propylene Copolymers (A-18A) to (A-23A))

Ethylene.propylene copolymers (A-18A) to (A-23A) were obtained in the same manner as in the preparation of the ethylene.propylene copolymer (A-1A) except that the supply amounts of ethylene, propylene and hydrogen were changed as indicated in Table 2A. The profiles of obtained polymers are shown in Table 2A.

TABLE 1A

| | | COMPONENT (A) | | | | | | | | |
|---|---|---|---|---|---|---|---|---|---|---|
| | | A-1A | A-2A | A-3A | A-4A | A-5A | A-6A | A-7A | A-8A | A-11A |
| POLYMERIZATION CONDITIONS | ETHYLENE [L/h] | 2000 | 2000 | 2000 | 2000 | 2000 | 2000 | 2000 | 2000 | 2000 |
| | PROPYLENE [L/h] | 1000 | 1000 | 1000 | 1000 | 1000 | 1000 | 1000 | 1000 | 1000 |
| | HYDROGEN [L/h] | 8 | 100 | 80 | 22 | 12 | 6 | 4 | 1.5 | 8 |
| | POYMERIZATION TEMPERATURE [° C.] | 35 | 35 | 35 | 35 | 35 | 35 | 35 | 35 | 35 |
| | POLYMERIZATION TIME [h] | 1 | 1 | 1 | 1 | 1 | 1 | 1 | 1 | 1 |
| POLYMER PROPERTIES | ETHYLENE CONTENT [PARTS BY MASS] | 56 | 56 | 56 | 56 | 56 | 56 | 56 | 56 | 56 |
| | PROPYLENE CONTENT [PARTS BY MASS] | 44 | 44 | 44 | 44 | 44 | 44 | 44 | 44 | 44 |
| | WEIGHT AVERAGE MOLECULAR WEIGHT [×10$^4$] | 30 | 15 | 17 | 24 | 26 | 32 | 35 | 38 | 30 |
| | DISTRIBUTION OF MOLECULAR WEIGHT (Mw/Mn) | 2.2 | 2.1 | 2.2 | 2.2 | 2.3 | 2.2 | 2.2 | 2.2 | 3.2 |

TABLE 2A

| | | COMPONENT (A) | | | | | | | |
|---|---|---|---|---|---|---|---|---|---|
| | | A-15A | A-16A | A-18A | A-19A | A-20A | A-21A | A-22A | A-23A |
| POLYMERIZATION CONDITIONS | ETHYLENE [L/h] | 2000 | 1800 | 1500 | 1700 | 1900 | 2100 | 2200 | 2250 |
| | PROPYLENE [L/h] | 1000 | 0 | 1500 | 1300 | 1100 | 900 | 800 | 750 |
| | 5-ETHYLIDENE-2-NORBORNENE [g/h] | 100 | 0 | 0 | 0 | 0 | 0 | 0 | 0 |
| | 1-BUTENE [L/h] | 0 | 1200 | 0 | 0 | 0 | 0 | 0 | 0 |
| | HYDROGEN [L/h] | 7 | 6 | 3 | 6 | 7 | 9 | 20 | 30 |
| | POLYMERIZATION TEMPERATURE [° C.] | 35 | 35 | 35 | 35 | 35 | 35 | 35 | 35 |
| | POLYMERIZATION TIME [h] | 1 | 1 | 1 | 1 | 1 | 1 | 1 | 1 |
| POLYMER PROPERTIES | ETHYLENE CONTENT [PARTS BY MASS] | 56 | 62 | 42 | 45 | 50 | 60 | 65 | 68 |
| | PROPYLENE CONTENT [PARTS BY MASS] | 43 | 0 | 58 | 55 | 50 | 40 | 35 | 32 |
| | 5-ETHYLIDENE-2-NORBORNENE CONTENT [PARTS BY MASS] | 1 | 0 | 0 | 0 | 0 | 0 | 0 | 0 |
| | 1-BUTENE CONTENT [PARTS BY MASS] | 0 | 38 | 0 | 0 | 0 | 0 | 0 | 0 |
| | WEIGHT AVERAGE MOLECULAR WEIGHT [×10$^4$] | 30 | 31 | 28 | 28 | 29 | 30 | 31 | 31 |
| | DISTRIBUTION OF MOLECULAR WEIGHT (Mw/Mn) | 2.2 | 2.3 | 2.2 | 2.1 | 2.2 | 2.3 | 2.2 | 2.2 |

TABLE 3A

| | | COMPONENT (A) | | | | | |
|---|---|---|---|---|---|---|---|
| | | A-9A | A-10A | A-12A | A-13A | A-14A | A-17A |
| POLYMER PROPERTIES | ETHYLENE CONTENT [PARTS BY MASS] | 56 | 56 | 56 | 56 | 56 | 69 |
| | PROPYLENE CONTENT [PARTS BY MASS] | 44 | 44 | 44 | 44 | 44 | 0 |

TABLE 3A-continued

|  | COMPONENT (A) | | | | | |
| --- | --- | --- | --- | --- | --- | --- |
|  | A-9A | A-10A | A-12A | A-13A | A-14A | A-17A |
| 1-OCTENE CONTENT [PARTS BY MASS] | 0 | 0 | 0 | 0 | 0 | 31 |
| WEIGHT AVERAGE MOLECULAR WEIGHT [×10$^4$] | 30 | 30 | 30 | 30 | 30 | 28 |
| DISTRIBUTION OF MOLECULAR WEIGHT (Mw/Mn) | 1.8 | 1.9 | 2.5 | 2.7 | 3.0 | 2.2 |

<Olefin Resin Aqueous Dispersions (B)> (Preparation of Olefin Resin Aqueous Dispersions (B-1A))

100 parts of the ethylene.propylene copolymer (A-1A), 15 parts of a maleic anhydride-modified polyethylene (K-1A) (manufactured by Mitsui Chemicals, Inc., "Mitsui Hi-WAX 2203A", the weight average molecular weight: 2,700, acid value: 30 mg/g) as an acid-modified olefin polymer (K), and 3 parts of potassium oleate as an anion-type emulsifier were mixed.

Next, the mixture was supplied from a hopper of a twin screw extruder (manufactured by Ikegai Inc., product name: "PCM-30", L/D=40) at 4 kg/hour, and heated to 220° C. to conduct melt-kneading while 14% aqueous solution of potassium hydroxide was continuously supplied at 240 g/hour, and then the resulting melt-kneaded product was extruded.

Thereafter, the melt-kneaded product was continuously supplied to a cooling device which was attached to the tip of the extruder, and then cooled to 90° C. The obtained solid was poured into hot water at 80° C. and continuously dispersed, thereby obtaining an olefin resin aqueous dispersion (B-1A) having the volume average particle diameter of 0.38 μm.

<Preparation of Olefin Resin Aqueous Dispersions (B-2A) to (B-23A)>

Olefin resin aqueous dispersions (B-2A) to (B-23A) were obtained in the same manner as in the preparation of the olefin resin aqueous dispersion (B-1A), except that the components (A-2A) to (A-23A) was used as a component (A) as indicated in Tables 4A to 6A instead of the component (A-1A). The volume average particle diameters of olefin resin aqueous dispersions (B-2A) to (B-23A) are shown in tables 4A to 6A.

TABLE 4A

|  |  | OLEFIN RESIN AQUEOUS DISPERSION (B) | | | | | | | |
| --- | --- | --- | --- | --- | --- | --- | --- | --- | --- |
|  |  | B-1A | B-2A | B-3A | B-4A | B-5A | B-6A | B-7A | B-8A |
| COMPONENT (A) [PARTS BY MASS] | A-1A | 100 | 0 | 0 | 0 | 0 | 0 | 0 | 0 |
|  | A-2A | 0 | 100 | 0 | 0 | 0 | 0 | 0 | 0 |
|  | A-3A | 0 | 0 | 100 | 0 | 0 | 0 | 0 | 0 |
|  | A-4A | 0 | 0 | 0 | 100 | 0 | 0 | 0 | 0 |
|  | A-5A | 0 | 0 | 0 | 0 | 100 | 0 | 0 | 0 |
|  | A-6A | 0 | 0 | 0 | 0 | 0 | 100 | 0 | 0 |
|  | A-7A | 0 | 0 | 0 | 0 | 0 | 0 | 100 | 0 |
|  | A-8A | 0 | 0 | 0 | 0 | 0 | 0 | 0 | 100 |
| ACID-MODIFIED OLEFIN POLYMER (K) [PARTS BY MASS] | K-1A | 15 | 15 | 15 | 15 | 15 | 15 | 15 | 15 |
| VOLUME AVERAGE PARTICLE DIAMETER [μm] |  | 0.38 | 0.35 | 0.36 | 0.38 | 0.39 | 0.42 | 0.42 | 0.43 |

TABLE 5A

|  |  | OLEFIN RESIN AQUEOUS DISPERSION (B) | | | | | |
| --- | --- | --- | --- | --- | --- | --- | --- |
|  |  | B-9A | B-10A | B-11A | B-12A | B-13A | B-14A |
| COMPONENT (A) [PARTS BY MASS] | A-9A | 100 | 0 | 0 | 0 | 0 | 0 |
|  | A-10A | 0 | 100 | 0 | 0 | 0 | 0 |
|  | A-11A | 0 | 0 | 100 | 0 | 0 | 0 |
|  | A-12A | 0 | 0 | 0 | 100 | 0 | 0 |
|  | A-13A | 0 | 0 | 0 | 0 | 100 | 0 |
|  | A-14A | 0 | 0 | 0 | 0 | 0 | 100 |
| ACID-MODIFIED OLEFIN POLYMER (K) [PARTS BY MASS] | K-1A | 15 | 15 | 15 | 15 | 15 | 15 |
| VOLUME AVERAGE PARTICLE DIAMETER [μm] |  | 0.38 | 0.35 | 0.36 | 0.38 | 0.41 | 0.42 |

TABLE 6A

| | | OLEFIN RESIN AQUEOUS DISPERSION (B) | | | | | | | | |
|---|---|---|---|---|---|---|---|---|---|---|
| | | B-15A | B-16A | B-17A | B-18A | B-19A | B-20A | B-21A | B-22A | B-23A |
| COMPONENT (A) [PARTS BY MASS] | A-15A | 100 | 0 | 0 | 0 | 0 | 0 | 0 | 0 | 0 |
| | A-16A | 0 | 100 | 0 | 0 | 0 | 0 | 0 | 0 | 0 |
| | A-17A | 0 | 0 | 100 | 0 | 0 | 0 | 0 | 0 | 0 |
| | A-18A | 0 | 0 | 0 | 100 | 0 | 0 | 0 | 0 | 0 |
| | A-19A | 0 | 0 | 0 | 0 | 100 | 0 | 0 | 0 | 0 |
| | A-20A | 0 | 0 | 0 | 0 | 0 | 100 | 0 | 0 | 0 |
| | A-21A | 0 | 0 | 0 | 0 | 0 | 0 | 100 | 0 | 0 |
| | A-22A | 0 | 0 | 0 | 0 | 0 | 0 | 0 | 100 | 0 |
| | A-23A | 0 | 0 | 0 | 0 | 0 | 0 | 0 | 0 | 100 |
| ACID-MODIFIED OLEFIN POLYMER (K) [PARTS BY MASS] | K-1A | 15 | 15 | 15 | 15 | 15 | 15 | 15 | 15 | 15 |
| VOLUME AVERAGE PARTICLE DIAMETER [μm] | | 0.39 | 0.36 | 0.35 | 0.42 | 0.40 | 0.38 | 0.38 | 0.39 | 0.41 |

<Cross-Linked Ethylene·α-Olefin Copolymer (C)>
(Preparation of Cross-Linked Ethylene·α-Olefin Copolymer (C-1A))

0.5 parts of t-butyl cumyl peroxide as an organic peroxide and 1 part of divinylbenzene as a polyfunctional compound were added to 100 parts of the cross-linked olefin resin aqueous dispersion (B-1A) in terms of a solid content, and the mixture was reacted at 130° C. for 5 hours, thereby preparing an acid dispersion of cross-linked ethylene·α-olefin copolymer (C-1A). The gel content ratio of the cross-linked ethylene·α-olefin copolymer (C-1A) was measured as 51%.

(Preparation of Cross-Linked Ethylene·α-Olefin Copolymers (C-2A) to (C-23A))

Cross-linked ethylene·α-olefin copolymers (C-2A) to (C-23A) were obtained in the same manner as in the preparation of the cross-linked ethylene·α-olefin copolymer (C-1A) except that the type of the olefin resin aqueous dispersion (B) and the amount of the t-butyl cumyl peroxide were changed as indicated in Tables 7A to 9A. The gel content ratio of cross-linked ethylene·α-olefin copolymers (C-2A) to (C-23A) are shown in Tables 7A to 9A.

<Preparation of Cross-Linked Ethylene·α-Olefin Copolymers (C-24A) to (C-31A)>

Cross-linked ethylene·α-olefin copolymers (C-24A) to (C-31A) were obtained in the same manner as in the preparation of the cross-linked ethylene·α-olefin copolymer (C-1A) except that the amount of the t-butyl cumyl peroxide were changed as indicated in Table 10A. The gel content ratio of cross-linked ethylene·α-olefin copolymers (C-24A) to (C-31A) are shown in Table 10A.

TABLE 7A

| | | CROSS-LINKED ETHYLENE· α-OLEFIN COPOLYMER (C) | | | | | | | |
|---|---|---|---|---|---|---|---|---|---|
| | | C-1A | C-2A | C-3A | C-4A | C-5A | C-6A | C-7A | C-8A |
| OLEFIN RESIN AQUEOUS DISPERSION (B) [PARTS BY MASS] | B-1A | 100 | 0 | 0 | 0 | 0 | 0 | 0 | 0 |
| | B-2A | 0 | 100 | 0 | 0 | 0 | 0 | 0 | 0 |
| | B-3A | 0 | 0 | 100 | 0 | 0 | 0 | 0 | 0 |
| | B-4A | 0 | 0 | 0 | 100 | 0 | 0 | 0 | 0 |
| | B-5A | 0 | 0 | 0 | 0 | 100 | 0 | 0 | 0 |
| | B-6A | 0 | 0 | 0 | 0 | 0 | 100 | 0 | 0 |
| | B-7A | 0 | 0 | 0 | 0 | 0 | 0 | 100 | 0 |
| | B-8A | 0 | 0 | 0 | 0 | 0 | 0 | 0 | 100 |
| t-BUTYL CUMYL PEROXIDE [PARTS BY MASS] | | 0.5 | 1.5 | 0.8 | 0.6 | 0.4 | 0.3 | 0.3 | 0.3 |
| DIVINYLBENZENE [PARTS BY MASS] | | 1 | 1 | 1 | 1 | 1 | 1 | 1 | 1 |
| GEL CONTENT [% BY MASS] | | 51 | 49 | 50 | 52 | 50 | 51 | 52 | 52 |

TABLE 8A

| | | CROSS-LINKED ETHYLENE· α-OLEFIN COPOLYMER (C) | | | | | |
|---|---|---|---|---|---|---|---|
| | | C-9A | C-10A | C-11A | D-12A | D-13A | D-14A |
| OLEFIN RESIN AQUEOUS DISPERSION (B) | B-9A | 100 | 0 | 0 | 0 | 0 | 0 |
| | B-10A | 0 | 100 | 0 | 0 | 0 | 0 |
| | B-11A | 0 | 0 | 100 | 0 | 0 | 0 |

TABLE 8A-continued

| | | CROSS-LINKED ETHYLENE• α-OLEFIN COPOLYMER (C) | | | | | |
|---|---|---|---|---|---|---|---|
| | | C-9A | C-10A | C-11A | D-12A | D-13A | D-14A |
| [PARTS BY MASS] | B-12A | 0 | 0 | 0 | 100 | 0 | 0 |
| | B-13A | 0 | 0 | 0 | 0 | 100 | 0 |
| | B-14A | 0 | 0 | 0 | 0 | 0 | 100 |
| t-BUTYL CUMYL PEROXIDE [PARTS BY MASS] | | 0.4 | 0.4 | 0.6 | 0.5 | 0.5 | 0.6 |
| DIVINYLBENZENE [PARTS BY MASS] | | 1 | 1 | 1 | 1 | 1 | 1 |
| GEL CONTENT [% BY MASS] | | 52 | 50 | 49 | 50 | 49 | 51 |

TABLE 9A

| | | CROSS-LINKED ETHYLENE• α-OLEFIN COPOLYMER (C) | | | | | | | |
|---|---|---|---|---|---|---|---|---|---|
| | | C-15A | C-16A | C-17A | C-18A | C-19A | C-20A | C-21A | C-22A | C-23A |
| OLEFIN RESIN AQUEOUS DISPERSION (B) [PARTS BY MASS] | B-15A | 100 | 0 | 0 | 0 | 0 | 0 | 0 | 0 | 0 |
| | B-16A | 0 | 100 | 0 | 0 | 0 | 0 | 0 | 0 | 0 |
| | B-17A | 0 | 0 | 100 | 0 | 0 | 0 | 0 | 0 | 0 |
| | B-18A | 0 | 0 | 0 | 100 | 0 | 0 | 0 | 0 | 0 |
| | B-19A | 0 | 0 | 0 | 0 | 100 | 0 | 0 | 0 | 0 |
| | B-20A | 0 | 0 | 0 | 0 | 0 | 100 | 0 | 0 | 0 |
| | B-21A | 0 | 0 | 0 | 0 | 0 | 0 | 100 | 0 | 0 |
| | B-22A | 0 | 0 | 0 | 0 | 0 | 0 | 0 | 100 | 0 |
| | B-23A | 0 | 0 | 0 | 0 | 0 | 0 | 0 | 0 | 100 |
| t-BUTYL CUMYL PEROXIDE [PARTS BY MASS] | | 0.3 | 0.8 | 1.1 | 0.4 | 0.4 | 0.5 | 0.5 | 0.5 | 0.6 |
| DIVINYLBENZENE [PARTS BY MASS] | | 1 | 1 | 1 | 1 | 1 | 1 | 1 | 1 | 1 |
| GEL CONTENT [% BY MASS] | | 52 | 48 | 49 | 53 | 50 | 52 | 49 | 48 | 52 |

TABLE 10A

| | | GROSS-LINKED ETHYLENE• α-OLEFIN COPOLYMER (C) | | | | | | | |
|---|---|---|---|---|---|---|---|---|---|
| | | C-24A | C-25A | C-26A | C-27A | C-28A | C-29A | C-30A | C-31A |
| OLEFIN RESIN AQUEOUS DISPERSION (B) [PARTS BY MASS] | B-1A | 100 | 100 | 100 | 100 | 100 | 100 | 100 | 100 |
| t-BUTYL CUMYL PEROXIDE [PARTS BY MASS] | | 0.15 | 0.2 | 0.3 | 0.4 | 0.7 | 0.9 | 1.2 | 1.5 |
| DIVINYLBENZENE [PARTS BY MASS] | | 1 | 1 | 1 | 1 | 1 | 1 | 1 | 1 |
| GEL CONTENT [% BY MASS] | | 31 | 35 | 40 | 45 | 65 | 70 | 75 | 79 |

<Graft Copolymer (D)> (Preparation of Graft Copolymer (D-1A))

180 parts of ion exchanged water, 60 parts of the aqueous dispersion of cross-linked ethylene.α-olefin copolymer (C-1A) in terms of a solid content, 0.006 parts of ferrous sulfate, 0.3 parts of sodium pyrophosphate, and 0.35 parts of dextrose were fed into a stainless-steel polymerization vessel equipped with a stirrer, and the temperature was adjusted to 80° C. Next, 13.7 parts of acrylonitrile, 26.3 parts of styrene and 0.6 parts of cumene hydroperoxide were continuously added over 150 minutes, and emulsion polymerization was conducted while maintaining the polymerization temperature at 80° C. After polymerization, an antioxidant was added to an aqueous dispersion containing a graft copolymer (D-1A), and solid was precipitated using sulfuric acid, and washing, dehydration and drying were conducted, thereby obtaining a powdery graft copolymer (D-1A). The graft ratio of the graft copolymer (D-1A) was measured as 40%.

(Preparation of Graft Copolymers (D-2A) to (D-31A))

Graft copolymers (D-2A) to (D-31A) were obtained in the same manner as in the preparation of the graft copolymer (D-1A) except that the type of the ethylene.α-olefin copolymer (C) was changed as indicated in Tables 11A to 14A. The measurement results of graft ratio with respect to graft copolymers (D-2) to (D-31) are shown in Tables 11A to 14A.

(Preparation of Graft Copolymer (D-32A))

52 parts of the ethylene.propylene copolymer (A-1A), 8 parts of a maleic anhydride-modified polyethylene (K-1A), 300 parts of toluene, and 1 part of divinylbenzene were fed into a stainless-steel polymerization vessel equipped with a stirrer, and the mixture was dissolved uniformly while stirring for 1 hour at 75° C. After the vessel was purged with nitrogen satisfactorily, 0.5 parts of t-butyl cumyl peroxide was added thereto, the inner temperature was raised to 130° C. and mixture was reacted for 5 hours, thereby preparing a solvent solution of ethylene.α-olefin copolymer (C-32A) having a gel content ratio of 46% by mass.

Thereafter, the inner temperature was cooled to 70° C., 26.3 parts of styrene, 13.7 parts of acrylonitrile, 0.24 parts of tert-dodecyl mercaptan, and 0.22 parts of tert-butylperoxyisopropyl monocarbonate were added, then the inner temperature was raised to 110° C., and reaction was conducted for 4 hours, and then the inner temperature was raised to 120° C. and reaction was conducted for 2 hours. After polymerization reaction was completed, the inner temperature was cooled to 100° C., 0.2 parts of octadecyl-3-(3,5-di-tert-butyl-4-hydroxy phenol)-propionate was added to the reaction mixture. Then, reaction mixture was taken out from the vessel, and unreacted material and solvent were distilled by steam distillation. Thereafter, using a twin-screw extruder equipped with a vacuum vent of 30 mmφ (manufactured by Ikegai Inc., product name: PCM30), volatiles were substantially volatilized at 220° C. under a vacuum condition of 93.325 kPa, and a pellet was formed, thereby obtaining a graft copolymer (D-32B). The graft ratio of the graft copolymer (D-32A) was measured as 35%.

TABLE 11A

| | | GRAFT COPOLYMER (D) | | | |
|---|---|---|---|---|---|
| | | D-1A | D-2A | D-3A | D-4A |
| CROSS-LINKED ETHYLENE• α-OLEFIN COPOLYMER (C) [PARTS BY MASS] | C-1A | 60 | 0 | 0 | 0 |
| | C-2A | 0 | 60 | 0 | 0 |
| | C-3A | 0 | 0 | 60 | 0 |
| | C-4A | 0 | 0 | 0 | 60 |
| | C-5A | 0 | 0 | 0 | 0 |
| | C-6A | 0 | 0 | 0 | 0 |
| | C-7A | 0 | 0 | 0 | 0 |
| | C-8A | 0 | 0 | 0 | 0 |
| VINYL-BASED MONOMER MIXTURE (m1) [PARTS BY MASS] | STYRENE | 26.3 | 26.3 | 26.3 | 26.3 |
| | ACRYLONITRILE | 13.7 | 13.7 | 13.7 | 13.7 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO [% BY MASS] | | 40 | 41 | 41 | 40 |

| | | GRAFT COPOLYMER (D) | | | |
|---|---|---|---|---|---|
| | | D-5A | D-6A | D-7A | D-8A |
| CROSS-LINKED ETHYLENE• α-OLEFIN COPOLYMER (C) [PARTS BY MASS] | C-1A | 0 | 0 | 0 | 0 |
| | C-2A | 0 | 0 | 0 | 0 |
| | C-3A | 0 | 0 | 0 | 0 |
| | C-4A | 0 | 0 | 0 | 0 |
| | C-5A | 60 | 0 | 0 | 0 |
| | C-6A | 0 | 60 | 0 | 0 |
| | C-7A | 0 | 0 | 60 | 0 |
| | C-8A | 0 | 0 | 0 | 60 |
| VINYL-BASED MONOMER MIXTURE (m1) [PARTS BY MASS] | STYRENE | 26.3 | 26.3 | 26.3 | 26.3 |
| | ACRYLONITRILE | 13.7 | 13.7 | 13.7 | 13.7 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO [% BY MASS] | | 39 | 40 | 38 | 38 |

TABLE 12A

| | | GRAFT COPOLYMER (D) | | | | | |
|---|---|---|---|---|---|---|---|
| | | D-9A | D-10A | D-11A | D-12A | D-13A | D-14A |
| CROSS-LINKED ETHYLENE• α-OLEFIN COPOLYMER (C) [PARTS BY MASS] | C-9A | 60 | 0 | 0 | 0 | 0 | 0 |
| | C-10A | 0 | 60 | 0 | 0 | 0 | 0 |
| | C-11A | 0 | 0 | 60 | 0 | 0 | 0 |
| | C-12A | 0 | 0 | 0 | 60 | 0 | 0 |
| | C-13A | 0 | 0 | 0 | 0 | 60 | 0 |
| | C-14A | 0 | 0 | 0 | 0 | 0 | 60 |

TABLE 12A-continued

|  |  | GRAFT COPOLYMER (D) | | | | | |
|---|---|---|---|---|---|---|---|
|  |  | D-9A | D-10A | D-11A | D-12A | D-13A | D-14A |
| VINYL-BASED MONOMER MIXTURE (m1) [PARTS BY MASS] | STYRENE | 26.3 | 26.3 | 26.3 | 26.3 | 26.3 | 26.3 |
|  | ACRYLONITRILE | 13.7 | 13.7 | 13.7 | 13.7 | 13.7 | 13.7 |
| GRAFT POLYMERIZATION METHOD | | EMULSION POLYMER-IZATION | EMULSION POLYMER-IZATION | EMULSION POLYMER-IZATION | EMULSION POLYMER-IZATION | EMULSION POLYMER-IZATION | EMULSION POLYMER-IZATION |
| GRAFT RATIO [% BY MASS] | | 40 | 40 | 40 | 40 | 39 | 39 |

TABLE 13A

|  |  | GRAFT COPOLYMER (D) | | | | |
|---|---|---|---|---|---|---|
|  |  | D-15A | D-16A | D-17A | D-18A | D-19A |
| CROSS-LINKED ETHYLENE• α-OLEFIN COPOLYMER (C) [PARTS BY MASS] | C-15A | 60 | 0 | 0 | 0 | 0 |
|  | C-16A | 0 | 60 | 0 | 0 | 0 |
|  | C-17A | 0 | 0 | 60 | 0 | 0 |
|  | C-18A | 0 | 0 | 0 | 60 | 0 |
|  | C-19A | 0 | 0 | 0 | 0 | 60 |
|  | C-20A | 0 | 0 | 0 | 0 | 0 |
|  | C-21A | 0 | 0 | 0 | 0 | 0 |
|  | C-22A | 0 | 0 | 0 | 0 | 0 |
|  | C-23A | 0 | 0 | 0 | 0 | 0 |
| VINYL-BASED MONOMER MIXTURE (m1) [PARTS BY MASS] | STYRENE | 26.3 | 26.3 | 26.3 | 26.3 | 26.3 |
|  | ACRYLONITRILE | 13.7 | 13.7 | 13.7 | 13.7 | 13.7 |
| GRAFT POLYMERIZATION METHOD | | EMULSION POLYMER-IZATION | EMULSION POLYMER-IZATION | EMULSION POLYMER-IZATION | EMULSION POLYMER-IZATION | EMULSION POLYMER-IZATION |
| GRAFT RATIO [% BY MASS] | | 40 | 38 | 37 | 39 | 39 |

|  |  | GRAFT COPOLYMER (D) | | | |
|---|---|---|---|---|---|
|  |  | D-20A | D-21A | D-22A | D-23A |
| CROSS-LINKED ETHYLENE• α-OLEFIN COPOLYMER (C) [PARTS BY MASS] | C-15A | 0 | 0 | 0 | 0 |
|  | C-16A | 0 | 0 | 0 | 0 |
|  | C-17A | 0 | 0 | 0 | 0 |
|  | C-18A | 0 | 0 | 0 | 0 |
|  | C-19A | 0 | 0 | 0 | 0 |
|  | C-20A | 60 | 0 | 0 | 0 |
|  | C-21A | 0 | 60 | 0 | 0 |
|  | C-22A | 0 | 0 | 60 | 0 |
|  | C-23A | 0 | 0 | 0 | 60 |
| VINYL-BASED MONOMER MIXTURE (m1) [PARTS BY MASS] | STYRENE | 26.3 | 26.3 | 26.3 | 26.3 |
|  | ACRYLONITRILE | 13.7 | 13.7 | 13.7 | 13.7 |
| GRAFT POLYMERIZATION METHOD | | EMULSION POLYMER-IZATION | EMULSION POLYMER-IZATION | EMULSION POLYMER-IZATION | EMULSION POLYMER-IZATION |
| GRAFT RATIO [% BY MASS] | | 40 | 41 | 40 | 41 |

TABLE 14A

|  |  | GRAFT COPOLYMER (D) | | | | |
|---|---|---|---|---|---|---|
|  |  | D-24A | D-25A | D-26A | D-27A | D-28A |
| CROSS-LINKED ETHYLENE• α-OLEFIN COPOLYMER (C) [PARTS BY MASS] | C-24A | 60 | 0 | 0 | 0 | 0 |
|  | C-25A | 0 | 60 | 0 | 0 | 0 |
|  | C-26A | 0 | 0 | 60 | 0 | 0 |
|  | C-27A | 0 | 0 | 0 | 60 | 0 |
|  | C-28A | 0 | 0 | 0 | 0 | 60 |
|  | C-29A | 0 | 0 | 0 | 0 | 0 |
|  | C-30A | 0 | 0 | 0 | 0 | 0 |
|  | C-31A | 0 | 0 | 0 | 0 | 0 |

TABLE 14A-continued

| COMPONENT (A) [PARTS BY MASS] | A-1A | 0 | 0 | 0 | 0 | 0 |
|---|---|---|---|---|---|---|
| ACID-MODIFIED OLEFIN POLYMER (K) [PARTS BY MASS] | K-1A | 0 | 0 | 0 | 0 | 0 |
| VINYL-BASED MONOMER MIXTURE (m1) [PARTS BY MASS] | STYRENE ACRYLONITRILE | 26.3 13.7 | 26.3 13.7 | 26.3 13.7 | 26.3 13.7 | 26.3 13.7 |
| GRAFT POLYMERIZATION METHOD | | EMULSION POLYMER- IZATION | EMULSION POLYMER- IZATION | EMULSION POLYMER- IZATION | EMULSION POLYMER- IZATION | EMULSION POLYMER- IZATION |
| GRAFT RATIO [% BY MASS] | | 40 | 39 | 39 | 40 | 40 |

| | | GRAFT COPOLYMER (D) | | | |
|---|---|---|---|---|---|
| | | D-29A | D-30A | D-31A | D-32A |
| CROSS-LINKED ETHYLENE• α-OLEFIN COPOLYMER (C) [PARTS BY MASS] | C-24A | 0 | 0 | 0 | 0 |
| | C-25A | 0 | 0 | 0 | 0 |
| | C-26A | 0 | 0 | 0 | 0 |
| | C-27A | 0 | 0 | 0 | 0 |
| | C-28A | 0 | 0 | 0 | 0 |
| | C-29A | 60 | 0 | 0 | 0 |
| | C-30A | 0 | 60 | 0 | 0 |
| | C-31A | 0 | 0 | 60 | 0 |
| COMPONENT (A) [PARTS BY MASS] | A-1A | 0 | 0 | 0 | 52 |
| ACID-MODIFIED OLEFIN POLYMER (K) [PARTS BY MASS] | K-1A | 0 | 0 | 0 | 8 |
| VINYL-BASED MONOMER MIXTURE (m1) [PARTS BY MASS] | STYRENE ACRYLONITRILE | 26.3 13.7 | 26.3 13.7 | 26.3 13.7 | 26.3 13.7 |
| GRAFT POLYMERIZATION METHOD | | EMULSION POLYMER- IZATION | EMULSION POLYMER- IZATION | EMULSION POLYMER- IZATION | EMULSION POLYMER- IZATION |
| GRAFT RATIO [% BY MASS] | | 39 | 39 | 39 | 35 |

<Hard Component (J)> (Preparation of Styrene-Based Copolymer (H-1A))

120 parts of ion exchanged water, 0.1 parts of polyvinyl alcohol, 0.3 parts of 2,2'-azobis(isobutyronitrile), 34 parts of acrylonitrile, 66 parts of styrene and 0.3 parts of t-dodecylmercaptane were fed into a stainless-steel polymerization vessel equipped with a stirrer and purged with nitrogen gas. The temperature of the reaction vessel was raised to 50° C. and polymerization was conducted for 5 hours. Then, after the temperature was raised to 120° C. and reaction was conducted for 4 hours, the reaction mixture was taken out from the vessel. The reaction mixture was washed and dried, thereby obtaining a powdery stylene-based copolymer (H-1A).

(Preparation of Styrene-Based Copolymer (H-2A))

0.003 part of sodium dodecylbenzenesulfonate, 28 parts of acrylonitrile, 26 parts of styrene, 36 parts of α-methylstyrene, 10 parts of N-phenylmaleimide, 0.7 parts of benzoylperoxide, 0.07 parts of t-butyl peroxy benzoate, 0.6 parts of calcium phosphate, 0.4 parts of t-dodecyl mercaptan and 120 parts of ion exchanged water were fed into a stainless-steel polymerization vessel equipped with a stirrer and purged with nitrogen gas. The temperature of the reaction vessel was raised to 80° C., polymerization was conducted for 8 hours. Then, after the temperature was raised to 120° C. and polymerization was conducted for 2 hours, the reaction mixture was taken out from the vessel. The reaction mixture was washed and dried, thereby obtaining a powdery stylene-based copolymer (H-2A).

(Polycarbonate (J-3A))

As a polycarbonate (J-3A), polycarbonate (product name: Iupilon S-3000F, manufactured by Mitsubishi Engineering-Plastics Corporation) was used.

Example 1A 28 parts of the graft copolymer (D-1A), 72 parts of the styrene copolymer (H-1A), and 0.5 parts of carbon black (manufactured by Mitsubishi Chemical Co., Ltd., "#966") are mixed and subjected to melt-kneading using a twin-screw extruder equipped with a vacuum vent of 30 mmφ (manufactured by Ikegai Inc., product name: PCM30) at 220° C. under a vacuum condition of 93.325 kPa, thereby producing a thermoplastic resin composition (1A). The measurement result of MVR with respect to the obtained thermoplastic resin component (1A) is shown in Table 15A.

Separately from the above, 28 parts of the graft copolymer (D-1A), 72 parts of the styrene copolymer (H-1A), and 0.8 parts of carbon black (manufactured by Mitsubishi Chemical Co., Ltd., "#966") are mixed and subjected to melt-kneading using a twin-screw extruder equipped with a vacuum vent of 30 mmφ (manufactured by Ikegai Inc., product name: PCM30) at 220° C. under a vacuum condition of 93.325 kPa, thereby producing a thermoplastic resin composition (2A).

The each of thermoplastic resin compositions (1A) and (2A) was pelletized, and each molded articles was produced, and flexural modulus of the obtained molded articles was measured, and impact resistance, glossiness, coloration and scratch resistance were evaluated. The results are shown in Table 15A.

Examples 2A to 26A

The thermoplastic resin compositions (1A) and (2A) were prepared in the same manner as in Example 1A except that the type of graft copolymer (D) was changed as indicated in Tables 15A to 17A, and then MVR was measured. The each of thermoplastic resin compositions (1A) and (2A) was molded, and flexural modulus of the obtained molded article was measured, and impact resistance, glossiness, coloration and scratch resistance were evaluated. The results are shown in Tables 15A to 17A.

Examples 27A to 29A

The thermoplastic resin compositions (1A) and (2A) were prepared in the same manner as in Example 1A except that the type and amount of the hard component (J) were changed as indicated in Table 17A, and the melt-kneading condition was changed to 250° C. and 93.325 kPa. Then, MVR was measured. The each of thermoplastic resin compositions (1A) and (2A) was molded, and flexural modulus of the obtained molded article was measured, and impact resistance, glossiness, coloration and scratch resistance were evaluated. The results are shown in Table 17A.

Comparative Examples 1A to 6A

The thermoplastic resin compositions (1A) and (2A) were prepared in the same manner as in Example 1A except that the type of graft copolymer (D) was changed as indicated in Table 18A, and then MVR was measured. The each of thermoplastic resin compositions (1A) and (2A) was molded, and flexural modulus of the obtained molded article was measured, and impact resistance, glossiness, coloration and scratch resistance were evaluated. The results are shown in Table 18A.

TABLE 15A

| | | EXAMPLES | | | | | | | | | |
|---|---|---|---|---|---|---|---|---|---|---|---|
| | | 1A | 2A | 3A | 4A | 5A | 6A | 7A | 8A | 9A | 10A |
| GRAFT COPOLYMER (D) [PARTS BY MASS] | D-1A | 28 | 0 | 0 | 0 | 0 | 0 | 0 | 0 | 0 | 0 |
| | D-3A | 0 | 28 | 0 | 0 | 0 | 0 | 0 | 0 | 0 | 0 |
| | D-4A | 0 | 0 | 28 | 0 | 0 | 0 | 0 | 0 | 0 | 0 |
| | D-5A | 0 | 0 | 0 | 28 | 0 | 0 | 0 | 0 | 0 | 0 |
| | D-6A | 0 | 0 | 0 | 0 | 28 | 0 | 0 | 0 | 0 | 0 |
| | D-7A | 0 | 0 | 0 | 0 | 0 | 28 | 0 | 0 | 0 | 0 |
| | D-9A | 0 | 0 | 0 | 0 | 0 | 0 | 28 | 0 | 0 | 0 |
| | D-10A | 0 | 0 | 0 | 0 | 0 | 0 | 0 | 28 | 0 | 0 |
| | D-12A | 0 | 0 | 0 | 0 | 0 | 0 | 0 | 0 | 28 | 0 |
| | D-13A | 0 | 0 | 0 | 0 | 0 | 0 | 0 | 0 | 0 | 28 |
| HARD COMPONENT (J) [PARTS BY MASS] | J-1A | 72 | 72 | 72 | 72 | 72 | 72 | 72 | 72 | 72 | 72 |
| EVALUATION | MVR [cm$^3$ · 10 min] | 23 | 22 | 22 | 20 | 20 | 15 | 11 | 20 | 23 | 23 |
| | FLEXURAL MODULUS [MPa] | 2400 | 2380 | 2410 | 2400 | 2400 | 2390 | 2400 | 2390 | 2410 | 2400 |
| | CHARPY IMPACT STRENGTH [kJ/m$^2$] | 22 | 14 | 15 | 22 | 23 | 20 | 20 | 21 | 20 | 16 |
| | REFLECTION RATIO [%] | 95 | 94 | 95 | 94 | 93 | 90 | 93 | 94 | 94 | 93 |
| | COLORATION (L*) | 8.1 | 8.1 | 8.2 | 8.3 | 8.2 | 8.3 | 8.3 | 8.2 | 8.1 | 8.0 |
| | SCRATCH RESISTANCE (ΔL*) | 2.8 | 3.9 | 3.7 | 2.9 | 2.8 | 3.3 | 4.3 | 2.8 | 2.8 | 3.3 |
| | SCRATCH RESISTANCE (Rz jis) | 0.8 | 1.2 | 1.2 | 0.8 | 0.8 | 1.1 | 1.3 | 0.8 | 0.8 | 1.1 |

TABLE 16A

| | | EXAMPLES | | | | | | | | |
|---|---|---|---|---|---|---|---|---|---|---|
| | | 11A | 12A | 13A | 14A | 15A | 16A | 17A | 18A | 19A |
| GRAFT COPOLYMER (D) [PARTS BY MASS] | D-14A | 28 | 0 | 0 | 0 | 0 | 0 | 0 | 0 | 0 |
| | D-16A | 0 | 28 | 0 | 0 | 0 | 0 | 0 | 0 | 0 |
| | D-17A | 0 | 0 | 28 | 0 | 0 | 0 | 0 | 0 | 0 |
| | D-18A | 0 | 0 | 0 | 28 | 0 | 0 | 0 | 0 | 0 |
| | D-19A | 0 | 0 | 0 | 0 | 28 | 0 | 0 | 0 | 0 |
| | D-20A | 0 | 0 | 0 | 0 | 0 | 28 | 0 | 0 | 0 |
| | D-21A | 0 | 0 | 0 | 0 | 0 | 0 | 28 | 0 | 0 |
| | D-22A | 0 | 0 | 0 | 0 | 0 | 0 | 0 | 28 | 0 |
| | D-23A | 0 | 0 | 0 | 0 | 0 | 0 | 0 | 0 | 28 |
| HARD COMPONENT (J) [PARTS BY MASS] | J-1A | 72 | 72 | 72 | 72 | 72 | 72 | 72 | 72 | 72 |
| EVALUATION | MVR [cm$^3$ · 10 min] | 24 | 21 | 20 | 19 | 21 | 21 | 21 | 19 | 18 |
| | FLEXURAL MODULUS [MPa] | 2400 | 2400 | 2410 | 2410 | 2400 | 2370 | 2380 | 2400 | 2410 |
| | CHARPY IMPACT STRENGTH [kJ/m$^2$] | 15 | 11 | 11 | 21 | 22 | 23 | 22 | 17 | 15 |
| | REFLECTION RATIO [%] | 93 | 93 | 94 | 93 | 94 | 94 | 95 | 94 | 96 |
| | COLORATION (L*) | 8.1 | 9.3 | 9.9 | 8.5 | 8.4 | 8.3 | 8.2 | 8.1 | 8.1 |

TABLE 16A-continued

|  |  | EXAMPLES | | | | | | | | |
|---|---|---|---|---|---|---|---|---|---|---|
|  |  | 11A | 12A | 13A | 14A | 15A | 16A | 17A | 18A | 19A |
| SCRATCH RESISTANCE (ΔL*) | | 3.4 | 2.8 | 2.9 | 3.8 | 3.3 | 2.7 | 2.7 | 2.8 | 3.2 |
| SCRATCH RESISTANCE (Rz jis) | | 1.1 | 0.8 | 0.9 | 1.3 | 1.1 | 0.8 | 0.8 | 0.8 | 1.2 |

TABLE 17A

|  |  | EXAMPLES | | | | | | | | | |
|---|---|---|---|---|---|---|---|---|---|---|---|
|  |  | 20A | 21A | 22A | 23A | 24A | 25A | 26A | 27A | 28A | 29A |
| GRAFT COPOLYMER (D) [PARTS BY MASS] | D-1A | 0 | 0 | 0 | 0 | 0 | 0 | 0 | 28 | 28 | 28 |
| | D-25A | 28 | 0 | 0 | 0 | 0 | 0 | 0 | 0 | 0 | 0 |
| | D-26A | 0 | 28 | 0 | 0 | 0 | 0 | 0 | 0 | 0 | 0 |
| | D-27A | 0 | 0 | 28 | 0 | 0 | 0 | 0 | 0 | 0 | 0 |
| | D-28A | 0 | 0 | 0 | 28 | 0 | 0 | 0 | 0 | 0 | 0 |
| | D-29A | 0 | 0 | 0 | 0 | 28 | 0 | 0 | 0 | 0 | 0 |
| | D-30A | 0 | 0 | 0 | 0 | 0 | 28 | 0 | 0 | 0 | 0 |
| | D-32A | 0 | 0 | 0 | 0 | 0 | 0 | 28 | 0 | 0 | 0 |
| HARD COMPONENT (J) [PARTS BY MASS] | J-1A | 72 | 72 | 72 | 72 | 72 | 72 | 72 | 0 | 22 | 0 |
| | J-2A | 0 | 0 | 0 | 0 | 0 | 0 | 0 | 72 | 0 | 0 |
| | J-3A | 0 | 0 | 0 | 0 | 0 | 0 | 0 | 0 | 50 | 72 |
| EVALUATION | MVR [cm³ · 10 min] | 22 | 22 | 21 | 19 | 19 | 19 | 17 | 12 | 8 | 5 |
| | FLEXURAL MODULUS [MPa] | 2400 | 2390 | 2410 | 2390 | 2400 | 2400 | 2390 | 2400 | 2410 | 2380 |
| | CHARPY IMPACT STRENGTH [kJ/m²] | 13 | 15 | 20 | 22 | 15 | 14 | 17 | 12 | 31 | 39 |
| | REFLECTION RATIO [%] | 94 | 94 | 95 | 96 | 95 | 95 | 89 | 95 | 93 | 92 |
| | COLORATION (L*) | 9.8 | 9.0 | 8.2 | 8.1 | 8.2 | 8.1 | 8.2 | 8.9 | 9.8 | 10.5 |
| | SCRATCH RESISTANCE (ΔL*) | 4.5 | 3.8 | 2.9 | 2.8 | 3.6 | 4.3 | 4.6 | 2.9 | 2.8 | 2.9 |
| | SCRATCH RESISTANCE (Rz jis) | 1.5 | 1.3 | 0.8 | 0.8 | 1.2 | 1.5 | 1.5 | 0.9 | 0.8 | 0.8 |

TABLE 18A

|  |  | COMPARATIVE EXAMPLE | | | | | |
|---|---|---|---|---|---|---|---|
|  |  | 1A | 2A | 3A | 4A | 5A | 6A |
| GRAFT COPOLYMER (D) [PARTS BY MASS] | D-2A | 28 | 0 | 0 | 0 | 0 | 0 |
| | D-8A | 0 | 28 | 0 | 0 | 0 | 0 |
| | D-11A | 0 | 0 | 28 | 0 | 0 | 0 |
| | D-15A | 0 | 0 | 0 | 28 | 0 | 0 |
| | D-24A | 0 | 0 | 0 | 0 | 28 | 0 |
| | D-31A | 0 | 0 | 0 | 0 | 0 | 28 |
| HARD COMPONENT (J) [PARTS BY MASS] | J-1A | 72 | 72 | 72 | 72 | 72 | 72 |
| EVALUATION | MVR [cm³ · 10 min] | 22 | 5 | 22 | 21 | 21 | 20 |
| | FLEXURAL MODULUS [MPa] | 2380 | 2380 | 2390 | 2410 | 2400 | 2420 |
| | CHARPY IMPACT STRENGTH [kJ/m²] | 8 | 19 | 9 | 7 | 6 | 7 |
| | REFLECTION RATIO [%] | 96 | 87 | 95 | 94 | 94 | 95 |
| | COLORATION (L*) | 8.2 | 8.8 | 8.3 | 8.2 | 12.8 | 8.2 |
| | SCRATCH RESISTANCE (ΔL*) | 7.4 | 3.5 | 7.1 | 4.1 | 8.2 | 7.3 |
| | SCRATCH RESISTANCE (Rz jis) | 3.8 | 1.2 | 3.6 | 1.4 | 3.9 | 3.6 |

As is obvious from the Tables 15A to 17A, the thermoplastic resin compositions obtained in every Examples exhibited excellent fluidity. The molded articles obtained in every Examples exhibited excellent impact resistance, glossiness, coloration and scratch resistance.

When the graft copolymer (D) according to the first aspect of the present invention is used, a thermoplastic resin component having excellent fluidity can be obtained and a molded article having excellent impact resistance, scratch resistance, glossiness and coloration can be obtained. The graft copolymer can be applied for vehicle interior parts, vehicle exterior parts, office equipment, consumer electronics, or building materials.

As apparent from the Table 18A, in Comparative Example 1A using the graft copolymer (D-2A) prepared from the ethylene.propylene copolymer (A-2A) having the mass average molecular weight (Mw) of less than $17 \times 10^4$ as a component (A), impact resistance and scratch resistance of the molded article were deteriorated.

In Comparative Example 2A using the graft copolymer (D-8A) prepared from the ethylene.propylene copolymer (A-8A) having the mass average molecular weight of greater than $35 \times 10^4$ was used as a component (A), fluidity of the thermoplastic resin composition was reduced significantly, and glossiness of the molded article was deteriorated.

In Comparative Example 3A using the graft copolymer (D-11A) prepared from the ethylene.propylene copolymer (A-11A) having a distribution of molecular weight (Mw/Mn) of greater than 3 as a component (A), impact resistance and scratch resistance of the molded article were deteriorated.

In Comparative Example 4A in which the graft copolymer (D-15A) prepared from the ethylene.propylene.non-conjugated diene copolymer (A-15A) as a component (A) was used, impact resistance of the molded article was low level.

In Comparative Example 5A in which graft copolymer (D-24A) prepared from the cross-linked ethylene.α-olefin copolymer (C-24A) having a gel content ratio of less than 35% by mass as a cross-linked ethylene.α-olefin copolymer (C) was used, impact resistance, coloration, and scratch resistance of the molded article were deteriorated. In Comparative Example 6A in which graft copolymer (D-31A) prepared from cross-linked ethylene.α-olefin copolymer (C-31A) having a gel content ratio of greater than 75% by mass as a cross-linked ethylene.α-olefin copolymer (C), impact resistance, coloration, and scratch resistance of the molded article were deteriorated.

<Measurement Method of Volume Average Particle Diameter 2>

The volume average particle diameter (MV) was measured using microtrac (product name: nanotrac 150, manufactured by Nikkiso Co., Ltd.) and pure water as a solvent used in measurement.

By image processing of electron micrographs, it was confirmed that the volume average particle diameter of ethylene.α-olefin copolymer (A) dispersed in the olefin resin aqueous dispersion (B) and the volume average particle diameter of cross-linked ethylene.α-olefin copolymer (C) dispersed in the aqueous dispersion correspond to the volume average particle diameter of ethylene.α-olefin copolymer (A) and the volume average particle diameter of cross-linked ethylene.α-olefin copolymer (C) respectively, in the thermoplastic resin composition.

<Melt-Kneading 3>

A graft copolymer (D), a methacrylic ester resin (G) and if necessary, the other component were mixed in the ratio as indicated in 22B to 31B, and subjected to melt-kneading using a twin-screw extruder equipped with a vacuum vent of 30 mmϕ (manufactured by Ikegai Inc., product name: PCM30) at the cylinder temperature of 200 to 260° C. under a vacuum condition of 93.325 kPa, thereby obtaining a thermoplastic resin composition. After melting and kneading, if necessary, the thermoplastic resin was pelletized using a pelletizer ("SH-type pelletizer, manufactured by So-ken-sha).

<Injection Molding 3>

By treating the pellet obtained by melt-kneading of the thermoplastic resin composition, using an injection molding machine (manufactured by Toshiba Machine Co., Ltd., "IS55FP-1.5A") under the condition where the cylinder temperature was 200 to 260° C. and the mold temperature was 60° C., a plane plate (10 cm×10 cm) having a thickness of 2 mm as a test piece for evaluation of Charpy impact strength and evaluation of flexural modulus was obtained.

<Evaluation of Impact Resistance: Charpy Impact Test>

With respect to the test pieces, in accordance with ISO 179 standard, Charpy impact test in the presence of notch was conducted at 23° C. to measure Charpy impact strength.

<Evaluation of Heat Resistance>

In accordance with ISO test method 75 standard, deflection temperature under load was measured at 1.83 MPa and 4 mm, by a flat wise method.

<Evaluation of Glossiness 2>

With respect to the plane board having a thickness of 2 mm, the glossiness was measured under the conditions of the incident angle of 60° and the reflection angle of 60° using a digital variable angle gloss meter (manufactured by Suga Test Instruments Co., product name: UGV-5D).

<Evaluation of Coloration>

0.8 parts of carbon black was added to 100 parts of thermoplastic resin composition to color the composition, a black-colored board (molded article (Ma) of 100×100 mm (thickness: 2 mm) was obtained by injection molding.

With respect to the molded article (Ma), using a pectrophotometer (manufactured by Konica Minolta Optics, Inc., "CM-3500d"), Luminosity L* was measured in accordance with SCE method. The L*measured in accordance with the aforementioned manner indicates as "L*(ma)". As the value of L* becomes smaller, the molded article becomes darker color, and the coloration of the molded article becomes excellent.

<Evaluation of Scratch Resistance>

Using a pencil hardness test machine, a pencil having a hardness of 3H was pressed against the surface of the molded article while applying a load of 750 g, and the molded article (Ma) was slid 5 cm while keeping the state so as to scratch the surface of the molded article (Ma) by the pencil, and the molded article (Ma) was scratched. Luminosity L* of the scratched molded article (Mb) was measured in accordance with SCE method using a spectrophotometer. The L* measured in accordance with the aforementioned manner indicates as "L*(mb)".

(Evaluation Results of Scratch Resistance 1)

The evaluation index ΔL* of the easily noticeable scratches of the molded article (Mb) was calculated in accordance with the following equation (3). The larger absolute value of ΔL*(mb−ma) means that the scratch is easily noticeable.

$$\Delta L^*(mb-ma)=L^*(mb)-L^*(ma) \quad (3)$$

When the absolute value of ΔL*(mb−ma) is 3.0 or less, the scratch is not noticeable and the appearance of the molded article is not impaired.

When the absolute value of ΔL*(mb−ma) is greater than 3.0 and not more than 7.0, the scratch is little noticeable and the appearance of the molded article is not impaired.

When the absolute value of ΔL*(mb−ma) is greater than 7.0, the scratch is noticeable and the appearance of the molded article is impaired.

(Evaluation Results of Scratch Resistance 2)

As determination index of ease of scratching of the molded article (Ma), using a shape measurement laser microscope (manufactured by Keyence Corp., "VK-9700"), 10-point average roughness (Rz jis) of the molded article (Mb) was measured. The larger value of Rz jis means that the molded article is easily scratched.

<Evaluation of Abrasion Resistance>

As shown in FIG. 1, a jig 10 having a rod shape and having a tip portion 11 formed in a substantially hemispherical shape was set, and the tip portion was covered with a laminated sheet 12 having 8 sheets of gauze piled. The tip portion 11 covered with a laminated sheet 12 was brought into contact with the surface of the molded article (Ma) 13, such that the angle between the surface of the molded article (Ma) 13 and the jig 10 having a rod shape becomes right angle. Then, the tip portion 11 is slid to a horizontal direction on the surface of the molded article (Ma2) 13 (direction of double-headed arrow in FIG. 1), and reciprocated 100 times. The load to be applied was set to 1 kg. After the tip portion was reciprocated 100 times, luminosity L* of the scratched molded article (Mc) was measured in accordance with SCE method using a spectrophotometer. The L* measured in accordance with the aforementioned manner indicates as "L(mc)".

(Evaluation Results of Abrasion Resistance 1)

The determination index ΔL* of the easily noticeable scratches in the molded article (Mc) was calculated in accordance with the following equation (4). The larger absolute value of ΔL*(mc−ma) means that the scratch is easily noticeable.

$$\Delta L^*(mc-ma)=L^*(mc)-L^*(ma) \qquad (4)$$

When the absolute value of ΔL*(mc−ma) is 3.0 or less, the scratch is not noticeable and the appearance of the molded article is not impaired.

When the absolute value of ΔL*(mc−ma) is greater than 3.0 and not more than 7.0, the scratch is little noticeable and the appearance of the molded article is not impaired.

When the absolute value of ΔL*(mc−ma) is greater than 7.0, the scratch is noticeable and the appearance of the molded article is impaired.

(Evaluation Results of Abrasion Resistance 2)

As determination index of ease of scratching of the molded article (Ma), using a shape measurement laser microscope (manufactured by Keyence Corp., "VK-9700"), 10-point average roughness (Rz jis) of the molded article (Mc) was measured. The larger value of Rz jis means that the molded article is easily scratched.

<Each Components>

In the following examples, an ethylene.α-olefin copolymer (A), olefin resin aqueous dispersion (B), cross-linked ethylene.α-olefin copolymer (C), graft copolymer (D), methacrylic ester resin (G) and styrene-based copolymer (H) were used as follows.

<Ethylene.α-Olefin Copolymer (A)>

(Preparation of ethylene.propylene copolymer (A-1B))

After the inner gas of a 20 L stainless-steel polymerization vessel equipped with a stirrer were purged with nitrogen, 10 L of dehydrated and purified hexane was fed into the vessel, 8.0 mmol/L hexane solution of ethyl aluminum sesquichloride $(Al(C_2H_5)_{1.5} \cdot Cl_{1.5})$ was supplied at 5 L/h over 1 hour, and then, 0.8 mmol/L hexane solution of $VO(OC_2H_5)Cl_2$ as a catalyst and hexane were continuously supplied at 5 L/h and 5 L/h respectively. From the top of the polymerization vessel, the polymerization solution was continuously taken out from the vessel, so that the amount of the polymerization solution maintained up to 10 L. Using a bubbling tube, ethylene, propylene and hydrogen are supplied at 2000 L/h, 1000 L/h and 8 L/h respectively, and polymerization reaction was conducted at 35° C.

A polymerization reaction was conducted in the aforementioned manner, and polymerization solution containing an ethylene.propylene copolymer (A-1B) was obtained. The obtained polymerization solution was subjected to decalcification using hydrochloric acid, and poured into methanol to precipitate the product, and then the precipitate was dried, thereby obtaining the ethylene.propylene copolymer (A-1B). The polymer profiles of the ethylene.propylene copolymer (A-1B) are shown in Table 1.

(Preparation of Ethylene.Propylene Copolymers (A-2B) to (A-8B))

Ethylene.propylene copolymers (A-2B) to (A-8B) were obtained in the same manner as in the preparation of ethylene.propylene copolymer (A-1B) except that the supply amount of hydrogen was changed as indicated in Tables 1B and 211 The polymer profiles of ethylene.propylene copolymers (A-2B) to (A-8B) are shown in Tables 1A and 2B.

(Preparation of Ethylene.Propylene Copolymer (A-9B))

After the inner gas of a 20 L stainless-steel polymerization vessel equipped with a stirrer was purged with nitrogen, 10 L of hexane was fed to the vessel, and 110 L of propylene (in a standard state) and 800 mL of hydrogen gas were added thereto. After heating to 40° C., pressure was applied by ethylene, so that total pressure became 0.6 MPa[gage].

When the inner pressure became 0.6 MPa[gage], 10 mL of 1.0 mM/mL hexane solution of triisobutylaluminum (TIBA) was injected into the autoclave by nitrogen gas. 30 mL of toluene solution containing 0.16 mM of triphenylcarbenium (tetrakispentafluorophenyl) borate in terms of boron and 0.0004 mM of [dimethyl(t-butylamido) (tetramethyl-η5-cyclopentadienyl) silane] titanium chloride, which were prepared in advance, was injected with nitrogen to initiate polymerization. Then, the temperature was adjusted to 40° C. over 5 minutes, and ethylene was supplied so that the pressure became 0.6 MPa[gage]. After 5 minutes from starting the polymerization, 50 mL of methanol was added in order to stop the polymerization, and depressurization was conducted so as to be atmospheric pressure, thereby obtaining polymeric solution of an ethylene.propylene copolymer (A-9B). The obtained polymerization solution was subjected to decalcification by hydrochloric acid, and poured into methanol to precipitate the product, and then the precipitate was dried, thereby obtaining the ethylene.propylene copolymer (A-9A). The polymer profiles of the ethylene.propylene copolymer (A-9B) are shown in Table 4B.

(Preparation of Ethylene.Propylene Copolymer (A-10B))

20 parts of ethylene.propylene copolymer (A-1B) and 80 parts of ethylene.propylene copolymer (A-9B) were mixed and subjected to melt-kneading using a twin-screw extruder equipped with a vacuum vent of 30 mmφ) (manufactured by Ikegai Inc., product name: PCM30) at 200° C. under a vacuum condition of 93.325 kPa, thereby producing an ethylene.propylene copolymer (A-10B). The polymer profiles of the ethylene.propylene copolymer (A-10B) are shown in Table 4B.

(Preparation of Ethylene.Propylene Copolymer (A-11B))

An ethylene.propylene copolymer (A-11B) was obtained in the same manner as in the preparation of the ethylene.propylene copolymer (A-1B), except that $VCl_4$ was used as a catalyst instead of $VO(OC_2H_5)Cl_2$. The polymer profiles of the ethylene propylene copolymer (A-11B) are shown in Table 2B.

(Preparation of Ethylene.Propylene Copolymer (A-12B))

75 parts of the ethylene.propylene copolymer (A-1B) and 25 parts of the ethylene.propylene copolymer (A-11B) were mixed and subjected to melt-kneading using a twin-screw extruder equipped with a vacuum vent of 30 mmφ (manufactured by Ikegai Inc., product name: PCM30) at 200° C. under a vacuum condition of 93.325 kPa, thereby producing an ethylene.propylene copolymer (A-12B). The polymer profiles of the ethylene propylene copolymer (A-12B) are shown in Table 4B.

(Preparation of Ethylene.Propylene Copolymer (A-13B))

50 parts of the ethylene.propylene copolymer (A-1B) and 50 parts of the ethylene.propylene copolymer (A-11B) were mixed and subjected to melt-kneading using a twin-screw extruder equipped with a vacuum vent of 30 mmϕ (manufactured by Ikegai Inc., product name: PCM30) at 200° C. under a vacuum condition of 93.325 kPa, thereby producing an ethylene.propylene copolymer (A-13B). The polymer profiles of the ethylene.propylene copolymer (A-13B) are shown in Table 4B.

(Preparation of Ethylene.Propylene Copolymer (A-14B))

20 parts of the ethylene.propylene copolymer (A-1B) and 80 parts of the ethylene.propylene copolymer (A-11B) were mixed and subjected to melt-kneading using a twin-screw extruder equipped with a vacuum vent of 30 mmϕ (manufactured by Ikegai Inc., product name: PCM30) at 200° C. under a vacuum condition of 93.325 kPa, thereby producing an ethylene propylene copolymer (A-14B). The polymer profiles of the ethylene.propylene copolymer (A-14B) are shown in Table 4B.

(Preparation of Ethylene.Propylene Copolymers (A-15B) to (A-20B))

Ethylene.propylene copolymers (A-15B) to (A-20B) were obtained in the same manner as in the preparation of the ethylene.propylene copolymer (A-1B) except that the supply amounts of ethylene, propylene and hydrogen were changed as indicated in Table 3B. The polymer profiles of ethylene.propylene copolymers (A-15A) to (A-20A) are shown in Table 3B.

TABLE 1B

| | | ETHYLENE•α-OLEFIN COPOLYMER (A) | | | | | |
|---|---|---|---|---|---|---|---|
| | | A-1B | A-2B | A-3B | A-4B | A-5B | A-6B |
| POLYMERIZATION CONDITIONS | ETHYLENE (L/h) | 2,000 | 2,000 | 2,000 | 2,000 | 2,000 | 2,000 |
| | PROPYLENE (L/h) | 1,000 | 1,000 | 1,000 | 1,000 | 1,000 | 1,000 |
| | HYDROGEN (L/h) | 8 | 100 | 80 | 22 | 12 | 6 |
| POLYMER PROPERTIES | ETHYLENE UNIT CONTENT (PARTS) | 56 | 56 | 56 | 56 | 56 | 56 |
| | PROPYLENE UNIT CONTENT (PARTS) | 44 | 44 | 44 | 44 | 44 | 44 |
| | WEIGHT AVERAGE MOLECULAR WEIGHT ($\times 10^4$) | 30 | 15 | 17 | 24 | 26 | 32 |
| | DISTRIBUTION OF MOLECULAR WEIGHT (Mw/Mn) | 2.2 | 2.1 | 2.2 | 2.2 | 2.3 | 2.2 |

TABLE 2B

| | | ETHYLENE•α-OLEFIN COPOLYMER (A) | | |
|---|---|---|---|---|
| | | A-7B | A-8B | A-11B |
| POLYMERIZATION CONDITIONS | ETHYLENE (L/h) | 2,000 | 2,000 | 2,000 |
| | PROPYLENE (L/h) | 1,000 | 1,000 | 1,000 |
| | HYDROGEN (L/h) | 4 | 1.5 | 8 |
| POLYMER PROPERTIES | ETHYLENE UNIT CONTENT (PARTS) | 56 | 56 | 56 |
| | PROPYLENE UNIT CONTENT (PARTS) | 44 | 44 | 44 |
| | WEIGHT AVERAGE MOLECULAR WEIGHT ($\times 10^4$) | 35 | 38 | 30 |
| | DISTRIBUTION OF MOLECULAR WEIGHT (Mw/Mn) | 2.2 | 2.2 | 3.2 |

TABLE 3B

| | | ETHYLENE•α-OLEFIN COPOLYMER (A) | | | | | |
|---|---|---|---|---|---|---|---|
| | | A-15B | A-16B | A-17B | A-18B | A-19B | A-20B |
| POLYMERIZATION CONDITIONS | ETHYLENE (L/h) | 1,500 | 1,700 | 1,900 | 2,100 | 2,200 | 2,250 |
| | PROPYLENE (L/h) | 1,500 | 1,300 | 1,100 | 900 | 800 | 750 |
| | HYDROGEN (L/h) | 3 | 6 | 7 | 9 | 20 | 30 |
| POLYMER PROPERTIES | ETHYLENE UNIT CONTENT (PARTS) | 42 | 45 | 50 | 60 | 65 | 68 |
| | PROPYLENE UNIT CONTENT (PARTS) | 58 | 55 | 50 | 40 | 35 | 32 |
| | WEIGHT AVERAGE MOLECULAR WEIGHT ($\times 10^4$) | 28 | 28 | 29 | 30 | 31 | 31 |
| | DISTRIBUTION OF MOLECULAR WEIGHT (Mw/Mn) | 2.2 | 2.1 | 2.2 | 2.3 | 2.2 | 2.2 |

TABLE 4B

|  |  | ETHYLENE·α-OLEFIN COPOLYMER (A) | | | | |
|---|---|---|---|---|---|---|
|  |  | A-9B | A-10B | A-12B | A-13B | A-14B |
| POLYMER PROPERTIES | ETHYLENE UNIT CONTENT (PARTS) | 56 | 56 | 56 | 56 | 56 |
|  | PROPYLENE UNIT CONTENT (PARTS) | 44 | 44 | 44 | 44 | 44 |
|  | WEIGHT AVERAGE MOLECULAR WEIGHT ($\times 10^4$) | 30 | 30 | 30 | 30 | 30 |
|  | DISTRIBUTION OF MOLECULAR WEIGHT (Mw/Mn) | 1.8 | 1.9 | 2.5 | 2.7 | 3.0 |

<Olefin Resin Aqueous Dispersion (B)>
<Preparation of Olefin Resin Aqueous Dispersion (B-1B)>

100 parts of ethylene.propylene copolymer (A-1B), 20 parts of maleic anhydride-modified polyethylene (manufactured by Mitsui Chemicals, Inc., "Mitsui Hi-WAX 2203A"), the weight average molecular weight: 2,700, acid value: 30 mg/g) as an acid-modified olefin polymer, and 4 parts of potassium oleate as an anion-type emulsifier were mixed.

Next, the mixture was supplied from a hopper of a twin screw extruder (manufactured by Ikegai Inc., product name: "PCM-30", L/D=40) at 4 kg/hour, and heated to 220° C. while 14% aqueous solution of potassium hydroxide was continuously supplied at 240 g/hour to conduct melt-kneading, and then the resulting melt-kneaded product was extruded. The melt-kneaded product was continuously supplied to a cooling device which was attached to the tip of the extruder, and then cooled to 90° C. The obtained solid was poured into hot water at 80° C. and continuously dispersed, thereby obtaining an olefin resin aqueous dispersion (B-1B) having the volume average particle diameter of 0.25 μm.

<Preparation of Olefin Resin Aqueous Dispersions (B-2B) to (B-20B)>

Olefin resin aqueous dispersions (B-2B) to (B-20B) were obtained in the same manner as in the preparation of the olefin resin aqueous dispersion (B-1B), except that the components (A-2B) to (A-20B) were used as a component (A) instead of the component (A-1B) as indicated in Table 2B.

Each of the volume average particle diameters of ethylene.α-olefin copolymer (A) dispersed in olefin resin aqueous dispersions (B-1B) to (B-20B) are shown in tables 5B and 7B.

TABLE 5B

|  |  | OLEFIN RESIN AQUEOUS DISPERSION (B) | | | | | | | |
|---|---|---|---|---|---|---|---|---|---|
|  |  | B-1B | B-2B | B-3B | B-4B | B-5B | B-6B | B-7B | B-8B |
| ETHYLENE·α-OLEFIN COPOLYMER (A) (PARTS) | A-1B | 100 | | | | | | | |
|  | A-2B | | 100 | | | | | | |
|  | A-3B | | | 100 | | | | | |
|  | A-4B | | | | 100 | | | | |
|  | A-5B | | | | | 100 | | | |
|  | A-6B | | | | | | 100 | | |
|  | A-7B | | | | | | | 100 | |
|  | A-8B | | | | | | | | 100 |
| VOLUME MEAN DIAMETER (μm) |  | 0.25 | 0.24 | 0.24 | 0.25 | 0.25 | 0.25 | 0.26 | 0.26 |

TABLE 6B

|  |  | OLEFIN RESIN AQUEOUS DISPERSION (B) | | | | | |
|---|---|---|---|---|---|---|---|
|  |  | B-9B | B-10B | B-11B | B-12B | B-13B | B-14B |
| ETHYLENE·α-OLEFIN COPOLYMER (A) (PARTS) | A-9B | 100 | | | | | |
|  | A-10B | | 100 | | | | |
|  | A-11B | | | 100 | | | |
|  | A-12B | | | | 100 | | |
|  | A-13B | | | | | 100 | |
|  | A-14B | | | | | | 100 |
| VOLUME MEAN DIAMETER (μm) |  | 0.26 | 0.25 | 0.25 | 0.25 | 0.25 | 0.25 |

TABLE 7B

|  |  | OLEFIN RESIN AQUEOUS DISPERSION (B) | | | | | |
|---|---|---|---|---|---|---|---|
|  |  | B-15B | B-16B | B-17B | B-18B | B-19B | B-20B |
| ETHYLENE·α-OLEFIN COPOLYMER (A) (PARTS) | A-15B | 100 | | | | | |
|  | A-16B | | 100 | | | | |
|  | A-17B | | | 100 | | | |
|  | A-18B | | | | 100 | | |
|  | A-19B | | | | | 100 | |
|  | A-20B | | | | | | 100 |
| VOLUME MEAN DIAMETER (μm) |  | 0.25 | 0.25 | 0.25 | 0.25 | 0.25 | 0.26 |

<Cross-Linked Ethylene.α-Olefin Copolymer (C)>
<Preparation of Cross-Linked Ethylene.α-Olefin Copolymer (C-1B)>

Ion exchanged water was added to a olefin resin aqueous dispersion (B-1B)(100 pars in terms of a solid content), such that the solid content ratio was adjusted to 35%, 0.5 parts t-butyl cumyl peroxide as an organic peroxide, and 1 part of divinylbenzene as a polyfunctional compound were added to the mixture, and reacted at 130° C. for 5 hours, thereby producing a cross-linked.α-olefin copolymer (C-1B). The gel content ratio of the cross-linked ethylene.α-olefin copolymer (C-1B) was measured as 51%. The results are shown in Table 8B.

<Preparation of Cross-Linked Ethylene.α-Olefin Copolymers (C-2B) to (C-15B)>

Cross-linked ethylene.α-olefin copolymers (C-2B) to (C-15B) were obtained in the same manner as in the preparation of the cross-linked ethylene.α-olefin copolymer (C-1B) except that the type of the olefin resin aqueous dispersion (B) and the amount of the t-butyl cumyl peroxide were changed as indicated in Table 8B. The gel content ratios of cross-linked ethylene.α-olefin copolymers (C-2B) to (C-15B) are shown in Table 8B.

<Preparation of Cross-Linked Ethylene.α-Olefin Copolymers (C-16B) to (C-24B)>

Cross-linked ethylene.α-olefin copolymers (C-16B) to (C-24B) were obtained in the same manner as in the preparation of the cross-linked ethylene.α-olefin copolymer (C-1B) except that the amount of the t-butyl cumyl peroxide was changed as indicated in Tables 9B and 10B. The gel content ratios of cross-linked ethylene.α-olefin copolymers (C-16B) to (C-24B) are shown in Tables 9B and 10B.

TABLE 8B

| | | CROSS-LINKED ETHYLENE•α-OLEFIN COPOLYMER (C) | | | | | | | | |
|---|---|---|---|---|---|---|---|---|---|---|
| | | C-1B | C-2B | C-3B | C-4B | C-5B | C-6B | C-7B | C-8B | C-9B |
| OLEFIN RESIN AQUEOUS DISPERSION (B) (SOLID CONTENT) (PARTS) | B-1B | 100 | | | | | | | | |
| | B-2B | | 100 | | | | | | | |
| | B-3B | | | 100 | | | | | | |
| | B-7B | | | | 100 | | | | | |
| | B-8B | | | | | 100 | | | | |
| | B-9B | | | | | | 100 | | | |
| | B-10B | | | | | | | 100 | | |
| | B-11B | | | | | | | | 100 | |
| | B-14B | | | | | | | | | 100 |
| t-BUTYL CUMYL PEROXIDE (PARTS) | | 0.5 | 1.5 | 0.8 | 0.3 | 0.3 | 0.4 | 0.4 | 0.6 | 0.6 |
| DIVINYLBENZENE (PARTS) | | 1 | 1 | 1 | 1 | 1 | 1 | 1 | 1 | 1 |
| GEL CONTENT (%) | | 53 | 48 | 48 | 51 | 50 | 51 | 49 | 49 | 51 |

TABLE 9B

| | | CROSS-LINKED ETHYLENE•α-OLEFIN COPOLYMER (C) | | | | | |
|---|---|---|---|---|---|---|---|
| | | C-10B | C-11B | C-12B | C-13B | C-14B | C-15B |
| OLEFIN RESIN AQUEOUS DISPERSION (B) (SOLID CONTENT) (PARTS) | B-15B | 100 | | | | | |
| | B-16B | | 100 | | | | |
| | B-17B | | | 100 | | | |
| | B-18B | | | | 100 | | |
| | B-19B | | | | | 100 | |
| | B-20B | | | | | | 100 |
| t-BUTYL CUMYL PEROXIDE (PARTS) | | 0.4 | 0.4 | 0.5 | 0.5 | 0.5 | 0.6 |
| DIVINYLBENZENE (PARTS) | | 1 | 1 | 1 | 1 | 1 | 1 |
| GEL CONTENT (%) | | 53 | 50 | 52 | 49 | 48 | 52 |

TABLE 10B

| | | CROSS-LINKED ETHYLENE•α-OLEFIN COPOLYMER (C) | | | | | | | | |
|---|---|---|---|---|---|---|---|---|---|---|
| | | C-16B | C-17B | C-18B | C-19B | C-20B | C-21B | C-22B | C-23B | C-24B |
| OLEFIN RESIN AQUEOUS DISPERSION (B) (SOLID CONTENT) (PARTS) | B-1B | 100 | 100 | 100 | 100 | 100 | 100 | 100 | 100 | 100 |
| t-BUTYL CUMYL PEROXIDE (PARTS) | | 0.1 | 0.15 | 0.2 | 0.3 | 0.4 | 0.7 | 0.9 | 1.2 | 1.5 |
| DIVINYLBENZENE (PARTS) | | 1 | 1 | 1 | 1 | 1 | 1 | 1 | 1 | 1 |
| GEL CONTENT (%) | | 4 | 31 | 35 | 40 | 45 | 65 | 70 | 75 | 79 |

\<Graft Copolymer (D)\>

(Preparation of Graft Copolymer (D-1B))

The olefin resin aqueous dispersion (B-1B) (containing 70 parts of ethylene.propylene copolymer (A-1B) in terms of a solid content) was fed into a stainless-steel polymerization vessel equipped with a stirrer, ion exchanged water was added thereto such that the solid content ratio was adjusted to 30%, and then, 0.006 parts of ferrous sulfate, 0.3 parts of sodium pyrophosphate, and 0.35 parts of fructose were added, and the temperature was adjusted to 80° C. 23.4 parts of styrene, 6.6 parts of acrylonitrile and 0.6 parts of cumene hydroperoxide were continuously added over 150 minutes, and emulsion polymerization was conducted while maintaining a polymerization temperature at 80° C. After polymerization, an antioxidant was added to an aqueous dispersion containing a graft copolymer (D-1B), and solid was precipitated using sulfuric acid, and then, washing, dehydration and drying were conducted, thereby obtaining a powdery graft copolymer (D-1B). The graft ratio of the graft copolymer (D-1B) was measured as 30%. The results are shown in Table 11B.

(Preparation of Graft Copolymers (D-2B) to (D-14B))

Graft copolymers (D-2B) and (D-14B) were obtained in the same manner as in the preparation of the graft copolymer (D-1B) except that the type of the olefin resin aqueous dispersion (B) was changed as indicated in Tables 11B to 14B. The graft ratios of graft copolymers (D-2B) to (D-14B) are shown in Tables 11B to 14B.

(Preparation of Graft Copolymer (D-15B))

Into a stainless-steel polymerization vessel equipped with a stirrer, 70 parts of the ethylene.propylene copolymer (A-1B) and 300 parts of toluene were fed and dissolved uniformly while stirring for 1 hour at 70° C. After the inner gas was purged with nitrogen satisfactorily, 23.4 parts of styrene, 6.6 parts of acrylonitrile, 0.24 parts of t-dodecylmercaptane, and 0.22 parts of t-butylperoxyisopropyl monocarbonate were added, and the inner temperature was raised to 110° C., and reacted for 4 hours. The inner temperature was raised to 120° C. and reaction was conducted for 2 hours. After polymerization, the inner temperature was cooled to 100° C., 0.2 parts of octadecyl-3-(3,5-di-t-butyl-4-hydroxyphenol)-propionate was added to the reaction solution. The reaction mixture was taken out from the vessel, and unreacted materials and solvents were distilled by steam distillation. Then, using a twin-screw extruder equipped with a vacuum vent of 30 mmφ (manufactured by Ikegai Inc., product name: PCM30), volatiles were substantially volatilized at 220° C. under a vacuum condition of 93.325 kPa, and a pellet was formed, thereby obtaining a graft copolymer (D-15B). The graft ratio of the graft copolymer (D-15B) was measured as 26%. The results are shown in Table 14B.

(Preparation of Graft Copolymers (D-16B) to (D-39B))

Graft copolymers (D-16B) to (D-39B) were obtained in the same manner as in the preparation of the graft copolymer (D-1B) except that the olefin resin aqueous dispersion (B-1B) was changed to an aqueous dispersion containing an cross-linked ethylene.α-olefin copolymer (C) as indicated in Tables 15B to 18B. The graft ratios of graft copolymers (D-16B) to (D-39B) are shown in Tables 15B to 18B.

TABLE 11B

| | | GRAFT COPOLYMER (D) | | | |
|---|---|---|---|---|---|
| | | D-1B | D-2B | D-3B | D-4B |
| OLEFIN RESIN AQUEOUS DISPERSION (B)(SOLID CONTENT)(PARTS) | B-1B | 70 | | | |
| | B-2B | | 70 | | |
| | B-3B | | | 70 | |
| | B-4B | | | | 70 |
| VINYL-BASED MONOMER MIXTURE (m1)(PARTS) | STYRENE | 23.4 | 23.4 | 23.4 | 23.4 |
| | ACRYLONITRILE | 6.6 | 6.6 | 6.6 | 6.6 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO (%) | | 30 | 31 | 31 | 30 |

TABLE 12B

| | | GRAFT COPOLYMER (D) | | | |
|---|---|---|---|---|---|
| | | D-5B | D-6B | D-7B | D-8B |
| OLEFIN RESIN AQUEOUS DISPERSION (B)(SOLID CONTENT)(PARTS) | B-5B | 70 | | | |
| | B-6B | | 70 | | |
| | B-7B | | | 70 | |
| | B-8B | | | | 70 |
| VINYL-BASED MONOMER MIXTURE (m1)(PARTS) | STYRENE | 23.4 | 23.4 | 23.4 | 23.4 |
| | ACRYLONITRILE | 6.6 | 6.6 | 6.6 | 6.6 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO (%) | | 29 | 30 | 28 | 28 |

TABLE 13B

| | | GRAFT COPOLYMER (D) | | | |
|---|---|---|---|---|---|
| | | D-9B | D-10B | D-11B | D-12B |
| OLEFIN RESIN AQUEOUS DISPERSION (B)(SOLID CONTENT)(PARTS) | B-9B | 70 | | | |
| | B-10B | | 70 | | |
| | B-11B | | | 70 | |
| | B-12B | | | | 70 |
| VINYL-BASED MONOMER MIXTURE (m1)(PARTS) | STYRENE | 23.4 | 23.4 | 23.4 | 23.4 |
| | ACRYLONITRILE | 6.6 | 6.6 | 6.6 | 6.6 |
| GRAFT POLYMERIZATION METHOD | | EMULSION POLYMERI-ZATION | EMULSION POLYMERI-ZATION | EMULSION POLYMERI-ZATION | EMULSION POLYMERI-ZATION |
| GRAFT RATIO (%) | | 30 | 30 | 29 | 30 |

TABLE 14B

| | | GRAFT COPOLYMER (D) | | |
|---|---|---|---|---|
| | | D-13B | D-14B | D-15B |
| OLEFIN RESIN AQUEOUS DISPERSION (B)(SOLID CONTENT)(PARTS) | B-13B | 70 | | |
| | B-14B | | 70 | |
| ETHYLENE•α-OLEFIN COPOLYMER (A)(PARTS) | A-1B | | | 70 |
| VINYL-BASED MONOMER MIXTURE (m1)(PARTS) | STYRENE | 23.4 | 23.4 | 23.4 |
| | ACRYLONITRILE | 6.6 | 6.6 | 6.6 |
| GRAFT POLYMERIZATION METHOD | | EMULSION POLYMERI-ZATION | EMULSION POLYMERI-ZATION | EMULSION POLYMERI-ZATION |
| GRAFT RATIO (%) | | 29 | 29 | 26 |

TABLE 15B

| | | GRAFT COPOLYMER (D) | | | | | |
|---|---|---|---|---|---|---|---|
| | | D-16B | D-17B | D-18B | D-19B | D-20B | D-21B |
| AQUEOUS DISPERSION OF CROSS-LINKED ETHYLENE•α-OLEFIN COPOLYMER (C) (SOLID CONTENT) (PARTS) | C-1B | 70 | | | | | |
| | C-2B | | 70 | | | | |
| | C-3B | | | 70 | | | |
| | C-4B | | | | 70 | | |
| | C-5B | | | | | 70 | |
| | C-6B | | | | | | 70 |
| VINYL-BASED MONOMER MIXTURE (ml) (PARTS) | STYRENE | 23.4 | 23.4 | 23.4 | 23.4 | 23.4 | 23.4 |
| | ACRYLONITRILE | 6.6 | 6.6 | 6.6 | 6.6 | 6.6 | 6.6 |
| GRAFT POLYMERIZATION METHOD | | EMULSION POLYMER-IZATION | EMULSION POLYMER-IZATION | EMULSION POLYMER-IZATION | EMULSION POLYMER-IZATION | EMULSION POLYMER-IZATION | EMULSION POLYMER-IZATION |
| GRAFT RATIO (%) | | 30 | 29 | 30 | 29 | 30 | 30 |

TABLE 16B

| | | GRAFT COPOLYMER (D) | | | | | |
|---|---|---|---|---|---|---|---|
| | | D-22B | D-23B | D-24B | D-25B | D-26B | D-27B |
| AQUEOUS DISPERSION OF CROSS-LINKED ETHYLENE•α-OLEFIN COPOLYMER (C) (SOLID CONTENT) (PARTS) | C-7B | 70 | | | | | |
| | C-8B | | 70 | | | | |
| | C-9B | | | 70 | | | |
| | C-10B | | | | 70 | | |
| | C-11B | | | | | 70 | |
| | C-12B | | | | | | 70 |
| VINYL-BASED MONOMER MIXTURE (ml) (PARTS) | STYRENE | 23.4 | 23.4 | 23.4 | 23.4 | 23.4 | 23.4 |
| | ACRYLONITRILE | 6.6 | 6.6 | 6.6 | 6.6 | 6.6 | 6.6 |
| GRAFT POLYMERIZATION METHOD | | EMULSION POLYMER-IZATION | EMULSION POLYMER-IZATION | EMULSION POLYMER-IZATION | EMULSION POLYMER-IZATION | EMULSION POLYMER-IZATION | EMULSION POLYMER-IZATION |
| GRAFT RATIO (%) | | 29 | 30 | 30 | 28 | 29 | 30 |

TABLE 17B

| | | GRAFT COPOLYMER (D) | | | | | |
|---|---|---|---|---|---|---|---|
| | | D-28B | D-29B | D-30B | D-31B | D-32B | D-33B |
| AQUEOUS DISPERSION | C-13B | 70 | | | | | |
| OF CROSS-LINKED | C-14B | | 70 | | | | |
| ETHYLENE·α-OLEFIN | C-15B | | | 70 | | | |
| COPOLYMER(C) | C-16B | | | | 70 | | |
| (SOLID CONTENT) | C-17B | | | | | 70 | |
| (PARTS) | C-18B | | | | | | 70 |
| VINYL-BASED MONOMER | STYRENE | 23.4 | 23.4 | 23.4 | 23.4 | 23.4 | 23.4 |
| MIXTURE (ml) (PARTS) | ACRYLONITRILE | 6.6 | 6.6 | 6.6 | 6.6 | 6.6 | 6.6 |
| GRAFT POLYMERIZATION METHOD | | EMULSION POLYMER-IZATION | EMULSION POLYMER-IZATION | EMULSION POLYMER-IZATION | EMULSION POLYMER-IZATION | EMULSION POLYMER-IZATION | EMULSION POLYMER-IZATION |
| GRAFT RATIO (%) | | 30 | 29 | 30 | 30 | 30 | 29 |

TABLE 18B

| | | GRAFT COPOLYMER (D) | | | | | |
|---|---|---|---|---|---|---|---|
| | | D-34B | D-35B | D-36B | D-37B | D-38B | D-39B |
| AQUEOUS DISPERSION | C-19B | 70 | | | | | |
| OF CROSS-LINKED | C-20B | | 70 | | | | |
| ETHYLENE·α-OLEFIN | C-21B | | | 70 | | | |
| COPOLYMER (C) | C-22B | | | | 70 | | |
| (SOLID CONTENT) | C-23B | | | | | 70 | |
| (PARTS) | C-24B | | | | | | 70 |
| VINYL-BASED MONOMER | STYRENE | 23.4 | 23.4 | 23.4 | 23.4 | 23.4 | 23.4 |
| MIXTURE (ml) (PARTS) | ACRYLONITRILE | 6.6 | 6.6 | 6.6 | 6.6 | 6.6 | 6.6 |
| GRAFT POLYMERIZATION METHOD | | EMULSION POLYMER-IZATION | EMULSION POLYMER-IZATION | EMULSION POLYMER-IZATION | EMULSION POLYMER-IZATION | EMULSION POLYMER-IZATION | EMULSION POLYMER-IZATION |
| GRAFT RATIO (%) | | 29 | 30 | 30 | 29 | 29 | 29 |

<Methacrylic Ester Resin (G)>
<Preparation of Methacrylic Ester Resin (G-1B)>

150 parts of ion exchanged water, 99 parts of methyl methacrylate, 1 parts of methyl acrylate, 0.2 parts of 2,2'-azobis(isobutyronitrile), 0.25 parts of n-octyl mercaptane, 0.47 parts of calcium hydroxyapatite, and 0.003 parts of potassium alkenylsuccinate were fed into a stainless-steel polymerization vessel equipped with a stirrer. The inner temperature of the polymerization vessel was raised to 75° C., and reaction was conducted for 3 hours, and then the temperature was raised to 90° C. and reaction was conducted for 1 hour. The inner reaction product was taken out from the vessel, and washed using a centrifugal dehydrator, and then dried, thereby obtaining a methacrylic ester resin (G-1B). The monomers are shown in Table 19B.

<Preparation of Methacrylic Ester Resin (G-2B)>

150 parts of ion exchanged water, 82 parts of methyl methacrylate, 12 parts of N-phenylmaleimide, 6 parts of styrene, 0.2 parts of 2,2'-azobis(isobutyronitrile), 0.25 parts of n-octyl mercaptane and 0.7 parts of polyvinyl alcohol were fed into a stainless-steel polymerization vessel equipped with a stirrer. The inner temperature of the polymerization vessel was raised to 75° C., and reaction was conducted for 3 hours, and then the temperature was raised to 90° C. and reaction was conducted for 1 hour. The inner reaction product was taken out from the vessel, and washed using a centrifugal dehydrator, and then dried, thereby obtaining methacrylic ester resin (G-2B). The monomers are shown in Table 19B.

<Preparation of Methacrylic Ester Resins (G-3B) to (G-11B)>

Each of the methacrylic ester resins (G-3B) to (G-11B) was obtained in the same manner as in the preparation of the methacrylic ester resin (G-2B) except that the type of the vinyl-based monomer mixture (m3) was changed as indicated in Tables 19B or 2011

TABLE 19B

| | | METHACRYLIC ESTER RESIN (G) | | | | | |
|---|---|---|---|---|---|---|---|
| | | G-1B | G-2B | G-3B | G-4B | G-5B | G-6B |
| VINYL-BASED MONOMER MIXTURE (m3) (PARTS) | METHYL METHACRYLATE | 99 | 82 | 45 | 50 | 94 | 96 |
| | METHYL ACRYLATE | 1 | | | | | |
| | N-PHENYL MALEIMIDE | | 12 | 12 | 12 | 5 | 3 |
| | STYRENE | | 6 | 43 | 38 | 1 | 1 |

TABLE 20B

| | | METHACRYLIC ESTER RESIN (G) | | | | |
|---|---|---|---|---|---|---|
| | | G-7B | G-8B | G-9B | G-10B | G-11B |
| VINYL-BASED MONOMER MIXTURE (m3) (PARTS) | METHYL METHACRYLATE | 50 | 46 | 94 | 50 | 47 |
| | METHYL ACRYLATE | | | | | |
| | N-PHENYL MALEIMIDE | 49 | 53 | 5.5 | 5 | 5 |
| | STYRENE | 1 | 1 | 0.5 | 45 | 48 |

<Styrene-Based Copolymer (H)>

(Preparation of Styrene-Based Copolymer (H-1B))

120 parts of ion exchanged water, 0.1 parts of polyvinyl alcohol, 0.3 parts of 2,2'-azobis(isobutyronitrile), 25 parts of acrylonitrile, 75 parts of styrene and 0.35 parts of t-dodecylmercaptane were fed into a stainless-steel polymerization vessel equipped with a stirrer and purged with nitrogen gas, the starting temperature was set to 60° C., and reaction was conducted for 5 hours. The temperature was raised to 120° C. and reaction was conducted for 4 hours. The inner reaction product was taken out, thereby obtaining styrene-based copolymer (H-1B).

(Preparation of Styrene-Based Copolymer (H-2B))

150 parts of ion exchanged water, 7 parts of methyl methacrylate, 23 parts of acrylonitrile, 70 parts of styrene, 0.2 parts of 2,2'-azobis(isobutyronitrile), 0.25 parts of n-octyl mercaptane, 0.47 parts of calcium hydroxyapatite, and 0.003 parts of potassium alkenylsuccinate were fed into a stainless-steel polymerization vessel equipped with a stirrer, the inner temperature was raised up to 75° C., and reaction was conducted for 3 hours. The temperature was raised to 90° C., and after maintaining the temperature for 60 minutes, the reaction was completed. The inner reaction product was taken out, washing and dehydration using a centrifugal dehydrator were repeatedly conducted, and then the residue was dried, thereby obtaining styrene-based copolymer (H-2B).

(Preparation of Styrene-Based Copolymers (H-3B) to (H-6B))

Each of styrene-type copolymers (H-3B) to (H-6B) was obtained in the same manner as in the preparation of the styrene-type copolymer (H-2B) except that the amount of the vinyl-based monomer mixture (m4) was changed as indicated in Table 21B.

TABLE 21B

| | | STYRENE-BASED COPOLYMER (H) | | | | | |
|---|---|---|---|---|---|---|---|
| | | H-1B | H-2B | H-3B | H-4B | H-5B | H-6B |
| VINYL-BASED MONOMER MIXTURE (m4) (PARTS) | STYRENE | 75 | 70 | 68 | 41 | 22 | 55 |
| | ACRYLONITRILE | 25 | 23 | 22 | 14 | 8 | 15 |
| | METHYL METHACRYLATE | | 1 | 10 | 45 | 70 | |
| | N-PHENYL MALEIMIDE | | | | | | 30 |

Example 1B 24 parts of graft copolymer (D-1B), and 76 parts of methacrylic ester resin (G-1B) were mixed and subjected to melt-kneading using a twin-screw extruder equipped with a vacuum vent of 30 mmϕ (manufactured by Ikegai Inc., product name: PCM30) at 240° C. under a vacuum condition of 93.325 kPa, thereby producing a thermoplastic resin composition. The MVR of thermoplastic resin composition is shown in Table 22B.

The thermoplastic resin composition was pelletized, and each of molded articles was produced, and flexural modulus of the obtained molded article was measured, and impact resistance, heat resistance, glossiness, coloration, scratch resistance and abrasion resistance were evaluated. The results are shown in Table 22B.

Examples 2B to 33B

The thermoplastic resin composition was prepared in the same manner as in Example 1B except that the type of graft copolymer (D) was changed as indicated in Tables 22B to 27B, and then MVR was measured.

The thermoplastic resin composition was pelletized, and each of molded articles was produced, and flexural modulus of the obtained molded article was measured, and impact resistance, heat resistance, glossiness, coloration, scratch resistance and abrasion resistance were evaluated. The results are shown in Tables 22B to 27B.

Examples 34B to 56B

The thermoplastic resin composition was prepared in the same manner as in Example 1B except that the type and amount of the graft copolymer (D), methacrylic ester resin (G) and styrene-based composition (H) were changed as indicated in Tables 28B to 31B, and the melt-kneading condition was changed to 250° C. and 93.325 kPa. Then, MVR was measured.

The thermoplastic resin composition was pelletized, and each of molded articles was produced, and flexural modulus of the obtained molded article was measured, and impact resistance, heat resistance, glossiness, coloration, scratch resistance and abrasion resistance were evaluated. The results are shown in Tables 28B to 31B.

Comparative Examples 1B to 6B

The thermoplastic resin composition was prepared in the same manner as in Example 1B except that the type of graft copolymer (D) was changed as indicated in Table 32B, and then MVR was measured.

The thermoplastic resin composition was pelletized, and each of molded articles was produced, and flexural modulus of the obtained molded article was measured, and impact resistance, heat resistance, glossiness, coloration, scratch resistance and abrasion resistance were evaluated. The results are shown in Table 32B.

TABLE 22B

| | | | EXAMPLES | | | | | |
| --- | --- | --- | --- | --- | --- | --- | --- | --- |
| | | | 1B | 2B | 3B | 4B | 5B | 6B |
| FORMULATION(PARTS) | GRAFT COPOLYMER (D) | D-1B | 24 | | | | | |
| | | D-3B | | 24 | | | | |
| | | D-4B | | | 24 | | | |
| | | D-5B | | | | 24 | | |
| | | D-6B | | | | | 24 | |
| | | D-7B | | | | | | 24 |
| | METHACRYLIC ESTER RESIN (G) | G-1B | 76 | 76 | 76 | 76 | 76 | 76 |
| EVALUATION OF PHYSICAL PROPERTIES | FLEXURAL MODULUS | (MPa) | 2300 | 2310 | 2300 | 2300 | 2290 | 2300 |
| | CHARPY IMPACT STRENGTH | (kJ/m$^2$) | 6 | 4 | 4 | 6 | 6 | 6 |
| | MVR | (cm$^3$/10 min) | 10 | 10 | 10 | 10 | 10 | 8 |
| | HEAT RESISTANCE | (° C.) | 75 | 75 | 75 | 76 | 75 | 75 |
| | GLOSSINESS | | 88 | 89 | 89 | 88 | 88 | 84 |
| | COLORATION (L*) | | 6.1 | 6.3 | 6.3 | 6.3 | 6.3 | 6.3 |
| | SCRATCH RESISTANCE | ΔL*(mb − ma) | 3.4 | 3.3 | 3.3 | 3.3 | 3.3 | 3.3 |
| | | Rz jis | 2.2 | 2.2 | 2.3 | 2.3 | 2.3 | 2.2 |
| | ABRASION RESISTANCE | ΔL*(mc − ma) | 4.1 | 6.4 | 5.7 | 4.1 | 4.1 | 4.2 |
| | | Rz jis | 1.3 | 1.9 | 1.7 | 1.3 | 1.3 | 1.3 |

TABLE 23B

| | | | EXAMPLES | | | | | |
| --- | --- | --- | --- | --- | --- | --- | --- | --- |
| | | | 7B | 8B | 9B | 10B | 11B | 12B |
| FORMULATION(PARTS) | GRAFT COPOLYMER (D) | D-9B | 24 | | | | | |
| | | D-10B | | 24 | | | | |
| | | D-12B | | | 24 | | | |
| | | D-13B | | | | 24 | | |
| | | D-14B | | | | | 24 | |
| | | D-15B | | | | | | 24 |
| | METHACRYLIC ESTER RESIN (G) | G-1B | 76 | 76 | 76 | 76 | 76 | 76 |
| EVALUATION OF PHYSICAL PROPERTIES | FLEXURAL MODULUS | (MPa) | 2300 | 2310 | 2310 | 2300 | 2290 | 2310 |
| | CHARPY IMPACT STRENGTH | (kJ/m$^2$) | 6 | 6 | 6 | 4 | 4 | 6 |
| | MVR | (cm$^3$/10 min) | 5 | 9 | 10 | 11 | 11 | 10 |
| | HEAT RESISTANCE | (° C.) | 75 | 76 | 76 | 75 | 76 | 74 |
| | GLOSSINESS | | 88 | 88 | 89 | 88 | 88 | 83 |
| | COLORATION (L*) | | 6.4 | 6.3 | 6.3 | 6.2 | 6.4 | 6.3 |
| | SCRATCH RESISTANCE | ΔL*(mb − ma) | 3.3 | 3.4 | 3.4 | 3.3 | 3.3 | 3.3 |
| | | Rz jis | 2.2 | 2.5 | 2.3 | 2.4 | 2.4 | 2.4 |
| | ABRASION RESISTANCE | ΔL*(mc − ma) | 5.8 | 4.2 | 4.2 | 4.8 | 4.9 | 5.9 |
| | | Rz jis | 1.8 | 1.3 | 1.3 | 1.7 | 1.8 | 1.9 |

TABLE 24B

| | | | EXAMPLES | | | | | |
| --- | --- | --- | --- | --- | --- | --- | --- | --- |
| | | | 13B | 14B | 15B | 16B | 17B | 18B |
| FORMULATION(PARTS) | GRAFT COPOLYMER (D) | D-16B | 24 | | | | | |
| | | D-18B | | 24 | | | | |
| | | D-19B | | | 24 | | | |
| | | D-21B | | | | 24 | | |
| | | D-22B | | | | | 24 | |
| | | D-24B | | | | | | 24 |
| | METHACRYLIC ESTER RESIN (G) | G-1B | 76 | 76 | 76 | 76 | 76 | 76 |
| EVALUATION OF PHYSICAL PROPERTIES | FLEXURAL MODULUS | (MPa) | 2300 | 2310 | 2300 | 2290 | 2300 | 2300 |
| | CHARPY IMPACT STRENGTH | (kJ/m$^2$) | 12 | 8 | 11 | 10 | 12 | 7 |
| | MVR | (cm$^3$/10 min) | 10 | 10 | 6 | 4 | 8 | 10 |
| | HEAT RESISTANCE | (° C.) | 75 | 75 | 75 | 75 | 75 | 75 |
| | GLOSSINESS | | 88 | 84 | 87 | 87 | 88 | 88 |
| | COLORATION (L*) | | 5.1 | 5.2 | 5.3 | 5.2 | 5.1 | 5.2 |
| | SCRATCH RESISTANCE | ΔL*(mb − ma) | 2.9 | 3.0 | 3.0 | 3.0 | 2.9 | 2.9 |
| | | Rz jis | 2.0 | 2.0 | 2.0 | 2.0 | 1.9 | 2.0 |
| | ABRASION RESISTANCE | ΔL*(mc − ma) | 2.3 | 4.0 | 2.5 | 5.3 | 2.4 | 3.5 |
| | | Rz jis | 0.7 | 1.3 | 0.8 | 1.6 | 0.8 | 1.2 |

TABLE 25B

| | | | EXAMPLES | | | | |
|---|---|---|---|---|---|---|---|
| | | | 19B | 20B | 21B | 22B | 23B |
| FORMULATION(PARTS) | GRAFT COPOLYMER (D) | D-25B | 24 | | | | |
| | | D-26B | | 24 | | | |
| | | D-27B | | | 24 | | |
| | | D-28B | | | | 24 | |
| | | D-29B | | | | | 24 |
| | METHACRYLIC ESTER RESIN (G) | G-1B | 76 | 76 | 76 | 76 | 76 |
| EVALUATION OF PHYSICAL PROPERTIES | FLEXURAL MODULUS | (MPa) | 2300 | 2300 | 2310 | 2310 | 2300 |
| | CHARPY IMPACT STRENGTH | (kJ/m$^2$) | 9 | 10 | 12 | 12 | 8 |
| | MVR | (cm$^3$/10 min) | 10 | 10 | 10 | 10 | 10 |
| | HEAT RESISTANCE | (° C.) | 74 | 75 | 75 | 75 | 75 |
| | GLOSSINESS | | 88 | 89 | 88 | 89 | 88 |
| | COLORATION (L*) | | 5.3 | 5.3 | 5.4 | 5.4 | 5.3 |
| | SCRATCH RESISTANCE | ΔL*(mb − ma) | 2.9 | 2.8 | 2.8 | 2.8 | 2.8 |
| | | Rz jis | 2.1 | 2.1 | 2.1 | 2.1 | 2.1 |
| | ABRASION RESISTANCE | ΔL*(mc − ma) | 4.1 | 3.6 | 2.5 | 2.5 | 2.4 |
| | | Rz jis | 1.2 | 1.2 | 0.7 | 0.7 | 0.7 |

TABLE 26B

| | | | EXAMPLES | | | | | |
|---|---|---|---|---|---|---|---|---|
| | | | 24B | 25B | 26B | 27B | 28B | 29B |
| FORMULATION(PARTS) | GRAFT COPOLYMER (D) | D-30B | 24 | | | | | |
| | | D-31B | | 24 | | | | |
| | | D-32B | | | 24 | | | |
| | | D-33B | | | | 24 | | |
| | | D-34B | | | | | 24 | |
| | | D-35B | | | | | | 24 |
| | METHACRYLIC ESTER RESIN (G) | G-1B | 76 | 76 | 76 | 76 | 76 | 76 |
| EVALUATION OF PHYSICAL PROPERTIES | FLEXURAL MODULUS | (MPa) | 2290 | 2300 | 2300 | 2300 | 2310 | 2310 |
| | CHARPY IMPACT STRENGTH | (kJ/m$^2$) | 6 | 8 | 8 | 9 | 9 | 12 |
| | MVR | (cm$^3$/10 min) | 10 | 10 | 10 | 11 | 10 | 10 |
| | HEAT RESISTANCE | (° C.) | 76 | 75 | 75 | 75 | 75 | 75 |
| | GLOSSINESS | | 88 | 88 | 88 | 88 | 88 | 88 |
| | COLORATION (L*) | | 5.2 | 5.9 | 5.9 | 5.7 | 5.5 | 5.4 |
| | SCRATCH RESISTANCE | ΔL*(mb − ma) | 2.8 | 3.3 | 3.3 | 2.9 | 2.8 | 2.7 |
| | | Rz jis | 2.0 | 2.1 | 2.1 | 2.1 | 2.1 | 2.1 |
| | ABRASION RESISTANCE | ΔL*(mc − ma) | 2.5 | 3.6 | 3.1 | 2.7 | 2.5 | 2.4 |
| | | Rz jis | 0.7 | 1.1 | 0.9 | 0.8 | 0.7 | 0.7 |

TABLE 27B

| | | | EXAMPLES | | | |
|---|---|---|---|---|---|---|
| | | | 30B | 31B | 32B | 33B |
| FORMULATION (PARTS) | GRAFT COPOLYMER (D) | D-36B | 24 | | | |
| | | D-37B | | 24 | | |
| | | D-38B | | | 24 | |
| | | D-39B | | | | 24 |
| | METHACRYLIC ESTER RESIN (G) | G-1B | 76 | 76 | 76 | 76 |
| EVALUATION OF PHYSICAL PROPERTIES | FLEXURAL MODULUS | (MPa) | 2310 | 2300 | 2310 | 2300 |
| | CHARPY IMPACT STRENGTH | (kJ/m$^2$) | 12 | 9 | 8 | 7 |
| | MVR | (cm$^3$/10 min) | 10 | 10 | 10 | 10 |
| | HEAT RESISTANCE | (° C.) | 75 | 76 | 75 | 74 |
| | GLOSSINESS | | 89 | 88 | 88 | 87 |
| | COLORATION (L*) | | 5.4 | 5.3 | 5.4 | 5.5 |
| | SCRATCH RESISTANCE | Δ L*(mb-ma) | 2.8 | 2.8 | 2.8 | 2.8 |
| | | Rz jis | 2.1 | 2.1 | 2.1 | 2.1 |
| | ABRASION RESISTANCE | Δ L*(mc-ma) | 2.4 | 2.6 | 3.2 | 3.8 |
| | | Rz jis | 0.7 | 1.1 | 1.5 | 1.3 |

TABLE 28B

| | | | EXAMPLES | | | | | |
|---|---|---|---|---|---|---|---|---|
| | | | 34B | 35B | 36B | 37B | 38B | 39B |
| FORMULATION(PARTS) | GRAFT COPOLYMER (D) | D-16B | 24 | 24 | 24 | 24 | 24 | 24 |
| | METHACRYLIC ESTER RESIN (G) | G-2B | 76 | | | | | |
| | | G-3B | | 76 | | | | |
| | | G-4B | | | 76 | | | |
| | | G-5B | | | | 76 | | |
| | | G-6B | | | | | 76 | |
| | | G-7B | | | | | | 76 |
| EVALUATION OF PHYSICAL PROPERTIES | FLEXURAL MODULUS | (MPa) | 2310 | 2310 | 2310 | 2300 | 2310 | 2310 |
| | CHARPY IMPACT STRENGTH | (kJ/m$^2$) | 5 | 6 | 6 | 8 | 8 | 5 |
| | MVR | (cm$^3$/10 min) | 4 | 4 | 4 | 8 | 8 | 4 |
| | HEAT RESISTANCE | (° C.) | 95 | 94 | 94 | 92 | 87 | 99 |
| | GLOSSINESS | | 88 | 88 | 89 | 88 | 88 | 88 |
| | COLORATION (L*) | | 5.2 | 6.4 | 5.8 | 5.1 | 5.2 | 5.9 |
| | SCRATCH RESISTANCE | ΔL*(mb − ma) | 2.8 | 3.4 | 2.9 | 2.8 | 2.8 | 2.8 |
| | | Rz jis | 2.1 | 2.4 | 2.0 | 2.1 | 2.1 | 2.1 |
| | ABRASION RESISTANCE | ΔL*(mc − ma) | 2.6 | 2.7 | 2.9 | 2.7 | 2.7 | 2.7 |
| | | Rz jis | 0.7 | 0.7 | 1.1 | 0.7 | 0.7 | 0.7 |

TABLE 29B

| | | | EXAMPLES | | | | |
|---|---|---|---|---|---|---|---|
| | | | 40B | 41B | 42B | 43B | 44B |
| FORMULATION(PARTS) | GRAFT COPOLYMER (D) | D-16B | 24 | 24 | 24 | 24 | 24 |
| | METHACRYLIC ESTER RESIN (G) | G-1B | | | | | 10 |
| | | G-2B | | | | | 66 |
| | | G-8B | 76 | | | | |
| | | G-9B | | 76 | | | |
| | | G-10B | | | 76 | | |
| | | G-11B | | | | 76 | |
| EVALUATION OF PHYSICAL PROPERTIES | FLEXURAL MODULUS | (MPa) | 2310 | 2300 | 2310 | 2310 | 2300 |
| | CHARPY IMPACT STRENGTH | (kJ/m$^2$) | 5 | 3 | 9 | 10 | 8 |
| | MVR | (cm$^3$/10 min) | 3 | 7 | 8 | 8 | 6 |
| | HEAT RESISTANCE | (° C.) | 100 | 92 | 91 | 90 | 90 |
| | GLOSSINESS | | 87 | 89 | 88 | 88 | 88 |
| | COLORATION (L*) | | 6.5 | 5.3 | 5.9 | 6.8 | 5.2 |
| | SCRATCH RESISTANCE | ΔL*(mb − ma) | 3.4 | 2.9 | 2.8 | 3.4 | 2.9 |
| | | Rz jis | 2.4 | 2.0 | 2.1 | 2.4 | 2.0 |
| | ABRASION RESISTANCE | ΔL*(mc − ma) | 2.7 | 2.7 | 2.7 | 2.7 | 2.8 |
| | | Rz jis | 0.7 | 0.7 | 0.7 | 0.7 | 0.8 |

TABLE 30B

| | | | EXAMPLES | | | | | |
|---|---|---|---|---|---|---|---|---|
| | | | 45B | 46B | 47B | 48B | 49B | 50B |
| FORMULATION(PARTS) | GRAFT COPOLYMER (D) | D-16B | 24 | 24 | 24 | 24 | 24 | 24 |
| | METHACRYLIC ESTER RESIN (G) | G-2B | 75 | 46 | 41 | 72 | 72 | 72 |
| | STYRENE-BASED COPOLYMER (H) | H-1B | 1 | 30 | 35 | | | |
| | | H-2B | | | | 4 | | |
| | | H-3B | | | | | 4 | |
| | | H-4B | | | | | | 4 |
| EVALUATION OF PHYSICAL PROPERTIES | FLEXURAL MODULUS | (MPa) | 2310 | 2310 | 2310 | 2310 | 2310 | 2310 |
| | CHARPY IMPACT STRENGTH | (kJ/m$^2$) | 8 | 10 | 10 | 9 | 9 | 9 |
| | MVR | (cm$^3$/10 min) | 6 | 9 | 10 | 7 | 7 | 7 |
| | HEAT RESISTANCE | (° C.) | 95 | 92 | 87 | 94 | 94 | 94 |
| | GLOSSINESS | | 88 | 88 | 88 | 88 | 88 | 88 |
| | COLORATION (L*) | | 5.2 | 5.2 | 5.2 | 5.2 | 5.2 | 5.2 |
| | SCRATCH RESISTANCE | ΔL*(mb − ma) | 2.8 | 2.8 | 2.8 | 2.8 | 2.8 | 2.8 |
| | | Rz jis | 2.1 | 2.1 | 2.1 | 2.1 | 2.1 | 2.1 |
| | ABRASION RESISTANCE | ΔL*(mc − ma) | 2.5 | 2.5 | 2.6 | 2.6 | 1.9 | 1.8 |
| | | Rz jis | 0.7 | 0.7 | 0.7 | 0.7 | 0.6 | 0.6 |

TABLE 31B

| | | | EXAMPLES | | | | | |
|---|---|---|---|---|---|---|---|---|
| | | | 51B | 52B | 53B | 54B | 55B | 56B |
| FORMULATION(PARTS) | GRAFT COPOLYMER (D) | D-16B | 24 | 24 | 7 | 10 | 30 | 35 |
| | METHACRYLIC ESTER RESIN (G) | G-2B | 72 | 72 | 89 | 86 | 66 | 61 |
| | STYRENE-BASED COPOLYMER (H) | H-4B | | | 4 | 4 | 4 | 4 |
| | | H-5B | 4 | | | | | |
| | | H-6B | | 4 | | | | |
| EVALUATION OF PHYSICAL PROPERTIES | FLEXURAL MODULUS | (MPa) | 2310 | 2310 | 2610 | 2550 | 2230 | 2110 |
| | CHARPY IMPACT STRENGTH | (kJ/m$^2$) | 8 | 5 | 3 | 7 | 9 | 10 |
| | MVR | (cm$^3$/10 min) | 7 | 7 | 8 | 7 | 7 | 6 |
| | HEAT RESISTANCE | (° C.) | 94 | 95 | 98 | 97 | 93 | 87 |
| | GLOSSINESS | | 88 | 88 | 88 | 88 | 88 | 88 |
| | COLORATION (L*) | | 5.1 | 5.2 | 5.1 | 5.2 | 5.2 | 6.7 |
| | SCRATCH RESISTANCE | ΔL*(mb − ma) | 2.8 | 2.8 | 2.8 | 2.9 | 2.8 | 3.4 |
| | | Rz jis | 2.1 | 2.1 | 2.1 | 2.0 | 2.1 | 2.4 |
| | ABRASION RESISTANCE | ΔL*(mc − ma) | 1.9 | 2.6 | 3.6 | 1.9 | 1.8 | 1.9 |
| | | Rz jis | 0.6 | 0.7 | 1.4 | 0.7 | 0.7 | 0.7 |

TABLE 32B

| | | | COMPARATIVE EXAMPLE | | | | | |
|---|---|---|---|---|---|---|---|---|
| | | | 1B | 2B | 3B | 4B | 5B | 6B |
| FORMULATION(PARTS) | GRAFT COPOLYMER (D) | D-2B | 24 | | | | | |
| | | D-8B | | 24 | | | | |
| | | D-11B | | | 24 | | | |
| | | D-17B | | | | 24 | | |
| | | D-20B | | | | | 24 | |
| | | D-23B | | | | | | 24 |
| | METHACRYLIC ESTER RESIN (G) | G-1B | 76 | 76 | 76 | 76 | 76 | 76 |
| EVALUATION OF PHYSICAL PROPERTIES | FLEXURAL MODULUS | (MPa) | 2310 | 2310 | 2290 | 2300 | 2300 | 2310 |
| | CHARPY IMPACT STRENGTH | (kJ/m$^2$) | 3 | 6 | 3 | 4 | 1 | 4 |
| | MVR | (cm$^3$/10 min) | 10 | 2 | 9 | 10 | 2 | 9 |
| | HEAT RESISTANCE | (° C.) | 75 | 75 | 75 | 75 | 75 | 75 |
| | GLOSSINESS | | 88 | 79 | 86 | 88 | 80 | 87 |
| | COLORATION (L*) | | 6.4 | 6.5 | 6.4 | 5.5 | 5.8 | 5.9 |
| | SCRATCH RESISTANCE | ΔL*(mb − ma) | 3.4 | 3.4 | 3.3 | 3.2 | 3.3 | 3.3 |
| | | Rz jis | 2.3 | 2.2 | 2.3 | 2.0 | 2.2 | 2.3 |
| | ABRASION RESISTANCE | ΔL*(mc − ma) | 10.1 | 4.7 | 9.5 | 9.6 | 4.7 | 9.3 |
| | | Rz jis | 5.5 | 1.5 | 4.9 | 5.4 | 1.7 | 4.8 |

The thermoplastic resin composition of Examples 1B to 56B exhibited excellent fluidity. The molded articles obtained in Examples 1B to 56B exhibited excellent impact resistance, heat resistance, glossiness, coloration, scratch resistance and abrasion resistance.

Therefore, the thermoplastic resin composition of the third aspect of the present invention had excellent fluidity. When the thermoplastic resin composition of the third aspect of the present invention was used, a molded article having excellent impact resistance, glossiness, coloration, scratch resistance and abrasion resistance could be obtained. It was confirmed that the molded article could be applied to vehicle interior parts, vehicle exterior parts, office equipments, consumer electronics, building materials and the like.

In Comparative Example 1B in which ethylene propylene copolymer (A-2B) having the mass average molecular weight of less than 17×10$^4$ was used as an ethylene.α-olefin copolymer, impact resistance and abrasion resistance were deteriorated.

In Comparative Example 2B in which ethylene.propylene copolymer (A-8B) having the mass average molecular weight of greater than 35×10$^4$ was used as an ethylene.α-olefin copolymer (A), fluidity of the thermoplastic resin composition was reduced significantly, and glossiness of the molded article was deteriorated.

In Comparative Example 3B in which ethylene.propylene copolymer (A-11B) having the distribution of molecular weight (Mw/Mn) of greater than 3 was used as an ethylene.α-olefin copolymer (A), impact resistance and abrasion resistance were deteriorated.

In Comparative Example 4B, cross-linked ethylene.α-olefin copolymer (C-2B) obtained by cross-linking treatment of ethylene.propylene copolymer (A-2B) was used as a cross-linked.α-olefin copolymer (C), impact resistance and abrasion resistance were deteriorated.

In Comparative Example 5B, cross-linked ethylene.α-olefin copolymer (C-5B) obtained by cross-linking treatment of ethylene.propylene copolymer (A-8B) was used as a cross-linked.α-olefin copolymer (C), fluidity of the thermoplastic resin composition was reduced significantly, and glossiness of the molded article was deteriorated.

In Comparative Example 6B, cross-linked ethylene.α-olefin copolymer (C-8B) obtainable by cross-linking treatment of ethylene.propylene copolymer (A-11B) was used as a cross-linked.α-olefin copolymer (C), impact resistance and abrasion resistance were deteriorated.

<Measurement Method of Volume Average Particle Diameter 2>

The volume average particle diameter (MV) was measured using microtrac (product name: nanotrac 150, manufactured by Nikkiso Co., Ltd.) and pure water as a solvent used in measurement.

By image processing of electron micrographs, it was confirmed that the volume average particle diameter of ethylene.α-olefin copolymer (A) dispersed in the olefin resin aqueous dispersion (B), the volume average particle diameter of cross-linked ethylene.α-olefin copolymer (C) dispersed in the aqueous dispersion and the volume average particle diameter of cross-linked acrylic ester-type rubber polymer (E) respectively correspond to the volume average particle diameter of ethylene.α-olefin copolymer (A), the volume average particle diameter of cross-linked ethylene.α-olefin copolymer (C) and the volume average particle diameter of cross-linked acrylic ester-type rubber polymer (E) in the thermoplastic resin composition.

<Melt-Kneading 4>

A graft copolymer (D), a graft copolymer (F), a methacrylic ester resin (G) and if necessary, the other component were mixed in the ratio as indicated in Tables 24C to 35C, and subjected to melt-kneading using a twin-screw extruder equipped with a vacuum vent of 30 mmφ (manufactured by Ikegai Inc., product name: PCM30) at the temperature of 200 to 260° C. under a vacuum condition of 93.325 kPa, thereby obtaining a thermoplastic resin composition. After melting and kneading, if necessary, the thermoplastic resin composition was pelletized using a pelletizer ("SH-type pelletizer, manufactured by So-ken-sha).

<Injection Molding 4>

From the pellet obtained by melt-kneading of the thermoplastic resin composition, using an injection molding machine (manufactured by Toshiba Machine Co., Ltd., "IS55FP-1.5A") under the condition where the cylinder temperature was 200 to 260° C. and the mold temperature was 60° C., a plane plate (10 cm×10 cm) having a thickness of 2 mm as a test piece for evaluation of Charpy impact strength was prepared.

<Each Components>

In the following examples, an ethylene.α-olefin copolymer (A), olefin resin aqueous dispersion (B), cross-linked ethylene.α-olefin copolymer (C), graft copolymer (D), cross-linked acrylic ester-type rubber polymer (E), graft copolymer (F), methacrylic ester resin (G) and styrene-based copolymer (H) were used as follows.

<Ethylene.α-Olefin Copolymer (A)>

(Preparation of Ethylene.Propylene Copolymer (A-1C))

After the inner gas of a 20 L stainless-steel polymerization vessel equipped with a stirrer were purged with nitrogen, 10 L of dehydrated and purified hexane was fed into the vessel, 8.0 mmol/L hexane solution of ethyl aluminum sesquichloride ($Al(C_2H_5)_{1.5}*Cl_{1.5}$) was supplied at 5 L/h over 1 hour, and then, 0.8 mmol/L hexane solution of $VO(OC_2H_5)Cl_2$ as a catalyst and hexane were continuously supplied at 5 L/h and 5 L/h respectively. From the top of the polymerization vessel, the polymerization solution was continuously taken out from the vessel, so that the amount of the polymerization solution maintained up to 10 L. Using a bubbling tube, ethylene, propylene and hydrogen are supplied at 2000 L/h, 1000 L/h and 8 L/h respectively, and polymerization reaction was conducted at 35° C.

A polymerization reaction was conducted in the aforementioned manner, and polymerization solution containing an ethylene.propylene copolymer (A-1C) was obtained. The obtained polymerization solution was subjected to decalcification by hydrochloric acid, and poured into methanol to precipitate the product, and then the precipitate was dried, thereby obtaining the ethylene.propylene copolymer (A-1C). The polymer profiles of the ethylene.propylene copolymer (A-1C) are shown in Table 1C.

(Preparation of Ethylene.Propylene Copolymers (A-2C) to (A-5C))

Ethylene.propylene copolymers (A-2C) to (A-5C) were obtained in the same manner as in the preparation of ethylene.propylene copolymer (A-1C) except that the supply amount of hydrogen was changed as indicated in Table 1C. The polymer profiles of ethylene.propylene copolymers (A-2C) to (A-5C) are shown in Table 1C.

(Preparation of Ethylene.Propylene Copolymer (A-6C))

After the inner gas of a 20 L stainless-steel polymerization vessel equipped with a stirrer was purged with nitrogen, 10 L of hexane was fed to the vessel, and 110NL of propylene (in a standard state) and 800 mL of hydrogen gas were added thereto. After heating to 40° C., pressure was applied by ethylene, so that total pressure became 0.6 MPa[gage].

When the inner pressure became 0.6 MPa[gage], 10 mL of 1.0 mM/mL hexane solution of triisobutylaluminum (TIBA) was injected into the autoclave by nitrogen gas. 30 mL of toluene solution containing 0.16 mM of triphenylcarbenium (tetrakispentafluorophenyl) borate in terms of boron and 0.0004 mM of [dimethyl(t-butylamido) (tetramethyl-η5-cyclopentadienyl) silane] titanium chloride, prepared in advance, was injected with nitrogen to initiate polymerization. Then, the temperature was adjusted to 40° C. over 5 minutes, and ethylene was supplied so that the pressure became 0.6 MPa[gage]. After 5 minutes from starting the polymerization, 50 mL of methanol was added in order to stop the polymerization, and depressurization was conducted so as to be atmospheric pressure, thereby obtaining polymeric solution of an ethylene.propylene copolymer (A-6C). The obtained polymerization solution was subjected to decalcification by hydrochloric acid, and poured into methanol to precipitate the product, and then the precipitate was dried, thereby obtaining the ethylene propylene copolymer (A-6C). The polymer profiles of the ethylene propylene copolymer (A-6C) are shown in Table 2C.

(Preparation of Ethylene.Propylene Copolymer (A-7C))

20 parts of the ethylene.propylene copolymer (A-1C) and 80 parts of the ethylene.propylene copolymer (A-6C) were mixed and subjected to melt-kneading using a twin-screw extruder equipped with a vacuum vent of 30 mmφ (manufactured by Ikegai Inc., product name: PCM30) at 200° C. under a vacuum condition of 93.325 kPa, thereby producing the ethylene.propylene copolymer (A-7C). The polymer profiles of the ethylene.propylene copolymer (A-7C) are shown in Table 2C.

(Preparation of ethylene.propylene copolymer (A-11C))

An ethylene.propylene copolymer (A-11C) was obtained in the same manner as in the preparation of the ethylene.propylene copolymer (A-1C), except that $VCl_4$ was used as a catalyst instead of $VO(OC_2H_5)Cl_2$. The polymer profiles of the ethylene.propylene copolymer (A-11C) are shown in Table 1C.

(Preparation of Ethylene.Propylene Copolymer (A-8C))

75 parts of the ethylene.propylene copolymer (A-1C) and 25 parts of the ethylene.propylene copolymer (A-11C) were mixed and subjected to melt-kneading using a twin-screw extruder equipped with a vacuum vent of 30 mmφ (manufactured by Ikegai Inc., product name: PCM30) at 200° C. under a vacuum condition of 93.325 kPa, thereby producing an ethylene.propylene copolymer (A-8C). The polymer profiles of the ethylene.propylene copolymer (A-8C) are shown in Table 2C.

(Preparation of Ethylene.Propylene Copolymer (A-9C))

50 parts of the ethylene.propylene copolymer (A-1C) and 50 parts of the ethylene.propylene copolymer (A-11C) were mixed and subjected to melt-kneading using a twin-screw extruder equipped with a vacuum vent of 30 mmφ (manufactured by Ikegai Inc., product name: PCM30) at 200° C. under a vacuum condition of 93.325 kPa, thereby producing an ethylene.propylene copolymer (A-9C). The polymer profiles of the ethylene.propylene copolymer (A-9C) are shown in Table 2C.

(Preparation of Ethylene.Propylene Copolymer (A-10C))

20 parts of ethylene.propylene copolymer (A-1C) and 80 parts of ethylene.propylene copolymer (A-11C) were mixed and subjected to melt-kneading using a twin-screw extruder equipped with a vacuum vent of 30 mmφ (manufactured by Ikegai Inc., product name: PCM30) at 200° C. under a vacuum condition of 93.325 kPa, thereby producing ethylene.propylene copolymer (A-10C). The polymer profiles of ethylene.propylene copolymer (A-10C) are shown in Table 2C.

(Preparation of Ethylene.Propylene Copolymers (A-12C) and (A-13C))

Ethylene.propylene copolymers (A-12C) and (A-13C) were obtained in the same manner as in the preparation of ethylene propylene copolymer (A-1C) except that the supply amount of hydrogen was changed as indicated in Table 3C. The polymer profiles of ethylene.propylene copolymers (A-12C) to (A-13C) are shown in Table 3C.

<Olefin Resin Aqueous Dispersion (B)>
<Preparation of Olefin Resin Aqueous Dispersion (B-1C)>

100 parts of ethylene.propylene copolymer (A-1C), 20 parts of maleic anhydride-modified polyethylene (manufactured by Mitsui Chemicals, Inc., "Mitsui Hi-WAX 2203A", the weight average molecular weight: 2,700, acid value: 30 mg/g) as an acid-modified olefin polymer, and 5 parts of potassium oleate as an anion-type emulsifier were mixed.

The mixture was supplied from a hopper of a twin screw extruder (manufactured by Ikegai Inc., product name: "PCM30", L/D=40) at 4 kg/h, and an aqueous solution containing 0.5 parts of potassium hydroxide and 2.4 parts of ion exchanged water were continuously supplied through a supply port provided on a vent portion of the twin screw extruder, then heated at 220° C., and melting-kneading was conducted and then the resulting product was extruded. The melt-kneaded product was continuously supplied to a cooling device which was attached to the tip of the twin screw extruder, and then cooled to 90° C. Then, the solid extruded from the twin screw extruder was poured into hot water at 80° C. and continuously dispersed, and diluted to adjust the solid content to about 40% by mass, thereby obtaining an olefin resin aqueous dispersion (B-1C).

The volume average particle diameter of ethylene.α-olefin copolymer (A) dispersed in olefin resin aqueous dispersion (B-1C) is shown in table 4C.

TABLE 1C

| | | ETHYLENE•α-OLEFIN COPOLYMER (A) | | | | | |
|---|---|---|---|---|---|---|---|
| | | A-1C | A-2C | A-3C | A-4C | A-5C | A-11C |
| POLYMERIZATION CONDITIONS | ETHYLENE(L/h) | 2,000 | 2,000 | 2,000 | 2,000 | 2,000 | 2,000 |
| | PROPYLENE(L/h) | 1,000 | 1,000 | 1,000 | 1,000 | 1,000 | 1,000 |
| | HYDROGEN(L/h) | 8 | 100 | 80 | 4 | 1.5 | 8 |
| POLYMER PROPERTIES | ETHYLENE UNIT CONTENT(PARTS) | 56 | 56 | 56 | 56 | 56 | 56 |
| | PROPYLENE UNIT CONTENT(PARTS) | 44 | 44 | 44 | 44 | 44 | 44 |
| | WEIGHT AVERAGE MOLECULAR WEIGHT($\times 10^4$) | 30 | 15 | 17 | 35 | 38 | 30 |
| | DISTRIBUTION OF MOLECULAR WEIGHT(Mw/Mn) | 2.2 | 2.2 | 2.2 | 2.2 | 2.2 | 3.2 |

TABLE 2C

| | | ETHYLENE•α-OLEFIN COPOLYMER (A) | | | | |
|---|---|---|---|---|---|---|
| | | A-6C | A-7C | A-8C | A-9C | A-10C |
| POLYMER PROPERTIES | ETHYLENE UNIT CONTENT(PARTS) | 56 | 56 | 56 | 56 | 56 |
| | PROPYLENE UNIT CONTENT(PARTS) | 44 | 44 | 44 | 44 | 44 |
| | WEIGHT AVERAGE MOLECULAR WEIGHT($\times 10^4$) | 30 | 30 | 30 | 30 | 30 |
| | DISTRIBUTION OF MOLECULAR WEIGHT(Mw/Mn) | 1.8 | 1.9 | 2.5 | 2.7 | 3.0 |

TABLE 3C

| | | ETHYLENE•α-OLEFIN COPOLYMER (A) | |
|---|---|---|---|
| | | A-12C | A-13C |
| POLYMERIZATION CONDITIONS | ETHYLENE(L/h) | 2,000 | 2,000 |
| | PROPYLENE(L/h) | 1,000 | 1,000 |
| | HYDROGEN(L/h) | 12 | 6 |
| POLYMER PROPERTIES | ETHYLENE UNIT CONTENT(PARTS) | 56 | 56 |
| | PROPYLENE UNIT CONTENT(PARTS) | 44 | 44 |
| | WEIGHT AVERAGE MOLECULAR WEIGHT($\times 10^4$) | 26 | 32 |
| | DISTRIBUTION OF MOLECULAR WEIGHT(Mw/Mn) | 2.2 | 2.2 |

<Preparation of Olefin Resin Aqueous Dispersions (B-2C) to (B-11C)>

Olefin resin aqueous dispersions (B-2C) to (B-11C) were obtained in the same manner as in the preparation of the olefin resin aqueous dispersion (B-1C), except that the component (A-2C) to (A-11C) were used as a component (A) instead of the component (A-1C) as indicated in Tables 4C and 5C.

Each of the volume average particle diameters of the ethylene.α-olefin copolymer (A) dispersed in each of the olefin resin aqueous dispersions (B-2C) to (B-11C) is shown in tables 4C and 5C.

<Preparation of Olefin Resin Aqueous Dispersions (B-12C) to (B-17C)>

Olefin resin aqueous dispersion (B-12C) to (B-17C) were obtained in the same manner as in the preparation of the olefin resin aqueous dispersion (B-1C) except that the amount of potassium hydroxide and the amount of ion exchanged water used in emulsification were changed as indicated in Table 5C.

Each of the volume average particle diameters of the ethylene.α-olefin copolymer (A) dispersed in each of the olefin resin aqueous dispersions (B-12C) to (B-17C) is shown in table 5C.

<Preparation of Olefin Resin Aqueous Dispersions (B-18C) to (B-19C)>

Olefin resin aqueous dispersions (B-18C) and (B-19C) were obtained in the same manner as in the preparation of the olefin resin aqueous dispersion (B-1C), except that the component (A-12C) or (A-13C) were used as a component (A) instead of the component (A-1C) as indicated in Table 6C.

Each of the volume average particle diameters of ethylene.α-olefin copolymer (A) dispersed in olefin resin aqueous dispersions (B-18C) to (B-19C) are shown in table 6C.

TABLE 6C

| | | OLEFIN RESIN AQUEOUS DISPERSION (B) | |
|---|---|---|---|
| | | B-18C | B-19C |
| ETHYLENE•α-OLEFIN COPOLYMER (A)(PARTS) | A-12C | 100 | |
| | A-13C | | 100 |
| ADDITION AMOUNT OF POTASSIUM HYDROXIDE(PARTS) | | 0.5 | 0.5 |
| ADDITION AMOUNT OF ION EXCHANGED WATER(PARTS) | | 2.4 | 2.4 |
| VOLUME AVERAGE PARTICLE DIAMETER(μm) | | 0.39 | 0.39 |

<Cross-Linked Ethylene.α-Olefin Copolymer (C)>

<Preparation of Cross-Linked Ethylene.α-Olefin Copolymer (C-1C)>

Ion exchanged water was added to the olefin resin aqueous dispersion (B-1C)(100 pars as a solid content) such that the solid content ratio was adjusted to 35%, 0.5 parts t-butyl cumyl peroxide as an organic peroxide, and 1 part of divinylbenzene as a polyfunctional compound were added to the mixture, and reacted at 130° C. for 5 hours, thereby producing cross-linked.α-olefin copolymer (C–1). The gel content ratio and the volume average particle diameter of cross-linked ethylene.α-olefin copolymer (C-1C) are shown in Table 7C.

<Preparation of Cross-Linked Ethylene.α-Olefin Copolymers (C-2C) to (C-14C)>

Cross-linked ethylene.α-olefin copolymers (C-2C) to (C-14C) were obtained in the same manner as in the preparation of the cross-linked ethylene.α-olefin copolymer (C-1C) except that the type of the olefin resin aqueous dispersion (B) and the amount of the t-butyl cumyl peroxide were changed as indicated in Tables 7C and 8C. The gel

TABLE 4C

| | | OLEFIN RESIN AQUEOUS DISPERSION (B) | | | | | | | | |
|---|---|---|---|---|---|---|---|---|---|---|
| | | B-1C | B-2C | B-3C | B-4C | B-5C | B-6C | B-7C | B-8C | B-9C |
| ETHYLENE•α-OLEFIN COPOLYMER (A)(PARTS) | A-1C | 100 | | | | | | | | |
| | A-2C | | 100 | | | | | | | |
| | A-3C | | | 100 | | | | | | |
| | A-4C | | | | 100 | | | | | |
| | A-5C | | | | | 100 | | | | |
| | A-6C | | | | | | 100 | | | |
| | A-7C | | | | | | | 100 | | |
| | A-8C | | | | | | | | 100 | |
| | A-9C | | | | | | | | | 100 |
| VOLUME AVERAGE PARTICLE DIAMETER(μm) | | 0.39 | 0.39 | 0.39 | 0.39 | 0.39 | 0.39 | 0.39 | 0.39 | 0.39 |

TABLE 5C

| | | OLEFIN RESIN AQUEOUS DISPERSION (B) | | | | | | | |
|---|---|---|---|---|---|---|---|---|---|
| | | B-10C | B-11C | B-12C | B-13C | B-14C | B-15C | B-16C | B-17C |
| ETHYLENE•α-OLEFIN COPOLYMER (A)(PARTS) | A-10C | 100 | | | | | | | |
| | A-11C | | 100 | | | | | | |
| | A-1C | | | 100 | 100 | 100 | 100 | 100 | 100 |
| ADDITION AMOUNT OF POTASSIUM HYDROXIDE(PARTS) | | 0.5 | 0.5 | 0.7 | 0.6 | 0.5 | 0.4 | 0.4 | 0.4 |
| ADDITION AMOUNT Of ION EXCHANGED WATER(PARTS) | | 2.4 | 2.4 | 3.4 | 3.2 | 2.7 | 2.1 | 1.9 | 1.8 |
| VOLUME AVERAGE PARTICLE DIAMETER(μm) | | 0.39 | 0.39 | 0.15 | 0.20 | 0.30 | 0.50 | 0.60 | 0.68 | content ratio and the volume average particle diameter of cross-linked ethylene.α-olefin copolymers (C-2C) to (C-14C) are shown in Tables 7C and 8C.

<Preparation of Cross-Linked Ethylene.α-Olefin Copolymers (C-15C) to (C-24C)>

Cross-linked ethylene·α-olefin copolymers (C-15C) to (C-24C) were obtained in the same manner as in the preparation of the cross-linked ethylene.α-olefin copolymer (C-1C) except that the type of the olefin resin aqueous dispersion (B) and the amount of the t-butyl cumyl peroxide were changed as indicated in Tables 9C and 10C. The gel content ratio and the volume average particle diameter of cross-linked ethylene·α-olefin copolymers (C-15C) to (C-24C) are shown in Tables 9C and 10C.

TABLE 7C

| | | CROSS-LINKED ETHYLENE·α-OLEFIN COPOLYMER (C) | | | | | |
|---|---|---|---|---|---|---|---|
| | | C-1C | C-2C | C-3C | C-4C | C-5C | C-6C |
| OLEFIN RESIN AQUEOUS DISPERSION (B) (SOLID CONTENT) (PARTS) | B-1C | 100 | 100 | 100 | 100 | 100 | 100 |
| t-BUTYL CUMYL PEROXIDE(PARTS) | | 0.1 | 0.15 | 0.2 | 0.5 | 1.2 | 1.5 |
| DIVINYLBENZENE(PARTS) | | 1 | 1 | 1 | 1 | 1 | 1 |
| GEL CONTENT(%) | | 4 | 32 | 35 | 55 | 75 | 79 |
| VOLUME AVERAGE PARTICLE DIAMETER(μM) | | 0.39 | 0.39 | 0.39 | 0.39 | 0.39 | 0.39 |

TABLE 8C

| | | CROSS-LINKED ETHYLENE·α-OLEFIN COPOLYMER (C) | | | | | | | |
|---|---|---|---|---|---|---|---|---|---|
| | | C-7C | C-8C | C-9C | C-10C | C-11C | C-12C | C-13C | C-14C |
| OLEFIN RESIN AQUEOUS DISPERSION(B) (SOLID CONTENT) (PARTS) | B-2C | 100 | | | | | | | |
| | B-3C | | 100 | | | | | | |
| | B-4C | | | 100 | | | | | |
| | B-5C | | | | 100 | | | | |
| | B-6C | | | | | 100 | | | |
| | B-7C | | | | | | 100 | | |
| | B-10C | | | | | | | 100 | |
| | B-11C | | | | | | | | 100 |
| t-BUTYL CUMYL PEROXIDE(PARTS) | | 1.5 | 0.8 | 0.3 | 0.3 | 0.4 | 0.4 | 0.6 | 0.6 |
| DIVINYLBENZENE(PARTS) | | 1 | 1 | 1 | 1 | 1 | 1 | 1 | 1 |
| GEL CONTENT(%) | | 49 | 49 | 52 | 51 | 52 | 50 | 51 | 49 |
| VOLUME AVERAGE PARTICLE DIAMETER(μM) | | 0.39 | 0.39 | 0.39 | 0.39 | 0.39 | 0.39 | 0.39 | 0.39 |

TABLE 9C

| | | CROSS-LINKED ETHYLENE·α-OLEFIN COPOLYMER (C) | | | | | |
|---|---|---|---|---|---|---|---|
| | | C-15C | C-16C | C-17C | C-18C | C-19C | C-20C |
| OLEFIN RESIN AQUEOUS DISPERSION(B) (SOLID CONTENT) (PARTS) | B-18C | 100 | | | | | |
| | B-19C | | 100 | | | | |
| | B-15C | | | 100 | | | |
| | B-16C | | | | 100 | | |
| | B-8C | | | | | 100 | |
| | B-9C | | | | | | 100 |
| t-BUTYL CUMYL PEROXIDE(PARTS) | | 0.6 | 0.6 | 0.8 | 0.8 | 0.4 | 0.4 |
| DIVINYLBENZENE(PARTS) | | 1 | 1 | 1 | 1 | 1 | 1 |
| GEL CONTENT(%) | | 51 | 50 | 50 | 50 | 51 | 51 |
| VOLUME AVERAGE PARTICLE DIAMETER(μM) | | 0.39 | 0.39 | 0.5 | 0.6 | 0.39 | 0.39 |

TABLE 10C

|  |  | CROSS-LINKED ETHYLENE·α-OLEFIN COPOLYMER (C) | | | |
|---|---|---|---|---|---|
|  |  | C-21C | C-22C | C-23C | C-24C |
| OLEFIN RESIN AQUEOUS DISPERSION (B)(SOLID CONTENT) (PARTS) | B-1C | 100 | 100 | 100 | 100 |
| t-BUTYL CUMYL PEROXIDE(PARTS) |  | 0.25 | 0.35 | 0.8 | 1.0 |
| DIVINYLBENZENE(PARTS) |  | 1 | 1 | 1 | 1 |
| GEL CONTENT(%) |  | 40 | 45 | 65 | 70 |
| VOLUME AVERAGE PARTICLE DIAMETER(μM) |  | 0.39 | 0.39 | 0.39 | 0.39 |

<Graft Copolymer (D)>
(Preparation of Graft Copolymer (D-1C))

The olefin resin aqueous dispersion (B-1C) (containing 70 parts of ethylene·propylene copolymer (A-1C) as a solid content) was fed into a stainless-steel polymerization vessel equipped with a stirrer, ion exchanged water was added thereto, such that the solid content ratio was adjusted to 30%, and then, 0.006 parts of ferrous sulfate, 0.3 parts of sodium pyrophosphate, and 0.35 parts of fructose were added, and the temperature was adjusted to 80° C. 23.4 parts of styrene, 6.6 parts of acrylonitrile and 0.6 parts of cumene hydroperoxide were continuously added over 150 minutes, and emulsion polymerization was conducted while maintaining a polymerization temperature at 80° C. After polymerization, an antioxidant was added to an aqueous dispersion containing a graft copolymer (D-1C), and solid was precipitated using sulfuric acid, and washing, dehydration and drying were conducted, thereby obtaining a powdery graft copolymer (D-1C). The graft ratio of the graft copolymer (D-1C) was measured as 30%. The results are shown in Table 11C.

(Preparation of Graft Copolymers (D-2C) to (D-17C))

Graft copolymers (D-2C) and (D-17C) were obtained in the same manner as in the preparation of the graft copolymer (D-1C) except that the type of the olefin resin aqueous dispersion (B) was changed as indicated in Tables 11C to 14C. The graft ratios of graft copolymers (D-2C) to (D-17C) are shown in Tables 11C to 14C.

(Preparation of Graft Copolymers (D-18C) to (D-23C), (D-25C) to (D-32C))

Graft copolymers (D-18C) to (D-23C) and (D-25C) to (D-32C) were obtained in the same manner as in the preparation of the graft copolymer (D-1C) except that the olefin resin aqueous dispersion (B) was changed to an aqueous dispersion containing an cross-linked ethylene·α-olefin copolymer (C) as indicated in Tables 15C to 17C. The graft ratio of each of graft copolymers (D-18C) to (D-23C) and (D-25C) to (D-32C) is shown in Tables 15C to 17C.

(Preparation of Graft Copolymer (D-24C))

70 parts of ethylene·propylene copolymer (A-1C) and 300 parts of toluene were fed into a stainless-steel polymerization vessel equipped with a stirrer, and dissolved uniformly while stirring for 1 hour at 70° C. After purged with nitrogen satisfactorily, 23.4 parts of styrene, 6.6 parts of acrylonitrile, 0.24 parts of t-dodecylmercaptane, and 0.22 parts of t-butylperoxyisopropyl monocarbonate were added, and the inner temperature was raised to 110° C., and reacted for 4 hours. The inner temperature was raised to 120° C. and reaction was conducted for 2 hours. After polymerization, the inner temperature was cooled to 100° C., 0.2 parts of octadecyl-3-(3,5-di-t-butyl-4-hydroxyphenol)-propionate were added to the reaction solution. The reaction mixture was taken out from the vessel, and unreacted materials and solvents were distilled by steam distillation. Then, using a twin-screw extruder equipped with a vacuum vent of 30 mmφ (manufactured by Ikegai Inc., product name: PCM30), volatiles were substantially volatilized at 220° C. under a vacuum condition of 93.325 kPa, and a pellet was formed, thereby obtaining a graft copolymer (D-15C). The graft ratio of the graft copolymer (D-24C) was measured as 26%. The volume average particle diameter of ethylene·α-olefin copolymer (A) was observed using an electron microscope, and determined as 0.39 μm. The results are shown in Table 16C.

(Preparation of Graft Copolymers (D-33C) to (D-34C))

Graft copolymers (D-33C) and (D-34C) were obtained in the same manner as in the preparation of the graft copolymer (D-1C) except that the type of the olefin resin aqueous dispersion (B) was changed as indicated in Table 18C. The graft ratios of graft copolymers (D-33C) and (D-34C) are shown in Table 18C.

(Preparation of Graft Copolymers (D-35C) to (D-44C))

Graft copolymers (D-35C) to (D-44C) were obtained in the same manner as in the preparation of the graft copolymer (D-1C) except that the olefin resin aqueous dispersion (B) was changed to an aqueous dispersion containing an cross-linked ethylene·α-olefin copolymer (C) as indicated in Tables 18C to 20C. The graft ratio of each of graft copolymers (D-35C) to (D-44C) are shown in Tables 18C to 20C.

TABLE 11C

|  |  | GRAFT COPOLYMER (D) | | | |
|---|---|---|---|---|---|
|  |  | D-1C | D-2C | D-3C | D-4C |
| OLEFIN RESIN AQUEOUS DISPERSION(B) (SOLID CONTENT) (PARTS) | B-1C | 70 |  |  |  |
|  | B-2C |  | 70 |  |  |
|  | B-3C |  |  | 70 |  |
|  | B-4C |  |  |  | 70 |
| VINYL-BASED MONOMER MIXTURE (m1)(PARTS) | STYRENE | 23.4 | 23.4 | 23.4 | 23.4 |
|  | ACRYLONITRILE | 6.6 | 6.6 | 6.6 | 6.6 |
| GRAFT POLYMERIZATION METHOD |  | EMULSION POLYMERIZATION | EMULSION POLYMERIZATION | EMULSION POLYMERIZATION | EMULSION POLYMERIZATION |
| GRAFT RATIO(%) |  | 29 | 29 | 30 | 29 |

TABLE 12C

|  |  | GRAFT COPOLYMER (D) | | | |
| --- | --- | --- | --- | --- | --- |
|  |  | D-5C | D-6C | D-7C | D-8C |
| OLEFIN RESIN AQUEOUS DISPERSION(B) (SOLID CONTENT) (PARTS) | B-5C | 70 | | | |
|  | B-6C | | 70 | | |
|  | B-7C | | | 70 | |
|  | B-8C | | | | 70 |
| VINYL-BASED MONOMER MIXTURE (m1)(PARTS) | STYRENE | 23.4 | 23.4 | 23.4 | 23.4 |
|  | ACRYLONITRILE | 6.6 | 6.6 | 6.6 | 6.6 |
| GRAFT POLYMERIZATION METHOD | | EMULSION POLYMERI-ZATION | EMULSION POLYMERI-ZATION | EMULSION POLYMERI-ZATION | EMULSION POLYMERI-ZATION |
| GRAFT RATIO(%) | | 28 | 28 | 27 | 28 |

TABLE 13C

|  |  | GRAFT COPOLYMER (D) | | | |
| --- | --- | --- | --- | --- | --- |
|  |  | D-9C | D-10C | D-11C | D-12C |
| OLEFIN RESIN AQUEOUS DISPERSION(B) (SOLID CONTENT) (PARTS) | B-9C | 70 | | | |
|  | B-10C | | 70 | | |
|  | B-11C | | | 70 | |
|  | B-12C | | | | 70 |
| VINYL-BASED MONOMER MIXTURE (m1)(PARTS) | STYRENE | 23.4 | 23.4 | 23.4 | 23.4 |
|  | ACRYLONITRILE | 6.6 | 6.6 | 6.6 | 6.6 |
| GRAFT POLYMERIZATION METHOD | | EMULSION POLYMERI-ZATION | EMULSION POLYMERI-ZATION | EMULSION POLYMERI-ZATION | EMULSION POLYMERI-ZATION |
| GRAFT RATIO(%) | | 29 | 27 | 29 | 30 |

TABLE 14C

|  |  | GRAFT COPOLYMER (D) | | | | |
| --- | --- | --- | --- | --- | --- | --- |
|  |  | D-13C | D-14C | D-15C | D-16C | D-17C |
| OLEFIN RESIN AQUEOUS DISPERSION(B) (SOLID CONTENT) (PARTS) | B-13C | 70 | | | | |
|  | B-14C | | 70 | | | |
|  | B-15C | | | 70 | | |
|  | B-16C | | | | 70 | |
|  | B-17C | | | | | 70 |
| VINYL-BASED MONOMER MIXTURE (m1)(PARTS) | STYRENE | 23.4 | 23.4 | 23.4 | 23.4 | 23.4 |
|  | ACRYLONITRILE | 6.6 | 6.6 | 6.6 | 6.6 | 6.6 |
| GRAFT POLYMERIZATION METHOD | | EMULSION POLYMER-IZATION | EMULSION POLYMER-IZATION | EMULSION POLYMER-IZATION | EMULSION POLYMER-IZATION | EMULSION POLYMER-IZATION |
| GRAFT RATIO(%) | | 28 | 29 | 30 | 29 | 29 |

TABLE 15C

|  |  | GRAFT COPOLYMER (D) | | | |
| --- | --- | --- | --- | --- | --- |
|  |  | D-18C | D-19C | D-20C | D-21C |
| AQUEOUS DISPERSION OF CROSS-LINKED ETHYLENE·α-OLEFIN COPOLYMER (C) (SOLID CONTENT) (PARTS) | C-1C | 70 | | | |
|  | C-2C | | 70 | | |
|  | C-3C | | | 70 | |
|  | C-4C | | | | 70 |
| VINYL-BASED MONOMER MIXTURE (m1)(PARTS) | STYRENE | 23.4 | 23.4 | 23.4 | 23.4 |
|  | ACRYLONITRILE | 6.6 | 6.6 | 6.6 | 6.6 |
| GRAFT POLYMERIZATION METHOD | | EMULSION POLYMERI-ZATION | EMULSION POLYMERI-ZATION | EMULSION POLYMERI-ZATION | EMULSION POLYMERI-ZATION |
| GRAFT RATIO(%) | | 29 | 28 | 28 | 29 |

TABLE 16C

|  |  | GRAFT COPOLYMER (D) | | | | | |
|---|---|---|---|---|---|---|---|
|  |  | D-22C | D-23C | D-24C | D-25C | D-26C | D-27C |
| AQUEOUS DISPERSION OF CROSS-LINKED ETHYLENE·α-OLEFIN COPOLYMER (C) (SOLID CONTENT) (PARTS) | C-5C | 70 | | | | | |
|  | C-6C | | 70 | | | | |
|  | C-7C | | | | 70 | | |
|  | C-8C | | | | | 70 | |
|  | C-9C | | | | | | 70 |
| ETHYLENE·α-OLEFIN COPOLYMER (A) (PARTS) | A-1C | | | 70 | | | |
| VINYL-BASED MONOMER MIXTURE (m1)(PARTS) | STYRENE | 23.4 | 23.4 | 23.4 | 23.4 | 23.4 | 23.4 |
|  | ACRYLONITRILE | 6.6 | 6.6 | 6.6 | 6.6 | 6.6 | 6.6 |
| GRAFT POLYMERIZATION METHOD | | EMULSION POLYMERIZATION | EMULSION POLYMERIZATION | SOLUTION POLYMERIZATION | EMULSION POLYMERIZATION | EMULSION POLYMERIZATION | EMULSION POLYMERIZATION |
| GRAFT RATIO(%) | | 29 | 27 | 26 | 28 | 29 | 28 |

TABLE 17C

|  |  | GRAFT COPOLYMER (D) | | | | |
|---|---|---|---|---|---|---|
|  |  | D-28C | D-29C | D-30C | D-31C | D-32C |
| OLEFIN RESIN AQUEOUS DISPERSION (B) (SOLID CONTENT) (PARTS) | C-10C | 70 | | | | |
|  | C-11C | | 70 | | | |
|  | C-12C | | | 70 | | |
|  | C-13C | | | | 70 | |
|  | C-14C | | | | | 70 |
| VINYL-BASED MONOMER MIXTURE (m1)(PARTS) | STYRENE | 23.4 | 23.4 | 23.4 | 23.4 | 23.4 |
|  | ACRYLONITRILE | 6.6 | 6.6 | 6.6 | 6.6 | 6.6 |
| GRAFT POLYMERIZATION METHOD | | EMULSION POLYMERIZATION | EMULSION POLYMERIZATION | EMULSION POLYMERIZATION | EMULSION POLYMERIZATION | EMULSION POLYMERIZATION |
| GRAFT RATIO(%) | | 28 | 29 | 29 | 28 | 29 |

TABLE 18C

|  |  | GRAFT COPOLYMER (D) | | | |
|---|---|---|---|---|---|
|  |  | D-33C | D-34C | D-35C | D-36C |
| OLEFIN RESIN AQUEOUS DISPERSION (B) OR AQUEOUS DISPERSION OF CROSS-LINKED ETHYLENE·α-OLEFIN COPOLYMER (C) (SOLID CONTENT)(PARTS) | B-18C | 70 | | | |
|  | B-19C | | 70 | | |
|  | C-15C | | | 70 | |
|  | C-16C | | | | 70 |
| VINYL-BASED MONOMER MIXTURE (m1)(PARTS) | STYRENE | 23.4 | 23.4 | 23.4 | 23.4 |
|  | ACRYLONITRILE | 6.6 | 6.6 | 6.6 | 6.6 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO(%) | | 28 | 29 | 28 | 29 |

TABLE 19C

|  |  | GRAFT COPOLYMER (D) | | | |
|---|---|---|---|---|---|
|  |  | D-37C | D-38C | D-39C | D-40C |
| AQUEOUS DISPERSION OF GROSS-LINKED ETHYLENE·α-OLEFIN COPOLYMER (C) (SOLID CONTENT) (PARTS) | C-17C | 70 | | | |
|  | C-18C | | 70 | | |
|  | C-19C | | | 70 | |
|  | C-20C | | | | 70 |

TABLE 19C-continued

|  |  | GRAFT COPOLYMER (D) | | | |
|---|---|---|---|---|---|
|  |  | D-37C | D-38C | D-39C | D-40C |
| VINYL-BASED MONOMER MIXTURE (m1)(PARTS) | STYRENE ACRYLONITRILE | 23.4 6.6 | 23.4 6.6 | 23.4 6.6 | 23.4 6.6 |
| GRAFT POLYMERIZATION METHOD |  | EMULSION POLYMERI- ZATION | EMULSION POLYMERI- ZATION | EMULSION POLYMERI- ZATION | EMULSION POLYMERI- ZATION |
| GRAFT RATIO(%) |  | 29 | 29 | 30 | 30 |

TABLE 20C

|  |  | GRAFT COPOLYMER (D) | | | |
|---|---|---|---|---|---|
|  |  | D-41C | D-42C | D-43C | D-44C |
| AQUEOUS DISPERSION OF CROSS-LINKED ETHYLENE·α-OLEFIN COPOLYMER (C) (SOLID CONTENT) (PARTS) | C-21C C-22C C-23C C-24C | 70 | 70 | 70 | 70 |
| VINYL-BASED MONOMER MIXTURE (m1)(PARTS) | STYRENE ACRYLONITRILE | 23.4 6.6 | 23.4 6.6 | 23.4 6.6 | 23.4 6.6 |
| GRAFT POLYMERIZATION METHOD |  | EMULSION POLYMERI- ZATION | EMULSION POLYMERI- ZATION | EMULSION POLYMERI- ZATION | EMULSION POLYMERI- ZATION |
| GRAFT RATIO(%) |  | 29 | 29 | 30 | 29 |

<Graft Copolymer (F)> (Preparation of Graft Copolymer (F-1C))

0.97 parts of dipotassium alkenyl succinate, 175 parts of ion-exchanged water, 50 parts of n-butyl acrylate, 0.16 parts of allyl methacrylate, 0.08 parts of 1,3-butyleneglycol dimethacrylate and 0.1 parts of t-butylhydroperoxide were fed into a reaction vessel. By leading a stream of nitrogen into the reactor, the reactor was purged with nitrogen, and then, the temperature was raised to 60° C. When the inner temperature was reached to 50° C., an aqueous solution containing 0.00015 parts of ferrous sulfate, 0.00045 parts of ethylenediaminetetraacetic acid disodium salt and 0.24 parts of Rongalit and 5 parts of ion-exchanged water was added, and polymerization was started and the inner temperature was raised to 75° C. After this state was maintained for 1 hour, cross-linked acrylic ester-type rubber polymer (E-1C) was obtained. The volume average particle diameter of the cross-linked acrylic ester-type rubber polymer (E-1C) dispersed in the aqueous dispersion was 0.082 µm.

While maintaining the inner temperature of the reaction vessel at 75° C., an aqueous solution containing 0.15 parts of Rongalit, 0.65 parts of dipotassium alkenyl succinate and 10 parts of ion exchanged water was added to 50 parts of the cross-linked acrylic ester-type rubber polymer (E-1C), and a mixed solution containing 6.3 parts of acrylonitrile, 18.7 parts of styrene, and 0.11 parts of t-butyl hydroperoxide was added thereto in a dropwise manner over 1 hour to conduct graft polymerization. After 5 minutes from completion of dropwise, an aqueous solution containing 0.001 parts of ferrous sulfate, 0.003 parts of ethylenediaminetetraacetic acid disodium salt, 0.15 parts of Rongalit and 5 parts of ion exchanged water was added, and a mixed solution containing 6.3 parts of acrylonitrile, 18.7 parts of styrene, 0.19 parts of t-butyl hydroperoxide and 0.014 parts of n-octyl mercaptane was added in a dropwise manner over 1 hour to conduct graft polymerization. After dropwise was completed, the inner temperature was maintained at 75° C. for 10 minutes, then cooled. When the inner temperature was cooled to 60° C., an aqueous solution dissolving 0.2 parts of an antioxidant (manufactured by Yoshitomi Pharmaceutical Industries, Ltd., Antage W500) and 0.2 parts of dipotassium alkenyl succinate in 5 parts of ion exchanged solution was added thereto. By the above operation, graft polymerization of the cross-linked acrylic ester-type rubber polymer (E-1C) with acrylonitrile and styrene were performed. Next, the aqueous dispersion of reaction product was coagulated using an aqueous solution of sulfuric acid, and the coagulated product was washed and then dried, thereby obtaining a graft copolymer (F-1C).

(Preparation of Graft Copolymer (F-2C))

1.2 parts of dipotassium alkenyl succinate, 175 parts of ion-exchanged water, 50 parts of n-butyl acrylate, 0.16 parts of allyl methacrylate, 0.08 parts of 1,3-butyleneglycol dimethacrylate and 0.1 parts of t-butylhydroperoxide were fed into a reaction vessel. By leading a stream of nitrogen into the reactor, the reactor was purged with nitrogen, and then, the temperature was raised to 60° C. When the inner temperature was reached to 50° C., an aqueous solution containing 0.00015 parts of ferrous sulfate, 0.00045 parts of ethylenediaminetetraacetic acid disodium salt and 0.24 parts of Rongalit and 5 parts of ion-exchanged water was added, and polymerization was started and the inner temperature was raised to 75° C. After this state is maintained for 1 hour, aqueous dispersion of a cross-linked acrylic ester-type rubber polymer (E-2C) was obtained. The volume average particle diameter of the cross-linked acrylic ester-type rubber polymer (E-2C) dispersed in the aqueous dispersion was 0.037 µm.

While maintaining the inner temperature of the reaction vessel at 75° C., an aqueous solution containing 0.15 parts of Rongalit, 0.65 parts of dipotassium alkenyl succinate and 10 parts of ion exchanged water was added to 50 parts of the cross-linked acrylic ester-type rubber polymer (E-2C), and a mixed solution containing 6.3 parts of acrylonitrile, 18.7 parts of styrene, and 0.11 parts of t-butyl hydroperoxide was added in a dropwise manner over 1 hour to conduct graft polymerization. After 5 minutes from completion of dropwise, an aqueous solution containing 0.001 parts of ferrous sulfate, 0.003 parts of ethylenediaminetetraacetic acid disodium salt, 0.15 parts of Rongalit and 5 parts of ion exchanged water was added, and a mixed solution containing 6.3 parts of acrylonitrile, 18.7 parts of styrene, 0.19 parts of t-butyl hydroperoxide and 0.014 parts of n-octyl mercaptane was added in a dropwise manner over 1 hour to conduct graft polymerization. After dropwise was completed, the inner temperature was maintained at 75° C. for 10 minutes, then cooled. When the inner temperature was reached to 60° C., an aqueous solution dissolving 0.2 parts of an antioxidant (manufactured by Yoshitomi Pharmaceutical Industries, Ltd., Antage W500) and 0.2 parts of dipotassium Alkenyl succinate in 5 parts of ion exchanged solution was added thereto. By the above operation, graft polymerization of the cross-linked acrylic ester-type rubber polymer (E-2C) with acrylonitrile and styrene were performed. Thereafter, the aqueous dispersion of the reaction product was coagulated using an aqueous solution of sulfuric acid, and the coagulated product was washed and then dried, thereby obtaining a graft copolymer (F-2C).

(Preparation of Graft Copolymer (F-3C))

1.08 parts of dipotassium alkenyl succinate, 175 parts of ion-exchanged water, 50 parts of n-butyl acrylate, 0.16 parts of allyl methacrylate, 0.08 parts of 1,3-butyleneglycol dimethacrylate and 0.1 parts of t-butylhydroperoxide were fed into a reaction vessel. By leading a stream of nitrogen into the reactor, the reactor was purged with nitrogen, and then, the temperature was raised to 60° C. When the inner temperature was reached to 50° C., an aqueous solution containing 0.00015 parts of ferrous sulfate, 0.00045 parts of ethylenediaminetetraacetic acid disodium salt and 0.24 parts of Rongalit and 5 parts of ion-exchanged water was added, and polymerization was started and the inner temperature was raised to 75° C. After this state was maintained for 1 hour, cross-linked acrylic ester-type rubber polymer (E-3C) was obtained. The volume average particle diameter of the cross-linked acrylic ester-type rubber polymer (E-3C) dispersed in the aqueous dispersion was 0.050 μm.

While maintaining the inner temperature of the reaction vessel at 75° C., an aqueous solution containing 0.15 parts of Rongalit, 0.65 parts of dipotassium alkenyl succinate and 10 parts of ion exchanged water was added to 50 parts of the cross-linked acrylic ester-type rubber polymer (E-3C), and a mixed solution containing 6.3 parts of acrylonitrile, 18.7 parts of styrene, and 0.11 parts of t-butyl hydroperoxide was added in a dropwise manner over 1 hour to conduct graft polymerization. After 5 minutes from completion of dropwise, an aqueous solution containing 0.001 parts of ferrous sulfate, 0.003 parts of ethylenediaminetetraacetic acid disodium salt, 0.15 parts of Rongalit and 5 parts of ion exchanged water was added, and a mixed solution containing 6.3 parts of acrylonitrile, 18.7 parts of styrene, 0.19 parts of t-butyl hydroperoxide and 0.014 parts of n-octyl mercaptane was added in a dropwise manner over 1 hour to conduct graft polymerization. After dropwise was completed, the inner temperature was maintained at 75° C. for 10 minutes, then cooled. When the inner temperature was reached to 60° C., an aqueous solution dissolving 0.2 parts of an antioxidant (manufactured by Yoshitomi Pharmaceutical Industries, Ltd., Antage W500) and 0.2 parts of dipotassium alkenyl succinate in 5 parts of ion exchanged solution was added thereto. By the above operation, graft polymerization of the cross-linked acrylic ester-type rubber polymer (E-3C) with acrylonitrile and styrene were performed. Thereafter, the aqueous dispersion of reaction product was coagulated using an aqueous solution of sulfuric acid, and the coagulated product was washed and then dried, thereby obtaining a graft copolymer (F-3C).

(Preparation of Graft Copolymer (F-4C))

0.59 parts of dipotassium alkenyl succinate, 175 parts of ion-exchanged water, 50 parts of n-butyl acrylate, 0.16 parts of allyl methacrylate, 0.08 parts of 1,3-butyleneglycol dimethacrylate and 0.1 parts of t-butylhydroperoxide were fed into a reaction vessel. By leading a stream of nitrogen into the reactor, the reactor was purged with nitrogen, and then, the temperature was raised to 60° C. When the inner temperature was reached to 50° C., an aqueous solution containing 0.00015 parts of ferrous sulfate, 0.00045 parts of ethylenediaminetetraacetic acid disodium salt and 0.24 parts of Rongalit and 5 parts of ion-exchanged water was added to start polymerization, and then, the inner temperature was raised to 75° C. This condition was maintained for 1 hour, thereby obtaining a cross-linked acrylic ester-type rubber polymer (E-4C). The volume average particle diameter of the cross-linked acrylic ester-type rubber polymer (E-4C) dispersed in the aqueous dispersion was 0.18 μm.

While maintaining the inner temperature of the reaction vessel at 75° C., an aqueous solution containing 0.15 parts of Rongalit, 0.65 parts of dipotassium alkenyl succinate and 10 parts of ion exchanged water was added to 50 parts of cross-linked acrylic ester-type rubber polymer (E-4C) (as a solid content), and a mixed solution containing 6.3 parts of acrylonitrile, 18.7 parts of styrene, and 0.11 parts of t-butyl hydroperoxide was added in a dropwise manner over 1 hour to conduct graft polymerization. After 5 minutes from completion of dropwise, an aqueous solution containing 0.001 parts of ferrous sulfate, 0.003 parts of ethylenediaminetetraacetic acid disodium salt, 0.15 parts of Rongalit and 5 parts of ion exchanged water was added, and a mixed solution containing 6.3 parts of acrylonitrile, 18.7 parts of styrene, 0.19 parts of t-butyl hydroperoxide and 0.014 parts of n-octyl mercaptane was added in a dropwise manner over 1 hour to conduct graft polymerization. After dropwise was completed, the inner temperature was maintained at 75° C. for 10 minutes, then cooled. When the inner temperature was reached to 60° C., an aqueous solution dissolving 0.2 parts of an antioxidant (manufactured by Yoshitomi Pharmaceutical Industries, Ltd., Antage W500) and 0.2 parts of dipotassium Alkenyl succinate in 5 parts of ion exchanged solution was added thereto. By the above operation, graft polymerization of the cross-linked acrylic ester-type rubber polymer (E-4C) with acrylonitrile and styrene were performed. Thereafter, the aqueous dispersion of reaction product was coagulated using an aqueous solution of sulfuric acid, and the coagulated product was washed and then dried, thereby obtaining a graft copolymer (F-4C).

(Preparation of Graft Copolymer (F-5C))

0.43 parts of dipotassium alkenyl succinate, 175 parts of ion-exchanged water, 50 parts of n-butyl acrylate, 0.16 parts of allyl methacrylate, 0.08 parts of 1,3-butyleneglycol dimethacrylate and 0.1 parts of t-butylhydroperoxide were fed into a reaction vessel. By leading a stream of nitrogen into the reactor, the reactor was purged with nitrogen, and the temperature was raised to 60° C. When the inner temperature was reached to 50° C., an aqueous solution containing 0.00015 parts of ferrous sulfate, 0.00045 parts of ethylenediaminetetraacetic acid disodium salt and 0.24 parts of Rongalit and 5 parts of ion-exchanged water was added, and polymerization was started and the inner temperature was raised to 75° C. After this state was maintained for 1 hour, cross-linked acrylic ester-type rubber polymer (E-5C) was obtained. The volume average particle diameter of the cross-linked acrylic ester-type rubber polymer (E-5C) dispersed in the aqueous dispersion was 0.24 μm.

While maintaining the inner temperature of the reaction vessel at 75° C., an aqueous solution containing 0.15 parts of Rongalit, 0.65 parts of dipotassium alkenyl succinate and 10 parts of ion exchanged water was added to 50 parts of the cross-linked acrylic ester-type rubber polymer (E-5C) (as a solid content), and a mixed solution containing 6.3 parts of acrylonitrile, 18.7 parts of styrene, and 0.11 parts of t-butyl hydroperoxide was added in a dropwise manner over 1 hour to conduct graft polymerization. After 5 minutes from completion of dropwise, an aqueous solution containing 0.001 parts of ferrous sulfate, 0.003 parts of ethylenediaminetetraacetic acid disodium salt, 0.15 parts of Rongalit and 5 parts of ion exchanged water was added, and a mixed solution containing 6.3 parts of acrylonitrile, 18.7 parts of styrene, 0.19 parts of t-butyl hydroperoxide and 0.014 parts of n-octyl mercaptane was added in a dropwise manner over 1 hour to conduct graft polymerization. After dropwise was completed, the inner temperature was maintained at 75° C. for 10 minutes, and then cooled. When the inner temperature was reached to 60° C., an aqueous solution dissolving 0.2 parts of an antioxidant (manufactured by Yoshitomi Pharmaceutical Industries, Ltd., Antage W500) and 0.2 parts of dipotassium Alkenyl succinate in 5 parts of ion exchanged solution was added thereto. By the above operation, graft polymerization of the cross-linked acrylic ester-type rubber polymer (E-5C) with acrylonitrile and styrene were performed. Next, the aqueous dispersion of the reaction product was coagulated using an aqueous solution of sulfuric acid, and washed and then dried, thereby obtaining a graft copolymer (F-5C).

<Methacrylic Ester Resin (G)>
<Preparation of Methacrylic Ester Resin (G-1C)>

150 parts of ion exchanged water, 99 parts of methyl methacrylate, 1 parts of methyl acrylate, 0.2 parts of 2,2'-azobis(isobutyronitrile), 0.25 parts of n-octyl mercaptane, 0.47 parts of calcium hydroxyapatite, and 0.003 parts of potassium alkenylsuccinate were fed into a stainless-steel polymerization vessel equipped with a stirrer. The inner temperature of the polymerization vessel was raised to 75° C., and reaction was conducted for 3 hours, and then the temperature was raised to 90° C. and reaction was conducted for 1 hour. The inner reaction product was taken out from the vessel, and washed using a centrifugal dehydrator, and then dried, thereby obtaining methacrylic ester resin (G-1C). The monomers are shown in Table 21C.

<Preparation of Methacrylic Ester Resin (G-2C)>

150 parts of ion exchanged water, 82 parts of methyl methacrylate, 12 parts of N-phenylmaleimide, 6 parts of styrene, 0.2 parts of 2,2'-azobis(isobutyronitrile), 0.25 parts of n-octyl mercaptane and 0.7 parts of polyvinyl alcohol were fed into a stainless-steel polymerization vessel equipped with a stirrer. The inner temperature of the polymerization vessel was raised to 75° C., and reaction was conducted for 3 hours, and then the temperature was raised to 90° C. and reaction was conducted for 1 hour. The inner reaction product was taken out from the vessel, and washed using a centrifugal dehydrator, and then dried, thereby obtaining methacrylic ester resin (G-2C). The monomers are shown in Table 21C.

<Preparation of Methacrylic Ester Resins (G-3C) to (G-11C)>

Each of the methacrylic ester resins (G-3C) to (G-11C) was obtained in the same manner as in the preparation of the methacrylic ester resin (G-2C) except that the amount of the vinyl-based monomer mixture (m3) was changed as indicated in Tables 21B or 22B.

TABLE 21C

|  |  | METHACRYLIC ESTER RESIN (G) | | | | | |
|---|---|---|---|---|---|---|---|
|  |  | G-1C | G-2C | G-3C | G-4C | G-5C | G-6C |
| VINYL-BASED MONOMER MIXTURE (m3) (PARTS) | METHYL METHACRYLATE | 99 | 82 | 45 | 50 | 94 | 96 |
|  | METHYL ACRYLATE | 1 |  |  |  |  |  |
|  | N-PHENYL MALEIMIDE |  | 12 | 12 | 12 | 5 | 3 |
|  | STYRENE |  | 6 | 43 | 38 | 1 | 1 |

TABLE 22C

|  |  | METHACRYLIC ESTER RESIN (G) | | | | |
|---|---|---|---|---|---|---|
|  |  | G-7C | G-8C | G-9C | G-10C | G-11C |
| VINYL-BASED MONOMER MIXTURE (m3) (PARTS) | METHYL METHACRYLATE | 50 | 46 | 94 | 50 | 47 |
|  | METHYL ACRYLATE |  |  |  |  |  |
|  | N-PHENYL MALEIMIDE | 49 | 53 | 5.5 | 5 | 5 |
|  | STYRENE | 1 | 1 | 0.5 | 45 | 48 |

<Styrene-Based Copolymer (H)>

(Preparation of Styrene-Based Copolymer (H-1C))

120 parts of ion exchanged water, 0.1 parts of polyvinyl alcohol, 0.3 parts of 2,2'-azobis(isobutyronitrile), 25 parts of acrylonitrile, 75 parts of styrene and 0.35 parts of t-dodecylmercaptane were fed into a stainless-steel polymerization vessel equipped with a stirrer and purged with nitrogen gas, the starting temperature was set to 60° C., and reaction was conducted for 5 hours. The temperature was raised to 120° C. and reaction was conducted for 4 hours. The inner reaction product was taken out, thereby obtaining a styrene-based copolymer (H-1C).

(Preparation of Styrene-Based Copolymer (H-2C))

150 parts of ion exchanged water, 7 parts of methyl methacrylate, 23 parts of acrylonitrile, 70 parts of styrene, 0.2 parts of 2,2'-azobis(isobutyronitrile), 0.25 parts of n-octyl mercaptane, 0.47 parts of calcium hydroxyapatite, and 0.003 parts of potassium alkenylsuccinate were fed into a stainless-steel polymerization vessel equipped with a stirrer, the inner temperature was raised up to 75° C., and reaction was conducted for 3 hours. The temperature was raised to 90° C., and by maintaining the temperature for 60 minutes, the reaction was completed. The inner reaction product was taken out from the vessel, washing and dehydration using a centrifugal dehydrator were repeatedly conducted, and then the residue was dried, thereby obtaining a styrene-based copolymer (H-2C).

(Preparation of Styrene-Based Copolymers (H-3C) to (H-5C))

Each of styrene-type copolymers (H-3C) to (H-5C) was obtained in the same manner as in the preparation of the styrene-type copolymer (H-2C) except that the amount of the vinyl-based monomer mixture (m4) was changed as indicated in Table 23C.

TABLE 23C

|  |  | STYRENE-BASED COPOLYMER (H) | | | | |
|---|---|---|---|---|---|---|
|  |  | H-1C | H-2C | H-3C | H-4C | H-5C |
| VINYL-BASED | STYRENE | 75 | 70 | 68 | 22 | 55 |
| MONOMER MIXTURE | ACRYLONITRILE | 25 | 23 | 22 | 8 | 15 |
| (m4) (PARTS) | METHYL METHACRYLATE |  | 7 | 10 | 70 |  |
|  | N-PHENYL MALEIMIDE |  |  |  |  | 30 |

Example 1C 10 parts of the graft copolymer (D-1C), 14 parts of the graft copolymer (F-1C) and 76 parts of the methacrylic ester resin (G-1C) were mixed and subjected to melt-kneading using a twin-screw extruder equipped with a vacuum vent of 30 mmϕ (manufactured by Ikegai Inc., product name: PCM30) at 240° C. under a vacuum condition of 93.325 kPa, thereby producing a thermoplastic resin composition. The MVR of thermoplastic resin composition is shown in Table 15C.

The thermoplastic resin composition was pelletized, and each of molded articles was produced. Impact resistance, coloration, scratch resistance, abrasion resistance and heat resistance were evaluated. The results are shown in Table 24C.

Examples 2C to 72C

A thermoplastic resin composition was prepared in the same manner as in Example 1C except that the composition was changed as indicated in Tables 24C to 32C, and then MVR of each examples were measured.

The thermoplastic resin composition was pelletized, and each of molded articles was produced, impact resistance, coloration, scratch resistance, abrasion resistance and heat resistance were evaluated. The results are shown in Tables 24C to 32C.

Comparative Examples 1C to 17C

A thermoplastic resin composition was prepared in the same manner as in Example 1C except that the composition was changed as indicated in Tables 33C to 35C, and then MVR of each examples were measured.

The thermoplastic resin composition was pelletized, and each of molded articles was produced, impact resistance, coloration, scratch resistance, abrasion resistance and heat resistance were evaluated. The results are shown in Tables 33C to 35C.

TABLE 24C

|  |  |  |  | EXAMPLES | | | | | | | | | |
|---|---|---|---|---|---|---|---|---|---|---|---|---|---|
|  |  |  |  | 1C | 2C | 3C | 4C | 5C | 6C | 7C | 8C | 9C | 10C |
| FORMULATION(PARTS) | GRAFT COPOLYMER (D) |  | D-1C | 10 | 10 | 10 | 3 | 17 |  |  |  |  |  |
|  |  |  | D-3C |  |  |  |  |  | 10 |  |  |  |  |
|  |  |  | D-4C |  |  |  |  |  |  | 10 |  |  |  |
|  |  |  | D-6C |  |  |  |  |  |  |  | 10 |  |  |
|  |  |  | D-7C |  |  |  |  |  |  |  |  | 10 |  |
|  |  |  | D-8C |  |  |  |  |  |  |  |  |  | 10 |
|  | GRAFT COPOLYMER (F) |  | F-1C | 14 |  |  | 23.8 | 4.2 | 14 | 14 | 14 | 14 | 14 |
|  |  |  | F-3C |  | 14 |  |  |  |  |  |  |  |  |
|  |  |  | F-4C |  |  | 14 |  |  |  |  |  |  |  |
|  | METHACRYLIC ESTER | | G-1C | 76 |  |  |  |  |  |  |  |  |  |
|  | RESIN (G) | | G-2C |  | 76 | 76 | 73.2 | 78.8 | 76 | 76 | 76 | 76 | 76 |
| (A) OR (C) IN (A) + (C) + (E) (%) |  |  |  | 50 | 50 | 50 | 15 | 85 | 50 | 50 | 50 | 50 | 50 |
| EVALUATION OF | 230° C. MVR | cm³/10 min |  | 12 | 4 | 4 | 4 | 4 | 4 | 4 | 3 | 4 | 4 |
| PHYSICAL PROPERTIES | CHARPY IMPACT STRENGTH | kJ/m² |  | 6 | 6 | 6 | 6 | 6 | 6 | 6 | 6 | 6 | 6 |
|  | COLORATION | L* |  | 4.1 | 4.0 | 4.9 | 4.0 | 5.1 | 5.0 | 5.0 | 5.0 | 5.0 | 5.0 |
|  | SCRATCH RESISTANCE | ΔL*(mb − ma) |  | 3.5 | 3.5 | 3.5 | 3.5 | 3.5 | 3.5 | 3.5 | 3.5 | 3.5 | 3.5 |
|  | SCRATCH RESISTANCE | Rz jis |  | 2.9 | 2.9 | 2.9 | 2.9 | 2.9 | 2.9 | 2.9 | 2.9 | 2.9 | 2.9 |
|  | ABRASION RESISTANCE | ΔL*(mb − ma) |  | 5.5 | 5.5 | 5.5 | 5.5 | 5.5 | 5.5 | 5.5 | 6.7 | 5.5 | 5.5 |
|  | ABRASION RESISTANCE | Rz jis |  | 1.5 | 1.5 | 1.5 | 1.5 | 1.5 | 1.5 | 1.5 | 2.1 | 1.5 | 1.5 |
|  | HEAT RESISTANCE | ° C. |  | 75 | 95 | 95 | 95 | 95 | 95 | 95 | 95 | 95 | 95 |

TABLE 25C

|  |  |  | EXAMPLES | | | |
|---|---|---|---|---|---|---|
|  |  |  | 11C | 12C | 13C | 14C |
| FORMULATION(PARTS) | GRAFT COPOLYMER (D) | D-9C | 10 |  |  |  |
|  |  | D-10C |  | 10 |  |  |
|  |  | D-13C |  |  | 10 |  |
|  |  | D-14C |  |  |  | 10 |
|  | GRAFT COPOLYMER (F) | F-1C | 14 | 14 | 14 | 14 |
|  | METHACRYLIC ESTER | G-1C |  |  | 76 | 76 |
|  | RESIN (G) | G-2C | 76 | 76 |  |  |

TABLE 25C-continued

|  |  |  | EXAMPLES | | | |
|---|---|---|---|---|---|---|
|  |  |  | 11C | 12C | 13C | 14C |
| (A) OR (C) IN (A) + (C) + (E) (%) | | | 50 | 50 | 50 | 50 |
| EVALUATION OF PHYSICAL PROPERTIES | 230° C. MVR | cm³/10 min | 4 | 4 | 12 | 12 |
| | CHARPY IMPACT STRENGTH | kJ/m² | 4 | 4 | 4 | 4 |
| | COLORATION | L* | 5.0 | 5.1 | 4.1 | 4.6 |
| | SCRATCH RESISTANCE | ΔL*(mb − ma) | 3.5 | 3.5 | 3.5 | 3.5 |
| | SCRATCH RESISTANCE | Rz jis | 2.9 | 2.9 | 2.9 | 2.9 |
| | ABRASION RESISTANCE | ΔL*(mb − ma) | 6.6 | 6.7 | 5.5 | 5.5 |
| | ABRASION RESISTANCE | Rz jis | 2.0 | 2.1 | 1.5 | 1.5 |
| | HEAT RESISTANCE | ° C. | 95 | 95 | 75 | 75 |

TABLE 26C

|  |  |  | EXAMPLES | | | | | | | |
|---|---|---|---|---|---|---|---|---|---|---|
|  |  |  | 15C | 16C | 17C | 18C | 19C | 20C | 21C | 22C |
| FORMULATION(PARTS) | GRAFT COPOLYMER (D) | D-13C | 10 | | | | | | | |
| | | D-14C | | 10 | | | | | | |
| | | D-15C | | | 10 | | | | | |
| | | D-16C | | | | 10 | | | | |
| | | D-18C | | | | | 10 | | | |
| | | D-19C | | | | | | 10 | | |
| | | D-20C | | | | | | | 10 | |
| | | D-21C | | | | | | | | 10 |
| | GRAFT COPOLYMER (F) | F-1C | 14 | 14 | 14 | 14 | 14 | 14 | 14 | 14 |
| | METHACRYLIC ESTER RESIN (G) | G-1C | | | | | | | | |
| | | G-2C | 76 | 76 | 76 | 76 | 76 | 76 | 76 | 76 |
| (A) OR (C) IN (A) + (C) + (E) (%) | | | 50 | 50 | 50 | 50 | 50 | 50 | 50 | 50 |
| EVALUATION OF PHYSICAL PROPERTIES | 230° C. MVR | cm³/10 min | 4 | 4 | 4 | 4 | 4 | 4 | 4 | 4 |
| | CHARPY IMPACT STRENGTH | kJ/m² | 4 | 6 | 6 | 4 | 8 | 10 | 12 | 13 |
| | COLORATION | L* | 4.1 | 5.0 | 5.0 | 5.1 | 5.1 | 5.0 | 5.0 | 5.1 |
| | SCRATCH RESISTANCE | ΔL*(mb − ma) | 3.5 | 3.5 | 3.5 | 3.5 | 3.5 | 3.5 | 1.5 | 1.4 |
| | SCRATCH RESISTANCE | Rz jis | 2.9 | 2.9 | 2.9 | 2.9 | 2.9 | 2.9 | 1.8 | 1.6 |
| | ABRASION RESISTANCE | ΔL*(mb − ma) | 5.5 | 5.5 | 5.5 | 5.5 | 5.5 | 2.5 | 2.0 | 2.0 |
| | ABRASION RESISTANCE | Rz jis | 1.5 | 1.5 | 1.5 | 1.5 | 1.5 | 0.9 | 0.7 | 0.7 |
| | HEAT RESISTANCE | ° C. | 95 | 95 | 95 | 95 | 95 | 95 | 95 | 95 |

TABLE 27C

|  |  |  | EXAMPLES | | | | | | | | | |
|---|---|---|---|---|---|---|---|---|---|---|---|---|
|  |  |  | 23C | 24C | 25C | 26C | 27C | 28C | 29C | 30C | 31C | 32C |
| FORMULATION(PARTS) | GRAFT COPOLYMER (D) | D-21C | | | 13.3 | 12.5 | 4.2 | 3.3 | 10 | 10 | 10 | 10 |
| | | D-22C | 10 | | | | | | | | | |
| | | D-23C | | 10 | | | | | | | | |
| | GRAFT COPOLYMER (F) | F-1C | 14 | 14 | 18.7 | 17.5 | 5.8 | 4.7 | 14 | 14 | 14 | 14 |
| | METHACRYLIC ESTER RESIN (G) | G-1C | | | | | | | 63 | 61 | 1 | |
| | | G-2C | 76 | 76 | 68 | 70 | 90 | 92 | 13 | 15 | 75 | |
| | | G-3C | | | | | | | | | | 76 |
| (A) OR (C) IN (A) + (C) + (E) (%) | | | 50 | 50 | 50 | 50 | 50 | 50 | 50 | 50 | 50 | 50 |
| EVALUATION OF PHYSICAL PROPERTIES | 230° C. MVR | cm³/10 min | 4 | 4 | 4 | 4 | 4 | 4 | 9 | 8 | 7 | 4 |
| | CHARPY IMPACT STRENGTH | kJ/m² | 12 | 8 | 14 | 13 | 11 | 8 | 12 | 12 | 12 | 12 |
| | COLORATION | L* | 5.0 | 8.0 | 6.5 | 5.0 | 5.0 | 5.1 | 5.0 | 5.0 | 5.0 | 5.0 |
| | SCRATCH RESISTANCE | ΔL*(mb − ma) | 1.4 | 1.4 | 2.5 | 1.5 | 1.4 | 1.4 | 1.4 | 1.4 | 1.4 | 3.5 |
| | SCRATCH RESISTANCE | Rz jis | 1.6 | 1.6 | 2.2 | 1.8 | 1.6 | 1.6 | 1.6 | 1.6 | 1.6 | 2.9 |
| | ABRASION RESISTANCE | ΔL*(mb − ma) | 2.0 | 2.0 | 2.0 | 2.0 | 2.5 | 4.0 | 2.0 | 2.0 | 2.0 | 2.0 |
| | ABRASION RESISTANCE | Rz jis | 0.7 | 0.7 | 0.7 | 0.7 | 0.9 | 1.0 | 0.7 | 0.7 | 0.7 | 0.7 |
| | HEAT RESISTANCE | ° C. | 95 | 95 | 87 | 92 | 97 | 98 | 87 | 92 | 95 | 95 |

TABLE 28C

| | | | EXAMPLES | | | | | | | | | |
|---|---|---|---|---|---|---|---|---|---|---|---|---|
| | | | 33C | 34C | 35C | 36C | 37C | 38C | 39C | 40C | 41C | 42C |
| FORMULATION(PARTS) | GRAFT COPOLYMER (D) | D-21C | 10 | 10 | 10 | 10 | 10 | 10 | 10 | 10 | 10 | 10 |
| | GRAFT COPOLYMER (F) | F-1C | 14 | 14 | 14 | 14 | 14 | 14 | 14 | 14 | 14 | 14 |
| | METHACRYLIC | G-1C | | | | | | | | | 60 | 58 |
| | ESTER RESIN (G) | G-2C | | | | | | | | | 15 | 14 |
| | | G-4C | 76 | | | | | | | | | |
| | | G-5C | | 76 | | | | | | | | |
| | | G-6C | | | 76 | | | | | | | |
| | | G-7C | | | | 76 | | | | | | |
| | | G-8C | | | | | 76 | | | | | |
| | | G-9C | | | | | | 76 | | | | |
| | | G-10C | | | | | | | 76 | | | |
| | | G-11C | | | | | | | | 76 | | |
| | STYRENE-BASED COPOLYMER (H) | H-1C | | | | | | | | | 1 | 4 |
| (A) OR (C) IN (A) + (C) + (E) (%) | | | 50 | 50 | 50 | 50 | 50 | 50 | 50 | 50 | 50 | 50 |
| EVALUATION OF PHYSICAL PROPERTIES | 230° C. MVR | cm³/10 min | 4 | 8 | 9 | 4 | 3 | 7 | 8 | 8 | 8 | 9 |
| | CHARPY IMPACT STRENGTH | kJ/m² | 12 | 12 | 12 | 12 | 12 | 12 | 12 | 8 | 14 | 14 |
| | COLORATION | L* | 5.0 | 5.0 | 5.1 | 5.0 | 5.0 | 5.0 | 5.0 | 5.0 | 5.0 | 5.0 |
| | SCRATCH RESISTANCE | ΔL*(mb − ma) | 2.5 | 1.4 | 1.4 | 2.5 | 3.5 | 2.5 | 1.5 | 2.5 | 1.4 | 1.4 |
| | SCRATCH RESISTANCE | Rz jis | 2.2 | 1.6 | 1.6 | 2.2 | 2.9 | 2.2 | 1.8 | 2.2 | 1.6 | 1.6 |
| | ABRASION RESISTANCE | ΔL*(mb − ma) | 2.0 | 2.0 | 2.0 | 2.0 | 2.0 | 2.0 | 2.0 | 2.0 | 2.0 | 2.0 |
| | ABRASION RESISTANCE | Rz jis | 0.7 | 0.7 | 0.7 | 0.7 | 0.7 | 0.7 | 0.7 | 0.7 | 0.7 | 0.7 |
| | HEAT RESISTANCE | ° C. | 95 | 92 | 87 | 98 | 99 | 93 | 92 | 92 | 92 | 92 |

TABLE 29C

| | | | EXAMPLES | | | | | |
|---|---|---|---|---|---|---|---|---|
| | | | 43C | 44C | 45C | 46C | 47C | 48C |
| FORMULATION(PARTS) | GRAFT COPOLYMER (D) | D-21C | 10 | 10 | 10 | 10 | 10 | |
| | | D-24C | | | | | | 10 |
| | GRAFT COPOLYMER (F) | F-1C | 14 | 14 | 14 | 14 | 14 | 14 |
| | METHACRYLIC ESTER RESIN (G) | G-1C | 45 | 43 | 58 | 58 | 58 | 76 |
| | | G-2C | 11 | 9 | 14 | 14 | 14 | |
| | STYRENE-BASED COPOLYMER (H) | H-1C | 20 | 24 | | | | |
| | | H-2C | | | 4 | | | |
| | | H-3C | | | | 4 | | |
| | | H-4C | | | | | 4 | |
| | | H-5C | | | | | | |
| (A) OR (C) IN (A) + (C) + (E) (%) | | | 50 | 50 | 50 | 50 | 50 | 50 |
| EVALUATION OF PHYSICAL PROPERTIES | 230° C. MVR | cm³/10 min | 10 | 10 | 9 | 9 | 9 | 4 |
| | CHARPY IMPACT STRENGTH | kJ/m² | 14 | 14 | 14 | 14 | 14 | 5 |
| | COLORATION | L* | 5.0 | 5.0 | 5.0 | 5.0 | 5.0 | 5.1 |
| | SCRATCH RESISTANCE | ΔL*(mb − ma) | 1.4 | 1.5 | 1.4 | 1.4 | 1.4 | 3.5 |
| | SCRATCH RESISTANCE | Rz jis | 1.6 | 1.8 | 1.6 | 1.6 | 1.6 | 2.9 |
| | ABRASION RESISTANCE | ΔL*(mb − ma) | 2.0 | 2.0 | 2.0 | 1.7 | 1.7 | 6.6 |
| | ABRASION RESISTANCE | Rz jis | 0.7 | 0.7 | 0.7 | 0.6 | 0.6 | 2.5 |
| | HEAT RESISTANCE | ° C. | 92 | 92 | 92 | 92 | 92 | 95 |

TABLE 30C

| | | | EXAMPLES | | | | | |
|---|---|---|---|---|---|---|---|---|
| | | | 49C | 50C | 51C | 52C | 53C | 54C |
| FORMULATION(PARTS) | GRAFT COPOLYMER (D) | D-21C | 10 | | | | | |
| | | D-26C | | 10 | | | | |
| | | D-27C | | | 10 | | | |
| | | D-29C | | | | 10 | | |
| | | D-30C | | | | | 10 | |
| | | D-31C | | | | | | 10 |
| | GRAFT COPOLYMER (F) | F-1C | 14 | 14 | 14 | 14 | 14 | 14 |
| | METHACRYLIC ESTER RESIN (G) | G-1C | | | | | | |
| | | G-2C | 38 | 76 | 76 | 76 | 76 | 76 |
| | STYRENE-BASED COPOLYMER (H) | H-5C | 38 | | | | | |

TABLE 30C-continued

|  |  |  | EXAMPLES | | | | | |
|---|---|---|---|---|---|---|---|---|
|  |  |  | 49C | 50C | 51C | 52C | 53C | 54C |
| (A) OR (C) IN (A) + (C) + (E) (%) |  |  | 50 | 50 | 50 | 50 | 50 | 50 |
| EVALUATION OF PHYSICAL PROPERTIES | 230° C. MVR | cm³/10 min | 4 | 4 | 4 | 3 | 4 | 4 |
|  | CHARPY IMPACT STRENGTH | kJ/m² | 12 | 8 | 8 | 8 | 12 | 8 |
|  | COLORATION | L* | 6.1 | 5.1 | 5.0 | 5.3 | 5.0 | 5.2 |
|  | SCRATCH RESISTANCE | ΔL*(mb − ma) | 1.4 | 1.5 | 1.5 | 1.6 | 1.4 | 1.6 |
|  | SCRATCH RESISTANCE | Rz jis | 1.6 | 1.6 | 1.6 | 1.3 | 1.6 | 1.5 |
|  | ABRASION RESISTANCE | ΔL*(mb − ma) | 1.7 | 2.5 | 2.6 | 4.1 | 2.0 | 2.9 |
|  | ABRASION RESISTANCE | Rz jis | 0.6 | 0.9 | 1.0 | 1.2 | 0.7 | 0.9 |
|  | HEAT RESISTANCE | ° C. | 105 | 95 | 95 | 95 | 95 | 95 |

TABLE 31C

|  |  |  | EXAMPLES | | | | | | | |
|---|---|---|---|---|---|---|---|---|---|---|
|  |  |  | 55C | 56C | 57C | 58C | 59C | 60C | 61C | 62C |
| FORMULATION(PARTS) | GRAFT COPOLYMER (D) | D-33C | 10 |  |  |  |  |  |  |  |
|  |  | D-34C |  | 10 |  |  |  |  |  |  |
|  |  | D-35C |  |  | 10 |  |  |  |  |  |
|  |  | D-36C |  |  |  | 10 |  |  |  |  |
|  |  | D-37C |  |  |  |  | 10 |  |  |  |
|  |  | D-38C |  |  |  |  |  | 10 |  |  |
|  |  | D-39C |  |  |  |  |  |  | 10 |  |
|  |  | D-40C |  |  |  |  |  |  |  | 10 |
|  | GRAFT COPOLYMER (F) | F-1C | 14 | 14 | 14 | 14 | 14 | 14 | 14 | 14 |
|  | METHACRYLIC ESTER RESIN (G) | G-2C | 76 | 76 | 76 | 76 | 76 | 76 | 76 | 76 |
| (A) OR (C) IN (A) + (C) + (E) (%) |  |  | 50 | 50 | 50 | 50 | 50 | 50 | 50 | 50 |
| EVALUATION OF PHYSICAL PROPERTIES | 230° C. MVR | cm³/10 min | 4 | 4 | 4 | 4 | 4 | 4 | 4 | 4 |
|  | CHARPY IMPACT STRENGTH | kJ/m² | 6 | 6 | 10 | 11 | 12 | 8 | 12 | 8 |
|  | COLORATION | L* | 4.7 | 4.7 | 5.1 | 5.0 | 5.0 | 5.1 | 5.0 | 5.1 |
|  | SCRATCH RESISTANCE | ΔL*(mb − ma) | 3.5 | 3.5 | 1.4 | 1.4 | 1.5 | 3.5 | 1.5 | 3.5 |
|  | SCRATCH RESISTANCE | Rz jis | 2.9 | 2.9 | 1.6 | 1.6 | 1.8 | 2.9 | 1.8 | 2.9 |
|  | ABRASION RESISTANCE | ΔL*(mb − ma) | 5.5 | 5.5 | 2.2 | 2.3 | 2.0 | 5.5 | 2.0 | 5.5 |
|  | ABRASION RESISTANCE | Rz jis | 1.5 | 1.5 | 0.8 | 0.8 | 0.7 | 1.5 | 0.7 | 1.5 |
|  | HEAT RESISTANCE | ° C. | 95 | 95 | 95 | 95 | 95 | 95 | 95 | 95 |

TABLE 32C

|  |  |  | EXAMPLES | | | | | | | | | |
|---|---|---|---|---|---|---|---|---|---|---|---|---|
|  |  |  | 63C | 64C | 65C | 66C | 67C | 68C | 69C | 70C | 71C | 72C |
| FORMULATION(PARTS) | GRAFT COPOLYMER (D) | D-1C | 6 | 15.3 |  |  |  |  |  |  |  |  |
|  |  | D-21C |  |  | 3 | 6 | 15.3 | 17 |  |  |  |  |
|  |  | D-41C |  |  |  |  |  |  | 10 |  |  |  |
|  |  | D-42C |  |  |  |  |  |  |  | 10 |  |  |
|  |  | D-43C |  |  |  |  |  |  |  |  | 10 |  |
|  |  | D-44C |  |  |  |  |  |  |  |  |  | 10 |
|  | GRAFT COPOLYMER (F) | F-1C | 19.6 | 6.6 | 23.8 | 19.6 | 6.6 | 4.2 | 14 | 14 | 14 | 14 |
|  | METHACRYLIC ESTER RESIN (G) | G-2C | 74.4 | 78.1 | 73.2 | 74.4 | 78.1 | 78.8 | 76 | 76 | 76 | 76 |
| (A) OR (C) IN (A) + (C) + (E) (%) |  |  | 30 | 70 | 15 | 30 | 70 | 85 | 50 | 50 | 50 | 50 |
| EVALUATION OF PHYSICAL PROPERTIES | 230° C. MVR | cm³/10 min | 4 | 4 | 4 | 4 | 4 | 4 | 4 | 4 | 4 | 4 |
|  | CHARPY IMPACT STRENGTH | kJ/m² | 6 | 6 | 8 | 13 | 13 | 8 | 12 | 13 | 13 | 12 |
|  | COLORATION | L* | 4.2 | 4.7 | 5.1 | 5.1 | 5.1 | 5.1 | 5.1 | 5.1 | 5.1 | 5.1 |
|  | SCRATCH RESISTANCE | ΔL*(mb − ma) | 3.5 | 3.5 | 3.5 | 1.4 | 1.4 | 3.5 | 1.5 | 1.4 | 1.4 | 1.4 |
|  | SCRATCH RESISTANCE | Rz jis | 2.9 | 2.9 | 2.9 | 1.6 | 1.6 | 2.9 | 1.8 | 1.6 | 1.6 | 1.6 |
|  | ABRASION RESISTANCE | ΔL*(mb − ma) | 5.5 | 5.5 | 5.5 | 2.1 | 2.1 | 5.5 | 2.0 | 2.0 | 2.0 | 2.0 |
|  | ABRASION RESISTANCE | Rz jis | 1.5 | 1.5 | 1.5 | 0.7 | 0.7 | 1.5 | 0.7 | 0.7 | 0.7 | 0.7 |
|  | HEAT RESISTANCE | ° C. | 95 | 95 | 95 | 95 | 95 | 95 | 95 | 95 | 95 | 95 |

TABLE 33C

|  |  |  | COMPARATIVE EXAMPLE | | | | | | |
|---|---|---|---|---|---|---|---|---|---|
|  |  |  | 1C | 2C | 3C | 4C | 5C | 6C | 7C |
| FORMULATION(PARTS) | GRAFT COPOLYMER (D) | D-2C |  |  |  |  | 10 |  |  |
|  |  | D-5C |  |  |  |  |  | 10 |  |
|  |  | D-11C |  |  |  |  |  |  | 10 |
|  |  | D-12C | 10 |  | 10 |  |  |  |  |
|  |  | D-17C |  | 10 |  | 10 |  |  |  |
|  | GRAFT COPOLYMER (F) | F-1C | 14 | 14 | 14 | 14 | 14 | 14 | 14 |
|  | METHACRYLIC | G-1C | 76 | 76 |  |  |  |  |  |
|  | ESTER RESIN (G) | G-2C |  |  | 76 | 76 | 76 | 76 | 76 |
| (A) OR (C) IN (A) + (C) + (E) (%) |  |  | 50 | 50 | 50 | 50 | 50 | 50 | 50 |
| EVALUATION OF PHYSICAL PROPERTIES | 230° C. MVR | cm³/10 min | 4 | 4 | 4 | 4 | 4 | 1 | 4 |
|  | CHARPY IMPACT STRENGTH | kJ/m² | 2 | 2 | 2 | 2 | 3 | 6 | 3 |
|  | COLORATION | L* | 4.2 | 8.1 | 4.0 | 8.0 | 8.0 | 8.2 | 5.0 |
|  | SCRATCH RESISTANCE | ΔL*(mb − ma) | 3.5 | 3.5 | 3.5 | 3.5 | 3.5 | 3.5 | 3.5 |
|  | SCRATCH RESISTANCE | Rz jis | 2.9 | 2.9 | 2.9 | 2.9 | 2.9 | 2.9 | 2.9 |
|  | ABRASION RESISTANCE | ΔL*(mb − ma) | 5.5 | 5.5 | 5.5 | 5.5 | 10.5 | 5.5 | 10.5 |
|  | ABRASION RESISTANCE | Rz jis | 1.5 | 1.5 | 1.5 | 1.5 | 15.0 | 1.5 | 15.0 |
|  | HEAT RESISTANCE | ° C. | 75 | 75 | 95 | 95 | 95 | 95 | 95 |

TABLE 34C

|  |  |  | COMPARATIVE EXAMPLE | | | | |
|---|---|---|---|---|---|---|---|
|  |  |  | 8C | 9C | 10C | 11C | 12C |
| FORMULATION(PARTS) | GRAFT COPOLYMER (D) | D-1C | 10 | 10 |  |  |  |
|  |  | D-12C |  |  |  |  |  |
|  |  | D-17C |  |  |  |  |  |
|  |  | D-25C |  |  | 10 |  |  |
|  |  | D-28C |  |  |  | 10 |  |
|  |  | D-32C |  |  |  |  | 10 |
|  | GRAFT COPOLYMER (F) | F-1C |  |  |  |  |  |
|  |  | F-2C | 14 |  | 14 | 14 | 14 |
|  |  | F-5C |  | 14 |  |  |  |
|  | METHACRYLIC | G-1C |  |  |  |  |  |
|  | ESTER RESIN (G) | G-2C | 76 | 76 | 76 | 76 | 76 |
|  | STYRENE-BASED COPOLYMER (H) | H-5C |  |  |  |  |  |
| (A) OR (C) IN (A) + (C) + (E) (%) |  |  | 50 | 50 | 50 | 50 | 50 |
| EVALUATION OF PHYSICAL PROPERTIES | 230° C. MVR | cm³/10 min | 4 | 4 | 4 | 1 | 4 |
|  | CHARPY IMPACT STRENGTH | kJ/m² | 2 | 2 | 3 | 7 | 3 |
|  | COLORATION | L* | 4.0 | 8.0 | 7.6 | 7.2 | 4.8 |
|  | SCRATCH RESISTANCE | ΔL*(mb − ma) | 3.5 | 3.5 | 3.4 | 3.5 | 3.3 |
|  | SCRATCH RESISTANCE | Rz jis | 2.9 | 2.9 | 2.8 | 2.9 | 2.8 |
|  | ABRASION RESISTANCE | ΔL*(mb − ma) | 5.5 | 5.5 | 8.3 | 4.9 | 7.6 |
|  | ABRASION RESISTANCE | Rz jis | 1.5 | 1.5 | 4.1 | 1.5 | 3.9 |
|  | HEAT RESISTANCE | ° C. | 95 | 95 | 95 | 95 | 95 |

TABLE 35C

|  |  |  | COMPARATIVE EXAMPLE | | | | |
|---|---|---|---|---|---|---|---|
|  |  |  | 13C | 14C | 15C | 16C | 17C |
| FORMULATION(PARTS) | GRAFT COPOLYMER (D) | D-1C | 2 | 18 | 20 |  |  |
|  | GRAFT COPOLYMER (F) | F-1C | 25.2 | 2.8 |  | 28 | 28 |
|  |  | F-5C |  |  |  |  |  |
|  | METHACRYLIC | G-1C |  |  |  | 72 |  |
|  | ESTER RESIN (G) | G-2C | 72.8 | 79.2 | 80 |  | 72 |
|  | STYRENE-BASED COPOLYMER (H) | H-5C |  |  |  |  |  |
| (A) OR (C) IN (A) + (C) + (E) (%) |  |  | 10 | 90 | 100 | 0 | 0 |
| EVALUATION OF PHYSICAL PROPERTIES | 230° C. MVR | cm³/10 min | 4 | 4 | 4 | 12 | 4 |
|  | CHARPY IMPACT STRENGTH | kJ/m² | 2 | 3 | 3 | 2 | 2 |
|  | COLORATION | L* | 4.0 | 8.1 | 9.0 | 5.0 | 5.1 |
|  | SCRATCH RESISTANCE | ΔL*(mb − ma) | 3.5 | 3.5 | 3.5 | 3.5 | 3.5 |
|  | SCRATCH RESISTANCE | Rz jis | 2.9 | 2.9 | 2.9 | 2.9 | 2.9 |
|  | ABRASION RESISTANCE | ΔL*(mb − ma) | 8.5 | 5.5 | 5.5 | 10.5 | 10.5 |
|  | ABRASION RESISTANCE | Rz jis | 5.0 | 1.5 | 1.5 | 15.0 | 15.0 |
|  | HEAT RESISTANCE | ° C. | 95 | 95 | 95 | 75 | 95 |

The thermoplastic resin composition of Examples 1C to 72C exhibited excellent fluidity. The molded articles obtained in Examples 1C to 72C exhibited excellent impact resistance, heat resistance, coloration, scratch resistance and abrasion resistance.

Therefore, the thermoplastic resin composition of the fourth aspect of the present invention had excellent fluidity. When the thermoplastic resin composition of the fourth aspect of the present invention was used, a molded article having excellent impact resistance, coloration, scratch resistance and abrasion resistance could be obtained. It was confirmed that the molded article could be applied to vehicle interior parts, vehicle exterior parts, office equipments, consumer electronics, building materials and the like.

From the results of Comparative Examples 1C to 17C, impact resistance and abrasion resistance of the molded article other than that of the present invention were deteriorated.

<Measurement Method of Volume Average Particle Diameter 3>

The volume average particle diameter (MV) was measured using microtrac (product name: nanotrac 150, manufactured by Nikkiso Co., Ltd.) and pure water as a solvent used in measurement.

By image processing of electron micrographs, it was confirmed that the volume average particle diameter of ethylene.α-olefin copolymer (A) dispersed in the olefin resin aqueous dispersion (B), the volume average particle diameter of cross-linked ethylene.α-olefin copolymer (C) dispersed in the aqueous dispersion and the volume average particle diameter of composite rubber polymer (L) respectively correspond to the volume average particle diameter of ethylene.α-olefin copolymer (A), the volume average particle diameter of cross-linked ethylene.α-olefin copolymer (C) and the volume average particle diameter of composite rubber polymer (L) without change, in the thermoplastic resin composition.

<Melt-Kneading 5>

A graft copolymer (D), a graft copolymer (M), a methacrylic ester resin (G) and if necessary, the other component were mixed in the ratio as indicated in 24D to 35D, and subjected to melt-kneading using a twin-screw extruder equipped with a vacuum vent of 30 mmϕ (manufactured by Ikegai Inc., product name: PCM30) at the temperature of 200 to 260° C. under a vacuum condition of 93.325 kPa, thereby obtaining a thermoplastic resin composition. After melting and kneading, if necessary, the thermoplastic resin was pelletized using a pelletizer ("SH-type pelletizer, manufactured by So-ken-sha).

<Injection Molding 5>

By treating the pellet obtained by melt-kneading of the thermoplastic resin composition, using an injection molding machine (manufactured by Toshiba Machine Co., Ltd., "IS55FP-1.5A") under the condition where the cylinder temperature was 200 to 260° C. and the mold temperature was 60° C., a plane plate (10 cm×10 cm) having a thickness of 2 mm as a test piece for evaluation of Charpy impact strength was obtained. Using an injection molding machine (manufactured by Sumitomo Heavy Industries, "SG150-SYCAPM IV") under the condition where the cylinder temperature was 200 to 260° C. and the mold temperature was 60° C., a test piece for evaluation of lubricant properties was obtained.

<Evaluation of Lubrication Properties: Before Degreasing>

Figure 2:
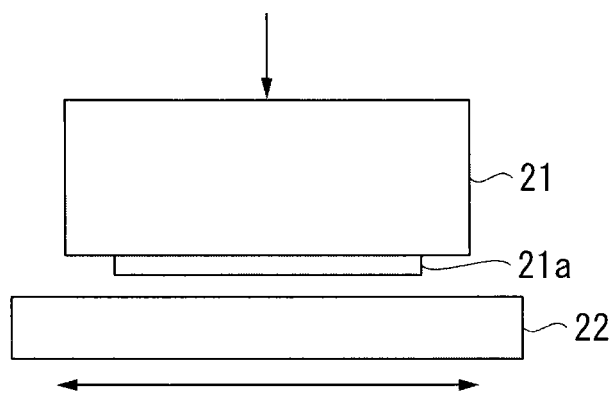
FIG. 2 is a schematic diagram to explain the evaluation method of lubrication property.

By the test using a test piece 21 having a rib structure 21a and a test piece 22 having a planar portion as shown in FIG. 2, whether a squeaking noise was made or not was determined, when the reciprocating movement of the test piece 22 was carried out while applying a load of 500 g or 1 kg. The lubrication properties were evaluated in accordance with the following criteria. A or more better criteria are taken as a test piece having lubricant property.

⊚: a squeaking noise was not made when a load of 500 g or 1 kg was applied.

○: When the load of 1 kg was applied, a squeaking noise was slightly made. But when the load of 500 g was applied, a squeaking noise was not made.

Δ: a squeaking noise was slightly made when a load of 500 g or 1 kg was applied.

x: a squeaking noise was made when a load of 500 g or 1 kg was applied.

<Evaluation of Lubrication Properties: After Degreasing>

A test piece 21 having a rib structure 21a and a test piece 22 having a planar portion as shown in FIG. 2 was annealed at 60° C. for 10 days, the surface of the test pieces 21 and 22 was degreased using isopropylalcohol to remove a bleeded component. The generation of squeaking noise after degreasing was examined in the same manner as above, and evaluated in accordance with the following criteria. A or more better criteria are taken as a test piece having continuous lubricant property.

⊚: a squeaking noise was not made when a load of 500 g or 1 kg was applied.

○: When the load of 1 kg was applied, a squeaking noise was slightly made. But when the load of 500 g was applied, a squeaking noise was not made.

Δ: a squeaking noise was slightly made when a load of 500 g or 1 kg was applied.

x: a squeaking noise was made when a load of 500 g or 1 kg was applied.

<Each Components>

In the following examples, an ethylene·α-olefin copolymer (A), olefin resin aqueous dispersion (B), cross-linked ethylene·α-olefin copolymer (C), graft copolymer (D), polyorganosilixane (La), composite rubber polymer (L), graft copolymer (M), methacrylic ester resin (G) and styrene-based copolymer (H) were used as follows.

<Ethylene·α-Olefin Copolymer (A)>

(Preparation of Ethylene·Propylene Copolymer (A-1D))

After a 20 L stainless-steel polymerization vessel equipped with a stirrer was purged with nitrogen satisfactorily, 10 L of dehydrated and purified hexane was fed to the vessel, 8.0 mmol/L hexane solution of ethyl aluminum sesquichloride $(Al(C_2H_5)_{1.5}\cdot Cl_{1.5})$ was supplied at 5 L/h over 1 hour, and then, 0.8 mmol/L hexane solution of $VO(OC_2H_5)Cl_2$ as a catalyst and hexane were continuously supplied at 5 L/h and 5 L/h respectively. From the top of the polymerization vessel, the polymerization solution was continuously taken out from the vessel, so that the amount of the polymerization solution maintained up to 10 L. Using a bubbling tube, ethylene, propylene and hydrogen were supplied at 2000 L/h, 1000 L/h and 8 L/h respectively, and polymerization reaction was conducted at 35° C.

A polymerization reaction was conducted in the aforementioned manner, and polymerization solution containing an ethylene·propylene copolymer (A-1D) was obtained. The obtained polymerization solution was subjected to decalcification by hydrochloric acid, and poured into methanol to precipitate the product, and then the precipitate was dried, thereby obtaining the ethylene·propylene copolymer (A-1D). The polymer profiles of the ethylene·propylene copolymer (A-1D) are shown in Table 1D.

(Preparation of Ethylene-Propylene Copolymers (A-2D) to (A-5D))

Ethylene-propylene copolymers (A-2D) to (A-5D) were obtained in the same manner as in the preparation of ethylene-propylene copolymer (A-1D) except that the supply amount of hydrogen was changed as indicated in Table 1D. The polymer profiles of ethylene-propylene copolymers (A-2D) to (A-5D) are shown in Table 1D.

(Preparation of Ethylene-Propylene Copolymer (A-6D))

After a 20 L stainless-steel polymerization vessel equipped with a stirrer was purged with nitrogen, 10 L of hexane was fed to the vessel, and 110 L of propylene (in a standard state) and 800 mL of hydrogen gas were added thereto. After heating to 40° C., pressure was applied by supplying ethylene, so that total pressure became 0.6 MPa [gage].

When the inner pressure became 0.6 MPa[gage], 10 mL of 1.0 mM/mL hexane solution of triisobutylaluminum (TIBA) was injected into the autoclave with nitrogen gas. 30 mL of toluene solution containing 0.16 mM of triphenylcarbenium (tetrakispentafluorophenyl) borate in terms of boron and 0.0004 mM of [dimethyl(t-butylamido) (tetramethyl-η5-cyclopentadienyl) silane] titanium chloride, which were prepared in advance, was injected with nitrogen to initiate polymerization. Then, the temperature was adjusted to 40° C. over 5 minutes, and ethylene was supplied so that the pressure became 0.6 MPa[gage]. After 5 minutes from starting the polymerization, 50 mL of methanol was added in order to stop the polymerization, and depressurization was conducted so as to be atmospheric pressure, thereby obtaining polymeric solution of an ethylene-propylene copolymer (A-6D). The obtained polymerization solution was subjected to decalcification by hydrochloric acid, and poured into methanol to precipitate the product, and then the precipitate was dried, thereby obtaining ethylene-propylene copolymer (A-6D). The polymer profiles of the ethylene-propylene copolymer (A-6D) are shown in Table 2D.

(Preparation of Ethylene-Propylene Copolymer (A-7D))

20 parts of the ethylene-propylene copolymer (A-1D) and 80 parts of the ethylene-propylene copolymer (A-6D) were mixed and subjected to melt-kneading using a twin-screw extruder equipped with a vacuum vent of 30 mmφ (manufactured by Ikegai Inc., product name: PCM30) at 200° C. under a vacuum condition of 93.325 kPa, thereby producing an ethylene-propylene copolymer (A-7D). The polymer profiles of the ethylene-propylene copolymer (A-7D) are shown in Table 2D.

(Preparation of Ethylene-Propylene Copolymer A-11 D))

An ethylene-propylene copolymer (A-11D) was obtained in the same manner as in the preparation of the ethylene-propylene copolymer (A-1D), except that $VCl_4$ was used as a catalyst instead of $VO(OC_2H_5)Cl_2$. The polymer profiles of the ethylene-propylene copolymer (A-11D) are shown in Table 1D.

(Preparation of Ethylene-Propylene Copolymer (A-8D))

75 parts of the ethylene-propylene copolymer (A-1D) and 25 parts of the ethylene-propylene copolymer (A-11D) were mixed and subjected to melt-kneading using a twin-screw extruder equipped with a vacuum vent of 30 mmφ (manufactured by Ikegai Inc., product name: PCM30) at 200° C. under a vacuum condition of 93.325 kPa, thereby producing an ethylene-propylene copolymer (A-8D). The polymer profiles of the ethylene-propylene copolymer (A-8D) are shown in Table 2D.

(Preparation of Ethylene-Propylene Copolymer (A-9D))

50 parts of the ethylene-propylene copolymer (A-1D) and 50 parts of the ethylene-propylene copolymer (A-11 D) were mixed and subjected to melt-kneading using a twin-screw extruder equipped with a vacuum vent of 30 mmφ (manufactured by Ikegai Inc., product name: PCM30) at 200° C. under a vacuum condition of 93.325 kPa, thereby producing an ethylene-propylene copolymer (A-9D). The polymer profiles of the ethylene-propylene copolymer (A-9D) are shown in Table 2D.

(Preparation of Ethylene-Propylene Copolymer (A-10D))

20 parts of the ethylene-propylene copolymer (A-1D) and 80 parts of the ethylene-propylene copolymer (A-11D) were mixed and subjected to melt-kneading using a twin-screw extruder equipped with a vacuum vent of 30 mmφ (manufactured by Ikegai Inc., product name: PCM30) at 200° C. under a vacuum condition of 93.325 kPa, thereby producing an ethylene-propylene copolymer (A-10D). The polymer profiles of the ethylene propylene copolymer (A-10D) are shown in Table 2D.

(Preparation of Ethylene-Propylene Copolymers (A-12D) and (A-13D))

Ethylene-propylene copolymers (A-12D) and (A-13D) were obtained in the same manner as in the preparation of ethylene-propylene copolymer (A-1D) except that the supply amount of hydrogen was changed as indicated in Table 3D. The polymer profiles of ethylene-propylene copolymers (A-12D) and (A-13D) are shown in Table 3D.

TABLE 1D

|  |  | ETHYLENE·α-OLEFIN COPOLYMER (A) | | | | | |
| --- | --- | --- | --- | --- | --- | --- | --- |
|  |  | A-1D | A-2D | A-3D | A-4D | A-5D | A-11D |
| POLYMERIZATION CONDITIONS | ETHYLENE(L/h) | 2,000 | 2,000 | 2,000 | 2,000 | 2,000 | 2,000 |
|  | PROPYLENE(L/h) | 1,000 | 1,000 | 1,000 | 1,000 | 1,000 | 1,000 |
|  | HYDROGEN(L/h) | 8 | 100 | 80 | 4 | 1.5 | 8 |
| POLYMER PROPERTIES | ETHYLENE UNIT CONTENT (PARTS) | 56 | 56 | 56 | 56 | 56 | 56 |
|  | PROPYLENE UNIT CONTENT (PARTS) | 44 | 44 | 44 | 44 | 44 | 44 |
|  | WEIGHT AVERAGE MOLECULAR WEIGHT($\times 10^4$) | 30 | 15 | 17 | 35 | 38 | 30 |
|  | DISTRIBUTION OF MOLECULAR WEIGHT(Mw/Mn) | 2.2 | 2.2 | 2.2 | 2.2 | 2.2 | 3.2 |

TABLE 2D

| | | ETHYLENE·α-OLEFIN COPOLYMER (A) | | | | |
|---|---|---|---|---|---|---|
| | | A-6D | A-7D | A-8D | A-9D | A-10D |
| POLYMER PROPERTIES | ETHYLENE UNIT CONTENT (PARTS) | 56 | 56 | 56 | 56 | 56 |
| | PROPYLENE UNIT CONTENT (PARTS) | 44 | 44 | 44 | 44 | 44 |
| | WEIGHT AVERAGE MOLECULAR WEIGHT($\times 10^4$) | 30 | 30 | 30 | 30 | 30 |
| | DISTRIBUTION OF MOLECULAR WEIGHT(Mw/Mn) | 1.8 | 1.9 | 2.5 | 2.7 | 3.0 |

TABLE 3D

| | | ETHYLENE·α-OLEFIN COPOLYMER (A) | |
|---|---|---|---|
| | | A-12D | A-13D |
| POLYMERIZATION CONDITIONS | ETHYLENE(L/h) | 2,000 | 2,000 |
| | PROPYLENE(L/h) | 1,000 | 1,000 |
| | HYDROGEN(L/h) | 12 | 6 |
| POLYMER PROPERTIES | ETHYLENE UNIT CONTENT (PARTS) | 56 | 56 |
| | PROPYLENE UNIT CONTENT (PARTS) | 44 | 44 |
| | WEIGHT AVERAGE MOLECULAR WEIGHT ($\times 10^4$) | 26 | 32 |
| | DISTRIBUTION OF MOLECULAR WEIGHT (Mw/Mn) | 2.2 | 2.2 |

<Olefin Resin Aqueous Dispersion (B)>
<Preparation of Olefin Resin Aqueous Dispersion (B-1D)>

100 parts of the ethylene·propylene copolymer (A-1D), 20 parts of a maleic anhydride-modified polyethylene (manufactured by Mitsui Chemicals, Inc., "Mitsui Hi-WAX 2203A", the weight average molecular weight: 2,700, acid value: 30 mg/g) as an acid-modified olefin polymer, and 5 parts of potassium oleate as an anion-type emulsifier were mixed.

The mixture was supplied from a hopper of a twin screw extruder (manufactured by Ikegai Inc., product name: "PCM30", L/D=40) at 4 kg/h. While an aqueous solution containing 0.5 parts of potassium hydroxide and 2.4 parts of ion exchanged water was continuously supplied through a supply port provided in a vent portion of the twin screw extruder, the mixture was heated at 220° C., and melting-kneading was conducted and then the resulting product was extruded. The melt-kneaded product was continuously supplied to a cooling device which was attached to the tip of the twin screw extruder, and then cooled to 90° C. Then, the solid extruded from the twin screw extruder was poured into hot water at 80° C. and continuously dispersed, and diluted to have the solid content of about 40% by mass, thereby obtaining an olefin resin aqueous dispersion (B-1D).

The volume average particle diameter of the ethylene·α-olefin copolymer (A) dispersed in the olefin resin aqueous dispersion (B-1D) is shown in table 4D.

<Preparation of Olefin Resin Aqueous Dispersions (B-2D) to (B-11D)>

Olefin resin aqueous dispersions (B-2D) to (B-11D) were obtained in the same manner as in the preparation of the olefin resin aqueous dispersion (B-1 D), except that the component (A-2D) to (A-11D) were used as a component (A) instead of the component (A-1D) as indicated in Tables 4D and 5D.

The volume average particle diameters of ethylene·α-olefin copolymer (A) dispersed in olefin resin aqueous dispersions (B-2D) to (B-11D) are shown in tables 4D and 5D.

<Preparation of Olefin Resin Aqueous Dispersions (B-12D) to (B-17D)>

Olefin resin aqueous dispersions (B-12D) to (B-17D) were obtained in the same manner as in the preparation of the olefin resin aqueous dispersion (B-1D) except that the amount of potassium hydroxide and the amount of ion exchanged water used in emulsification were changed as indicated in Table 5D.

The volume average particle diameters of the ethylene·α-olefin copolymer (A) dispersed in the olefin resin aqueous dispersions (B-12D) to (B-17D) are shown in table 5C.

<Preparation of Olefin Resin Aqueous Dispersions (B-18D) to (B-19D)>

Olefin resin aqueous dispersions (B-18D) and (B-19D) were obtained in the same manner as in the preparation of the olefin resin aqueous dispersion (B-1 D), except that the component (A-12D) or (A-13D) was used as a component (A) instead of the component (A-1D) as indicated in Table 6D.

The volume average particle diameters of the ethylene·α-olefin copolymer (A) dispersed in the olefin resin aqueous dispersions (B-18D) and (B-19D) are shown in table 6D.

TABLE 4D

| | | OLEFIN RESIN AQUEOUS DISPERSION (B) | | | | | | | | |
|---|---|---|---|---|---|---|---|---|---|---|
| | | B-1D | B-2D | B-3D | B-4D | B-5D | B-6D | B-D7 | B-8D | B-9D |
| ETHYLENE·α-OLEFIN COPOLYMER (A) (PARTS) | A-1D | 100 | | | | | | | | |
| | A-2D | | 100 | | | | | | | |
| | A-3D | | | 100 | | | | | | |
| | A-4D | | | | 100 | | | | | |
| | A-5D | | | | | 100 | | | | |
| | A-6D | | | | | | 100 | | | |
| | A-7D | | | | | | | 100 | | |
| | A-8D | | | | | | | | 100 | |
| | A-9D | | | | | | | | | 100 |
| VOLUME AVERAGE PARTICLE DIAMETER(μm) | | 0.39 | 0.39 | 0.39 | 0.39 | 0.39 | 0.39 | 0.39 | 0.39 | 0.39 |

TABLE 5D

| | | OLEFIN RESIN AQUEOUS DISPERSION (B) | | | | | | | |
|---|---|---|---|---|---|---|---|---|---|
| | | B-10D | B-11D | B-12D | B-13D | B-14D | B-15D | B-16D | B-17D |
| ETHYLENE·α-OLEFIN COPOLYMER (A) (PARTS) | A-10D | 100 | | | | | | | |
| | A-11D | | 100 | | | | | | |
| | A-1D | | | 100 | 100 | 100 | 100 | 100 | 100 |
| ADDITION AMOUNT OF POTASSIUM HYDROXIDE(PARTS) | | 0.5 | 0.5 | 0.7 | 0.6 | 0.5 | 0.4 | 0.4 | 0.4 |
| ADDITION AMOUNT OF ION EXCHANGED WATER(PARTS) | | 2.4 | 2.4 | 3.4 | 3.2 | 2.7 | 2.1 | 1.9 | 1.8 |
| VOLUME AVERAGE PARTICLE DIAMETER | | 0.39 | 0.39 | 0.15 | 0.20 | 0.30 | 0.50 | 0.60 | 0.68 |

TABLE 6D

| | | OLEFIN RESIN AQUEOUS DISPERSION (B) | |
|---|---|---|---|
| | | B-18D | B-19D |
| ETHYLENE·α-OLEFIN COPOLYMER (A)(PARTS) | A-12D | 100 | |
| | A-13D | | 100 |
| ADDITION AMOUNT OF POTASSIUM HYDROXIDE(PARTS) | | 0.5 | 0.5 |
| ADDITION AMOUNT OF ION EXCHANGED WATER(PARTS) | | 2.4 | 2.4 |
| VOLUME AVERAGE PARTICLE DIAMETER(μm) | | 0.39 | 0.39 |

<Cross-Linked Ethylene·α-Olefin Copolymer (C)>
<Preparation of Cross-Linked Ethylene·α-Olefin Copolymer (C-1D)>

Ion exchanged water was added to the olefin resin aqueous dispersion (B-1D)(100 pars as a solid content), such that the solid content ratio was adjusted to 35%, and then 0.5 parts t-butyl cumyl peroxide as an organic peroxide, and 1 part of divinylbenzene as a polyfunctional compound were added to the mixture, and reacted at 130° C. for 5 hours, thereby producing a cross-linked·α-olefin copolymer (C–1). The gel content ratio and the volume average particle diameter of the cross-linked ethylene·α-olefin copolymer (C-1D) are shown in Table 7D.

<Preparation of Cross-Linked Ethylene·α-Olefin Copolymers (C-2D) to (C-14D)>

Cross-linked ethylene·α-olefin copolymers (C-2D) to (C-14D) were obtained in the same manner as in the preparation of the cross-linked ethylene·α-olefin copolymer (C-1D) except that the type of the olefin resin aqueous dispersion (B) and the amount of the t-butyl cumyl peroxide were changed as indicated in Tables 7D and 8D. The gel content ratios and the volume average particle diameters of cross-1 inked ethylene·α-olefin copolymers (C-2D) to (C-14D) are shown in Tables 7D and 8D.

<Preparation of Cross-Linked Ethylene·α-Olefin Copolymers (C-15D) to (C-24D)>

Cross-linked ethylene·α-olefin copolymers (C-15D) to (C-24D) were obtained in the same manner as in the preparation of the cross-linked ethylene·α-olefin copolymer (C-1D) except that the type of the olefin resin aqueous dispersion (B) and the amount of the t-butyl cumyl peroxide were changed as indicated in Tables 9D and 10D. The gel content ratios and the volume average particle diameters of cross-linked ethylene·α-olefin copolymers (C-15D) to (C-24D) are shown in Tables 9D and 10D.

TABLE 7D

| | | C-1D | C-2D | C-3D | C-4D | C-5D | C-6D |
|---|---|---|---|---|---|---|---|
| OLEFIN RESIN AQUEOUS DISPERSION (B) (SOLID CONTENT) (PARTS) | B-1D | 100 | 100 | 100 | 100 | 100 | 100 |
| t-BUTYL CUMYL PEROXIDE(PARTS) | | 0.1 | 0.15 | 0.2 | 0.5 | 1.2 | 1.5 |
| DIVINYLBENZENE(PARTS) | | 1 | 1 | 1 | 1 | 1 | 1 |
| GEL CONTENT(%) | | 4 | 32 | 35 | 55 | 75 | 79 |
| VOLUME AVERAGE PARTICLE DIAMETER(μm) | | 0.39 | 0.39 | 0.39 | 0.39 | 0.39 | 0.39 |

TABLE 8D

| | | C-7D | C-8D | C-9D | C-10D | C-11D | C-12D | C-13D | C-14D |
|---|---|---|---|---|---|---|---|---|---|
| OLEFIN RESIN AQUEOUS DISPERSION (B) (SOLID CONTENT) (PARTS) | B-2D | 100 | | | | | | | |
| | B-3D | | 100 | | | | | | |
| | B-4D | | | 100 | | | | | |
| | B-5D | | | | 100 | | | | |
| | B-6D | | | | | 100 | | | |
| | B-7D | | | | | | 100 | | |
| | B-10D | | | | | | | 100 | |
| | B-11D | | | | | | | | 100 |
| t-BUTYL CUMYL PEROXIDE(PARTS) | | 1.5 | 0.8 | 0.3 | 0.3 | 0.4 | 0.4 | 0.6 | 0.6 |
| DIVINYLBENZENE(PARTS) | | 1 | 1 | 1 | 1 | 1 | 1 | 1 | 1 |
| GEL CONTENT(%) | | 49 | 49 | 52 | 51 | 52 | 50 | 51 | 49 |
| VOLUME AVERAGE PARTICLE DIAMETER(μm) | | 0.39 | 0.39 | 0.39 | 0.39 | 0.39 | 0.39 | 0.39 | 0.39 |

TABLE 9D

| | | C-15D | C-16D | C-17D | C-18D | C-19D | C-20D |
|---|---|---|---|---|---|---|---|
| OLEFIN RESIN AQUEOUS DISPERSION (B) (SOLID CONTENT) (PARTS) | B-18D | 100 | | | | | |
| | B-19D | | 100 | | | | |
| | B-15D | | | 100 | | | |
| | B-16D | | | | 100 | | |
| | B-8D | | | | | 100 | |
| | B-9D | | | | | | 100 |
| t-BUTYL CUMYL PEROXIDE(PARTS) | | 0.6 | 0.6 | 0.8 | 0.8 | 0.4 | 0.4 |
| DIVINYLBENZENE(PARTS) | | 1 | 1 | 1 | 1 | 1 | 1 |
| GEL CONTENT(%) | | 51 | 50 | 50 | 50 | 51 | 51 |
| VOLUME AVERAGE PARTICLE DIAMETER(μm) | | 0.39 | 0.39 | 0.5 | 0.6 | 0.39 | 0.39 |

TABLE 10D

| | | C-21D | C-22D | C-23D | C-24D |
|---|---|---|---|---|---|
| OLEFIN RESIN AQUEOUS DISPERSION (B) (SOLID CONTENT) (PARTS) | B-1D | 100 | 100 | 100 | 100 |
| t-BUTYL CUMYL PEROXIDE(PARTS) | | 0.25 | 0.35 | 0.8 | 1.0 |
| DIVINYLBENZENE(PARTS) | | 1 | 1 | 1 | 1 |
| GEL CONTENT(%) | | 40 | 45 | 65 | 70 |
| VOLUME AVERAGE PARTICLE DIAMETER(μm) | | 0.39 | 0.39 | 0.39 | 0.39 |

<Graft Copolymer (D)>
(Preparation of Graft Copolymer (D-1D))

An olefin resin aqueous dispersion (B-1D) (containing 70 parts of the ethylene·propylene copolymer (A-1D) as a solid content) was fed into a stainless-steel polymerization vessel equipped with a stirrer, ion exchanged water was added thereto, such that the solid content ratio was adjusted to 30%, and then, 0.006 parts of ferrous sulfate, 0.3 parts of sodium pyrophosphate, and 0.35 parts of fructose were added, and the temperature was adjusted to 80° C. 23.4 parts of styrene, 6.6 parts of acrylonitrile and 0.6 parts of cumene hydroperoxide were continuously added over 150 minutes, and emulsion polymerization was conducted while maintaining a polymerization temperature at 80° C. After polymerization, an antioxidant was added to an aqueous dispersion containing a graft copolymer (D-1D), and solid was precipitated using sulfuric acid, and washing, dehydration and drying were conducted, thereby obtaining a powdery graft copolymer (D-1D). The graft ratio of the graft copolymer (D-1D) was measured as 30%. The results are shown in Table 11D.

(Preparation of Graft Copolymers (D-2D) to (D-1D))

Graft copolymers (D-2D) and (D-17D) were obtained in the same manner as in the preparation of the graft copolymer (D-1D) except that the type of the olefin resin aqueous dispersion (B) was changed as indicated in Tables 11D to 14D. The graft ratios of graft copolymers (D-2D) to (D-17D) are shown in Tables 11D to 14D.

(Preparation of Graft Copolymers (D-18D) to (D-23D) and (D-25D) to (D-32D))

Graft copolymers (D-18D) to (D-23D) and (D-25D) to (D-32D) were obtained in the same manner as in the preparation of the graft copolymer (D-1D) except that the olefin resin aqueous dispersion (B) was changed to an aqueous dispersion containing an cross-linked ethylene-α-olefin copolymer (C) as indicated in Tables 15D to 17D. The graft ratios of graft copolymers (D-18D) to (D-23D) and (D-25D) to (D-32D) are shown in Tables 15D to 17D.

(Preparation of Graft Copolymer (D-24D))

70 parts of ethylene-propylene copolymer (A-1D) and 300 parts of toluene were fed into a stainless-steel polymerization vessel equipped with a stirrer, and dissolved uniformly while stirring for 1 hour at 70° C. After purged with nitrogen satisfactorily, 23.4 parts of styrene, 6.6 parts of acrylonitrile, 0.24 parts of t-dodecylmercaptane, and 0.22 parts of t-butylperoxyisopropyl monocarbonate were added, and then, the inner temperature was raised to 110° C., and the reaction was conducted for 4 hours. The inner temperature was raised to 120° C. and reaction was conducted for 2 hours. After polymerization, the inner temperature was cooled to 100° C., 0.2 parts of octadecyl-3-(3,5-di-t-butyl-4-hydroxyphenol)-propionate was added to the reaction solution. The reaction mixture was taken out from the vessel, and unreacted materials and solvents were distilled by steam distillation. Then, using a twin-screw extruder equipped with a vacuum vent of 30 mmφ (manufactured by Ikegai Inc., product name: PCM30), volatiles were substantially volatilized at 220° C. under a vacuum condition of 93.325 kPa, and a pellet was formed, thereby obtaining a graft copolymer (D-15D). The graft ratio of the graft copolymer (D-24D) was measured as 26%. The volume average particle diameter of ethylene-α-olefin copolymer (A) in a thermoplastic resin composition was observed using an electron microscope, and determined as 0.39 μm. The results are shown in Table 16D.

(Preparation of Graft Copolymers (D-33D) to (D-34D))

Graft copolymers (D-33D) and (D-34D) were obtained in the same manner as in the preparation of the graft copolymer (D-1D) except that the type of the olefin resin aqueous dispersion (B) was changed as indicated in Table 18D. The graft ratios of graft copolymers (D-33D) and (D-34D) are shown in Table 18D.

(Preparation of Graft Copolymers (D-35D) to (D-44D))

Graft copolymers (D-35D) to (D-44D) were obtained in the same manner as in the preparation of the graft copolymer (D-1D) except that the olefin resin aqueous dispersion (B) was changed to an aqueous dispersion containing an cross-linked ethylene-α-olefin copolymer (C) as indicated in Tables 18D to 20D. The graft ratio of each of graft copolymers (D-35D) to (D-44D) are shown in Tables 18D to 20D.

TABLE 11D

| | | GRAFT COPOLYMER (D) | | | |
|---|---|---|---|---|---|
| | | D-1D | D-2D | D-3D | D-4D |
| OLEFIN RESIN AQUEOUS DISPERSION (B) (SOLID CONTENT)(PARTS) | B-1D | 70 | | | |
| | B-2D | | 70 | | |
| | B-3D | | | 70 | |
| | B-4D | | | | 70 |
| VINYL-BASED MONOMER MIXTURE (m1)(PARTS) | STYRENE | 23.4 | 23.4 | 23.4 | 23.4 |
| | ACRYLONITRILE | 6.6 | 6.6 | 6.6 | 6.6 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO(%) | | 29 | 29 | 30 | 29 |

TABLE 12D

| | | GRAFT COPOLYMER (D) | | | |
|---|---|---|---|---|---|
| | | D-5D | D-6D | D-7D | D-8D |
| OLEFIN RESIN AQUEOUS DISPERSION (B) (SOLID CONTENT) (PARTS) | B-5D | 70 | | | |
| | B-6D | | 70 | | |
| | B-7D | | | 70 | |
| | B-8D | | | | 70 |
| VINYL-BASED MONOMER MIXTURE (m1)(PARTS) | STYRENE | 23.4 | 23.4 | 23.4 | 23.4 |
| | ACRYLONITRILE | 6.6 | 6.6 | 6.6 | 6.6 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO(%) | | 28 | 28 | 27 | 28 |

TABLE 13D

| | | GRAFT COPOLYMER (D) | | | |
|---|---|---|---|---|---|
| | | D-9D | D-10D | D-11D | D-12D |
| OLEFIN RESIN AQUEOUS DISPERSION (B) (SOLID CONTENT) (PARTS) | B-9D | 70 | | | |
| | B-10D | | 70 | | |
| | B-11D | | | 70 | |
| | B-12D | | | | 70 |

TABLE 13D-continued

|  | | GRAFT COPOLYMER (D) | | | |
|---|---|---|---|---|---|
|  | | D-9D | D-10D | D-11D | D-12D |
| VINYL-BASED MONOMER | STYRENE | 23.4 | 23.4 | 23.4 | 23.4 |
| MIXTURE (m1)(PARTS) | ACRYLONITRILE | 6.6 | 6.6 | 6.6 | 6.6 |
| GRAFT POLYMERIZATION METHOD | | EMULSION POLYMERI- ZATION | EMULSION POLYMERI- ZATION | EMULSION POLYMERI- ZATION | EMULSION POLYMERI- ZATION |
| GRAFT RATIO(%) | | 29 | 27 | 29 | 30 |

TABLE 14D

|  | | GRAFT COPOLYMER (D) | | | | |
|---|---|---|---|---|---|---|
|  | | D-13D | D-14D | D-15D | D-16D | D-17D |
| OLEFIN RESIN AQUEOUS DISPERSION (B) (SOLID CONTENT) (PARTS) | B-13D | 70 | | | | |
|  | B-14D | | 70 | | | |
|  | B-15D | | | 70 | | |
|  | B-16D | | | | 70 | |
|  | B-17D | | | | | 70 |
| VINYL-BASED MONOMER | STYRENE | 23.4 | 23.4 | 23.4 | 23.4 | 23.4 |
| MIXTURE (m1)(PARTS) | ACRYLONITRILE | 6.6 | 6.6 | 6.6 | 6.6 | 6.6 |
| GRAFT POLYMERIZATION METHOD | | EMULSION POLYMERI- ZATION | EMULSION POLYMERI- ZATION | EMULSION POLYMERI- ZATION | EMULSION POLYMERI- ZATION | EMULSION POLYMERI- ZATION |
| GRAFT RATIO(%) | | 28 | 29 | 30 | 29 | 29 |

TABLE 15D

|  | | GRAFT COPOLYMER (D) | | | |
|---|---|---|---|---|---|
|  | | D-18D | D-19D | D-20D | D-21D |
| AQUEOUS DISPERSION OF CROSS-LINKED ETHYLENE• α-OLEFIN COPOLYMER (C) (SOLID CONTENT)(PARTS) | C-1D | 70 | | | |
|  | C-2D | | 70 | | |
|  | C-3D | | | 70 | |
|  | C-4D | | | | 70 |
| VINYL-BASED MONOMER | STYRENE | 23.4 | 23.4 | 23.4 | 23.4 |
| MIXTURE (m1)(PARTS) | ACRYLONITRILE | 6.6 | 6.6 | 6.6 | 6.6 |
| GRAFT POLYMERIZATION METHOD | | EMULSION POLYMERI- ZATION | EMULSION POLYMERI- ZATION | EMULSION POLYMERI- ZATION | EMULSION POLYMERI- ZATION |
| GRAFT RATIO(%) | | 29 | 28 | 28 | 29 |

TABLE 16D

|  | | GRAFT COPOLYMER (D) | | | | | |
|---|---|---|---|---|---|---|---|
|  | | D-22D | D-23D | D-24D | D-25D | D-26D | D-27D |
| AQUEOUS DISPERSION OF CROSS-LINKED ETHYLENE•α-OLEFIN COPOLYMER (C) (SOLID CONTENT) (PARTS) | C-5D | 70 | | | | | |
|  | C-6D | | 70 | | | | |
|  | C-7D | | | | 70 | | |
|  | C-8D | | | | | 70 | |
|  | C-9D | | | | | | 70 |
| ETHYLENE•α-OLEFIN COPOLYMER (A)(PARTS) | A-1D | | | 70 | | | |
| VINYL-BASED MONOMER MIXTURE (m1)(PARTS) | STYRENE | 23.4 | 23.4 | 23.4 | 23.4 | 23.4 | 23.4 |
|  | ACRYLONITRILE | 6.6 | 6.6 | 6.6 | 6.6 | 6.6 | 6.6 |
| GRAFT POLYMERIZATION METHOD | | EMULSION POLYMER- IZATION | EMULSION POLYMER- IZATION | SOLUTION POLYMER- IZATION | EMULSION POLYMER- IZATION | EMULSION POLYMER- IZATION | EMULSION POLYMER- IZATION |
| GRAFT RATIO(%) | | 29 | 27 | 26 | 28 | 29 | 28 |

TABLE 17D

| | | GRAFT COPOLYMER (D) | | | | |
|---|---|---|---|---|---|---|
| | | D-28D | D-29D | D-30D | D-31D | D-32D |
| OLEFIN RESIN | C-10D | 70 | | | | |
| AQUEOUS | C-11D | | 70 | | | |
| DISPERSION | C-12D | | | 70 | | |
| (B)(PARTS) | C-13D | | | | 70 | |
| | C-14D | | | | | 70 |
| VINYL-BASED | STYRENE | 23.4 | 23.4 | 23.4 | 23.4 | 23.4 |
| MONOMER MIXTURE | ACRYLONITRILE | 6.6 | 6.6 | 6.6 | 6.6 | 6.6 |
| (m1)(PARTS) | | | | | | |
| GRAFT POLYMERIZATION METHOD | | EMULSION POLYMERIZATION | EMULSION POLYMERIZATION | EMULSION POLYMERIZATION | EMULSION POLYMERIZATION | EMULSION POLYMERIZATION |
| GRAFT RATIO(%) | | 28 | 29 | 29 | 28 | 29 |

TABLE 18D

| | | GRAFT COPOLYMER (D) | | | |
|---|---|---|---|---|---|
| | | D-33D | D-34D | D-35D | D-36D |
| OLEFIN RESIN AQUEOUS | B-18D | 70 | | | |
| DISPERSION (B) OR | B-19D | | 70 | | |
| AQUEOUS DISPERSION OF | C-15D | | | 70 | |
| CROSS-LINKED ETHYLENE·α- | C-16D | | | | 70 |
| OLEFIN COPOLYMER (C) | | | | | |
| (SOLID CONTENT)(PARTS) | | | | | |
| VINYL-BASED MONOMER | STYRENE | 23.4 | 23.4 | 23.4 | 23.4 |
| MIXTURE (m1)(PARTS) | ACRYLONITRILE | 6.6 | 6.6 | 6.6 | 6.6 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO(%) | | 28 | 29 | 28 | 29 |

TABLE 19D

| | | GRAFT COPOLYMER (D) | | | |
|---|---|---|---|---|---|
| | | D-37D | D-38D | D-39D | D-40D |
| AQUEOUS DISPERSION | C-17D | 70 | | | |
| OF CROSS-LINKED | C-18D | | 70 | | |
| ETHYLENE·α-OLEFIN | C-19D | | | 70 | |
| COPOLYMER (C) | C-20D | | | | 70 |
| (SOLID CONTENT)(PARTS) | | | | | |
| VINYL-BASED MONOMER | STYRENE | 23.4 | 23.4 | 23.4 | 23.4 |
| MIXTURE (m1)(PARTS) | ACRYLONITRILE | 6.6 | 6.6 | 6.6 | 6.6 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO(%) | | 29 | 29 | 30 | 30 |

TABLE 20D

| | | GRAFT COPOLYMER (D) | | | |
|---|---|---|---|---|---|
| | | D-41D | D-42D | D-43D | D-44D |
| AQUEOUS DISPERSION | C-21D | 70 | | | |
| OF CROSS-LINKED | C-22D | | 70 | | |
| ETHYLENE·α-OLEFIN | C-23D | | | 70 | |
| COPOLYMER (C) | C-24D | | | | 70 |
| (SOLID CONTENT)(PARTS) | | | | | |
| VINYL-BASED MONOMER | STYRENE | 23.4 | 23.4 | 23.4 | 23.4 |
| MIXTURE (m1)(PARTS) | ACRYLONITRILE | 6.6 | 6.6 | 6.6 | 6.6 |
| GRAFT POLYMERIZATION METHOD | | EMULSION POLYMERIZATION | EMULSION POLYMERIZATION | EMULSION POLYMERIZATION | EMULSION POLYMERIZATION |
| GRAFT RATIO(%) | | 29 | 29 | 30 | 29 |

<Graft Copolymer (M)>
(Preparation of Polyorganosiloxane (La-1D))

96 parts of octamethyltetracyclosiloxane, 2 parts of γ-methacryloxypropyl dimethoxymethylsilane, and 2 parts of ethyl orthosilicate are mixed thereby obtaining 100 parts of a siloxane-based mixture. 300 parts of ion-exchanged water dissolving 0.67 parts of sodium dodecylbenzenesulfonate was added to the mixture, and stirred for 2 minutes using a homomixer at 10000 rotation rate, and passed through a homogenizer once under a pressure of 30 MPa, thereby obtaining a premixed aqueous dispersion of organosiloxane.

Into a reaction vessel equipped with a reagent injection container, a cooling tube, a jacket heater and a stirring device, 2 parts of dodecylbenzenesulfonic acid and 98 parts of ion-exchanged water was injected, thereby preparing 2% aqueous solution of dodecylbenzenesulfonic acid. While heating the aqueous solution at 85° C., a premixed aqueous dispersion of organopolysiloxane was added in a dropwise manner over 4 hours, and after dropwise was completed, the temperature was maintained for 1 hour, then cooled. After the reaction solution was left for 48 hours at room temperature, the solution was neutralized using sodium hydroxide aqueous solution, thereby obtaining an aqueous dispersion of polyorganosiloxane (La-1D). Part of polyorganosiloxane (La-1D) aqueous dispersion was dried at 170° C. for 30 minutes, and then, the solid content was calculated as 17.3%. The volume average particle diameter of the polyorganosiloxane (La-1D) dispersed in the aqueous dispersion was 0.05 μm.

(Preparation of Polyorganosiloxane (La-2D))

96 parts of octamethyltetracyclosiloxane, 2 parts of γ-methacryloxypropyl dimethoxymethylsilane, and 2 parts of ethyl orthosilicate are mixed thereby obtaining 100 parts of a siloxane-based mixture. 300 parts of ion-exchanged water dissolving 10 parts of sodium dodecylbenzenesulfonate was added to the mixture, and stirred for 2 minutes using a homomixer at 10,000 rotation rate, and passed through a homogenizer once under a pressure of 30 MPa, thereby obtaining a premixed aqueous dispersion of organosiloxane in a stable state.

Into a reaction vessel equipped with a reagent injection container, a cooling tube, a jacket heater and a stirring device, 2 parts of dodecylbenzenesulfonic acid and 98 parts of ion-exchanged water were injected, thereby preparing 2% aqueous solution of dodecylbenzenesulfonic acid. While heating the aqueous solution at 85° C., the premixed aqueous dispersion of organopolysiloxane was added in a dropwise manner over 4 hours, and after dropwise was completed, the temperature was maintained for 1 hour, then cooled. After the reaction solution was left for 48 hours at room temperature, the solution was neutralized using sodium hydroxide aqueous solution, thereby obtaining an aqueous dispersion of a polyorganosiloxane (La-2D). part of the polyorganosiloxane (La-2D) aqueous dispersion was dried at 170° C. for 30 minutes, and then, the solid content was calculated as 17.3%. The volume average particle diameter of the polyorganosiloxane (La-2D) dispersed in the aqueous dispersion was 0.03 μm.

(Preparation of Graft Copolymer (M-1D))

119.5 parts of aqueous dispersion of polyorganosiloxane (La-1D) and 0.8 parts of polyoxyethylene alkyl phenyl ether sulfate were fed into a reaction vessel equipped with a reagent injection container, a cooling tube, a jacket heater and a stirring device, and 203 parts of ion-exchanged water was added thereto and then mixed. Thereafter, a mixture of 53.2 parts of n-butyl acrylate, 0.21 parts of allyl methacrylate, 0.11 parts of 1,3-butylene glycol dimethacrylate and 0.13 parts of t-butylhydroperoxide were added. By injecting a nitrogen stream into the reactor vessel, the vessel was purged with nitrogen atmosphere, and then, the temperature was raised up to 60° C. When the inner temperature of the reaction vessel was reached to 60° C., an aqueous solution in which 0.0001 parts of ferrous sulfate, 0.0003 parts of ethylenediaminetetraacetic acid disodium salt and 0.24 parts of Rongalit had been dissolved in 10 parts of ion-exchanged water was added, thereby starting radical polymerization. The temperature of the solution was raised to 78° C. due to the polymerization reaction of (meth)acrylic acid ester component. The condition was maintained for 1 hour to complete the polymerization of (meth)acrylic acid ester component, thereby obtaining an aqueous dispersion of a composite rubber polymer (L1-1D). The volume average particle diameter of the composite rubber polymer (L1-1D) dispersed in the aqueous dispersion was 0.082 μm.

After the solution temperature in the reaction vessel was reduced to 60° C., an aqueous solution in which 0.4 parts of Rongalit had been dissolved in 10 parts of ion-exchanged water was added thereto. Next, a mixed solution containing 11.1 parts of acrylonitrile, 33.2 parts of styrene and 0.2 parts of t-butyl hydroperoxide were fed to the vessel in a dropwise manner over 1 hour to polymerize the mixture. After dropwise was completed, the mixture left for 1 hour, then an aqueous solution in which 0.0002 parts of ferrous sulfate, 0.0006 parts of ethylenediaminetetraacetic acid disodium salt and 0.25 parts of Rongalit had been dissolved in 10 parts of ion-exchanged water was added. Next, a mixed solution containing 7.4 parts of acrylonitrile, 22.2 parts of styrene and 0.1 parts of t-butyl hydroperoxide were added in a dropwise manner over 40 minutes to polymerize the mixture. After dropwise was completed, the reaction solution was left for 1 hour and then cooled, thereby obtaining an aqueous dispersion of a graft copolymer (M-1D). Next, 150 parts of an aqueous solution in which calcium acetate had been dissolved to be 5% solution was heated at 60° C. and stirred. To the aqueous solution of calcium acetate, 100 parts of the aqueous dispersion of the graft copolymer (M-1D) was added in a dropwise manner to be coagulated. The coagulated product was separated, washed, and dried, thereby obtaining a dried powder of the graft copolymer (M-1D).

(Preparation of Graft Copolymer (M-2D))

119.5 parts of aqueous dispersion of the polyorganosiloxane (La-2D) and 0.94 parts of polyoxyethylene alkyl phenyl ether sulfate were fed into a reaction vessel equipped with a reagent injection container, a cooling tube, a jacket heater and a stirring device, and 203 parts of ion-exchanged water was added thereto and then mixed. Thereafter, a mixture of 53.2 parts of n-butyl acrylate, 0.21 parts of allyl methacrylate, 0.11 parts of 1,3-butylene glycol dimethacrylate and 0.13 parts of t-butylhydroperoxide was added. By injecting a nitrogen stream into the reactor vessel, the vessel was purged with nitrogen atmosphere, and then, the temperature was raised up to 60° C. When the inner temperature of the reaction vessel was reached to 60° C., an aqueous solution in which 0.0001 parts of ferrous sulfate, 0.0003 parts of ethylenediaminetetraacetic acid disodium salt and 0.24 parts of Rongalit had been dissolved in 10 parts of ion-exchanged water was added, thereby starting radical polymerization. The temperature of the solution was raised to 78° C. due to the polymerization reaction of (meth)acrylic acid ester component. The condition was maintained for 1 hour to complete the polymerization of (meth)acrylic acid ester component, thereby obtaining an aqueous dispersion of a composite rubber polymer (L1-2D). The volume average particle diameter of the composite rubber polymer (L1-2D) dispersed in the aqueous dispersion was 0.037 μm.

After the solution temperature in the reaction vessel was reduced to 60° C., an aqueous solution in which 0.4 parts of Rongalit had been dissolved in 10 parts of ion-exchanged water was added thereto. Next, a mixed solution containing 11.1 parts of acrylonitrile, 33.2 parts of styrene and 0.2 parts of t-butyl hydroperoxide were added thereto in a dropwise manner over 1 hour to polymerize the mixture. After dropwise was completed, the mixture left for 1 hour, then an aqueous solution in which 0.0002 parts of ferrous sulfate, 0.0006 parts of ethylenediaminetetraacetic acid disodium salt and 0.25 parts of Rongalit had been dissolved in 10 parts of ion-exchanged water was added. Next, a mixed solution containing 7.4 parts of acrylonitrile, 22.2 parts of styrene and 0.1 parts of t-butyl hydroperoxide was added thereto in a dropwise manner over 40 minutes to polymerize the mixture. After dropwise was completed, the reaction solution was left for 1 hour and then cooled, thereby obtaining an aqueous dispersion of a graft copolymer (M-2D). Next, 150 parts of an aqueous solution in which calcium acetate had been dissolved to be 5% solution was heated at 60° C. and stirred. To the aqueous solution of calcium acetate, 100 parts of an aqueous dispersion of the graft copolymer (M-2D) was added in a dropwise manner to be coagulated. The coagulated product was separated, washed, and dried, thereby obtaining a dried powder of the graft copolymer (M-2D).

(Preparation of Graft Copolymer (M-3D))

119.5 parts of aqueous dispersion of polyorganosiloxane (La-2D) and 0.9 parts of polyoxyethylene alkyl phenyl ether sulfate were fed into a reaction vessel equipped with a reagent injection container, a cooling tube, a jacket heater and a stirring device, and 203 parts of ion-exchanged water was added thereto and then mixed. Thereafter, a mixture of 53.2 parts of n-butyl acrylate, 0.21 parts of allyl methacrylate, 0.11 parts of 1,3-butylene glycol dimethacrylate and 0.13 parts of t-butylhydroperoxide was added. By injecting a nitrogen stream into the reactor vessel, the vessel was purged with nitrogen atmosphere, and then, the temperature was raised up to 60° C. When the inner temperature of the reaction vessel was reached to 60° C., an aqueous solution in which 0.0001 parts of ferrous sulfate, 0.0003 parts of ethylenediaminetetraacetic acid disodium salt and 0.24 parts of Rongalit had been dissolved in 10 parts of ion-exchanged water was added, thereby starting radical polymerization. The temperature of the solution was raised to 78° C. due to the polymerization reaction of (meth)acrylic acid ester component. The condition was maintained for 1 hour to complete the polymerization of (meth)acrylic acid ester component, thereby obtaining an aqueous dispersion of a composite rubber polymer (L1-3D). The volume average particle diameter of the composite rubber polymer (L1-3D) dispersed in the aqueous dispersion was 0.05 μm.

After the solution temperature in the reaction vessel was reduced to 60° C., an aqueous solution in which 0.4 parts of Rongalit had been dissolved in 10 parts of ion-exchanged water was added thereto. Next, a mixed solution containing 11.1 parts of acrylonitrile, 33.2 parts of styrene and 0.2 parts of t-butyl hydroperoxide were fed to the vessel in a dropwise manner over 1 hour to polymerize the mixture. After dropwise was completed, the mixture left for 1 hour, then an aqueous solution in which 0.0002 parts of ferrous sulfate, 0.0006 parts of ethylenediaminetetraacetic acid disodium salt and 0.25 parts of Rongalit had been dissolved in 10 parts of ion-exchanged water was added. Next, a mixed solution containing 7.4 parts of acrylonitrile, 22.2 parts of styrene and 0.1 parts of t-butyl hydroperoxide were fed to the vessel in a dropwise manner over 40 minutes to polymerize the mixture. After dropwise was completed, the reaction solution was left for 1 hour and then cooled, thereby obtaining an aqueous dispersion of a graft copolymer (M-3D). Next, 150 parts of an aqueous solution in which calcium acetate had been dissolved to be 5% solution was heated at 60° C. and stirred. To the aqueous solution of calcium acetate, 100 parts of an aqueous dispersion of the graft copolymer (M-3D) was added in a dropwise manner and then coagulated. The coagulated product was separated, washed, and dried, thereby obtaining a dried powder of the graft copolymer (M-3D).

(Preparation of Graft Copolymer (M-4D))

119.5 parts of the aqueous dispersion of polyorganosiloxane (La-1D) and 0.51 parts of polyoxyethylene alkyl phenyl ether sulfate were fed into a reaction vessel equipped with a reagent injection container, a cooling tube, a jacket heater and a stirring device, and 203 parts of ion-exchanged water was added thereto and then mixed. Thereafter, a mixture of 53.2 parts of n-butyl acrylate, 0.21 parts of allyl methacrylate, 0.11 parts of 1,3-butylene glycol dimethacrylate and 0.13 parts of t-butylhydroperoxide was added. By injecting a nitrogen stream into the reactor vessel, the vessel was purged with nitrogen atmosphere, and then, the temperature was raised up to 60° C. When the inner temperature of the reaction vessel was reached to 60° C., an aqueous solution in which 0.0001 parts of ferrous sulfate, 0.0003 parts of ethylenediaminetetraacetic acid disodium salt and 0.24 parts of Rongalit had been dissolved in 10 parts of ion-exchanged water was added, thereby starting radical polymerization. The temperature of the solution was raised to 78° C. due to the polymerization reaction of (meth)acrylic acid ester component. The condition was maintained for 1 hour to complete the polymerization of (meth)acrylic acid ester component, thereby obtaining an aqueous dispersion of a composite rubber polymer (L1-4D). The volume average particle diameter of the composite rubber polymer (L1-4D) dispersed in the aqueous dispersion was 0.18 μm.

After the solution temperature in the reaction vessel was reduced to 60° C., an aqueous solution in which 0.4 parts of Rongalit had been dissolved in 10 parts of ion-exchanged water was added thereto. Next, a mixed solution containing 11.1 parts of acrylonitrile, 33.2 parts of styrene and 0.2 parts of t-butyl hydroperoxide were fed to the vessel in a dropwise manner over 1 hour to polymerize the mixture. After dropwise was completed, the mixture left for 1 hour, then an aqueous solution in which 0.0002 parts of ferrous sulfate, 0.0006 parts of ethylenediaminetetraacetic acid disodium salt and 0.25 parts of Rongalit had been dissolved in 10 parts of ion-exchanged water was added. Next, a mixed solution containing 7.4 parts of acrylonitrile, 22.2 parts of styrene and 0.1 parts of t-butyl hydroperoxide were added thereto in a dropwise manner over 40 minutes to polymerize the mixture. After dropwise was completed, the reaction solution was left for 1 hour and then cooled, thereby obtaining an aqueous dispersion of a graft copolymer (M-4D). Next, 150 parts of an aqueous solution in which calcium acetate had been dissolved to be 5% solution was heated at 60° C. and stirred. To the aqueous solution of calcium acetate, 100 parts of the aqueous dispersion of the graft copolymer (M-4D) was added in a dropwise manner to be coagulated. The coagulated product was separated, washed, and dried, thereby obtaining a dried powder of the graft copolymer (M-4D).

(Preparation of Graft Copolymer (M-5D))

119.5 parts of aqueous dispersion of the polyorganosiloxane (La-1D) and 0.33 parts of polyoxyethylene alkyl phenyl ether sulfate were fed into a reaction vessel equipped with a reagent injection container, a cooling tube, a jacket heater and a stirring device, and 203 parts of ion-exchanged water was added thereto and then mixed. Thereafter, a mixture of 53.2 parts of n-butyl acrylate, 0.21 parts of allyl methacrylate, 0.11 parts of 1,3-butylene glycol dimethacrylate and 0.13 parts of t-butylhydroperoxide was added. By injecting a nitrogen stream into the reactor vessel, the vessel was purged with nitrogen atmosphere, and then, the temperature was raised up to 60° C. When the inner temperature of the reaction vessel was reached to 60° C., an aqueous solution in which 0.0001 parts of ferrous sulfate, 0.0003 parts of ethylenediaminetetraacetic acid disodium salt and 0.24 parts of Rongalit had been dissolved in 10 parts of ion-exchanged water was added, thereby starting radical polymerization. The temperature of the solution was raised to 78° C. due to the polymerization reaction of (meth)acrylic acid ester component. The condition was maintained for 1 hour to complete the polymerization of (meth)acrylic acid ester component, thereby obtaining an aqueous dispersion of a composite rubber polymer (L1-5D). The volume average particle diameter of the composite rubber polymer (L1-5D) dispersed in the aqueous dispersion was 0.24 μm.

After the solution temperature in the reaction vessel was reduced to 60° C., an aqueous solution in which 0.4 parts of Rongalit had been dissolved in 10 parts of ion-exchanged water was added thereto. Next, a mixed solution containing 11.1 parts of acrylonitrile, 33.2 parts of styrene and 0.2 parts of t-butyl hydroperoxide were added thereto in a dropwise manner over 1 hour to polymerize the mixture. After dropwise was completed, the mixture left for 1 hour, then an aqueous solution in which 0.0002 parts of ferrous sulfate, 0.0006 parts of ethylenediaminetetraacetic acid disodium salt and 0.25 parts of Rongalit had been dissolved in 10 parts of ion-exchanged water was added. Next, a mixed solution containing 7.4 parts of acrylonitrile, 22.2 parts of styrene and 0.1 parts of t-butyl hydroperoxide were fed to the vessel in a dropwise manner over 40 minutes to polymerize the mixture. After dropwise was completed, the reaction solution was left for 1 hour and then cooled, thereby obtaining an aqueous dispersion of a graft copolymer (M-5D). Next, 150 parts of an aqueous solution in which calcium acetate was dissolved to be 5% solution was heated at 60° C. and stirred. To the aqueous solution of calcium acetate, 100 parts of the aqueous dispersion of the graft copolymer (M-5D) was added in a dropwise manner to be coagulated. The coagulated product was separated, washed, and dried, thereby obtaining a dried powder of the graft copolymer (M-5D).

<Methacrylic Ester Resin (G)>
<Preparation of Methacrylic Ester Resin (G-1D)>

150 parts of ion exchanged water, 99 parts of methyl methacrylate, 1 parts of methyl acrylate, 0.2 parts of 2,2'-azobis(isobutyronitrile), 0.25 parts of n-octyl mercaptane, 0.47 parts of calcium hydroxyapatite, and 0.003 parts of potassium alkenylsuccinate were fed into a stainless-steel polymerization vessel equipped with a stirrer. The inner temperature of the polymerization vessel was raised to 75° C., and reaction was conducted for 3 hours, and then the temperature was raised to 90° C. and reaction was conducted for 1 hour. The inner reaction product was taken out from the vessel, and washed using a centrifugal dehydrator, and then dried, thereby obtaining methacrylic ester resin (G-1D). The monomers are shown in Table 21D.

<Preparation of Methacrylic Ester Resin (G-2D)>

150 parts of ion exchanged water, 82 parts of methyl methacrylate, 12 parts of N-phenylmaleimide, 6 parts of styrene, 0.2 parts of 2,2'-azobis(isobutyronitrile), 0.25 parts of n-octyl mercaptane and 0.7 parts of polyvinyl alcohol were fed into a stainless-steel polymerization vessel equipped with a stirrer. The inner temperature of the polymerization vessel was raised to 75° C., and reaction was conducted for 3 hours, and then the temperature was raised to 90° C. and reaction was conducted for 1 hour. The inner reaction product was taken out from the vessel, and washed using a centrifugal dehydrator, and then dried, thereby obtaining methacrylic ester resin (G-2D). The monomers are shown in Table 21D.

<Preparation of Methacrylic Ester Resins (G-3D) to (G-11D)>

Each of the methacrylic ester resins (G-3D) to (G-11 D) was obtained in the same manner as in the preparation of the methacrylic ester resin (G-2D) except that the type of the vinyl-based monomer mixture (m3) was changed as indicated in Tables 21D or 22D.

TABLE 21D

|  |  | METHACRYLIC ESTER RESIN (G) | | | | | |
|---|---|---|---|---|---|---|---|
|  |  | G-1D | G-2D | G-3D | G-4D | G-5D | G-6D |
| VINYL-BASED MONOMER MIXTURE (m3) (PARTS) | METHYL METHACRYLATE | 99 | 82 | 45 | 50 | 94 | 96 |
|  | METHYL ACRYLATE | 1 |  |  |  |  |  |
|  | N-PHENYL MALEIMIDE |  | 12 | 12 | 12 | 5 | 3 |
|  | STYRENE |  | 6 | 43 | 38 | 1 | 1 |

TABLE 22D

|  |  | METHACRYLIC ESTER RESIN (G) | | | | |
|---|---|---|---|---|---|---|
|  |  | G-7D | G-8D | G-9D | G-10D | G-11D |
| VINYL-BASED MONOMER MIXTURE (m3) (PARTS) | METHYL METHACRYLATE | 50 | 46 | 94 | 50 | 47 |
|  | METHYL ACRYLATE |  |  |  |  |  |
|  | N-PHENYL MALEIMIDE | 49 | 53 | 5.5 | 5 | 5 |
|  | STYRENE | 1 | 1 | 0.5 | 45 | 48 |

<Styrene-Based Copolymer (H)>

(Preparation of Styrene-Based Copolymer (H-1D))

120 parts of ion exchanged water, 0.1 parts of polyvinyl alcohol, 0.3 parts of 2,2'-azobis(isobutyronitrile), 25 parts of acrylonitrile, 75 parts of styrene and 0.35 parts of t-dodecylmercaptane were fed into a stainless-steel polymerization vessel equipped with a stirrer and purged with nitrogen gas, the starting temperature was set to 60° C., and reaction was conducted for 5 hours. The temperature was raised to 120° C. and reaction was conducted for 4 hours. The inner reaction product was taken out, thereby obtaining a styrene-based copolymer (H-1D).

(Preparation of Styrene-Based Copolymer (H-2D))

150 parts of ion exchanged water, 7 parts of methyl methacrylate, 23 parts of acrylonitrile, 70 parts of styrene, 0.2 parts of 2,2'-azobis(isobutyronitrile), 0.25 parts of n-octyl mercaptane, 0.47 parts of calcium hydroxyapatite, and 0.003 parts of potassium alkenylsuccinate were fed into a stainless-steel polymerization vessel equipped with a stirrer, the inner temperature was raised up to 75° C., and reaction was conducted for 3 hours. The temperature was raised to 90° C., and by maintaining the temperature for 60 minutes, the reaction was completed. The inner reaction product was taken out, washing and dehydration using a centrifugal dehydrator were repeatedly conducted, and then the residue was dried, thereby obtaining a styrene-based copolymer (H-2D).

(Preparation of Styrene-Based Copolymers (H-3D) to (H-5D))

Each of styrene-type copolymers (H-3D) to (H-5D) was obtained in the same manner as in the preparation of the styrene-type copolymer (H-2D) except that the amount of the vinyl-based monomer mixture (m4) was changed as indicated in Table 23D.

Example 1D 10 parts of graft copolymer (D-1D), 14 parts of graft copolymer (M-1D) and 76 parts of methacrylic ester resin (G-1D) were mixed and subjected to melt-kneading using a twin-screw extruder equipped with a vacuum vent of 30 mmφ (manufactured by Ikegai Inc., product name: PCM30) at 240° C. under a vacuum condition of 93.325 kPa, thereby producing a thermoplastic resin composition. The MVR of thermoplastic resin composition is shown in Table 24D.

The thermoplastic resin composition was pelletized, and each of molded articles was produced, impact resistance, coloration, scratch resistance, abrasion resistance, heat resistance and lubrication properties (squeaking noise) were evaluated. The results are shown in Table 24D.

Examples 2D to 88D

A thermoplastic resin composition was prepared in the same manner as in Example 1D except that the composition was changed as indicated in Tables 24D to 32D, and then MVR of each examples were measured.

The thermoplastic resin composition was pelletized, and each of molded articles are produced, impact resistance, coloration, scratch resistance, abrasion resistance, heat resistance and lubrication properties (squeaking noise) were evaluated. The results are shown in Tables 24D to 32D.

Comparative Examples 1D to 24D

A thermoplastic resin composition was prepared in the same manner as in Example 1D except that the composition was changed as indicated in Tables 33D to 35D, and then MVR of each example was measured.

The thermoplastic resin composition was pelletized, and each of molded articles was produced, impact resistance, coloration, scratch resistance, abrasion resistance, heat resistance and lubrication properties (reducing squeaking noise) were evaluated. The results are shown in Tables 33D to 35D.

TABLE 23D

|  |  | STYRENE-BASED COPOLYMER (H) | | | | |
|---|---|---|---|---|---|---|
|  |  | H-1D | H-2D | H-3D | H-4D | H-5D |
| VINYL-BASED MONOMER MIXTURE (m4) (PARTS) | STYRENE | 75 | 70 | 68 | 22 | 55 |
|  | ACRYLONITRILE | 25 | 23 | 22 | 8 | 15 |
|  | METHYL METHACRYLATE |  | 7 | 10 | 70 |  |
|  | N-PHENYL MALEIMIDE |  |  |  |  | 30 |

TABLE 24D

| | | | EXAMPLES | | | | | | | | | |
|---|---|---|---|---|---|---|---|---|---|---|---|---|
| | | | 1D | 2D | 3D | 4D | 5D | 6D | 7D | 8D | 9D | 10D |
| FORMULATION (PARTS) | GRAFT COPOLYMER (D) | D-1D | 10 | 10 | 10 | 3 | 17 | | | | | |
| | | D-3D | | | | | | 10 | | | | |
| | | D-4D | | | | | | | 10 | | | |
| | | D-6D | | | | | | | | 10 | | |
| | | D-7D | | | | | | | | | 10 | |
| | | D-8D | | | | | | | | | | 10 |
| | GRAFT COPOLYMER (M) | M-1D | 14 | | | 23.8 | 4.2 | 14 | 14 | 14 | 14 | 14 |
| | | M-3D | | 14 | | | | | | | | |
| | | M-4D | | | 14 | | | | | | | |
| | METHACRYLIC ESTER RESIN (G) | G-1D | 76 | | | | | | | | | |
| | | G-2D | | 76 | 76 | 73.2 | 78.8 | 76 | 76 | 76 | 76 | 76 |
| | (A) OR (C) IN (A) + (C) + (E) (%) | | 50 | 50 | 50 | 15 | 85 | 50 | 50 | 50 | 50 | 50 |
| EVALUATION OF PHYSICAL PROPERTIES | 230° C. MVR | cm³/10 min | 12 | 4 | 4 | 4 | 4 | 4 | 4 | 4 | 3 | 4 |
| | CHARPY IMPACT STRENGTH | kJ/m² | 7 | 7 | 7 | 7 | 7 | 7 | 7 | 7 | 7 | 7 |
| | COLORATION | L* | 5.1 | 4.1 | 5.0 | 4.0 | 5.0 | 5.0 | 5.1 | 5.0 | 5.0 | 5.1 |
| | SCRATCH RESISTANCE | ΔL*(mb − ma) | 3.5 | 3.5 | 3.5 | 3.5 | 3.5 | 3.5 | 3.5 | 3.5 | 3.5 | 3.5 |
| | SCRATCH RESISTANCE | Rz jis | 2.9 | 2.9 | 2.9 | 2.9 | 2.9 | 2.9 | 2.9 | 2.9 | 2.9 | 2.9 |
| | ABRASION RESISTANCE | ΔL*(mb − ma) | 4.0 | 4.0 | 4.0 | 4.0 | 4.0 | 4.0 | 4.0 | 5.5 | 4.0 | 4.0 |
| | ABRASION RESISTANCE | Rz jis | 1.0 | 1.0 | 1.0 | 1.0 | 1.0 | 1.0 | 1.0 | 1.5 | 1.0 | 1.0 |
| | HEAT RESISTANCE | ° C. | 75 | 95 | 95 | 95 | 95 | 95 | 95 | 95 | 95 | 95 |
| | LUBRICANT PROPERTIES | BEFORE DEGREASING | ◎ | ○ | ○ | ○ | ○ | ○ | ○ | ○ | ◎ | ◎ |
| | LUBRICANT PROPERTIES | AFTER DEGREASING | ◎ | ○ | ○ | ○ | ○ | ○ | ○ | ○ | ◎ | ◎ |

TABLE 25D

| | | | EXAMPLES | | | | | | | | | |
|---|---|---|---|---|---|---|---|---|---|---|---|---|
| | | | 11D | 12D | 13D | 14D | 15D | 16D | 17D | 18D | 19D | 20D |
| FORMULATION (PARTS) | GRAFT COPOLYMER (D) | D-9D | 10 | | | | | | | | | |
| | | D-10D | | 10 | | | | | | | | |
| | | D-13D | | | 10 | | | | | | | |
| | | D-16D | | | | 10 | | | | | | |
| | | D-18D | | | | | 10 | | | | | |
| | | D-19D | | | | | | 10 | | | | |
| | | D-20D | | | | | | | 10 | | | |
| | | D-21D | | | | | | | | 10 | | |
| | | D-22D | | | | | | | | | 10 | |
| | | D-23D | | | | | | | | | | 10 |
| | GRAFT COPOLYMER (M) | M-1D | 14 | 14 | 14 | 14 | 14 | 14 | 14 | 14 | 14 | 14 |
| | METHACRYLIC ESTER RESIN (G) | G-1D | | | 76 | 76 | 76 | 76 | 76 | 76 | 76 | 76 |
| | | G-2D | 76 | 76 | | | | | | | | |
| | (A) OR (C) IN (A) + (C) + (E) (%) | | 50 | 50 | 50 | 50 | 50 | 50 | 50 | 50 | 50 | 50 |
| EVALUATION OF PHYSICAL PROPERTIES | 230° C. MVR | cm³/10 min | 4 | 4 | 12 | 12 | 12 | 12 | 12 | 12 | 12 | 12 |
| | CHARPY IMPACT STRENGTH | kJ/m² | 5 | 5 | 5 | 5 | 9 | 11 | 13 | 14 | 13 | 11 |
| | COLORATION | L* | 5.0 | 5.0 | 4.1 | 5.0 | 5.1 | 5.0 | 5.0 | 5.0 | 5.1 | 8.0 |
| | SCRATCH RESISTANCE | ΔL*(mb-ma) | 3.5 | 3.5 | 3.5 | 3.5 | 3.5 | 3.5 | 1.5 | 1.4 | 1.4 | 1.4 |
| | SCRATCH RESISTANCE | Rz jis | 2.9 | 2.9 | 2.9 | 2.9 | 2.9 | 2.9 | 1.8 | 1.6 | 1.6 | 1.6 |
| | ABRASION RESISTANCE | ΔL*(mb-ma) | 5.5 | 5.5 | 4.0 | 4.0 | 4.0 | 4.0 | 1.3 | 1.3 | 2.0 | 2.0 |
| | ABRASION RESISTANCE | Rz jis | 1.5 | 1.5 | 1.0 | 1.0 | 1.0 | 1.0 | 0.4 | 0.4 | 0.7 | 0.7 |
| | HEAT RESISTANCE | ° C. | 95 | 95 | 75 | 75 | 75 | 75 | 75 | 75 | 75 | 75 |
| | LUBRICANT PROPERTIES | BEFORE DEGREASING | ○ | ○ | ○ | ○ | ◎ | ◎ | ◎ | ◎ | ◎ | ◎ |
| | LUBRICANT PROPERTIES | AFTER DEGREASING | ○ | ○ | ○ | ○ | ◎ | ◎ | ◎ | ◎ | ◎ | ◎ |

TABLE 26D

| | | | EXAMPLES | | | | | | | | | |
|---|---|---|---|---|---|---|---|---|---|---|---|---|
| | | | 21D | 22D | 23D | 24D | 25D | 26D | 27D | 28D | 29D | 30D |
| FORMULATION (PARTS) | GRAFT COPOLYMER (D) | D-13D | | | 10 | | | | | | | |
| | | D-14D | | | | 10 | | | | | | |
| | | D-15D | | | | | 10 | | | | | |
| | | D-16D | | | | | | 10 | | | | |
| | | D-18D | | | | | | | 10 | | | |

TABLE 26D-continued

|  |  |  | EXAMPLES | | | | | | | | | |
|---|---|---|---|---|---|---|---|---|---|---|---|---|
|  |  |  | 21D | 22D | 23D | 24D | 25D | 26D | 27D | 28D | 29D | 30D |
|  |  | D-19D |  |  |  |  |  |  |  | 10 |  |  |
|  |  | D-20D |  |  |  |  |  |  |  |  | 10 |  |
|  |  | D-21D | 13.3 | 12.5 |  |  |  |  |  |  |  | 10 |
|  | GRAFT COPOLYMER (M) | M-1D | 18.7 | 17.5 | 14 | 14 | 14 | 14 | 14 | 14 | 14 | 14 |
|  | METHACRYLIC | G-1D | 68 | 70 |  |  |  |  |  |  |  |  |
|  | ESTER RESIN (G) | G-2D |  |  | 76 | 76 | 76 | 76 | 76 | 76 | 76 | 76 |
|  | (A) OR (C) IN (A) + (C) + (E) (%) |  | 50 | 50 | 50 | 50 | 50 | 50 | 50 | 50 | 50 | 50 |
| EVALUATION | 230° C. MVR | cm³/10 min | 12 | 12 | 4 | 4 | 4 | 4 | 4 | 4 | 4 | 4 |
| OF | CHARPY IMPACT | kJ/m² | 15 | 14 | 5 | 7 | 7 | 5 | 9 | 11 | 13 | 14 |
| PHYSICAL | STRENGTH |  |  |  |  |  |  |  |  |  |  |  |
| PROPERTIES | COLORATION | L* | 5.1 | 5.1 | 4.1 | 5.0 | 5.1 | 5.1 | 5.1 | 5.0 | 5.0 | 5.0 |
|  | SCRATCH RESISTANCE | ΔL*(mb − ma) | 2.5 | 1.5 | 3.5 | 3.5 | 3.5 | 3.5 | 3.5 | 3.5 | 1.5 | 1.4 |
|  | SCRATCH RESISTANCE | Rz jis | 2.2 | 1.8 | 2.9 | 2.9 | 2.9 | 2.9 | 2.9 | 2.9 | 1.8 | 1.6 |
|  | ABRASION RESISTANCE | ΔL*(mb − ma) | 1.3 | 1.3 | 4.0 | 4.0 | 4.0 | 4.0 | 4.0 | 4.0 | 1.3 | 1.3 |
|  | ABRASION RESISTANCE | Rz jis | 0.4 | 0.4 | 1.0 | 1.0 | 1.0 | 1.0 | 1.0 | 1.0 | 0.4 | 0.4 |
|  | HEAT RESISTANCE | ° C. | 70 | 72 | 95 | 95 | 95 | 95 | 95 | 95 | 95 | 95 |
|  | LUBRICANT PROPERTIES | BEFORE DEGREASING | ○ | ○ | ○ | ○ | ○ | ○ | ◉ | ◉ | ◉ | ◉ |
|  | LUBRICANT PROPERTIES | AFTER DEGREASING | ○ | ○ | ○ | ○ | ○ | ○ | ◉ | ◉ | ◉ | ◉ |

TABLE 27D

|  |  |  | EXAMPLES | | | | | | | | | |
|---|---|---|---|---|---|---|---|---|---|---|---|---|
|  |  |  | 31D | 32D | 33D | 34D | 35D | 36D | 37D | 38D | 39D | 40D |
| FORMULATION | GRAFT COPOLYMER (D) | D-21D |  |  | 13.3 | 12.5 | 4.2 | 3.3 | 10 | 10 | 10 | 10 |
| (PARTS) |  | D-22D | 10 |  |  |  |  |  |  |  |  |  |
|  |  | D-23D |  | 10 |  |  |  |  |  |  |  |  |
|  | GRAFT COPOLYMER (M) | M-1D | 14 | 14 | 18.7 | 17.5 | 5.8 | 4.7 | 14 | 14 | 14 | 14 |
|  | METHACRYLIC | G-1D |  |  |  |  |  |  | 63 | 61 | 1 |  |
|  | ESTER RESIN (G) | G-2D | 76 | 76 | 68 | 70 | 90 | 92 | 13 | 15 | 75 |  |
|  |  | G-3D |  |  |  |  |  |  |  |  |  | 76 |
|  | (A) OR (C) IN (A) + (C) + (E) (%) |  | 50 | 50 | 50 | 50 | 50 | 50 | 50 | 50 | 50 | 50 |
| EVALUATION | 230° C. MVR | cm³/10 min | 4 | 4 | 4 | 4 | 4 | 4 | 9 | 8 | 7 | 4 |
| OF | CHARPY IMPACT | kJ/m² | 13 | 11 | 15 | 14 | 12 | 9 | 13 | 13 | 13 | 13 |
| PHYSICAL | STRENGTH |  |  |  |  |  |  |  |  |  |  |  |
| PROPERTIES | COLORATION | L* | 5.1 | 8.0 | 5.8 | 5.1 | 5.0 | 5.0 | 5.0 | 5.0 | 5.0 | 5.0 |
|  | SCRATCH RESISTANCE | ΔL*(mb − ma) | 1.4 | 1.4 | 2.5 | 1.5 | 1.4 | 1.4 | 1.4 | 1.4 | 1.4 | 3.5 |
|  | SCRATCH RESISTANCE | Rz jis | 1.6 | 1.6 | 2.2 | 1.8 | 1.6 | 1.6 | 1.6 | 1.6 | 1.6 | 2.9 |
|  | ABRASION RESISTANCE | ΔL*(mb − ma) | 2.0 | 2.0 | 1.3 | 1.3 | 2.0 | 2.5 | 1.3 | 1.3 | 1.3 | 1.3 |
|  | ABRASION RESISTANCE | Rz jis | 0.7 | 0.7 | 0.4 | 0.4 | 0.7 | 0.9 | 0.4 | 0.4 | 0.4 | 0.4 |
|  | HEAT RESISTANCE | ° C. | 95 | 95 | 87 | 92 | 97 | 98 | 87 | 92 | 95 | 95 |
|  | LUBRICANT PROPERTIES | BEFORE DEGREASING | ◉ | ◉ | ○ | ○ | ○ | ○ | ◉ | ◉ | ◉ | ◉ |
|  | LUBRICANT PROPERTIES | AFTER DEGREASING | ◉ | ◉ | ○ | ○ | ○ | ○ | ◉ | ◉ | ◉ | ◉ |

TABLE 28D

|  |  |  | EXAMPLES | | | | | | | | | |
|---|---|---|---|---|---|---|---|---|---|---|---|---|
|  |  |  | 41D | 42D | 43D | 44D | 45D | 46D | 47D | 48D | 49D | 50D |
| FORMULATION | GRAFT COPOLYMER (D) | D-21D | 10 | 10 | 10 | 10 | 10 | 10 | 10 | 10 | 10 | 10 |
| (PARTS) | GRAFT COPOLYMER (M) | M-1D | 14 | 14 | 14 | 14 | 14 | 14 | 14 | 14 | 14 | 14 |
|  | METHACRYLIC | G-1D |  |  |  |  |  |  |  |  | 60 | 58 |
|  | ESTER RESIN (G) | G-2D |  |  |  |  |  |  |  |  | 15 | 14 |
|  |  | G-4D | 76 |  |  |  |  |  |  |  |  |  |
|  |  | G-5D |  | 76 |  |  |  |  |  |  |  |  |
|  |  | G-6D |  |  | 76 |  |  |  |  |  |  |  |
|  |  | G-7D |  |  |  | 76 |  |  |  |  |  |  |
|  |  | G-8D |  |  |  |  | 76 |  |  |  |  |  |
|  |  | G-9D |  |  |  |  |  | 76 |  |  |  |  |
|  |  | G-10D |  |  |  |  |  |  | 76 |  |  |  |
|  |  | G-11D |  |  |  |  |  |  |  | 76 |  |  |

TABLE 28D-continued

|  |  |  | EXAMPLES | | | | | | | | | |
|---|---|---|---|---|---|---|---|---|---|---|---|---|
|  |  |  | 41D | 42D | 43D | 44D | 45D | 46D | 47D | 48D | 49D | 50D |
|  | STYRENE-BASED COPOLYMER (H) | H-1D |  |  |  |  |  |  |  |  | 1 | 4 |
|  | (A) OR (C) IN (A) + (C) + (E) (%) |  | 50 | 50 | 50 | 50 | 50 | 50 | 50 | 50 | 50 | 50 |
| EVALUATION OF PHYSICAL PROPERTIES | 230° C. MVR | cm³/10 min | 4 | 8 | 9 | 4 | 3 | 7 | 8 | 8 | 8 | 9 |
|  | CHARPY IMPACT STRENGTH | kJ/m² | 13 | 13 | 13 | 13 | 13 | 13 | 13 | 9 | 15 | 15 |
|  | COLORATION | L* | 5.0 | 5.0 | 5.1 | 5.0 | 5.0 | 5.0 | 5.0 | 5.0 | 5.0 | 5.0 |
|  | SCRATCH RESISTANCE | ΔL*(mb − ma) | 2.5 | 1.4 | 1.4 | 2.5 | 3.5 | 2.5 | 1.5 | 2.5 | 1.4 | 1.4 |
|  | SCRATCH RESISTANCE | Rz jis | 2.2 | 1.6 | 1.6 | 2.2 | 2.9 | 2.2 | 1.8 | 2.2 | 1.6 | 1.6 |
|  | ABRASION RESISTANCE | ΔL*(mb − ma) | 1.3 | 1.3 | 1.3 | 1.3 | 1.3 | 1.3 | 1.3 | 1.3 | 1.3 | 1.3 |
|  | ABRASION RESISTANCE | Rz jis | 0.4 | 0.4 | 0.4 | 0.4 | 0.4 | 0.4 | 0.4 | 0.4 | 0.4 | 0.4 |
|  | HEAT RESISTANCE | ° C. | 95 | 92 | 87 | 98 | 99 | 93 | 92 | 92 | 92 | 92 |
|  | LUBRICANT PROPERTIES | BEFORE DEGREASING | ◎ | ◎ | ◎ | ◎ | ◎ | ◎ | ◎ | ◎ | ◎ | ◎ |
|  | LUBRICANT PROPERTIES | AFTER DEGREASING | ◎ | ◎ | ◎ | ◎ | ◎ | ◎ | ◎ | ◎ | ◎ | ◎ |

TABLE 29D

|  |  |  | EXAMPLES | | | | | | | | | |
|---|---|---|---|---|---|---|---|---|---|---|---|---|
|  |  |  | 51D | 52D | 53D | 54D | 55D | 56D | 57D | 58D | 59D | 60D |
| FORMULATION (PARTS) | GRAFT COPOLYMER (D) | D-13D |  |  |  |  |  |  |  | 10 |  |  |
|  |  | D-14D |  |  |  |  |  |  |  |  | 10 |  |
|  |  | D-18D |  |  |  |  |  |  |  |  |  | 10 |
|  |  | D-21D | 10 | 10 | 10 | 10 | 10 |  |  |  |  |  |
|  |  | D-24D |  |  |  |  |  | 10 | 10 |  |  |  |
|  | GRAFT COPOLYMER (M) | M-1D | 14 | 14 | 14 | 14 | 14 | 14 | 14 | 14 | 14 | 14 |
|  | METHACRYLIC ESTER RESIN (G) | G-1D | 45 | 43 | 58 | 58 | 58 |  | 76 |  |  |  |
|  |  | G-2D | 11 | 9 | 14 | 14 | 14 | 76 |  | 38 | 38 | 38 |
|  | STYRENE-BASED COPOLYMER (H) | H-1D | 20 | 24 |  |  |  |  |  |  |  |  |
|  |  | H-2D |  |  | 4 |  |  |  |  |  |  |  |
|  |  | H-3D |  |  |  | 4 |  |  |  |  |  |  |
|  |  | H-4D |  |  |  |  | 4 |  |  |  |  |  |
|  |  | H-5D |  |  |  |  |  |  |  | 38 | 38 | 38 |
|  | (A) OR (C) IN (A) + (C) + (E) (%) |  | 50 | 50 | 50 | 50 | 50 | 50 | 50 | 50 | 50 | 50 |
| EVALUATION OF PHYSICAL PROPERTIES | 230° C. MVR | cm³/10 min | 10 | 10 | 9 | 9 | 9 | 4 | 12 | 4 | 4 | 4 |
|  | CHARPY IMPACT STRENGTH | kJ/m² | 15 | 15 | 15 | 15 | 15 | 6 | 6 | 4 | 6 | 6 |
|  | COLORATION | L* | 5.0 | 5.0 | 5.0 | 5.0 | 5.0 | 5.0 | 5.0 | 5.1 | 6.0 | 6.1 |
|  | SCRATCH RESISTANCE | ΔL*(mb − ma) | 1.4 | 1.5 | 1.4 | 1.4 | 1.4 | 3.5 | 3.5 | 3.5 | 3.5 | 3.5 |
|  | SCRATCH RESISTANCE | Rz jis | 1.6 | 1.8 | 1.6 | 1.6 | 1.6 | 2.9 | 2.9 | 2.9 | 2.9 | 2.9 |
|  | ABRASION RESISTANCE | ΔL*(mb − ma) | 1.3 | 1.3 | 1.3 | 1.1 | 1.1 | 6.2 | 6.0 | 4.0 | 4.0 | 4.0 |
|  | ABRASION RESISTANCE | Rz jis | 0.4 | 0.4 | 0.4 | 0.3 | 0.3 | 2.1 | 2.1 | 1.0 | 1.0 | 1.0 |
|  | HEAT RESISTANCE | ° C. | 92 | 92 | 92 | 92 | 92 | 95 | 75 | 105 | 105 | 105 |
|  | LUBRICANT PROPERTIES | BEFORE DEGREASING | ◎ | ◎ | ◎ | ◎ | ◎ | ○ | ○ | ○ | ○ | ◎ |
|  | LUBRICANT PROPERTIES | AFTER DEGREASING | ◎ | ◎ | ◎ | ◎ | ◎ | ○ | ○ | ○ | ○ | ◎ |

TABLE 30D

|  |  |  | EXAMPLES | | | | | | | | | |
|---|---|---|---|---|---|---|---|---|---|---|---|---|
|  |  |  | 61D | 62D | 63D | 64D | 65D | 66D | 67D | 68D | 69D | 70D |
| FORMULATION (PARTS) | GRAFT COPOLYMER (D) | D-19D | 10 |  |  |  |  |  |  |  |  |  |
|  |  | D-20D |  | 10 |  |  |  |  |  |  |  |  |
|  |  | D-21D |  |  | 10 |  |  |  |  |  |  |  |
|  |  | D-22D |  |  |  | 10 |  |  |  |  |  |  |
|  |  | D-23D |  |  |  |  | 10 |  |  |  |  |  |
|  |  | D-26D |  |  |  |  |  | 10 |  |  |  |  |
|  |  | D-27D |  |  |  |  |  |  | 10 |  |  |  |
|  |  | D-29D |  |  |  |  |  |  |  | 10 |  |  |
|  |  | D-30D |  |  |  |  |  |  |  |  | 10 |  |
|  |  | D-31D |  |  |  |  |  |  |  |  |  | 10 |
|  | GRAFT COPOLYMER (M) | M-1D | 14 | 14 | 14 | 14 | 14 | 14 | 14 | 14 | 14 | 14 |
|  | METHACRYLIC ESTER RESIN (G) | G-1D |  |  |  |  |  |  |  |  |  |  |
|  |  | G-2D | 38 | 38 | 38 | 38 | 38 | 76 | 76 | 76 | 76 | 76 |
|  | STYRENE-BASED COPOLYMER (H) | H-5D | 38 | 38 | 38 | 38 | 38 |  |  |  |  |  |
|  | (A) OR (C) IN (A) + (C) + (E) (%) |  | 50 | 50 | 50 | 50 | 50 | 50 | 50 | 50 | 50 | 50 |

TABLE 30D-continued

| | | | EXAMPLES | | | | | | | | | |
|---|---|---|---|---|---|---|---|---|---|---|---|---|
| | | | 61D | 62D | 63D | 64D | 65D | 66D | 67D | 68D | 69D | 70D |
| EVALUATION OF PHYSICAL PROPERTIES | 230° C. MVR | cm³/10 min | 4 | 4 | 4 | 4 | 4 | 4 | 4 | 3 | 4 | 4 |
| | CHARPY IMPACT STRENGTH | kJ/m² | 10 | 12 | 13 | 12 | 10 | 10 | 10 | 10 | 11 | 11 |
| | COLORATION | L* | 6.0 | 6.0 | 6.0 | 6.1 | 9.3 | 4.0 | 4.1 | 4.2 | 4.1 | 4.1 |
| | SCRATCH RESISTANCE | ΔL*(mb − ma) | 3.5 | 1.5 | 1.4 | 1.4 | 1.4 | 1.5 | 1.5 | 1.5 | 1.5 | 1.5 |
| | SCRATCH RESISTANCE | Rz jis | 2.9 | 1.8 | 1.6 | 1.6 | 1.6 | 1.2 | 1.3 | 1.2 | 1.2 | 1.2 |
| | ABRASION RESISTANCE | ΔL*(mb − ma) | 4.0 | 1.3 | 1.3 | 2.0 | 2.0 | 3.5 | 3.8 | 5.5 | 2.9 | 3.9 |
| | ABRASION RESISTANCE | Rz jis | 1.0 | 0.4 | 0.4 | 0.7 | 0.7 | 0.7 | 0.8 | 1.5 | 0.6 | 1.8 |
| | HEAT RESISTANCE | ° C. | 105 | 105 | 105 | 105 | 105 | 95 | 95 | 95 | 96 | 97 |
| | LUBRICANT PROPERTIES | BEFORE DEGREASING | ◎ | ◎ | ◎ | ◎ | ◎ | ○ | ○ | ○ | ◎ | ○ |
| | LUBRICANT PROPERTIES | AFTER DEGREASING | ◎ | ◎ | ◎ | ◎ | ◎ | ○ | ○ | ○ | ◎ | ○ |

TABLE 31D

| | | | EXAMPLES | | | | | | | |
|---|---|---|---|---|---|---|---|---|---|---|
| | | | 71D | 72D | 73D | 74D | 75D | 76D | 77D | 78D |
| FORMULATION (PARTS) | GRAFT COPOLYMER (D) | D-33D | 10 | | | | | | | |
| | | D-34D | | 10 | | | | | | |
| | | D-35D | | | 10 | | | | | |
| | | D-36D | | | | 10 | | | | |
| | | D-37D | | | | | 10 | | | |
| | | D-38D | | | | | | 10 | | |
| | | D-39D | | | | | | | 10 | |
| | | D-40D | | | | | | | | 10 |
| | GRAFT COPOLYMER (M) | M-1D | 14 | 14 | 14 | 14 | 14 | 14 | 14 | 14 |
| | METHACRYLIC ESTER RESIN (G) | G-2D | 76 | 76 | 76 | 76 | 76 | 76 | 76 | 76 |
| | (A) OR (C) IN (A) + (C) + (E) (%) | | 50 | 50 | 50 | 50 | 50 | 50 | 50 | 50 |
| EVALUATION OF PHYSICAL PROPERTIES | 230° C. MVR | cm³/10 min | 4 | 4 | 4 | 4 | 4 | 4 | 4 | 4 |
| | CHARPY IMPACT STRENGTH | kJ/m² | 7 | 7 | 13 | 13 | 13 | 8 | 13 | 9 |
| | COLORATION | L* | 5.1 | 5.0 | 5.0 | 5.0 | 5.0 | 5.1 | 5.0 | 5.1 |
| | SCRATCH RESISTANCE | ΔL*(mb − ma) | 3.5 | 3.5 | 1.4 | 1.4 | 1.4 | 3.5 | 1.4 | 3.5 |
| | SCRATCH RESISTANCE | Rz jis | 2.9 | 2.9 | 1.6 | 1.6 | 1.6 | 2.9 | 1.6 | 2.9 |
| | ABRASION RESISTANCE | ΔL*(mb − ma) | 4.0 | 4.0 | 1.3 | 1.3 | 1.3 | 4.0 | 1.3 | 4.0 |
| | ABRASION RESISTANCE | Rz jis | 1.0 | 1.0 | 0.4 | 0.4 | 0.4 | 1.0 | 0.4 | 1.0 |
| | HEAT RESISTANCE | ° C. | 95 | 95 | 95 | 95 | 95 | 95 | 95 | 95 |
| | LUBRICANT PROPERTIES | BEFORE DEGREASING | ◎ | ◎ | ◎ | ◎ | ◎ | ○ | ◎ | ◎ |
| | LUBRICANT PROPERTIES | AFTER DEGREASING | ◎ | ◎ | ◎ | ◎ | ◎ | ○ | ◎ | ◎ |

TABLE 32D

| | | | EXAMPLES | | | | | | | | | |
|---|---|---|---|---|---|---|---|---|---|---|---|---|
| | | | 79D | 80D | 81D | 82D | 83D | 84D | 85D | 86D | 87D | 88D |
| FORMULATION (PARTS) | GRAFT COPOLYMER (D) | D-1D | 6 | 15.3 | | | | | | | | |
| | | D-21D | | | 3 | 6 | 15.3 | 17 | | | | |
| | | D-41D | | | | | | | 10 | | | |
| | | D-42D | | | | | | | | 10 | | |
| | | D-43D | | | | | | | | | 10 | |
| | | D-44D | | | | | | | | | | 10 |
| | GRAFT COPOLYMER (M) | M-1D | 19.6 | 6.6 | 23.8 | 19.6 | 6.6 | 4.2 | 14 | 14 | 14 | 14 |
| | METHACRYLIC ESTER RESIN (G) | G-2D | 74.4 | 78.1 | 73.2 | 74.4 | 78.1 | 78.8 | 76 | 76 | 76 | 76 |
| | (A) OR (C) IN (A) + (C) + (E) (%) | | 30 | 70 | 15 | 30 | 70 | 85 | 50 | 50 | 50 | 50 |
| EVALUATION OF PHYSICAL PROPERTIES | 230° C. MVR | cm³/10 min | 4 | 4 | 4 | 4 | 4 | 4 | 4 | 4 | 4 | 4 |
| | CHARPY IMPACT STRENGTH | kJ/m² | 7 | 7 | 9 | 13 | 13 | 9 | 13 | 14 | 14 | 13 |
| | COLORATION | L* | 5.1 | 5.0 | 5.1 | 5.0 | 5.0 | 5.1 | 5.0 | 5.0 | 5.0 | 5.0 |
| | SCRATCH RESISTANCE | ΔL*(mb − ma) | 3.5 | 3.5 | 3.5 | 1.4 | 1.4 | 3.5 | 1.4 | 1.4 | 1.4 | 1.4 |
| | SCRATCH RESISTANCE | Rz jis | 2.9 | 2.9 | 2.9 | 1.6 | 1.6 | 2.9 | 1.6 | 1.6 | 1.6 | 1.6 |
| | ABRASION RESISTANCE | ΔL*(mb − ma) | 4.0 | 4.0 | 4.0 | 1.3 | 1.3 | 4.0 | 1.3 | 1.3 | 1.3 | 1.6 |
| | ABRASION RESISTANCE | Rz jis | 1.0 | 1.0 | 1.0 | 0.4 | 0.4 | 1.0 | 0.4 | 0.4 | 0.4 | 0.5 |
| | HEAT RESISTANCE | ° C. | 95 | 95 | 95 | 95 | 95 | 95 | 95 | 95 | 95 | 95 |

TABLE 32D-continued

|  |  | EXAMPLES | | | | | | | | | |
|---|---|---|---|---|---|---|---|---|---|---|---|
|  |  | 79D | 80D | 81D | 82D | 83D | 84D | 85D | 86D | 87D | 88D |
| LUBRICANT PROPERTIES | BEFORE DEGREASING | ◎ | ◎ | ○ | ◎ | ◎ | ○ | ◎ | ◎ | ◎ | ◎ |
| LUBRICANT PROPERTIES | AFTER DEGREASING | ◎ | ◎ | ○ | ◎ | ◎ | ○ | ◎ | ◎ | ◎ | ◎ |

TABLE 33D

|  |  |  | COMPARATIVE EXAMPLE | | | | | | |
|---|---|---|---|---|---|---|---|---|---|
|  |  |  | 1D | 2D | 3D | 4D | 5D | 6D | 7D |
| FORMULATION (PARTS) | GRAFT COPOLYMER (D) | D-2D |  |  |  |  | 10 |  |  |
|  |  | D-5D |  |  |  |  |  | 10 |  |
|  |  | D-11D |  |  |  |  |  |  | 10 |
|  |  | D-12D | 10 |  | 10 |  |  |  |  |
|  |  | D-17D |  | 10 |  | 10 |  |  |  |
|  | GRAFT COPOLYMER (M) | M-1D | 14 | 14 | 14 | 14 | 14 | 14 | 14 |
|  | METHACRYLIC ESTER RESIN (G) | G-1D | 76 | 76 |  |  |  |  |  |
|  |  | G-2D |  |  | 76 | 76 | 76 | 76 | 76 |
|  | (A) OR (C) IN (A) + (C) + (E) (%) |  | 50 | 50 | 50 | 50 | 50 | 50 | 50 |
| EVALUATION OF PHYSICAL PROPERTIES | 230° C. MVR | cm³/10 min | 12 | 12 | 4 | 4 | 4 | 1 | 4 |
|  | CHARPY IMPACT STRENGTH | kJ/m² | 3 | 3 | 3 | 3 | 4 | 7 | 3 |
|  | COLORATION | L* | 4.0 | 8.0 | 4.0 | 8.0 | 8.0 | 8.3 | 5.1 |
|  | SCRATCH RESISTANCE | ΔL*(mb − ma) | 3.5 | 3.5 | 3.5 | 3.5 | 3.5 | 3.5 | 3.5 |
|  | SCRATCH RESISTANCE | Rz jis | 2.9 | 2.9 | 2.9 | 2.9 | 2.9 | 2.9 | 2.9 |
|  | ABRASION RESISTANCE | ΔL*(mb − ma) | 4.0 | 4.0 | 4.0 | 4.0 | 8.5 | 4.0 | 8.5 |
|  | ABRASION RESISTANCE | Rz jis | 1.0 | 1.0 | 1.0 | 1.0 | 5.0 | 1.0 | 5.0 |
|  | HEAT RESISTANCE | ° C. | 75 | 75 | 95 | 95 | 95 | 95 | 95 |
|  | LUBRICANT PROPERTIES | BEFORE DEGREASING | X | X | X | X | X | X | X |
|  | LUBRICANT PROPERTIES | AFTER DEGREASING | X | X | X | X | X | X | X |

TABLE 34D

|  |  |  | COMPARATIVE EXAMPLE | | | | | | | | | |
|---|---|---|---|---|---|---|---|---|---|---|---|---|
|  |  |  | 8D | 9D | 10D | 11D | 12D | 13D | 14D | 15D | 16D | 17D |
| FORMULATION (PARTS) | GRAFT COPOLYMER (D) | D-1D |  |  | 10 | 10 | 10 | 10 | 10 |  |  |  |
|  |  | D-12D | 10 |  |  |  |  |  |  |  |  |  |
|  |  | D-17D |  | 10 |  |  |  |  |  |  |  |  |
|  |  | D-25D |  |  |  |  |  |  |  | 10 |  |  |
|  |  | D-28D |  |  |  |  |  |  |  |  | 10 |  |
|  |  | D-32D |  |  |  |  |  |  |  |  |  | 10 |
|  | GRAFT COPOLYMER (M) | M-1D | 14 | 14 |  |  |  |  |  |  |  |  |
|  |  | M-2D |  |  | 14 |  | 14 |  | 14 | 14 | 14 | 14 |
|  |  | M-5D |  |  |  | 14 |  | 14 |  |  |  |  |
|  | METHACRYLIC ESTER RESIN (G) | G-1D |  |  | 76 | 76 |  |  |  |  |  |  |
|  |  | G-2D | 38 | 38 |  |  | 76 | 76 | 38 | 76 | 76 | 76 |
|  | STYRENE-BASED COPOLYMER (H) | H-5D | 38 | 38 |  |  |  |  | 38 |  |  |  |
|  | (A) OR (C) IN (A) + (C) + (E) (%) |  | 50 | 50 | 50 | 50 | 50 | 50 | 50 | 50 | 50 | 50 |
| EVALUATION OF PHYSICAL PROPERTIES | 230° C. MVR | cm³/10 min | 4 | 4 | 12 | 12 | 4 | 4 | 4 | 4 | 1 | 4 |
|  | CHARPY IMPACT STRENGTH | kJ/m² | 2 | 2 | 3 | 3 | 3 | 3 | 2 | 5 | 8 | 4 |
|  | COLORATION | L* | 5.0 | 9.0 | 4.0 | 8.1 | 4.0 | 8.1 | 5.0 | 7.1 | 7.5 | 2.5 |
|  | SCRATCH RESISTANCE | ΔL*(mb − ma) | 3.5 | 3.5 | 3.5 | 3.5 | 3.5 | 3.5 | 3.5 | 2.0 | 2.0 | 1.9 |
|  | SCRATCH RESISTANCE | Rz jis | 2.9 | 2.9 | 2.9 | 2.9 | 2.9 | 2.9 | 2.9 | 1.2 | 1.2 | 1.2 |
|  | ABRASION RESISTANCE | ΔL*(mb − ma) | 4.0 | 4.0 | 4.0 | 4.0 | 4.0 | 4.0 | 4.0 | 7.5 | 2.0 | 7.1 |
|  | ABRASION RESISTANCE | Rz jis | 1.0 | 1.0 | 1.0 | 1.0 | 1.0 | 1.0 | 1.0 | 4.5 | 0.6 | 4.3 |
|  | HEAT RESISTANCE | ° C. | 105 | 105 | 75 | 75 | 95 | 95 | 105 | 95 | 95 | 95 |
|  | LUBRICANT PROPERTIES | BEFORE DEGREASING | X | X | Δ | Δ | Δ | Δ | Δ | X | X | X |
|  | LUBRICANT PROPERTIES | AFTER DEGREASING | X | X | Δ | Δ | Δ | Δ | Δ | X | X | X |

TABLE 35D

| | | | COMPARATIVE EXAMPLE | | | | | | |
|---|---|---|---|---|---|---|---|---|---|
| | | | 18D | 19D | 20D | 21D | 22D | 23D | 24D |
| FORMULATION (PARTS) | GRAFT COPOLYMER (D) | D-1D | 10 | 2 | 18 | 20 | | | |
| | GRAFT COPOLYMER (M) | M-1D | | 25.2 | 2.8 | | 28 | 28 | 28 |
| | | M-5D | 14 | | | | | | |
| | METHACRYLIC ESTER RESIN (G) | G-1D | | | | | 72 | | |
| | | G-2D | 38 | 72.8 | 79.2 | 80 | | 72 | 36 |
| | STYRENE-BASED COPOLYMER (H) | H-5D | 38 | | | | | | 36 |
| | (A) OR (C) IN (A) + (C) + (E) (%) | | 50 | 10 | 90 | 100 | 0 | 0 | 0 |
| EVALUATION OF PHYSICAL PROPERTIES | 230° C. MVR | cm$^3$/10 min | 4 | 4 | 4 | 4 | 12 | 4 | 4 |
| | CHARPY IMPACT STRENGTH | kJ/m$^2$ | 2 | 3 | 4 | 4 | 3 | 3 | 2 |
| | COLORATION | L* | 9.3 | 4.1 | 8.1 | 9.0 | 4.0 | 4.0 | 5.0 |
| | SCRATCH RESISTANCE | ΔL*(mb − ma) | 3.5 | 3.5 | 3.5 | 3.5 | 3.5 | 3.5 | 3.5 |
| | SCRATCH RESISTANCE | Rz jis | 2.9 | 2.9 | 2.9 | 2.9 | 2.9 | 2.9 | 2.9 |
| | ABRASION RESISTANCE | ΔL*(mb − ma) | 4.0 | 5.5 | 5.5 | 5.5 | 8.5 | 8.5 | 8.5 |
| | ABRASION RESISTANCE | Rz jis | 1.0 | 5.0 | 1.5 | 1.5 | 5.0 | 5.0 | 5.0 |
| | HEAT RESISTANCE | ° C. | 105 | 95 | 95 | 95 | 75 | 95 | 105 |
| | LUBRICANT PROPERTIES | BEFORE DEGREASING | Δ | X | Δ | Δ | X | X | X |
| | LUBRICANT PROPERTIES | AFTER DEGREASING | Δ | X | Δ | Δ | X | X | X |

The thermoplastic resin composition of Examples 1D to 88D exhibited excellent fluidity. The molded articles obtained in Examples 1D to 88D exhibited excellent lubrication property (reducing squeak noise), impact resistance, heat resistance, coloration, scratch resistance and abrasion resistance.

Therefore, the thermoplastic resin composition of the fifth aspect of the present invention had excellent fluidity. When the thermoplastic resin composition of the fifth aspect of the present invention was used, a molded article having excellent lubrication properties (reduced squeaking noise), impact resistance, coloration, scratch resistance and abrasion resistance could be obtained. It was confirmed that the molded article could be applied to vehicle interior parts, vehicle exterior parts, office equipments, consumer electronics, building materials and the like.

From the results of Comparative Examples 1D to 24D, lubrication property (reducing squeak noise) couldn't be achieved, impact resistance and abrasion resistance of the molded article other than that of the present invention were deteriorated.

INDUSTRIAL APPLICABILITY

The molded article formed from the thermoplastic resin composition of the present invention is useful for vehicle interior parts, vehicle exterior parts, office equipments, consumer electronics, building materials and the like.

EXPLANATION OF REFERENCES

10: Jig 11: Tip portion 12: Laminated sheet 13: Molded article (Ma) 21: Test piece 21*a*: Rib structure 22: Test piece

The invention claimed is:

1. A graft copolymer obtainable by polymerization of a vinyl-based monomer mixture (m1) comprising an aromatic vinyl compound and a vinyl cyanide compound in the presence of a cross-linked ethylene.α-olefin copolymer (C) obtainable by cross-linking treatment of an ethylene.α-olefin copolymer (A) which has a mass average molecular weight (Mw) of 17×10$^4$ to 35×10$^4$ and a distribution of molecular weight (Mw/Mn) of 1 to 3, wherein the distribution of molecular weight is represented by the ratio of the mass average molecular weight (Mw) and the number-average molecular weight (Mn), wherein a gel content ratio of the cross-linked ethylene α-olefin copolymer (C) with respect to the total amount of the cross-linked ethylene α-olefin copolymer (C) is 35 to 75% by mass.

2. The graft copolymer according to claim 1, wherein the ethylene.α-olefin copolymer (A) is an ethylene.propylene copolymer.

3. The graft copolymer according to claim 1, wherein the amount of ethylene units in the ethylene.α-olefin copolymer (A) with respect to the total amount of structural units constituting the ethylene.α-olefin copolymer (A) is 45 to 65% by mass.

4. The graft copolymer according to claim 1, wherein the polymerization is emulsion polymerization.

5. A thermoplastic resin composition comprising: a graft copolymer (D) of claim 1; and a hard component (J).

6. The thermoplastic resin composition according to claim 5, wherein the hard compound (J) is a styrene-comprising copolymer (H).

7. A thermoplastic resin composition comprising:
a graft copolymer of claim 1; and
a methacrylic ester resin (G) obtainable by polymerization of a vinyl-based monomer mixture (m3) comprising a methacrylic ester.

8. A thermoplastic resin composition comprising:
a graft copolymer (D) of claim 1;
a graft copolymer (F) obtainable by polymerization of a vinyl-based monomer mixture (m2) comprising an aromatic vinyl compound and a vinyl cyanide compound in the presence of a cross-linked acrylic ester-type rubber polymer (E); and
a methacrylic ester resin (G) obtainable by polymerization of a vinyl-based monomer mixture (m3) comprising a methacrylic ester,
wherein the volume average particle diameter of the cross-linked ethylene.α-olefin copolymer (C) contained in the graft copolymer (D) in the thermoplastic resin composition is 0.2 to 0.6 μm, the volume average particle diameter of the cross-linked acrylic acid ester-type rubber polymer (E) contained in the graft copolymer (F) in the thermoplastic resin composition is 0.05 to 0.18 µm, and the amount of the cross-linked ethylene.α-olefin copolymer (C) is 15 to 85% by mass and the amount of the cross-linked acrylic ester-type rubber polymer (E) is 85 to 15% by mass, with respect to 100 parts by mass of the sum of the cross-linked ethylene.α-olefin copolymer (C) and the cross-linked acrylic ester-type rubber polymer (E).

9. A thermoplastic resin composition comprising:
a graft copolymer (D) of claim 1;
a graft copolymer (M) obtainable by polymerization of a vinyl-based monomer mixture (m5) in the presence of the composite rubber polymer (L) comprising a polyorganosiloxane (La); and
a methacrylic ester resin (G) obtainable by polymerization of a vinyl-based monomer mixture (m3) comprising a methacrylic ester,
wherein the volume average particle diameter of the cross-linked ethylene.α-olefin copolymer (C) contained in the graft copolymer (D) in the thermoplastic resin composition is 0.2 to 0.6 µm,
the volume average particle diameter of the composite rubber polymer (L) contained in the graft copolymer (M) in the thermoplastic resin composition is 0.05 to 0.18 µm, and
the amount of the cross-linked ethylene.α-olefin copolymer (C) is 15 to 85% by mass and the amount of the composite rubber polymer (L) is 85 to 15% by mass, with respect to 100 parts by mass of the sum of the cross-linked ethylene.α-olefin copolymer (C) and the composite rubber polymer (L).

10. The thermoplastic resin composition according to claim 9, wherein the graft copolymer (M) is obtainable by polymerization of the vinyl-based monomer mixture (m5) comprising an aromatic vinyl compound and a vinyl cyanide compound in the presence of a composite rubber polymer (L1) comprising the polyorganosiloxane (La) and a poly(meth)acrylic ester (Lb) that comprises a unit derived from a (meth)acrylic ester and comprises either one or both of a unit derived from a cross-linking agent and a unit derived from a graft cross-linking agent.

11. A molded article formed from the thermoplastic resin composition of claim 5.

12. A thermoplastic resin composition comprising:
a graft copolymer graft copolymer obtainable by polymerization of a vinyl-based monomer mixture (m1) comprising an aromatic vinyl compound and a vinyl cyanide compound in the presence of either an ethylene.α-olefin copolymer (A) which has a mass average molecular weight (Mw) of $17 \times 10^4$ to $35 \times 10^4$ and a distribution of molecular weight (Mw/Mn) of 1 to 3, which is represented by the ratio of the mass average molecular weight (Mw) and the number-average molecular weight (Mn), or a cross-linked ethylene.α-olefin copolymer (C) obtainable by cross-linking treatment of the ethylene.α-olefin copolymer (A);
a graft copolymer (F) obtainable by polymerization of a vinyl-based monomer mixture (m2) comprising an aromatic vinyl compound and a vinyl cyanide compound in the presence of a cross-linked acrylic ester-type rubber polymer (E); and
a methacrylic ester resin (G) obtainable by polymerization of a vinyl-based monomer mixture (m3) comprising a methacrylic ester,
wherein the volume average particle diameter of the ethylene.α-olefin copolymer (A) or the cross-linked ethylene.α-olefin copolymer (C) contained in the graft copolymer (D) in the thermoplastic resin composition is 0.2 to 0.6 µm,
the volume average particle diameter of the cross-linked acrylic acid ester-type rubber polymer (E) contained in the graft copolymer (F) in the thermoplastic resin composition is 0.05 to 0.18 µm, and
the amount of the ethylene.α-olefin copolymer (A) or the cross-linked ethylene.α-olefin copolymer (C) is 15 to 85% by mass and the amount of the cross-linked acrylic ester-type rubber polymer (E) is 85 to 15% by mass, with respect to 100 parts by mass of the sum of the ethylene.α-olefin copolymer (A), the cross-linked ethylene.α-olefin copolymer (C) and the cross-linked acrylic ester-type rubber polymer (E).

13. A thermoplastic resin composition comprising:
a graft copolymer graft copolymer obtainable by polymerization of a vinyl-based monomer mixture (m1) comprising an aromatic vinyl compound and a vinyl cyanide compound in the presence of either an ethylene.α-olefin copolymer (A) which has a mass average molecular weight (Mw) of $17 \times 10^4$ to $35 \times 10^4$ and a distribution of molecular weight (Mw/Mn) of 1 to 3, which is represented by the ratio of the mass average molecular weight (Mw) and the number-average molecular weight (Mn), or a cross-linked ethylene.α-olefin copolymer (C) obtainable by cross-linking treatment of the ethylene.α-olefin copolymer (A);
a graft copolymer (M) obtainable by polymerization of a vinyl-based monomer mixture (m5) in the presence of the composite rubber polymer (L) comprising a polyorganosiloxane (La); and
a methacrylic ester resin (G) obtainable by polymerization of a vinyl-based monomer mixture (m3) comprising a methacrylic ester,
wherein the volume average particle diameter of the ethylene.α-olefin copolymer (A) or the cross-linked ethylene.α-olefin copolymer (C) contained in the graft copolymer (D) in the thermoplastic resin composition is 0.2 to 0.6 µm,
the volume average particle diameter of the composite rubber polymer (L) contained in the graft copolymer (M) in the thermoplastic resin composition is 0.05 to 0.18 µm, and
the amount of the ethylene.α-olefin copolymer (A) or the cross-linked ethylene.α-olefin copolymer (C) is 15 to 85% by mass and the amount of the composite rubber polymer (L) is 85 to 15% by mass, with respect to 100 parts by mass of the sum of the ethylene.α-olefin copolymer (A), the cross-linked ethylene.α-olefin copolymer (C) and the composite rubber polymer (L).

14. The thermoplastic resin composition according to claim 13, wherein the graft copolymer (M) is obtainable by polymerization of the vinyl-based monomer mixture (m5) comprising an aromatic vinyl compound and a vinyl cyanide compound in the presence of a composite rubber polymer (L1) comprising the polyorganosiloxane (La) and a poly(meth)acrylic ester (Lb) that comprises a unit derived from a (meth)acrylic ester and comprises either one or both of a unit derived from a cross-linking agent and a unit derived from a graft cross-linking agent.

* * * * *